US010432414B2

United States Patent
Johnsen et al.

(10) Patent No.: US 10,432,414 B2
(45) Date of Patent: Oct. 1, 2019

(54) SYSTEM AND METHOD TO PROVIDE MULTICAST GROUP MEMBERSHIP DEFINED RELATIVE TO PARTITION MEMBERSHIP IN A HIGH PERFORMANCE COMPUTING ENVIRONMENT

(71) Applicant: ORACLE INTERNATIONAL CORPORATION

(72) Inventors: Bjørn Dag Johnsen, Oslo (NO); Bartosz Bogdanski, Oslo (NO); Line Holen, Oslo (NO)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/927,448

(22) Filed: Mar. 21, 2018

(65) Prior Publication Data

US 2018/0278429 A1 Sep. 27, 2018

Related U.S. Application Data

(60) Provisional application No. 62/476,423, filed on Mar. 24, 2017, provisional application No. 62/547,203, (Continued)

(51) Int. Cl.
*H04L 12/18* (2006.01)
*H04L 12/24* (2006.01)
(Continued)

(52) U.S. Cl.
CPC ........ *H04L 12/185* (2013.01); *G06F 9/45558* (2013.01); *G06F 16/2255* (2019.01);
(Continued)

(58) Field of Classification Search
CPC ... H04L 12/18; H04L 12/185; H04L 12/1881; H04L 12/1886; H04L 12/56; H04L 45/16; H04L 65/4076; H04L 67/1044
See application file for complete search history.

(56) References Cited

U.S. PATENT DOCUMENTS 5,355,371 A * 10/1994 Auerbach ............. H04L 12/185
370/255
6,671,276 B1 * 12/2003 Bakre ................. H04L 12/1836
370/390
(Continued)

FOREIGN PATENT DOCUMENTS

| EP | 1372319 | 12/2003 |
| EP | 1515477 | 3/2005 |
| WO | 2015130372 | 9/2015 |

OTHER PUBLICATIONS

International Search Report and Written Opinion of the International Searching Authority for PCT Application No. PCT/US2018/023845, dated Jun. 12, 2018, 14 pages.
(Continued)

*Primary Examiner* — Melanie Jagannathan
(74) *Attorney, Agent, or Firm* — Tucker Ellis LLP

(57) ABSTRACT

Systems and methods for providing multicast group (MCG) membership relative to partition membership in a high performance computing environment. In accordance with an embodiment, by allowing a subnet manager of a local subnet to be instructed that all ports that are members of the relevant partition should be set up as members for a specific multicast group, the SM can perform a more efficient multicast-routing process. It is also possible to limit the IB client interaction with subnet administration conventionally required to handle join and leave operations. Additionally, subnet manager overhead can be reduced by creating a spanning tree for the routing of multicast packets that
(Continued)

includes each of the partition members added to the multicast group, instead of creating a spanning tree after each multicast group join request is received, as conventionally required.

20 Claims, 72 Drawing Sheets

Related U.S. Application Data filed on Aug. 18, 2017, provisional application No. 62/547,206, filed on Aug. 18, 2017, provisional application No. 62/547,213, filed on Aug. 18, 2017, provisional application No. 62/547,218, filed on Aug. 18, 2017, provisional application No. 62/547,223, filed on Aug. 18, 2017, provisional application No. 62/547,225, filed on Aug. 18, 2017, provisional application No. 62/547,255, filed on Aug. 18, 2017, provisional application No. 62/547,258, filed on Aug. 18, 2017, provisional application No. 62/547,259, filed on Aug. 18, 2017, provisional application No. 62/547,260, filed on Aug. 18, 2017, provisional application No. 62/547,261, filed on Aug. 18, 2017, provisional application No. 62/547,264, filed on Aug. 18, 2017.

(51) Int. Cl.

| | | |
|---|---|---|
| *H04L 12/753* | (2013.01) | |
| *G06F 16/22* | (2019.01) | |
| *H04L 12/761* | (2013.01) | |
| *H04L 12/805* | (2013.01) | |
| *H04L 12/933* | (2013.01) | |
| *G06F 9/455* | (2018.01) | |
| *H04L 12/755* | (2013.01) | |
| *H04L 12/931* | (2013.01) | |
| *H04L 29/12* | (2006.01) | |
| *H04L 29/08* | (2006.01) | |
| *H04L 29/06* | (2006.01) | |
| *H04L 12/935* | (2013.01) | |

(52) U.S. Cl.
CPC ...... *H04L 12/1886* (2013.01); *H04L 41/0853* (2013.01); *H04L 41/0893* (2013.01); *H04L 41/14* (2013.01); *H04L 41/30* (2013.01); *H04L 45/021* (2013.01); *H04L 45/16* (2013.01); *H04L 45/48* (2013.01); *H04L 47/36* (2013.01); *H04L 49/15* (2013.01); *H04L 49/201* (2013.01); *H04L 49/356* (2013.01); *H04L 49/357* (2013.01); *H04L 49/358* (2013.01); *H04L 61/10* (2013.01); *H04L 61/103* (2013.01); *H04L 61/2069* (2013.01); *H04L 61/6068* (2013.01); *H04L 67/10* (2013.01); *H04L 69/18* (2013.01); *G06F 2009/4557* (2013.01); *G06F 2009/45595* (2013.01); *H04L 49/30* (2013.01); *H04L 61/6022* (2013.01)

(56) References Cited

U.S. PATENT DOCUMENTS

| | | | | |
|---|---|---|---|---|
| 6,738,376 | B1* | 5/2004 | Blasiak | H04L 45/00 370/390 |
| 7,136,907 | B1* | 11/2006 | Nordstrom | G06F 15/16 709/220 |
| 7,733,855 | B1* | 6/2010 | Torudbaken | H04L 12/4641 370/389 |
| 2003/0021223 | A1* | 1/2003 | Kashyap | H04L 12/56 370/217 |
| 2004/0215848 | A1* | 10/2004 | Craddock | H04L 49/90 710/39 |
| 2004/0255172 | A1* | 12/2004 | Dayan | G06F 1/26 713/300 |
| 2005/0027801 | A1* | 2/2005 | Kashyap | H04L 12/185 709/204 |
| 2005/0058085 | A1* | 3/2005 | Shapiro | H04L 12/185 370/256 |
| 2005/0271074 | A1* | 12/2005 | Johnsen | H04L 49/205 370/428 |
| 2012/0311670 | A1* | 12/2012 | Johnsen | H04L 9/3234 726/3 |
| 2014/0098814 | A1* | 4/2014 | Bansal | G06F 9/542 370/390 |
| 2014/0122675 | A1* | 5/2014 | Cohen | H04L 12/413 709/223 |
| 2014/0177629 | A1* | 6/2014 | Manula | H04L 49/358 370/390 |
| 2015/0244817 | A1* | 8/2015 | Johnsen | H04L 67/16 709/223 |

OTHER PUBLICATIONS

Vishnu, et al., "Performance Modeling of Subnet Management of Fat Tree Infiniband Networks using OpenSM", 19th IEEE International Parallel and Distributed Processing Symposium, Apr. 4-8, 2005, 8 pages.
Bogdanski, Bartosz, "Making the Network Scalable: Inter-subnet Routing in InfiniBand", Medical Image Computing and Computer-Assisted Intervention, 18th International Conference, Munich Germany, Oct. 5-9, 2015, pp. 685-698, 14 pages.
Chu, Jerry H.K., "IP link and multicast over InfiniBand networks", Jan. 2002, 13 pages.
"Delivering Application Performance with Oracle's InfiniBand Technology: A Standards-Based Interconnect for Application Scalability and Network Consolidation", An Oracle Technical White Paper, May 2012, 42 pages.
InfiniBand Trade Association, "InfiniBand Architecture Specification vol. 1, Release 1.1", Nov. 6, 2002, 15 pages.
Kashyap, V., "IPv4 multicast and broadcast over Infiniband networks", Apr. 26, 2001, 17 pages.
Notification of Transmittal of the International Search Report and the Written Opinion of the International Searching Authority for PCT Application No. PCT/US2018/023837, dated Aug. 14, 2018, 16 pages.
Zhou, Jiazheng, et al., "Hardware supported multicast in fat-tree-based InfiniBand networks", The Journal of Supercomputing, vol. 40, No. 3, Mar. 16, 2007, pp. 333-352, 20 pages.

\* cited by examiner

```
Port 1

P_Key Table:
Pa
Pb

Pd
Pe
Pf

MC fwd:
MGA-A:: QP-A
MCG-B:: QP-B

MCG-D:: QP-D
MCG-E:: QP-E
MCG-F:: QP-F

6001
```

| QP-A | QP-B | QP-D | QP-E | QP-F |
|---|---|---|---|---|
| MCG-A | MCG-B | MCG-D | MCG-E | MCG-F |
| Port 1 | Port 1 | Port 1 | Port 1 | Port 1 |
| P_Key: Pa | P_Key: Pb | P_Key: Pd | P_Key: Pe | P_Key: Pf |
| 6002 | 6003 | 6004 | 6005 | 6006 |

FIGURE 60

SYSTEM AND METHOD TO PROVIDE MULTICAST GROUP MEMBERSHIP DEFINED RELATIVE TO PARTITION MEMBERSHIP IN A HIGH PERFORMANCE COMPUTING ENVIRONMENT

CLAIM OF PRIORITY AND CROSS REFERENCE TO RELATED APPLICATIONS

This application claims the benefit of priority to U.S. Provisional Patent Application No. 62/476,423, entitled "SYSTEM AND METHOD FOR INFINIBAND FABRIC OPTIMIZATIONS TO MINIMIZE SA ACCESS AND STARTUP FAILOVER TIMES", filed on Mar. 24, 2017; U.S. Provisional Patent Application No. 62/547,203, entitled "SYSTEM AND METHOD TO PROVIDE HOMOGENEOUS FABRIC ATTRIBUTES TO REDUCE THE NEED FOR SA ACCESS IN A HIGH PERFORMANCE COMPUTING ENVIRONMENT", filed on Aug. 18, 2017; U.S. Provisional Patent Application No. 62/547,206, entitled "SYSTEM AND METHOD TO PROVIDE PATH RECORDS DERIVED FROM ARP RESPONSES AND PEER-TO-PEER NEGOTIATION ON HOMOGENOUS FABRIC ATTRIBUTE IN A HIGH PERFORMANCE COMPUTING ENVIRONMENT", filed on Aug. 18, 2017; U.S. Provisional Patent Application No. 62/547,213, entitled "SYSTEM AND METHOD TO PROVIDE MULTICAST GROUP MEMBERSHIP DEFINED RELATIVE TO PARTITION MEMBERSHIP IN A HIGH PERFORMANCE COMPUTING ENVIRONMENT", filed on Aug. 18, 2017; U.S. Provisional Patent Application No. 62/547,218, entitled "SYSTEM AND METHOD TO PROVIDE DUAL MULTICAST LID ALLOCATION PER MULTICAST GROUP TO FACILITATE BOTH FULL AND LIMITED PARTITION MEMBERS IN A HIGH PERFORMANCE COMPUTING ENVIRONMENT", filed on Aug. 18, 2017; U.S. Provisional Patent Application No. 62/547,223, entitled "SYSTEM AND METHOD TO PROVIDE MULTICAST GROUP MLID DYNAMIC DISCOVERY ON RECEIVED MULTICAST MESSAGES FOR RELEVANT MGID IN A HIGH PERFORMANCE COMPUTING ENVIRONMENT", filed on Aug. 18, 2017; U.S. Provisional Patent Application No. 62/547,225, entitled "SYSTEM AND METHOD TO PROVIDE DEFAULT MULTICAST LID VALUES PER PARTITION AS ADDITIONAL SMA ATTRIBUTES IN A HIGH PERFORMANCE COMPUTING ENVIRONMENT", filed on Aug. 18, 2017; U.S. Provisional Patent Application No. 62/547,255, entitled "SYSTEM AND METHOD TO PROVIDE EXPLICIT MULTICAST LID ASSIGNMENT FOR PER PARTITION DEFAULT MULTICAST LIDS DEFINED AS SM POLICY INPUT IN A HIGH PERFORMANCE COMPUTING ENVIRONMENT", filed on Aug. 18, 2017; U.S. Provisional Patent Application No. 62/547,258, entitled "SYSTEM AND METHOD TO PROVIDE DEFAULT MULTICAST GROUP (MCG) FOR ANNOUNCEMENTS AND DISCOVERY AS EXTENDED PORT INFORMATION IN A HIGH PERFORMANCE COMPUTING ENVIRONMENT", filed on Aug. 18, 2017; U.S. Provisional Patent Application No. 62/547,259, entitled "SYSTEM AND METHOD TO PROVIDE DEFAULT MULTICAST PROXY FOR SCALABLE FORWARDING OF ANNOUNCEMENTS AND INFORMATION REQUEST INTERCEPTING IN A HIGH PERFORMANCE COMPUTING ENVIRONMENT", filed on Aug. 18, 2017; U.S. Provisional Patent Application No. 62/547,260, entitled "SYSTEM AND METHOD TO USE QUEUE PAIR 1 FOR RECEIVING MULTICAST BASED ANNOUNCMENTS IN MULTIPLE PARTITIONS IN A HIGH PERFORMANCE COMPUTING ENVIRONMENT", filed on Aug. 18, 2017; U.S. Provisional Patent Application No. 62/547,261, entitled "SYSTEM AND METHOD TO USE ALL INCOMING MULTICAST PACKETS AS A BASIS FOR GUID TO LID CACHE CONTENTS IN A HIGH PERFORMANCE COMPUTING ENVIRONMENT", filed on Aug. 18, 2017; and U.S. Provisional Patent Application No. 62/547,264, entitled "SYSTEM AND METHOD TO PROVIDE COMBINED IB AND IP ADDRESS AND NAME RESOLUTION SCHEMES VIA DEFAULT IB MULTICAST GROUPS IN A HIGH PERFORMANCE COMPUTING ENVIRONMENT", filed on Aug. 18, 2017, each of which applications is herein incorporated by reference.

This application is related to the following patent applications, each of which is hereby incorporated by reference in its entirety: U.S. Patent Application entitled "SYSTEM AND METHOD TO PROVIDE HOMOGENEOUS FABRIC ATTRIBUTES TO REDUCE THE NEED FOR SA ACCESS IN A HIGH PERFORMANCE COMPUTING ENVIRONMENT", application Ser. No. 15/927,444, filed concurrently herewith; U.S. Patent Application entitled "SYSTEM AND METHOD TO PROVIDE PATH RECORDS DERIVED FROM ARP RESPONSES AND PEER-TO-PEER NEGOTIATION BASED ON HOMOGENEOUS FABRIC ATTRIBUTE IN A HIGH PERFORMANCE COMPUTING ENVIRONMENT", application Ser. No. 15/927,446, filed concurrently herewith; U.S. Patent Application entitled "SYSTEM AND METHOD TO PROVIDE DUAL MULTICAST LID ALLOCATION PER MULTICAST GROUP TO FACILITATE BOTH FULL AND LIMITED PARTITION MEMBERS IN A HIGH PERFORMANCE COMPUTING ENVIRONMENT", application Ser. No. 15/927,451, filed concurrently herewith; U.S. Patent Application entitled "SYSTEM AND METHOD TO PROVIDE MULTICAST GROUP MULTICAST LID DYNAMIC DISCOVERY BASED ON RECEIVED MULTICAST MESSAGES FOR RELEVANT MULTICAST GID IN A HIGH PERFORMANCE COMPUTING ENVIRONMENT", application Ser. No. 15/927,455, filed concurrently herewith.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

As larger cloud computing architectures are introduced, the performance and administrative bottlenecks associated with the traditional network and storage have become a significant problem. There has been an increased interest in using high performance lossless interconnects such as InfiniBand (IB) technology as the foundation for a cloud computing fabric. This is the general area that embodiments of the invention are intended to address.

SUMMARY

Systems and methods for providing multicast group (MCG) membership relative to partition membership in a high performance computing environment. An exemplary method for providing multicast group membership defined relative to partition membership in a high performance computing environment can receive, at a subnet manager, a request to create a multicast group, the request including an indicator and the indicator indicating that each member of a partition defined in the subnet is to be associated with the multicast group. The method can determine, by the subnet manager, a number of additional end-ports that are members of the partition that is defined in the subnet. The method can associate, by the subnet manager, the number of additional end-ports that are members of the partition with an identifier that defines the multicast group. The method can define, by the subnet manager, a route to deliver a multicast packet that includes the identifier that defines the multicast group to each end-port that is associated with the identifier that defines the multicast group.

BRIEF DESCRIPTION OF THE FIGURES

FIG. 60 illustrates a system to use queue pair 1 (QP1) for receiving multicast based announcements in multiple partitions in a high performance computing environment, in accordance with an embodiment.

DETAILED DESCRIPTION

Figure 1:
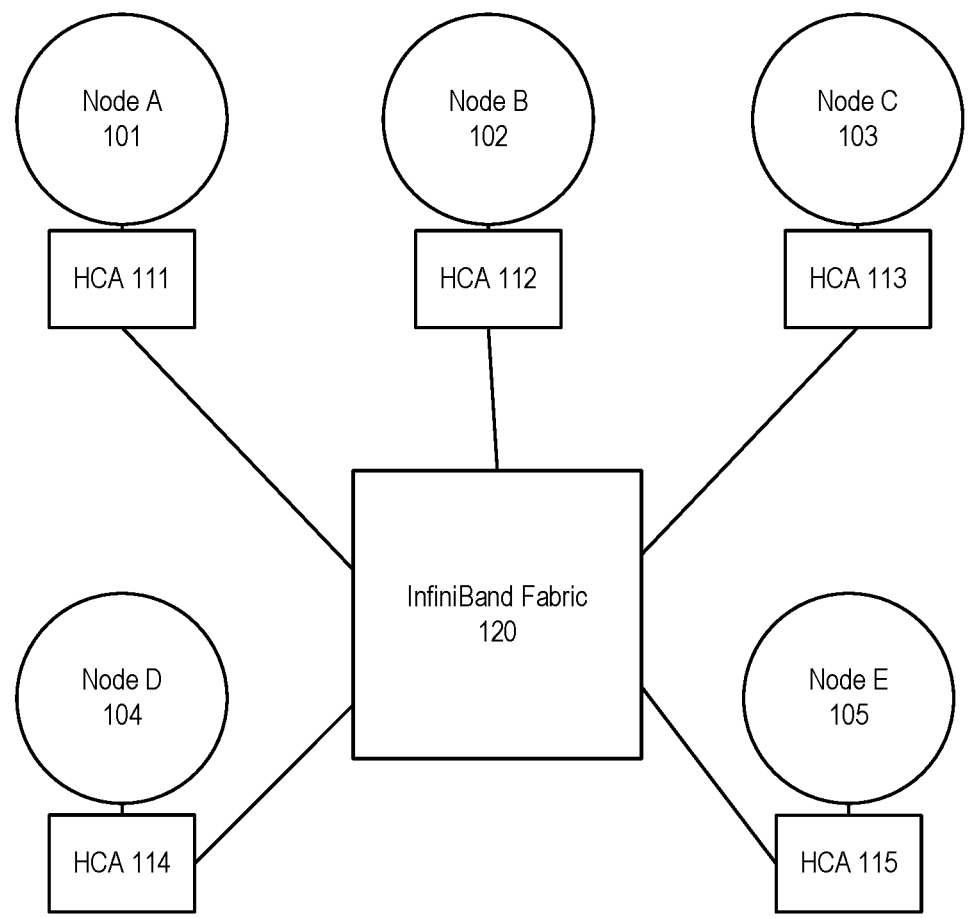
FIG. 1 shows an illustration of an InfiniBand environment, in accordance with an embodiment.

The invention is illustrated, by way of example and not by way of limitation, in the figures of the accompanying drawings in which like references indicate similar elements. It should be noted that references to "an" or "one" or "some" embodiment(s) in this disclosure are not necessarily to the same embodiment, and such references mean at least one. While specific implementations are discussed, it is understood that the specific implementations are provided for illustrative purposes only. A person skilled in the relevant art will recognize that other components and configurations may be used without departing from the scope and spirit of the invention.

Common reference numerals can be used to indicate like elements throughout the drawings and detailed description; therefore, reference numerals used in a figure may or may not be referenced in the detailed description specific to such figure if the element is described elsewhere.

Described herein are systems and methods to provide multicast group membership defined relative to partition membership in a high performance computing environment.

The following description of the invention uses an InfiniBand™ (IB) network as an example for a high performance network. Throughout the following description, reference can be made to the InfiniBand™ specification (also referred to variously as the InfiniBand specification, IB specification, or the legacy IB specification). Such reference is understood to refer to the InfiniBand® Trade Association Architecture Specification, Volume 1, Version 1.3, released March, 2015, available at http://www.inifinibandta.org, which is herein incorporated by reference in its entirety. It will be apparent to those skilled in the art that other types of high performance networks can be used without limitation. The following description also uses the fat-tree topology as an example for a fabric topology. It will be apparent to those skilled in the art that other types of fabric topologies can be used without limitation.

To meet the demands of the cloud in the current era (e.g., Exascale era), it is desirable for virtual machines to be able to utilize low overhead network communication paradigms such as Remote Direct Memory Access (RDMA). RDMA bypasses the OS stack and communicates directly with the hardware, thus, pass-through technology like Single-Root I/O Virtualization (SR-IOV) network adapters can be used. In accordance with an embodiment, a virtual switch (vSwitch) SR-IOV architecture can be provided for applicability in high performance lossless interconnection networks. As network reconfiguration time is critical to make live-migration a practical option, in addition to network architecture, a scalable and topology-agnostic dynamic reconfiguration mechanism can be provided.

In accordance with an embodiment, and furthermore, routing strategies for virtualized environments using vSwitches can be provided, and an efficient routing algorithm for network topologies (e.g., Fat-Tree topologies) can be provided. The dynamic reconfiguration mechanism can be further tuned to minimize imposed overhead in Fat-Trees.

In accordance with an embodiment of the invention, virtualization can be beneficial to efficient resource utilization and elastic resource allocation in cloud computing. Live migration makes it possible to optimize resource usage by moving virtual machines (VMs) between physical servers in an application transparent manner. Thus, virtualization can enable consolidation, on-demand provisioning of resources, and elasticity through live migration.

Infiniband™

InfiniBand™ (IB) is an open standard lossless network technology developed by the InfiniBand™ Trade Association. The technology is based on a serial point-to-point full-duplex interconnect that offers high throughput and low latency communication, geared particularly towards high-performance computing (HPC) applications and datacenters.

The InfiniBand™ Architecture (IBA) supports a two-layer topological division. At the lower layer, IB networks are referred to as subnets, where a subnet can include a set of hosts interconnected using switches and point-to-point links. At the higher level, an IB fabric constitutes one or more subnets, which can be interconnected using routers.

Within a subnet, hosts can be connected using switches and point-to-point links. Additionally, there can be a master management entity, the subnet manager (SM), which resides on a designated device in the subnet. The subnet manager is responsible for configuring, activating and maintaining the IB subnet. Additionally, the subnet manager (SM) can be responsible for performing routing table calculations in an IB fabric. Here, for example, the routing of the IB network aims at proper load balancing between all source and destination pairs in the local subnet.

The SM is responsible for providing subnet administration (SA) to the local subnet. SA provides access to, and storage of, information of several types with respect to the local subnet. In order to provide SA, the subnet manager generally maintains a query-able database for storing subnet-related information. Examples of information generally stored/provided by SA include information that end-nodes require for operation in a subnet such as paths between end-nodes, notification of events, service attributes, etc.; non-algorithmic information such as partitioning data, M_Keys, etc.; optional information that may be useful to other management entities, such as topology data, switch forwarding tables, etc.

Data provided by SA is accessed, queried, and or reported through the use of Management Datagrams (MADs). MADs are standardized management packets, and, among other uses, allow management operations between the SM/SA and IB devices, and between IB devices, themselves.

Through the subnet management interface, the subnet manager exchanges control packets, which are referred to as subnet management packets (SMPs—which are a subset of MADs), with subnet management agents (SMAs). A subnet management agent resides on every IB subnet device. By using SMPs, the subnet manager is able to discover the fabric, configure end nodes and switches, and receive notifications from SMAs.

Through the subnet management interface, the subnet manager exchanges control packets, which are referred to as subnet management packets (SMPs), with subnet management agents (SMAs). The subnet management agents reside on every IB subnet device. By using SMPs, the subnet manager is able to discover the fabric, configure end nodes and switches, and receive notifications from SMAs.

In accordance with an embodiment, intra-subnet routing in an IB network can be based on linear forwarding tables (LFTs) stored in the switches. The LFTs are calculated by the SM according to the routing mechanism in use. In a subnet, Host Channel Adapter (HCA) ports on the end nodes and switches are addressed using local identifiers (LIDs). Each entry in a linear forwarding table (LFT) consists of a destination LID (DLID) and an output port. Only one entry per LID in the table is supported. When a packet arrives at a switch, its output port is determined by looking up the DLID in the forwarding table of the switch. The routing is deterministic as packets take the same path in the network between a given source-destination pair (LID pair).

Generally, all other subnet managers, excepting the master subnet manager, act in standby mode for fault-tolerance. In a situation where a master subnet manager fails, however, a new master subnet manager is negotiated by the standby subnet managers. The master subnet manager also performs periodic sweeps of the subnet to detect any topology changes and reconfigure the network accordingly.

In an IB subnet, each end-node can contain one or more Host Channel Adapters (HCAs). HCAs are responsible for generating and sending data packets, and for receiving and processing data packets. Each Host Channel Adapter (HCA) can have one or more ports. An HCA's ports are used to connect the HCA, and the end-node that contains the HCA, to the network fabric. For example, the ports of an HCA can be connected to a subnet switch via physical media, such as a cable (e.g., a twisted-pair copper, or optical fiber, cable).

HCA ports connected to the network fabric are assigned local identifiers (LIDs) by the local subnet manager (i.e., the subnet manager for the subnet that the HCA is connected to). The LIDs are used to address the HCA ports. Other subnet nodes can also be assigned LIDs by the local subnet manager. For example, subnet hosts and switches can be assigned a local identifier (LID) by the subnet manager, and can be addressed by their assigned LIDs. LIDs are unique within a subnet, and a single subnet can be limited to 49151 unicast LIDs.

In accordance with an embodiment, intra-subnet routing in an IB network can be based on linear forwarding tables (LFTs) stored in local subnet switches. The LFTs are calculated by the SM according to the routing mechanism in use. Each data packet contains a Source LID (SLID) that identifies the port that created the packet, and a Destination LID (DLID) that identifies the port that the packet is to be delivered to. Additionally, each entry in a linear forwarding table (LFT) consists of a DLID and an output port. Only one entry per LID in the table is supported. When a packet arrives at a switch, its output port is determined by looking up the DLID of the packet in the forwarding table of the switch. The packet is then forwarded, outbound, via the switch port that corresponds to the packet's DLID in the LFT. The routing is deterministic as packets take the same path in the network between a given source-destination pair (LID pair).

Furthermore, hosts and switches within a subnet can be addressed using local identifiers (LIDs), and a single subnet can be limited to 49151 unicast LIDs. Besides the LIDs, which are the local addresses that are valid within a subnet, each IB device can have a 64-bit global unique identifier (GUID). A GUID can be used to form a global identifier (GID), which is an IB layer three (L3) address.

The SM can calculate routing tables (i.e., the connections/routes between each pair of nodes within the subnet) at network initialization time. Furthermore, the routing tables can be updated whenever the topology changes, in order to ensure connectivity and optimal performance. During normal operations, the SM can perform periodic light sweeps of the network to check for topology changes. If a change is discovered during a light sweep or if a message (trap) signaling a network change is received by the SM, the SM can reconfigure the network according to the discovered changes.

For example, the SM can reconfigure the network when the network topology changes, such as when a link goes down, when a device is added, or when a link is removed. The reconfiguration steps can include the steps performed during the network initialization. Furthermore, the reconfigurations can have a local scope that is limited to the subnets, in which the network changes occurred. Also, the segmenting of a large fabric with routers may limit the reconfiguration scope.

Besides LIDs, which are the local addresses that are valid and unique within a subnet, each IB device (e.g., an HCA or a switch) can have a 64-bit global unique identifier (GUID). Additionally, each port of an HCA can have its own GUID. The GUIDs of an IB device can be assigned by the vendor of the device. The GUIDs of an IB device can be hard-coded into the device, much like a media access control (MAC) address of a network interface card. A GUID can be used to form a global identifier (GID), which is an IB layer three (L3) address.

An example InfiniBand fabric is shown in FIG. 1, which shows an illustration of an InfiniBand environment 100, in accordance with an embodiment. In the example shown in FIG. 1, nodes A-E, 101-105, use the InfiniBand fabric, 120, to communicate, via the respective host channel adapters 111-115. In accordance with an embodiment, the various nodes, e.g., nodes A-E, 101-105, can be represented by various physical devices. In accordance with an embodiment, the various nodes, e.g., nodes A-E, 101-105, can be represented by various virtual devices, such as virtual machines.

Partitioning in InfiniBand

In accordance with an embodiment, IB networks can support partitioning as a security mechanism to provide for isolation of logical groups of systems sharing a network fabric. Each HCA port on a node in the fabric can be a member of one or more partitions. Partition memberships are managed by a centralized partition manager, which can be part of the SM. The SM can configure partition membership information on each port as a table of 16-bit partition keys (P_Keys). The SM can also configure switch and router ports with the partition enforcement tables containing P_Key information associated with the end-nodes that send or receive data traffic through these ports. Additionally, in a general case, partition membership of a switch port can represent a union of all membership indirectly associated with LIDs routed via the port in an egress (towards the link) direction.

A P_Key can specify one of two types of partition membership: limited or full. The high order bit of the P_Key is used to specify the type of membership of an HCA having the P_Key in its P_Key table. A value of 1 indicates a full member, while a value of 0 indicates a limited member. Limited partition members cannot accept packets from other limited members. Communication is allowed, however, between every other combination of membership types.

In accordance with an embodiment, partitions are logical groups of ports such that the members of a group can only communicate to other members of the same logical group. At host channel adapters (HCAs) and switches, packets can be filtered using the partition membership information to enforce isolation. Packets with invalid partitioning information can be dropped as soon as the packets reaches an incoming port. In partitioned IB systems, partitions can be used to create tenant clusters. With partition enforcement in place, a node cannot communicate with other nodes that belong to a different tenant cluster. In this way, the security of the system can be guaranteed even in the presence of compromised or malicious tenant nodes.

In accordance with an embodiment, for the communication between nodes, Queue Pairs (QPs) and End-to-End contexts (EECs) can be assigned to a particular partition, except for the management Queue Pairs (QP0 and QP1). The P_Key information can then be added to every IB transport packet sent. When a packet arrives at an HCA port or a switch, its P_Key value can be validated against a table configured by the SM. If an invalid P_Key value is found, the packet is discarded immediately. In this way, communication is allowed only between ports sharing a partition.

Figure 2:
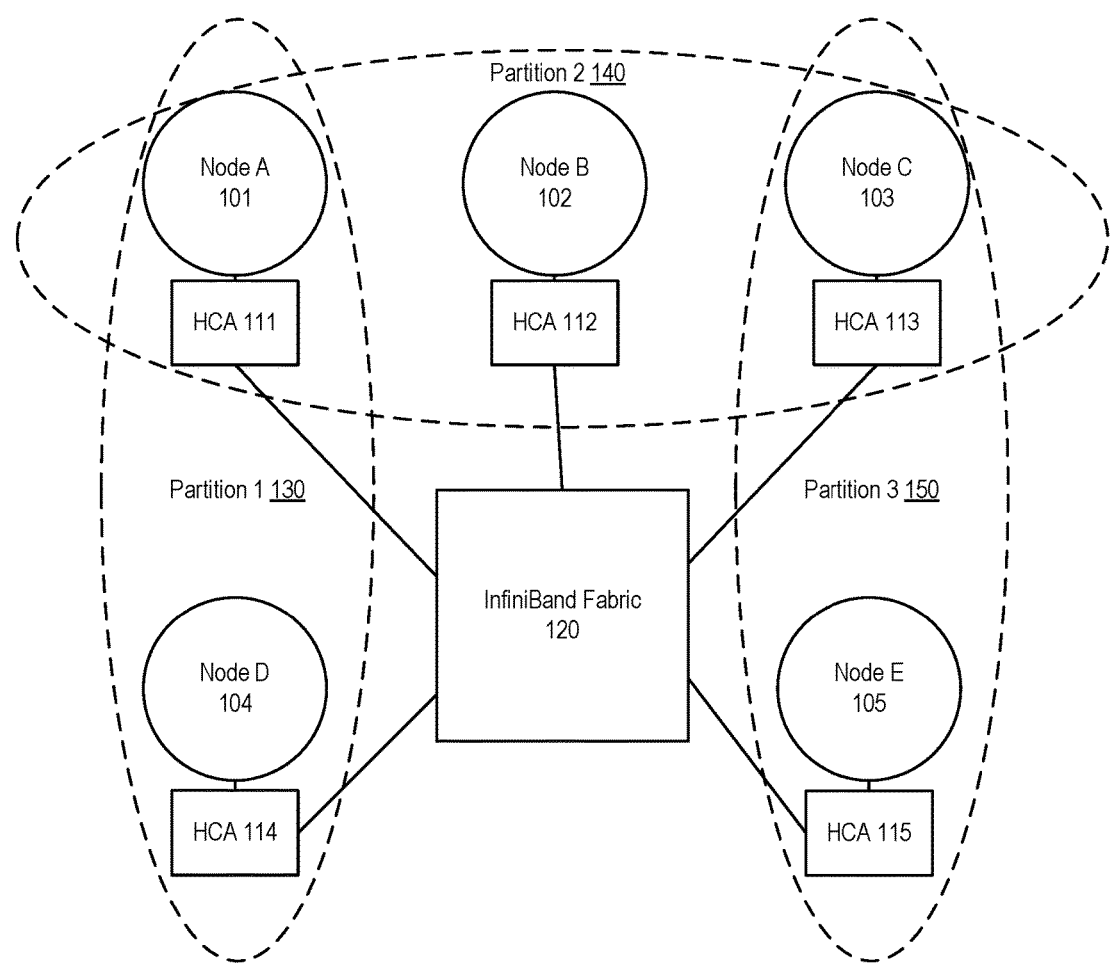
FIG. 2 shows an illustration of a partitioned cluster environment, in accordance with an embodiment

An example of IB partitions is shown in FIG. 2, which shows an illustration of a partitioned cluster environment, in accordance with an embodiment. In the example shown in FIG. 2, nodes A-E, 101-105, use the InfiniBand fabric, 120, to communicate, via the respective host channel adapters 111-115. The nodes A-E are arranged into partitions, namely partition 1, 130, partition 2, 140, and partition 3, 150. Partition 1 comprises node A 101 and node D 104. Partition 2 comprises node A 101, node B 102, and node C 103. Partition 3 comprises node C 103 and node E 105. Because of the arrangement of the partitions, node D 104 and node E 105 are not allowed to communicate as these nodes do not share a partition. Meanwhile, for example, node A 101 and node C 103 are allowed to communicate as these nodes are both members of partition 2, 140.

Virtual Machines in InfiniBand

During the last decade, the prospect of virtualized High Performance Computing (HPC) environments has improved considerably as CPU overhead has been practically removed through hardware virtualization support; memory overhead has been significantly reduced by virtualizing the Memory Management Unit; storage overhead has been reduced by the use of fast SAN storages or distributed networked file systems; and network I/O overhead has been reduced by the use of device passthrough techniques like Single Root Input/Output Virtualization (SR-IOV). It is now possible for clouds to accommodate virtual HPC (vHPC) clusters using high performance interconnect solutions and deliver the necessary performance.

However, when coupled with lossless networks, such as InfiniBand (IB), certain cloud functionality, such as live migration of virtual machines (VMs), still remains an issue due to the complicated addressing and routing schemes used in these solutions. IB is an interconnection network technology offering high bandwidth and low latency, thus, is very well suited for HPC and other communication intensive workloads.

The traditional approach for connecting IB devices to VMs is by utilizing SR-IOV with direct assignment. However, achieving live migration of VMs assigned with IB Host Channel Adapters (HCAs) using SR-IIV has proved to be challenging. Each IB connected node has three different addresses: LID, GUID, and GID. When a live migration happens, one or more of these addresses change. Other nodes communicating with the VM-in-migration can lose connectivity. When this happens, the lost connection can be attempted to be renewed by locating the virtual machine's new address to reconnect to by sending Subnet Administration (SA) path record queries to the IB Subnet Manager (SM).

IB uses three different types of addresses. A first type of address is the 16 bits Local Identifier (LID). At least one unique LID is assigned to each HCA port and each switch by the SM. The LIDs are used to route traffic within a subnet. Since the LID is 16 bits long, 65536 unique address combinations can be made, of which only 49151 (0x0001-0xBFFF) can be used as unicast addresses. Consequently, the number of available unicast addresses defines the maximum size of an IB subnet. A second type of address is the 64 bits Global Unique Identifier (GUID) assigned by the manufacturer to each device (e.g. HCAs and switches) and each HCA port. The SM may assign additional subnet unique GUIDs to an HCA port, which is useful when SR-IOV is used. A third type of address is the 128 bits Global Identifier (GID). The GID is a valid IPv6 unicast address, and at least one is assigned to each HCA port. The GID is formed by combining a globally unique 64 bits prefix assigned by the fabric administrator, and the GUID address of each HCA port.

Fat-Tree (FTree) Topologies and Routing

In accordance with an embodiment, some of the IB based HPC systems employ a fat-tree topology to take advantage of the useful properties fat-trees offer. These properties include full bisection-bandwidth and inherent fault-tolerance due to the availability of multiple paths between each source destination pair. The initial idea behind fat-trees was to employ fatter links between nodes, with more available bandwidth, as the tree moves towards the roots of the topology. The fatter links can help to avoid congestion in the upper-level switches and the bisection-bandwidth is maintained.

Figure 3:
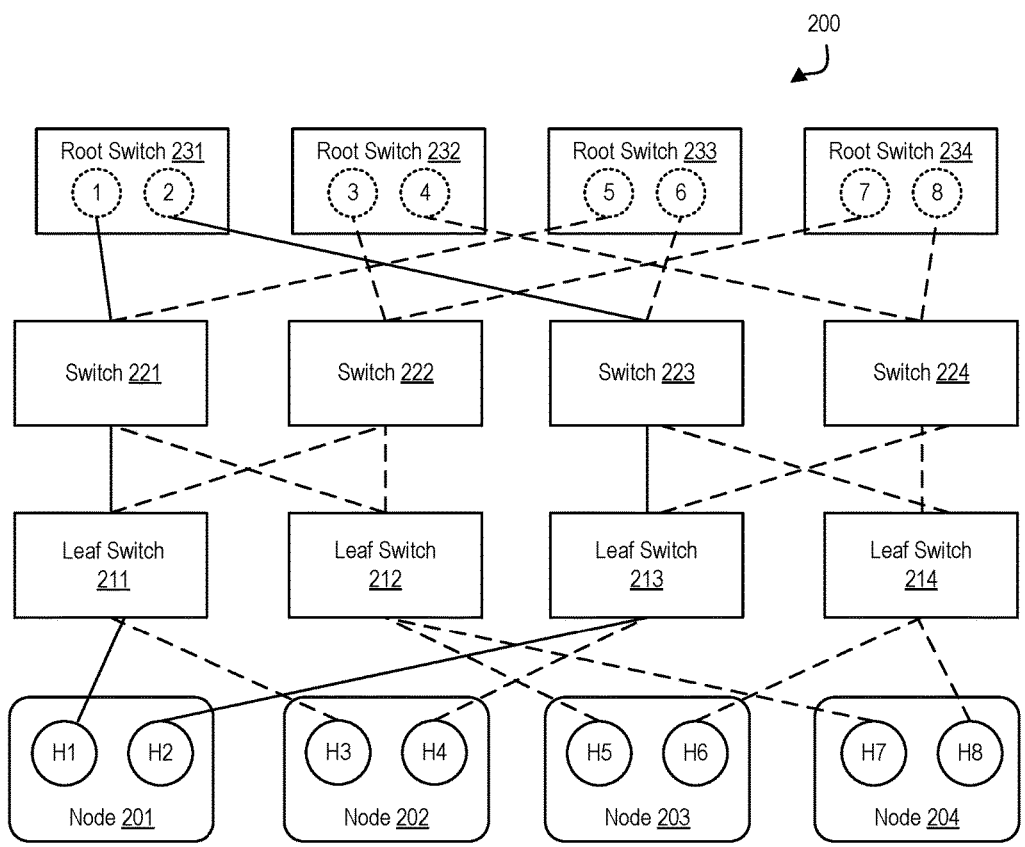
FIG. 3 shows an illustration of a tree topology in a network environment, in accordance with an embodiment.

FIG. 3 shows an illustration of a tree topology in a network environment, in accordance with an embodiment. As shown in FIG. 3, one or more end nodes 201-204 can be connected in a network fabric 200. The network fabric 200 can be based on a fat-tree topology, which includes a plurality of leaf switches 211-214, and multiple spine switches or root switches 231-234. Additionally, the network fabric 200 can include one or more intermediate switches, such as switches 221-224.

Also as shown in FIG. 3, each of the end nodes 201-204 can be a multi-homed node, i.e., a single node that is connected to two or more parts of the network fabric 200 through multiple ports. For example, the node 201 can include the ports H1 and H2, the node 202 can include the ports H3 and H4, the node 203 can include the ports H5 and H6, and the node 204 can include the ports H7 and H8.

Additionally, each switch can have multiple switch ports. For example, the root switch 231 can have the switch ports 1-2, the root switch 232 can have the switch ports 3-4, the root switch 233 can have the switch ports 5-6, and the root switch 234 can have the switch ports 7-8.

In accordance with an embodiment, the fat-tree routing mechanism is one of the most popular routing algorithm for IB based fat-tree topologies. The fat-tree routing mechanism is also implemented in the OFED (Open Fabric Enterprise Distribution—a standard software stack for building and deploying IB based applications) subnet manager, OpenSM.

The fat-tree routing mechanism aims to generate LFTs that evenly spread shortest-path routes across the links in the network fabric. The mechanism traverses the fabric in the indexing order and assigns target LIDs of the end nodes, and thus the corresponding routes, to each switch port. For the end nodes connected to the same leaf switch, the indexing order can depend on the switch port to which the end node is connected (i.e., port numbering sequence). For each port, the mechanism can maintain a port usage counter, and can use this port usage counter to select a least-used port each time a new route is added.

In accordance with an embodiment, in a partitioned subnet, nodes that are not members of a common partition are not allowed to communicate. Practically, this means that some of the routes assigned by the fat-tree routing algorithm are not used for the user traffic. The problem arises when the fat tree routing mechanism generates LFTs for those routes the same way it does for the other functional paths. This behavior can result in degraded balancing on the links, as nodes are routed in the order of indexing. As routing can be performed oblivious to the partitions, fat-tree routed subnets, in general, provide poor isolation among partitions.

In accordance with an embodiment, a Fat-Tree is a hierarchical network topology that can scale with the available network resources. Moreover, Fat-Trees are easy to build using commodity switches placed on different levels of the hierarchy. Different variations of Fat-Trees are commonly available, including k-ary-n-trees, Extended Generalized Fat-Trees (XGFTs), Parallel Ports Generalized Fat-Trees (PGFTs) and Real Life Fat-Trees (RLFTs).

A k-ary-n-tree is an n level Fat-Tree with $k^n$ end nodes and $n \cdot k^{n-1}$ switches, each with 2k ports. Each switch has an equal number of up and down connections in the tree. XGFT Fat-Tree extends k-ary-n-trees by allowing both different number of up and down connections for the switches, and different number of connections at each level in the tree. The PGFT definition further broadens the XGFT topologies and permits multiple connections between switches. A large variety of topologies can be defined using XGFTs and PGFTs. However, for practical purposes, RLFT, which is a restricted version of PGFT, is introduced to define Fat-Trees commonly found in today's HPC clusters. An RLFT uses the same port-count switches at all levels in the Fat-Tree.

Input/Output (I/O) Virtualization

In accordance with an embodiment, I/O Virtualization (IOV) can provide availability of I/O by allowing virtual machines (VMs) to access the underlying physical resources. The combination of storage traffic and inter-server communication impose an increased load that may overwhelm the I/O resources of a single server, leading to backlogs and idle processors as they are waiting for data. With the increase in number of I/O requests, IOV can provide availability; and can improve performance, scalability and flexibility of the (virtualized) I/O resources to match the level of performance seen in modern CPU virtualization.

In accordance with an embodiment, IOV is desired as it can allow sharing of I/O resources and provide protected access to the resources from the VMs. IOV decouples a logical device, which is exposed to a VM, from its physical implementation. Currently, there can be different types of IOV technologies, such as emulation, paravirtualization, direct assignment (DA), and single root-I/O virtualization (SR-IOV).

In accordance with an embodiment, one type of IOV technology is software emulation. Software emulation can allow for a decoupled front-end/back-end software architecture. The front-end can be a device driver placed in the VM, communicating with the back-end implemented by a hypervisor to provide I/O access. The physical device sharing ratio is high and live migrations of VMs are possible with just a few milliseconds of network downtime. However, software emulation introduces additional, undesired computational overhead.

In accordance with an embodiment, another type of IOV technology is direct device assignment. Direct device assignment involves a coupling of I/O devices to VMs, with no device sharing between VMs. Direct assignment or device passthrough, provides near to native performance with minimum overhead. The physical device bypasses the hypervisor and is directly attached to the VM. However, a downside of such direct device assignment is limited scalability, as there is no sharing among virtual machines—one physical network card is coupled with one VM.

In accordance with an embodiment, Single Root IOV (SR-IOV) can allow a physical device to appear through hardware virtualization as multiple independent lightweight instances of the same device. These instances can be assigned to VMs as passthrough devices, and accessed as Virtual Functions (VFs). The hypervisor accesses the device through a unique (per device), fully featured Physical Function (PF). SR-IOV eases the scalability issue of pure direct assignment. However, a problem presented by SR-IOV is that it can impair VM migration. Among these IOV technologies, SR-IOV can extend the PCI Express (PCIe) specification with the means to allow direct access to a single physical device from multiple VMs while maintaining near to native performance. Thus, SR-IOV can provide good performance and scalability.

SR-IOV allows a PCIe device to expose multiple virtual devices that can be shared between multiple guests by allocating one virtual device to each guest. Each SR-IOV device has at least one physical function (PF) and one or more associated virtual functions (VF). A PF is a normal PCIe function controlled by the virtual machine monitor (VMM), or hypervisor, whereas a VF is a light-weight PCIe function. Each VF has its own base address (BAR) and is assigned with a unique requester ID that enables I/O memory management unit (IOMMU) to differentiate between the traffic streams to/from different VFs. The IOMMU also apply memory and interrupt translations between the PF and the VFs.

Unfortunately, however, direct device assignment techniques pose a barrier for cloud providers in situations where transparent live migration of virtual machines is desired for data center optimization. The essence of live migration is that the memory contents of a VM are copied to a remote hypervisor. Then the VM is paused at the source hypervisor, and the VM's operation is resumed at the destination. When using software emulation methods, the network interfaces are virtual so their internal states are stored into the memory and get copied as well. Thus the downtime could be brought down to a few milliseconds.

However, migration becomes more difficult when direct device assignment techniques, such as SR-IOV, are used. In such situations, a complete internal state of the network interface cannot be copied as it is tied to the hardware. The SR-IOV VFs assigned to a VM are instead detached, the live migration will run, and a new VF will be attached at the destination. In the case of InfiniBand and SR-IOV, this process can introduce downtime in the order of seconds. Moreover, in an SR-IOV shared port model the addresses of the VM will change after the migration, causing additional overhead in the SM and a negative impact on the performance of the underlying network fabric.

InfiniBand SR-IOV Architecture—Shared Port

There can be different types of SR-IOV models, e.g. a shared port model, a virtual switch model, and a virtual port model.

Figure 4:
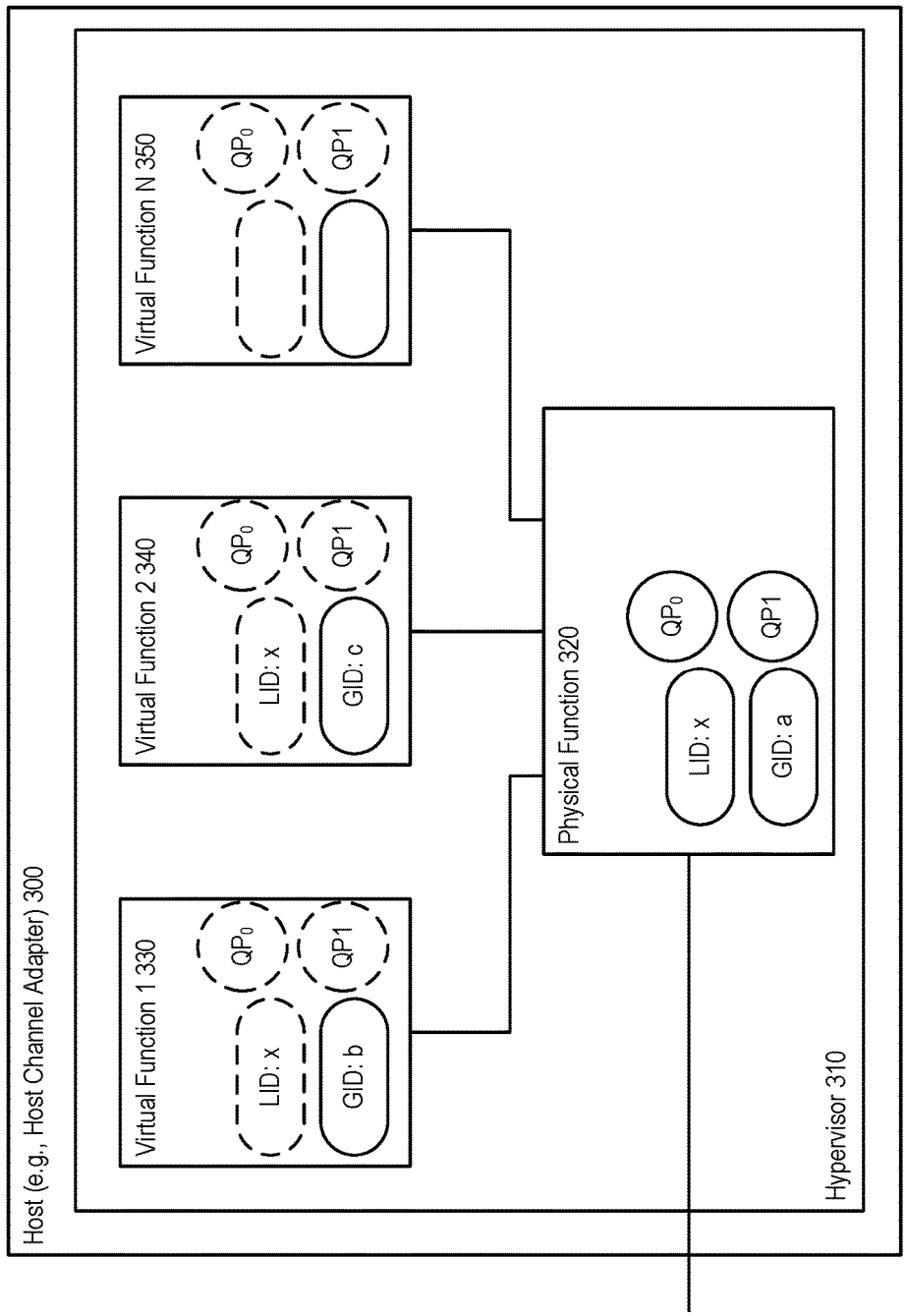
FIG. 4 shows an exemplary shared port architecture, in accordance with an embodiment.

FIG. 4 shows an exemplary shared port architecture, in accordance with an embodiment. As depicted in the figure, a host 300 (e.g., a host channel adapter) can interact with a hypervisor 310, which can assign the various virtual functions 330, 340, 350, to a number of virtual machines. As well, the physical function can be handled by the hypervisor 310.

In accordance with an embodiment, when using a shared port architecture, such as that depicted in FIG. 4, the host, e.g., HCA, appears as a single port in the network with a single shared LID and shared Queue Pair (QP) space between the physical function 320 and the virtual functions 330, 350, 350. However, each function (i.e., physical function and virtual functions) can have their own GID.

As shown in FIG. 4, in accordance with an embodiment, different GIDs can be assigned to the virtual functions and the physical function, and the special queue pairs, QP0 and QP1 (i.e., special purpose queue pairs that are used for InfiniBand management packets), are owned by the physical function. These QPs are exposed to the VFs as well, but the VFs are not allowed to use QP0 (all SMPs coming from VFs towards QP0 are discarded), and QP1 can act as a proxy of the actual QP1 owned by the PF.

In accordance with an embodiment, the shared port architecture can allow for highly scalable data centers that are not limited by the number of VMs (which attach to the network by being assigned to the virtual functions), as the LID space is only consumed by physical machines and switches in the network.

However, a shortcoming of the shared port architecture is the inability to provide transparent live migration, hindering the potential for flexible VM placement. As each LID is associated with a specific hypervisor, and shared among all VMs residing on the hypervisor, a migrating VM (i.e., a virtual machine migrating to a destination hypervisor) has to have its LID changed to the LID of the destination hypervisor. Furthermore, as a consequence of the restricted QP0 access, a subnet manager cannot run inside a VM.

InfiniBand SR-IOV Architecture Models—Virtual Switch (vSwitch)

Figure 5:
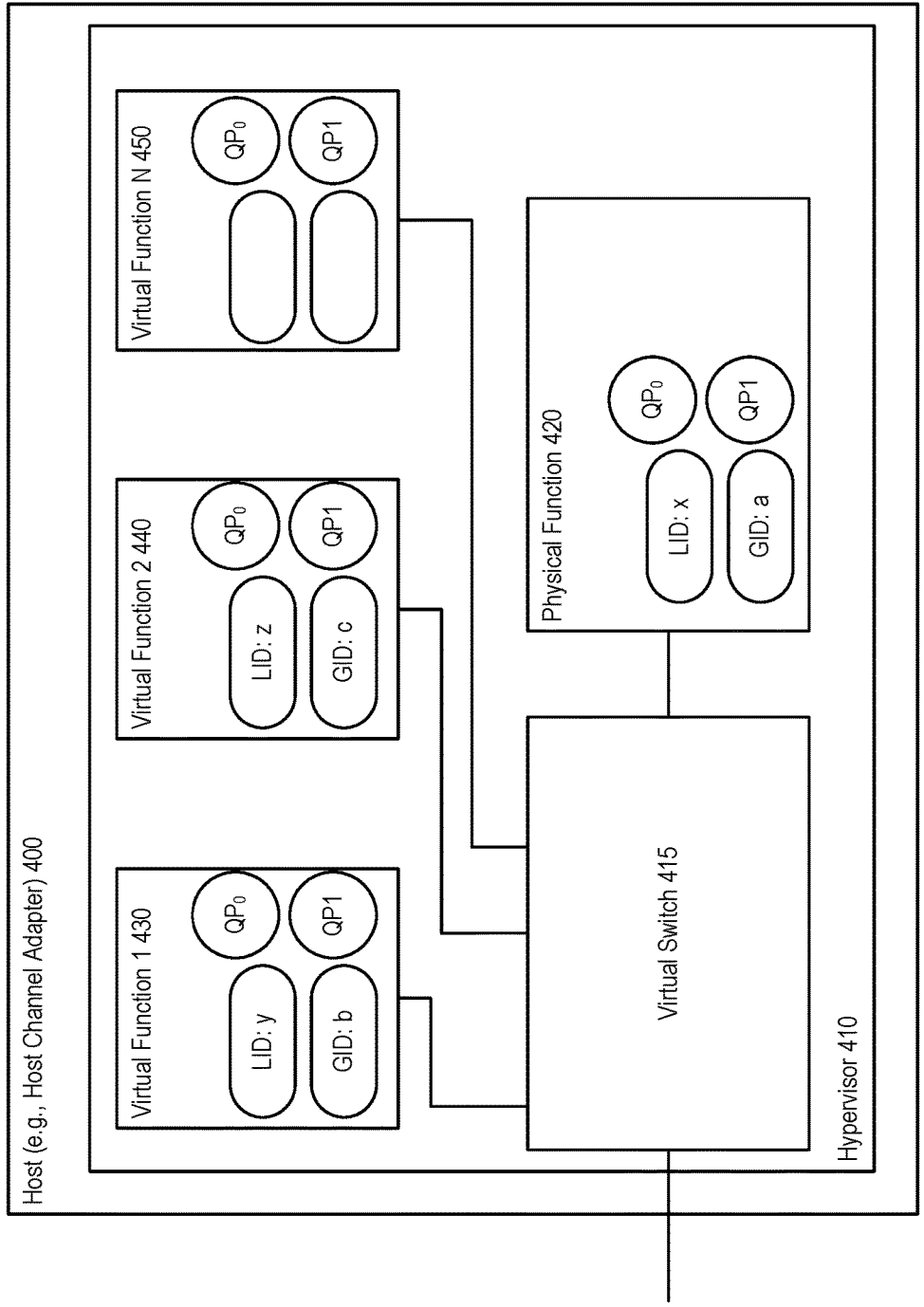
FIG. 5 shows an exemplary vSwitch architecture, in accordance with an embodiment.

FIG. 5 shows an exemplary vSwitch architecture, in accordance with an embodiment. As depicted in the figure, a host 400 (e.g., a host channel adapter) can interact with a hypervisor 410, which can assign the various virtual functions 430, 440, 450, to a number of virtual machines. As well, the physical function can be handled by the hypervisor 410. A virtual switch 415 can also be handled by the hypervisor 401.

In accordance with an embodiment, in a vSwitch architecture each virtual function 430, 440, 450 is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM, the HCA 400 looks like a switch, via the virtual switch 415, with additional nodes connected to it. The hypervisor 410 can use the PF 420, and the VMs (attached to the virtual functions) use the VFs.

In accordance with an embodiment, a vSwitch architecture provide transparent virtualization. However, because each virtual function is assigned a unique LID, the number of available LIDs gets consumed rapidly. As well, with many LID addresses in use (i.e., one each for each physical function and each virtual function), more communication paths have to be computed by the SM and more Subnet Management Packets (SMPs) have to be sent to the switches in order to update their LFTs. For example, the computation of the communication paths might take several minutes in large networks. Because LID space is limited to 49151 unicast LIDs, and as each VM (via a VF), physical node, and switch occupies one LID each, the number of physical nodes and switches in the network limits the number of active VMs, and vice versa.

InfiniBand SR-IOV Architecture Models—Virtual Port (vPort)

Figure 6:
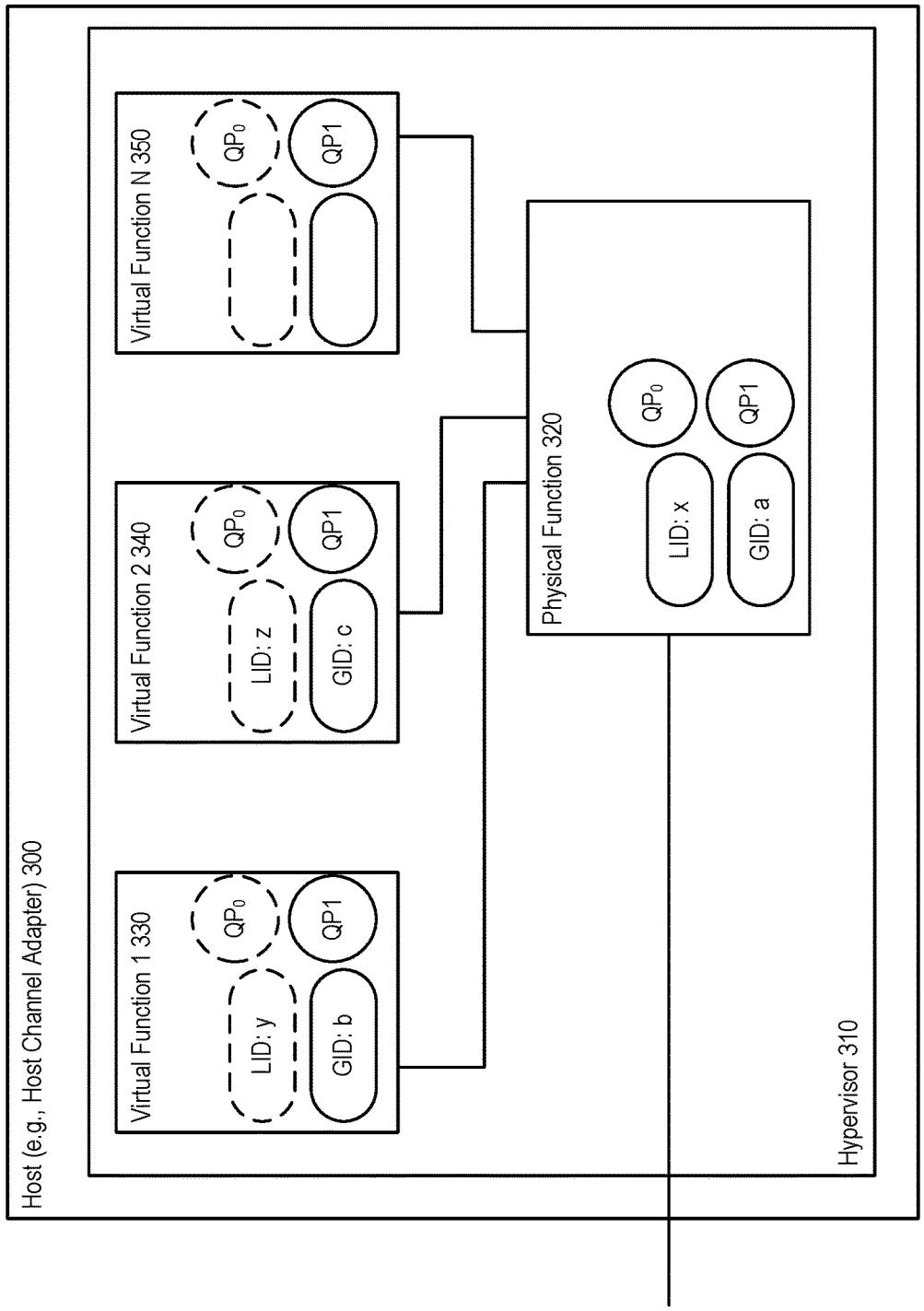
FIG. 6 shows an exemplary vPort architecture, in accordance with an embodiment.

FIG. 6 shows an exemplary vPort concept, in accordance with an embodiment. As depicted in the figure, a host 300 (e.g., a host channel adapter) can interact with a hypervisor 410, which can assign the various virtual functions 330, 340, 350, to a number of virtual machines. As well, the physical function can be handled by the hypervisor 310.

In accordance with an embodiment, the vPort concept is loosely defined in order to give freedom of implementation to vendors (e.g. the definition does not rule that the implementation has to be SRIOV specific), and a goal of the vPort is to standardize the way VMs are handled in subnets. With the vPort concept, both SR-IOV Shared-Port-like and vSwitch-like architectures or a combination of both, that can be more scalable in both the space and performance domains, can be defined. A vPort supports optional LIDs, and unlike the Shared-Port, the SM is aware of all the vPorts available in a subnet even if a vPort is not using a dedicated LID.

InfiniBand SR-IOV Architecture Models—vSwitch with Prepopulated LIDs

In accordance with an embodiment, the present disclosure provides a system and method for providing a vSwitch architecture with prepopulated LIDs.

Figure 7:
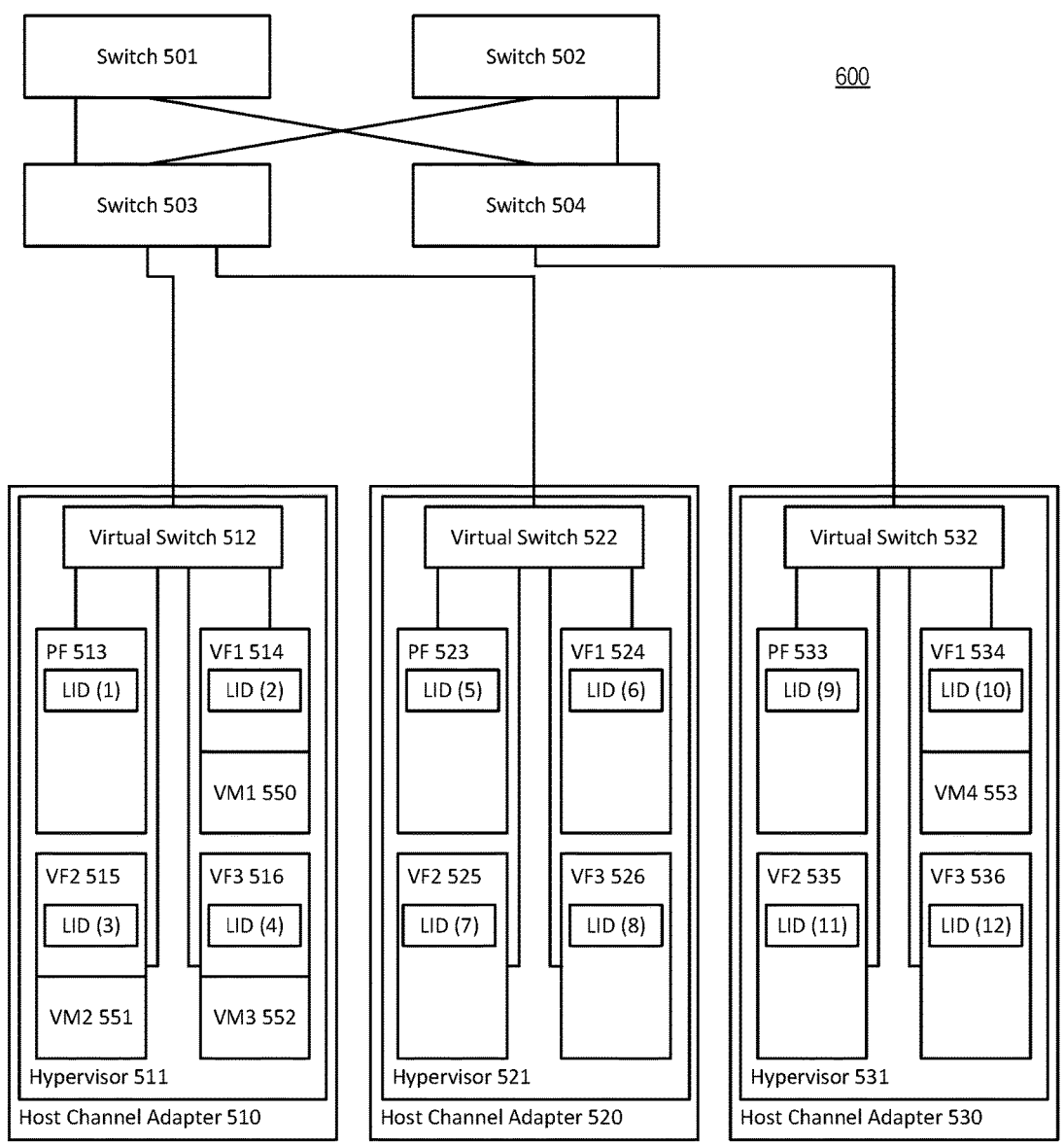
FIG. 7 shows an exemplary vSwitch architecture with prepopulated LIDs, in accordance with an embodiment.

FIG. 7 shows an exemplary vSwitch architecture with prepopulated LIDs, in accordance with an embodiment. As depicted in the figure, a number of switches 501-504 can provide communication within the network switched environment 600 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 600.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with prepopulated LIDs. Referring to FIG. 7, the LIDs are prepopulated to the various physical functions 513, 523, 533, as well as the virtual functions 514-516, 524-526, 534-536 (even those virtual functions not currently associated with an active virtual machine). For example, physical function 513 is prepopulated with LID 1, while virtual function 1 534 is prepopulated with LID 10. The LIDs are prepopulated in an SR-IOV vSwitch-enabled subnet when the network is booted. Even when not all of the VFs are occupied by VMs in the network, the populated VFs are assigned with a LID as shown in FIG. 7.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, in a vSwitch architecture with prepopulated LIDs, each hypervisor can consume one LID for itself through the PF and one more LID for each additional VF. The sum of all the VFs available in all hypervisors in an IB subnet, gives the maximum amount of VMs that are allowed to run in the subnet. For example, in an IB subnet with 16 virtual functions per hypervisor in the subnet, then each hypervisor consumes 17 LIDs (one LID for each of the 16 virtual functions plus one LID for the physical function) in the subnet. In such an IB subnet, the theoretical hypervisor limit for a single subnet is ruled by the number of available unicast LIDs and is: 2891 (49151 available LIDs divided by 17 LIDs per hypervisor), and the total number of VMs (i.e., the limit) is 46256 (2891 hypervisors times 16 VFs per hypervisor). (In actuality, these numbers are actually smaller since each switch, router, or dedicated SM node in the IB subnet consumes a LID as well). Note that the vSwitch does not need to occupy an additional LID as it can share the LID with the PF In accordance with an embodiment, in a vSwitch architecture with prepopulated LIDs, communication paths are computed for all the LIDs the first time the network is booted. When a new VM needs to be started the system does not have to add a new LID in the subnet, an action that would otherwise cause a complete reconfiguration of the network, including path recalculation, which is the most time consuming part. Instead, an available port for a VM is located (i.e., an available virtual function) in one of the hypervisors and the virtual machine is attached to the available virtual function.

In accordance with an embodiment, a vSwitch architecture with prepopulated LIDs also allows for the ability to calculate and use different paths to reach different VMs hosted by the same hypervisor. Essentially, this allows for such subnets and networks to use a LID Mask Control (LMC) like feature to provide alternative paths towards one physical machine, without being bound by the limitation of the LMC that requires the LIDs to be sequential. The freedom to use non-sequential LIDs is particularly useful when a VM needs to be migrated and carry its associated LID to the destination.

In accordance with an embodiment, along with the benefits shown above of a vSwitch architecture with prepopulated LIDs, certain considerations can be taken into account. For example, because the LIDs are prepopulated in an SR-IOV vSwitch-enabled subnet when the network is booted, the initial path computation (e.g., on boot-up) can take longer than if the LIDs were not pre-populated.

InfiniBand SR-IOV Architecture Models—vSwitch with Dynamic LID Assignment

In accordance with an embodiment, the present disclosure provides a system and method for providing a vSwitch architecture with dynamic LID assignment.

Figure 8:
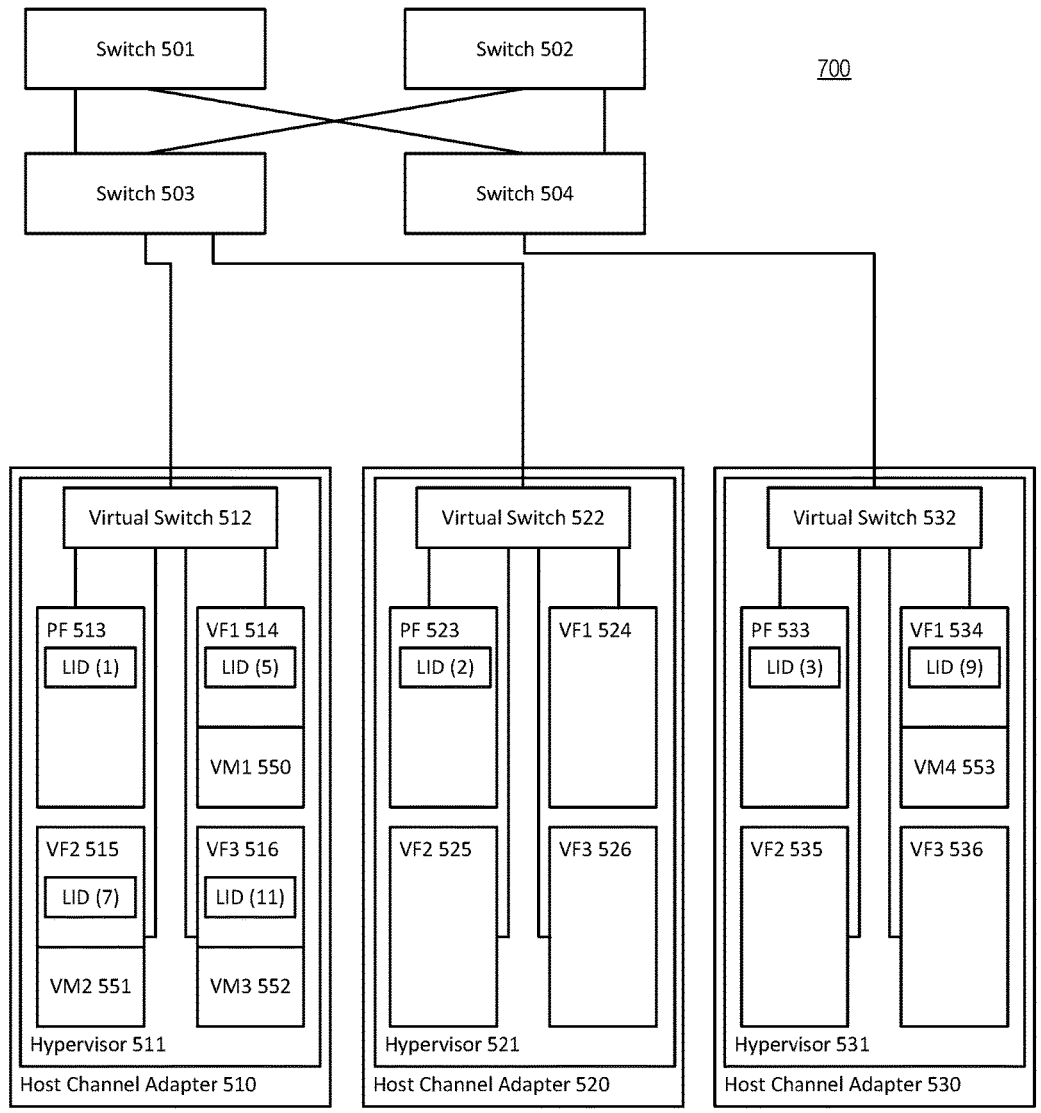
FIG. 8 shows an exemplary vSwitch architecture with dynamic LID assignment, in accordance with an embodiment.

FIG. 8 shows an exemplary vSwitch architecture with dynamic LID assignment, in accordance with an embodiment. As depicted in the figure, a number of switches 501-504 can provide communication within the network switched environment 700 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515, and virtual machine 3 552 to virtual function 3 516. Hypervisor 531 can, in turn, assign virtual machine 4 553 to virtual function 1 534. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 700.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a vSwitch architecture with dynamic LID assignment. Referring to FIG. 8, the LIDs are dynamically assigned to the various physical functions 513, 523, 533, with physical function 513 receiving LID 1, physical function 523 receiving LID 2, and physical function 533 receiving LID 3. Those virtual functions that are associated with an active virtual machine can also receive a dynamically assigned LID. For example, because virtual machine 1 550 is active and associated with virtual function 1 514, virtual function 514 can be assigned LID 5. Likewise, virtual function 2 515, virtual function 3 516, and virtual function 1 534 are each associated with an active virtual function. Because of this, these virtual functions are assigned LIDs, with LID 7 being assigned to virtual function 2 515, LID 11 being assigned to virtual function 3 516, and LID 9 being assigned to virtual function 1 534. Unlike vSwitch with prepopulated LIDs, those virtual functions not currently associated with an active virtual machine do not receive a LID assignment.

In accordance with an embodiment, with the dynamic LID assignment, the initial path computation can be substantially reduced. When the network is booting for the first time and no VMs are present then a relatively small number of LIDs can be used for the initial path calculation and LFT distribution.

In accordance with an embodiment, much like physical host channel adapters can have more than one port (two ports are common for redundancy), virtual HCAs can also be represented with two ports and be connected via one, two or more virtual switches to the external IB subnet.

In accordance with an embodiment, when a new VM is created in a system utilizing vSwitch with dynamic LID assignment, a free VM slot is found in order to decide on which hypervisor to boot the newly added VM, and a unique non-used unicast LID is found as well. However, there are no known paths in the network and the LFTs of the switches for handling the newly added LID. Computing a new set of paths in order to handle the newly added VM is not desirable in a dynamic environment where several VMs may be booted every minute. In large IB subnets, computing a new set of routes can take several minutes, and this procedure would have to repeat each time a new VM is booted.

Advantageously, in accordance with an embodiment, because all the VFs in a hypervisor share the same uplink with the PF, there is no need to compute a new set of routes. It is only needed to iterate through the LFTs of all the physical switches in the network, copy the forwarding port from the LID entry that belongs to the PF of the hypervisor—where the VM is created—to the newly added LID, and send a single SMP to update the corresponding LFT block of the particular switch. Thus the system and method avoids the need to compute a new set of routes.

In accordance with an embodiment, the LIDs assigned in the vSwitch with dynamic LID assignment architecture do not have to be sequential. When comparing the LIDs assigned on VMs on each hypervisor in vSwitch with prepopulated LIDs versus vSwitch with dynamic LID assignment, it is notable that the LIDs assigned in the dynamic LID assignment architecture are non-sequential, while those prepopulated in are sequential in nature. In the vSwitch dynamic LID assignment architecture, when a new VM is created, the next available LID is used throughout the lifetime of the VM. Conversely, in a vSwitch with prepopulated LIDs, each VM inherits the LID that is already assigned to the corresponding VF, and in a network without live migrations, VMs consecutively attached to a given VF get the same LID.

In accordance with an embodiment, the vSwitch with dynamic LID assignment architecture can resolve the drawbacks of the vSwitch with prepopulated LIDs architecture model at a cost of some additional network and runtime SM overhead. Each time a VM is created, the LFTs of the physical switches in the subnet are updated with the newly added LID associated with the created VM. One subnet management packet (SMP) per switch is needed to be sent for this operation. The LMC-like functionality is also not available, because each VM is using the same path as its host hypervisor. However, there is no limitation on the total amount of VFs present in all hypervisors, and the number of VFs may exceed that of the unicast LID limit. Of course, not all of the VFs are allowed to be attached on active VMs simultaneously if this is the case, but having more spare hypervisors and VFs adds flexibility for disaster recovery and optimization of fragmented networks when operating close to the unicast LID limit.

Figure 9:
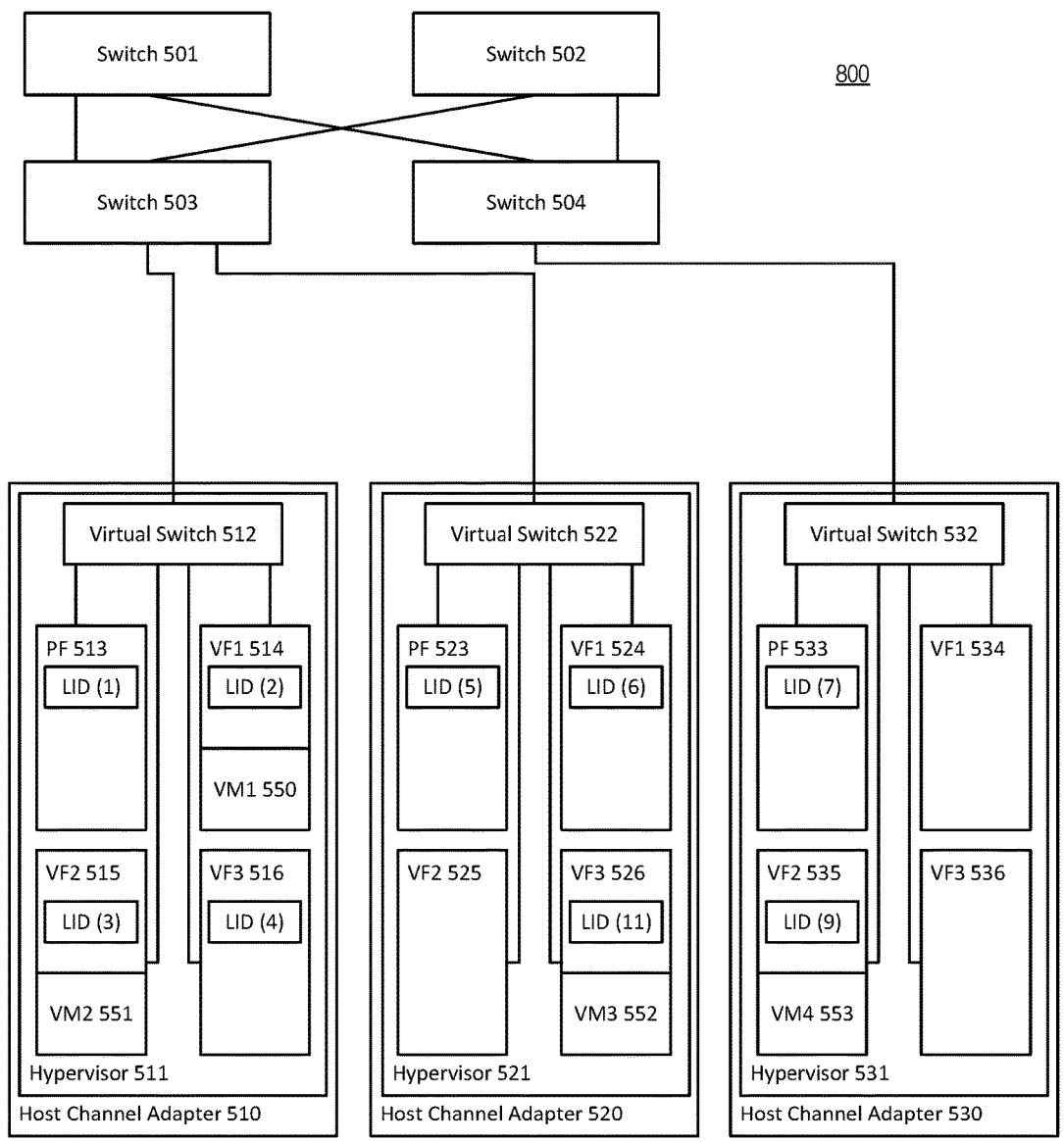
FIG. 9 shows an exemplary vSwitch architecture with vSwitch with dynamic LID assignment and prepopulated LIDs, in accordance with an embodiment.

InfiniBand SR-IOV Architecture Models—vSwitch with Dynamic LID Assignment and Prepopulated LIDs FIG. 9 shows an exemplary vSwitch architecture with vSwitch with dynamic LID assignment and prepopulated LIDs, in accordance with an embodiment. As depicted in the figure, a number of switches 501-504 can provide communication within the network switched environment 800 (e.g., an IB subnet) between members of a fabric, such as an InfiniBand fabric. The fabric can include a number of hardware devices, such as host channel adapters 510, 520, 530. Each of the host channel adapters 510, 520, 530, can in turn interact with a hypervisor 511, 521, and 531, respectively. Each hypervisor can, in turn, in conjunction with the host channel adapter it interacts with, setup and assign a number of virtual functions 514, 515, 516, 524, 525, 526, 534, 535, 536, to a number of virtual machines. For example, virtual machine 1 550 can be assigned by the hypervisor 511 to virtual function 1 514. Hypervisor 511 can additionally assign virtual machine 2 551 to virtual function 2 515. Hypervisor 521 can assign virtual machine 3 552 to virtual function 3 526. Hypervisor 531 can, in turn, assign virtual machine 4 553 to virtual function 2 535. The hypervisors can access the host channel adapters through a fully featured physical function 513, 523, 533, on each of the host channel adapters.

In accordance with an embodiment, each of the switches 501-504 can comprise a number of ports (not shown), which are used in setting a linear forwarding table in order to direct traffic within the network switched environment 800.

In accordance with an embodiment, the virtual switches 512, 522, and 532, can be handled by their respective hypervisors 511, 521, 531. In such a vSwitch architecture each virtual function is a complete virtual Host Channel Adapter (vHCA), meaning that the VM assigned to a VF is assigned a complete set of IB addresses (e.g., GID, GUID, LID) and a dedicated QP space in the hardware. For the rest of the network and the SM (not shown), the HCAs 510, 520, and 530 look like a switch, via the virtual switches, with additional nodes connected to them.

In accordance with an embodiment, the present disclosure provides a system and method for providing a hybrid vSwitch architecture with dynamic LID assignment and prepopulated LIDs. Referring to FIG. 9, hypervisor 511 can be arranged with vSwitch with prepopulated LIDs architecture, while hypervisor 521 can be arranged with vSwitch with prepopulated LIDs and dynamic LID assignment. Hypervisor 531 can be arranged with vSwitch with dynamic LID assignment. Thus, the physical function 513 and virtual functions 514-516 have their LIDs prepopulated (i.e., even those virtual functions not attached to an active virtual machine are assigned a LID). Physical function 523 and virtual function 1 524 can have their LIDs prepopulated, while virtual function 2 and 3, 525 and 526, have their LIDs dynamically assigned (i.e., virtual function 2 525 is available for dynamic LID assignment, and virtual function 3 526 has a LID of 11 dynamically assigned as virtual machine 3 552 is attached). Finally, the functions (physical function and virtual functions) associated with hypervisor 3 531 can have their LIDs dynamically assigned. This results in virtual functions 1 and 3, 534 and 536, are available for dynamic LID assignment, while virtual function 2 535 has LID of 9 dynamically assigned as virtual machine 4 553 is attached there.

In accordance with an embodiment, such as that depicted in FIG. 9, where both vSwitch with prepopulated LIDs and vSwitch with dynamic LID assignment are utilized (independently or in combination within any given hypervisor), the number of prepopulated LIDs per host channel adapter can be defined by a fabric administrator and can be in the range of 0<=prepopulated VFs<=Total VFs (per host channel adapter), and the VFs available for dynamic LID assignment can be found by subtracting the number of prepopulated VFs from the total number of VFs (per host channel adapter).

In accordance with an embodiment, much like physical host channel adapters can have more than one port (two ports are common for redundancy), virtual HCAs can also be represented with two ports and be connected via one, two or more virtual switches to the external IB subnet.

InfiniBand—Inter-Subnet Communication (Fabric Manager)

In accordance with an embodiment, in addition to providing an InfiniBand fabric within a single subnet, embodiments of the current disclosure can also provide for an InfiniBand fabric that spans two or more subnets.

Figure 10:
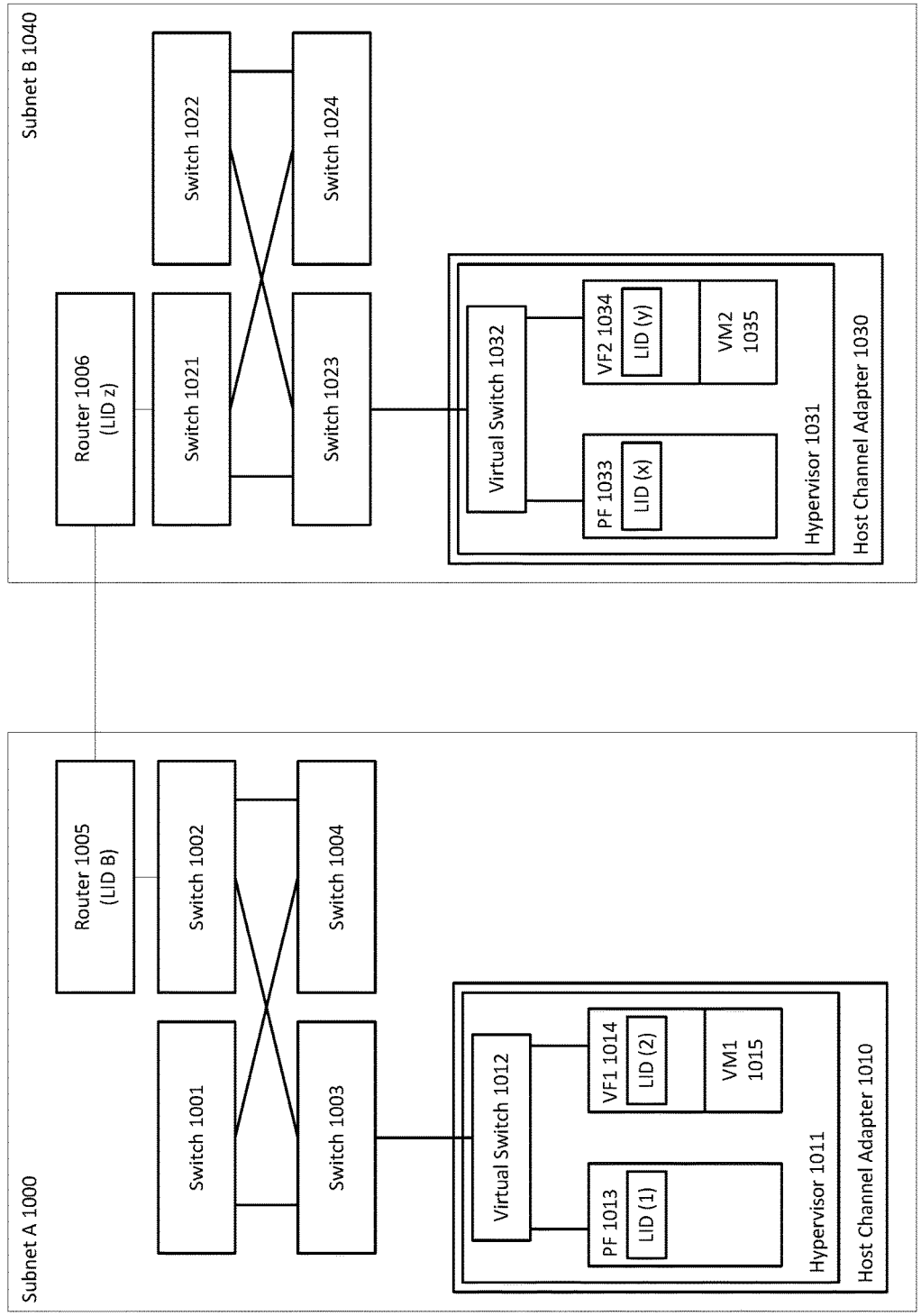
FIG. 10 shows an exemplary multi-subnet InfiniBand fabric, in accordance with an embodiment.

FIG. 10 shows an exemplary multi-subnet InfiniBand fabric, in accordance with an embodiment. As depicted in the figure, within subnet A 1000, a number of switches 1001-1004 can provide communication within subnet A 1000 (e.g., an IB subnet) between members of a fabric, such as an InfiniBand fabric. The fabric can include a number of hardware devices, such as, for example, channel adapter 1010. Host channel adapter 1010 can in turn interact with a hypervisor 1011. The hypervisor can, in turn, in conjunction with the host channel adapter it interacts with, setup a number of virtual functions 1014. The hypervisor can additionally assign virtual machines to each of the virtual functions, such as virtual machine 1 1015 being assigned to virtual function 1 1014. The hypervisor can access their associated host channel adapters through a fully featured physical function, such as physical function 1013, on each of the host channel adapters. Within subnet B 1040, a number of switches 1021-1024 can provide communication within subnet B 1040 (e.g., an IB subnet) between members of a fabric, such as an InfiniBand fabric. The fabric can include a number of hardware devices, such as, for example, channel adapter 1030. Host channel adapter 1030 can in turn interact with a hypervisor 1031. The hypervisor can, in turn, in conjunction with the host channel adapter it interacts with, setup a number of virtual functions 1034. The hypervisor can additionally assign virtual machines to each of the virtual functions, such as virtual machine 2 1035 being assigned to virtual function 2 1034. The hypervisor can access their associated host channel adapters through a fully featured physical function, such as physical function 1033, on each of the host channel adapters. It is noted that although only one host channel adapter is shown within each subnet (i.e., subnet A and subnet B), it is to be understood that a plurality of host channel adapters, and their corresponding components, can be included within each subnet.

In accordance with an embodiment, each of the host channel adapters can additionally be associated with a virtual switch, such as virtual switch 1012 and virtual switch 1032, and each HCA can be set up with a different architecture model, as discussed above. Although both subnets within FIG. 10 are shown as using a vSwitch with prepopulated LID architecture model, this is not meant to imply that all such subnet configurations can follow a similar architecture model.

In accordance with an embodiment, at least one switch within each subnet can be associated with a router, such as switch 1002 within subnet A 1000 being associated with router 1005, and switch 1021 within subnet B 1040 being associated with router 1006.

In accordance with an embodiment, at least one device (e.g., a switch, a node . . . etc.) can be associated with a fabric manager (not shown). The fabric manager can be used, for example, to discover inter-subnet fabric topology, create a fabric profile (e.g., a virtual machine fabric profile), build virtual machine related database objects that forms the basis for building a virtual machine fabric profile. In addition, the fabric manager can define legal inter-subnet connectivity in terms of which subnets are allowed to communicate via which router ports using which partition numbers.

In accordance with an embodiment, when traffic at an originating source, such as virtual machine 1 within subnet A, is addressed to a destination in a different subnet, such as virtual machine 2 within subnet B, the traffic can be addressed to the router within subnet A, i.e., router 1005, which can then pass the traffic to subnet B via its link with router 1006.

Virtual Dual Port Router

In accordance with an embodiment, a dual port router abstraction can provide a simple way for enabling subnet-to-subnet router functionality to be defined based on a switch hardware implementation that has the ability to do GRH (global route header) to LRH (local route header) conversion in addition to performing normal LRH based switching.

In accordance with an embodiment, a virtual dual-port router can logically be connected outside a corresponding switch port. This virtual dual-port router can provide an InfiniBand specification compliant view to a standard management entity, such as a Subnet Manager.

In accordance with an embodiment, a dual-ported router model implies that different subnets can be connected in a way where each subnet fully controls the forwarding of packets as well as address mappings in the ingress path to the subnet, and without impacting the routing and logical connectivity within either of the incorrectly connected subnets.

In accordance with an embodiment, in a situation involving an incorrectly connected fabric, the use of a virtual dual-port router abstraction can also allow a management entity, such as a Subnet Manager and IB diagnostic software, to behave correctly in the presence of un-intended physical connectivity to a remote subnet.

Figure 11:
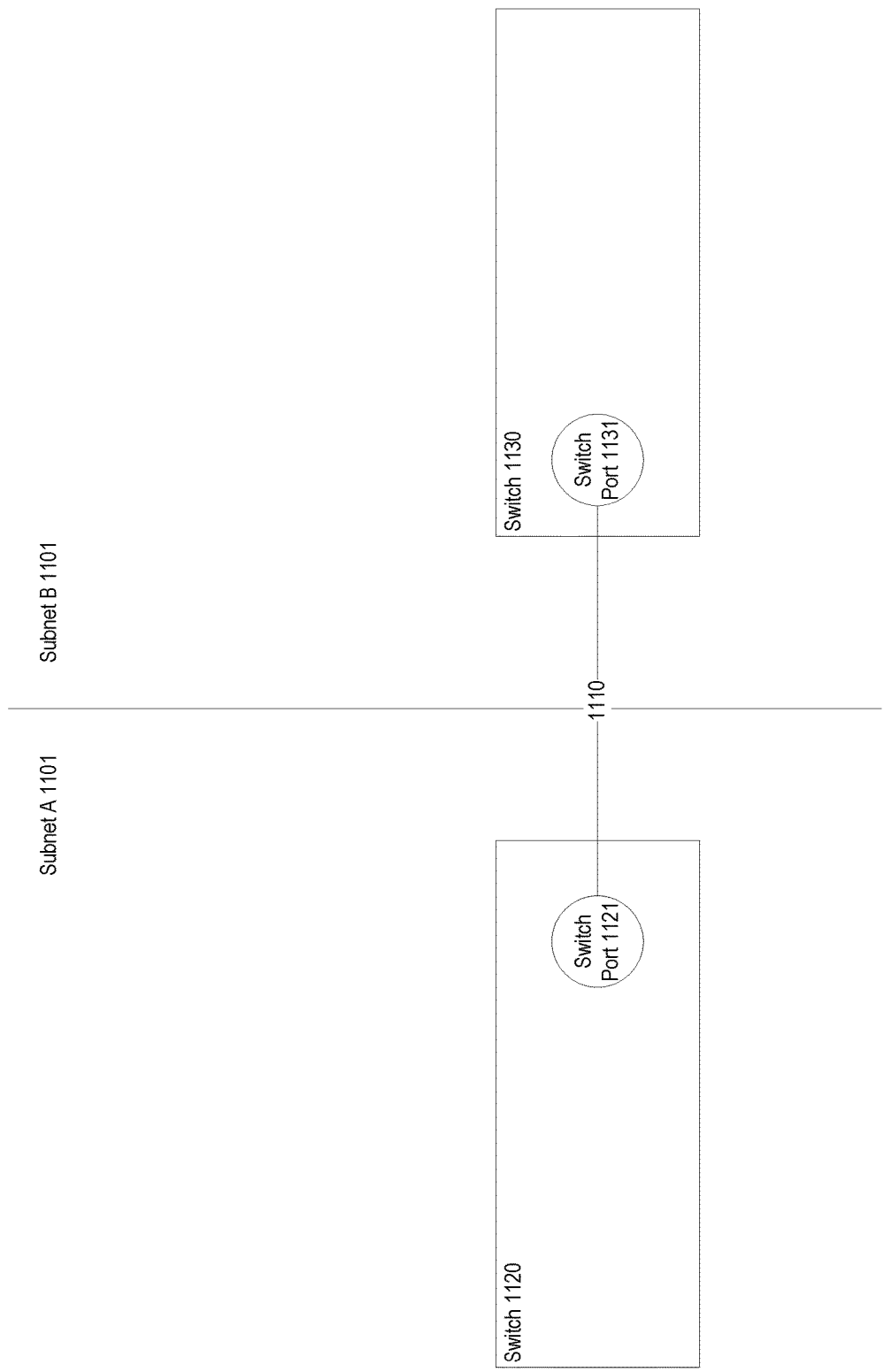
FIG. 11 shows an interconnection between two subnets in a high performance computing environment, in accordance with an embodiment.

FIG. 11 shows an interconnection between two subnets in a high performance computing environment, in accordance with an embodiment. Prior to configuration with a virtual dual port router, a switch 1120 in subnet A 1101 can be connected through a switch port 1121 of switch 1120, via a physical connection 1110, to a switch 1130 in subnet B 1102, via a switch port 1131 of switch 1130. In such an embodiment, each switch port, 1121 and 1131, can act both as switch ports and router ports.

In accordance with an embodiment, a problem with this configuration is that a management entity, such as a subnet manager in an InfiniBand subnet, cannot distinguish between a physical port that is both a switch port and a router port. In such a situation, an SM can treat the switch port as having a router port connected to that switch port. But if the switch port is connected to another subnet, via, for example, a physical link, with another subnet manager, then the subnet manager can be able to send a discovery message out on the physical link. However, such a discovery message cannot be allowed at the other subnet.

Figure 12:
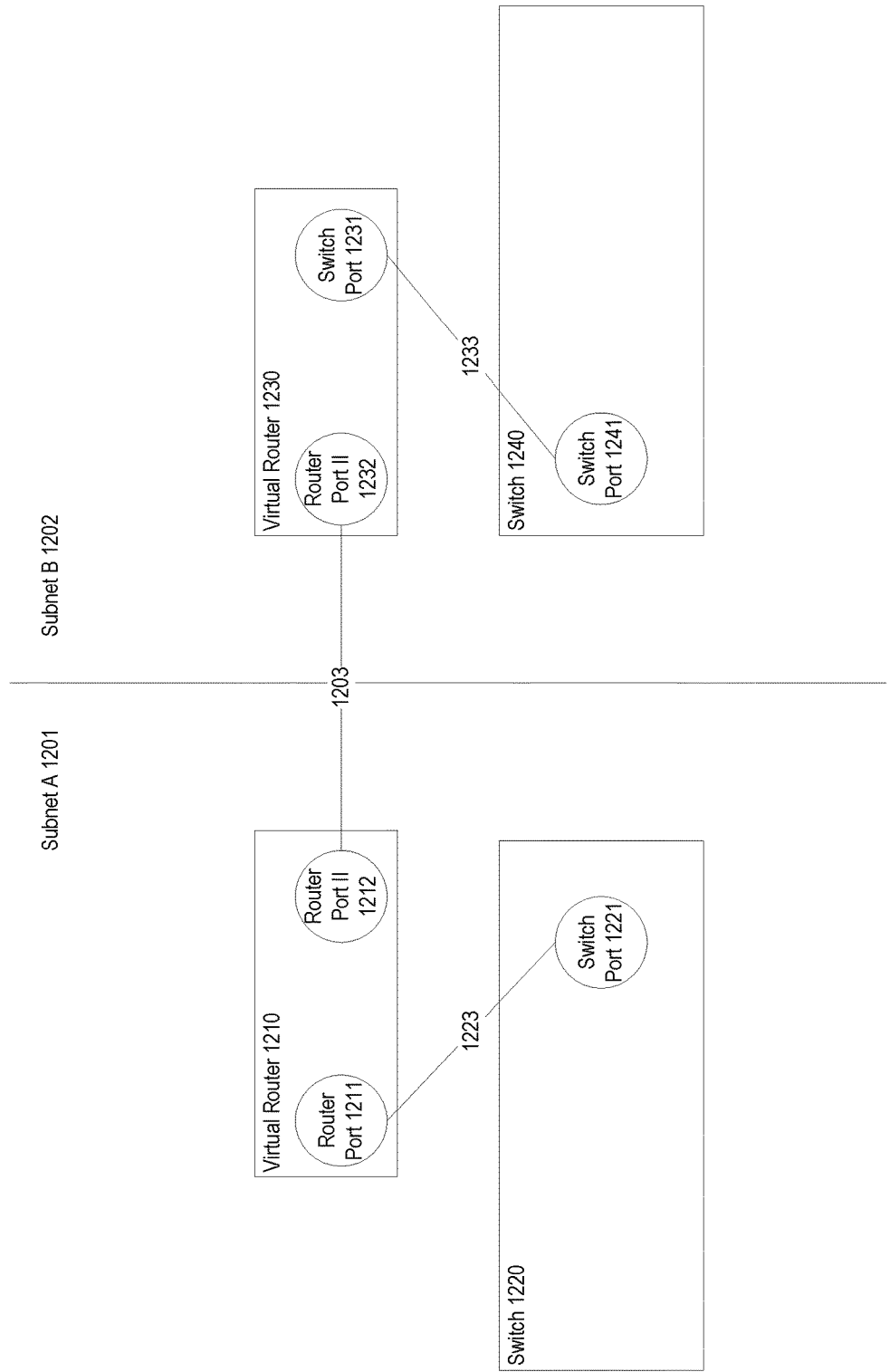
FIG. 12 shows an interconnection between two subnets via a dual-port virtual router configuration in a high performance computing environment, in accordance with an embodiment.

FIG. 12 shows an interconnection between two subnets via a dual-port virtual router configuration in a high performance computing environment, in accordance with an embodiment.

In accordance with an embodiment, after configuration, a dual-port virtual router configuration can be provided such that a subnet manager sees a proper end node, signifying an end of the subnet that the subnet manager is responsible for.

In accordance with an embodiment, at a switch 1220 in subnet A 1201, a switch port can be connected (i.e., logically connected) to a router port 1211 in a virtual router 1210 via a virtual link 1223. The virtual router 1210 (e.g., a dual-port virtual router), which while shown as being external to the switch 1220 can, in embodiments, be logically contained within the switch 1220, can also comprise a second router port, router port II 1212. In accordance with an embodiment, a physical link 1203, which can have two ends, can connect the subnet A 1201 via first end of the physical link with subnet B 1202 via a second end of the physical link, via router port II 1212 and router port II 1232, contained in virtual router 1230 in subnet B 1202. Virtual router 1230 can additionally comprise router port 1231, which can be connected (i.e., logically connected) to switch port 1241 on switch 1240 via a virtual link 1233.

In accordance with an embodiment, a subnet manager (not shown) on subnet A can detect router port 1211, on virtual router 1210 as an end point of the subnet that the subnet manager controls. The dual-port virtual router abstraction can allow the subnet manager on subnet A to deal with subnet A in a usual manner (e.g., as defined per the InfiniBand specification). At the subnet management agent level, the dual-port virtual router abstraction can be provided such that the SM sees the normal switch port, and then at the SMA level, the abstraction that there is another port connected to the switch port, and this port is a router port on a dual-port virtual router. In the local SM, a conventional fabric topology can continue to be used (the SM sees the port as a standard switch port in the topology), and thus the SM sees the router port as an end port. Physical connection can be made between two switch ports that are also configured as router ports in two different subnets.

In accordance with an embodiment, the dual-port virtual router can also resolve the issue that a physical link could be mistakenly connected to some other switch port in the same subnet, or to a switch port that was not intended to provide a connection to another subnet. Therefore, the methods and systems described herein also provide a representation of what is on the outside of a subnet.

In accordance with an embodiment, within a subnet, such as subnet A, a local SM determines a switch port, and then determines a router port connected to that switch port (e.g., router port 1211 connected, via a virtual link 1223, to switch port 1221). Because the SM sees the router port 1211 as the end of the subnet that the SM manages, the SM cannot send discovery and/or management messages beyond this point (e.g., to router port II 1212).

In accordance with an embodiment, the dual-port virtual router described above provides a benefit that the dual-port virtual router abstraction is entirely managed by a management entity (e.g., SM or SMA) within the subnet that the dual-port virtual router belongs to. By allowing management solely on the local side, a system does not have to provide an external, independent management entity. That is, each side of a subnet to subnet connection can be responsible for configuring its own dual-port virtual router.

In accordance with an embodiment, in a situation where a packet, such as an SMP, is addressed to a remote destination (i.e., outside of the local subnet) arrives local target port that is not configured via the dual-port virtual router described above, then the local port can return a message specifying that it is not a router port.

Many features of the present invention can be performed in, using, or with the assistance of hardware, software, firmware, or combinations thereof. Consequently, features of the present invention may be implemented using a processing system (e.g., including one or more processors).

Figure 13:
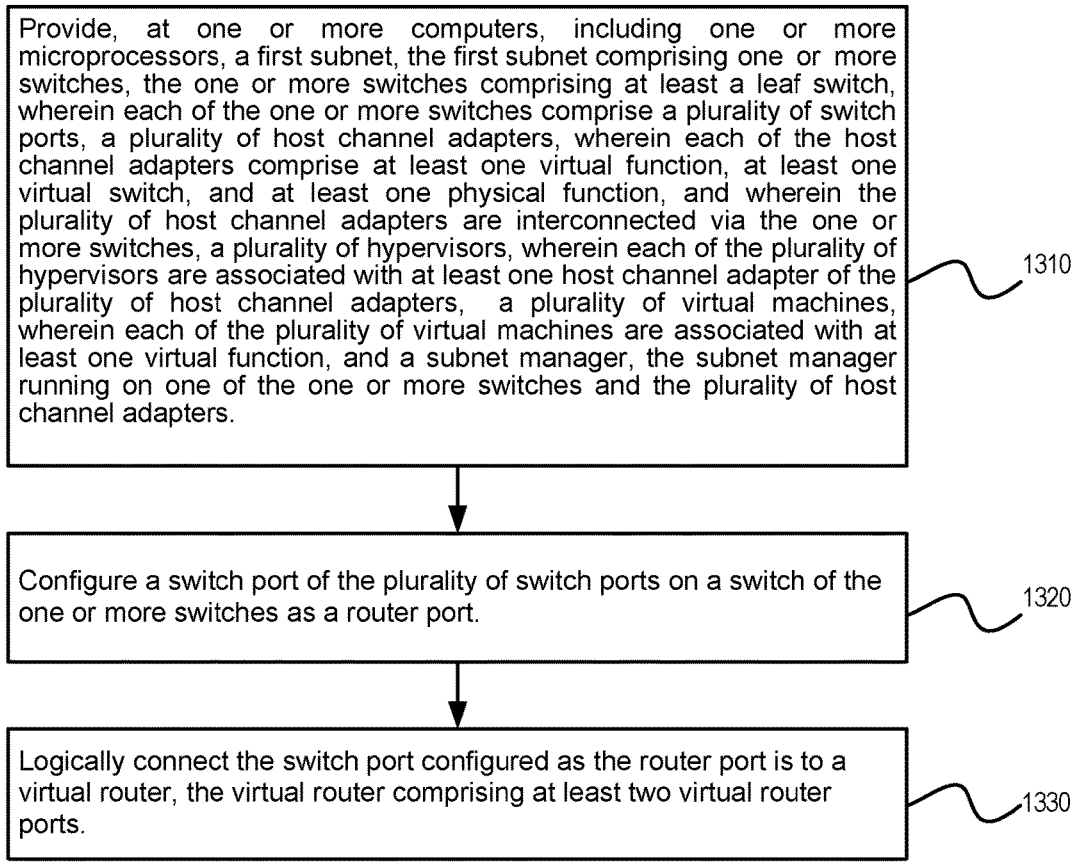
FIG. 13 shows a flowchart of a method for supporting dual-port virtual router in a high performance computing environment, in accordance with an embodiment.

FIG. 13 shows a method for supporting dual-port virtual router in a high performance computing environment, in accordance with an embodiment. At step 1310, the method can provide at one or more computers, including one or more microprocessors, a first subnet, the first subnet comprising a plurality of switches, the plurality of switches comprising at least a leaf switch, wherein each of the plurality of switches comprise a plurality of switch ports, a plurality of host channel adapters, each host channel adapter comprising at least one host channel adapter port, a plurality of end nodes, wherein each of the end nodes are associated with at least one host channel adapter of the plurality of host channel adapters, and a subnet manager, the subnet manager running on one of the plurality of switches and the plurality of host channel adapters.

At step 1320, the method can configure a switch port of the plurality of switch ports on a switch of the plurality of switches as a router port.

At step 1330, the method can logically connect the switch port configured as the router port to a virtual router, the virtual router comprising at least two virtual router ports.

Multicast Communication

Multicast is the ability to deliver a single packet to multiple destinations. Accordingly, multicast can simplify, and improve the efficiency of, communication between end-nodes of a network fabric. Multicast is implemented and managed through the use of multicast groups. Each HCA, switch, or router that supports multicast may participate in (i.e., be a member of) zero, one, or many multicast groups. Multicast groups can be managed by a management entity, such as the subnet manager.

A multicast group is a collection of end-nodes, each of which receive a multicast packet sent to a single multicast address. Each multicast group is associated with a subnet-unique multicast LID (referred to herein as an MLID) and a globally unique multicast GID (referred to herein as an MGID). A multicast group is defined by its MGID, which is associated with the multicast group at the time of the group's creation. A multicast group's MGID can be assigned by the subnet manager, or it can be provided to the SM at the time of the group's creation. The MLID is assigned, or allocated, by the SM at the time the multicast group is created. Multiple MGIDs can be associated with a single MLID (that is, multiple multicast groups can share the same MLID). However, a given MGID cannot be associated with more than one MLID on the same subnet. The MLID, MGID, and other details about the multicast group, such as the LIDs and GIDs of ports that are a member of the multicast group, can be stored in a data store accessible by/for subnet administration (SA).

In accordance with an embodiment, information about multicast groups defined in the local subnet can be distributed to the switches in the subnet. Each switch is configured with routing information used to forward a copy of a received multicast packet to one or more ports such that copies of the received multicast packet are forwarded to each HCA port having an LID included in the multicast group (i.e., associated with the MGID of the multicast group) that corresponds to the MLID/MGID of the received multicast packet. In some cases, a multicast packet will be replicated and forwarded to a port that will send the copy on directly to an HCA port, while in other cases, the copy will need to be forwarded to another switch before it reaches an HCA port.

The SM can generate a single spanning tree that includes all ports in the multicast group to which the multicast packet should be delivered. A multicast forwarding table (MFT) for each switch in the subnet that will participate in multicast forwarding can then be derived from the spanning tree. Using a single spanning tree to derive the switch MFTs assures that no duplicate copies of a multicast packet are forwarded to a switch that has already processed a copy of that multicast packet.

A multicast packet is a packet that contains an MLID in the DLID field of its packet header. When a switch receives a multicast packet, the switch examines the packet header and extracts the DLID to determine if it corresponds to a multicast group. Upon a determination that the DLID corresponds to a multicast group (i.e., the DLID field contains an MLID), the switch replicates the packet and sends it out to each of the ports (except for the arrival port) designated in the MFT that is associated with the multicast group with which the MLID of the multicast packet is associated with.

Figure 14:
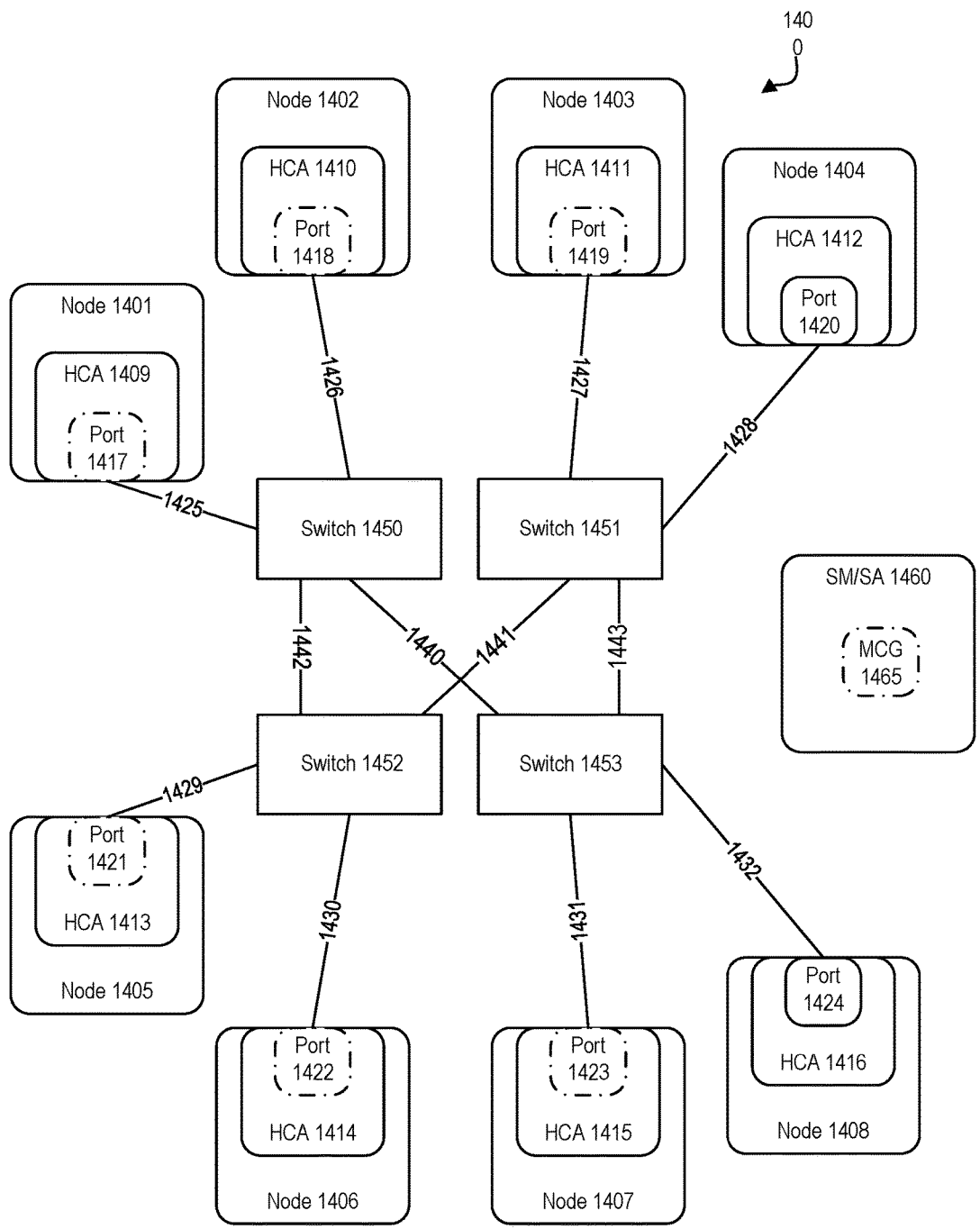
FIG. 14 shows an exemplary subnet A00 that supports multicast communication, in accordance with an embodiment.

FIG. 14 shows an exemplary subnet 1400 that supports multicast communication, in accordance with an embodiment. Subnet A includes nodes 1401-1408. Nodes 1401-1408 include HCAs 1409-1416, respectively. HCAs 1409-1416 each include a port—ports 1417-1424, respectively. The ports 1417-1424 are connected to switches 1450-1453 via links 1425-1432. For example, Port 1417 is connected to switch 1450 via link 1425; port 1418 is connected to switch 1450 via link 1426; port 1419 is connected to switch 1451 via link 1427; etc.

Subnet 1400 includes SM/SA 1460. While depicted as a separate entity in FIG. 15 for simplicity, and in accordance with differing embodiments, it is to be understood that SM/SA 1460 could be deployed as a component of any of switches 1450-1453, any of nodes 1401-1408, or as a component of another IB device not shown. Multicast group (MCG) 1465 is defined by SM/SA 1460. MCG 1465 is depicted in block-diagram form with a dash-dot line. Further ports 1417-1419 and ports 1421-1423 are also depicted with a dash-dot line to indicate that they are members of MCG 1465. Conversely, ports 1420 and 1424 are depicted in block-diagram form with a solid line to indicate that they are not members of MCG 1465.

Switch 1450 is interconnected via link 1440 to switch 1453, and is interconnected via link 1442 to switch 1452. Likewise, switch 1451 is interconnected via link 1441 to switch 1452, and is interconnected via link 1443 to switch 1453.

In accordance with an embodiment, should port 1421 send a multicast packet, including the MGID that defines MCG 1465, onto the network, each of ports 1417-1419 and ports 1422 and 1423 will receive a copy of the multicast packet sent by port 1421 by virtue of being a member of MCG 1465.

Figure 15:
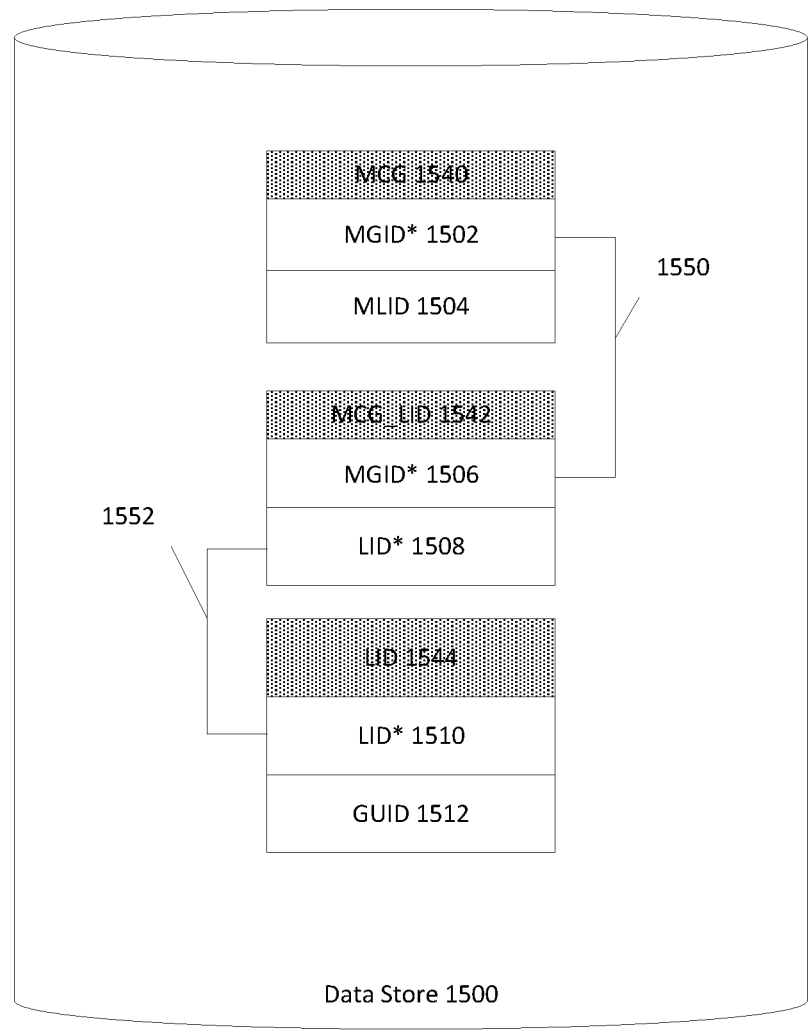
FIG. 15 shows an exemplary SA data store used by the SM/SA to manage multicast groups, in accordance with an embodiment.

FIG. 15 shows an exemplary SA data store used by the SM/SA to manage multicast groups, in accordance with an embodiment. Data store 1500 is depicted as tables in a relational database diagram, because such diagrams show the relationships between the related components. However, FIG. 15 is meant to be illustrative of the relationships between multicast group components and the associative mapping between such components, and not meant to be limiting. Any suitable data structure that allows appropriate associative mapping between the relevant components can provide an embodiment. Indeed, the IB Specification leaves the particular implementation of SA and any SA data stores undefined.

As shown in FIG. 15, SA data store 1500 can include MCG table 1540 and LID table 1544. MCG table 1540 can include information about MCGs defined in the local subnet, including MGIDs and corresponding MLIDs of each defined MCG in the local subnet. LID table 1544 can include information about LIDs in the subnet, such as the corresponding GUID of the port that each LID is assigned to. Relationships can be configured such that a query can return data showing every LID (assigned to an end-port) that is associated with a given MGID (i.e., every port that is a member of the MCG defined by the given MGID).

For example, and in accordance with an embodiment, a mapping table can be utilized to map LIDs in the local subnet to MGIDs of multicast groups with which the LIDs are associated. With continued reference to FIG. 15, MCG and LID data can be mapped in, e.g., mapping table MCG_LID 1542, where an LID assigned to an end-port in the local subnet can be mapped to one or multiple MGIDs. In accordance with an embodiment, tables 1540 and 1542 can be related via relationship 1550, and tables 1542 and 1544 can be related via relationship 1552. With such relationships in place, the SM can determine, via a query of the data store, which LIDs are associated with which MGIDs (i.e., which ports are members of which multicast groups).

Figure 16:
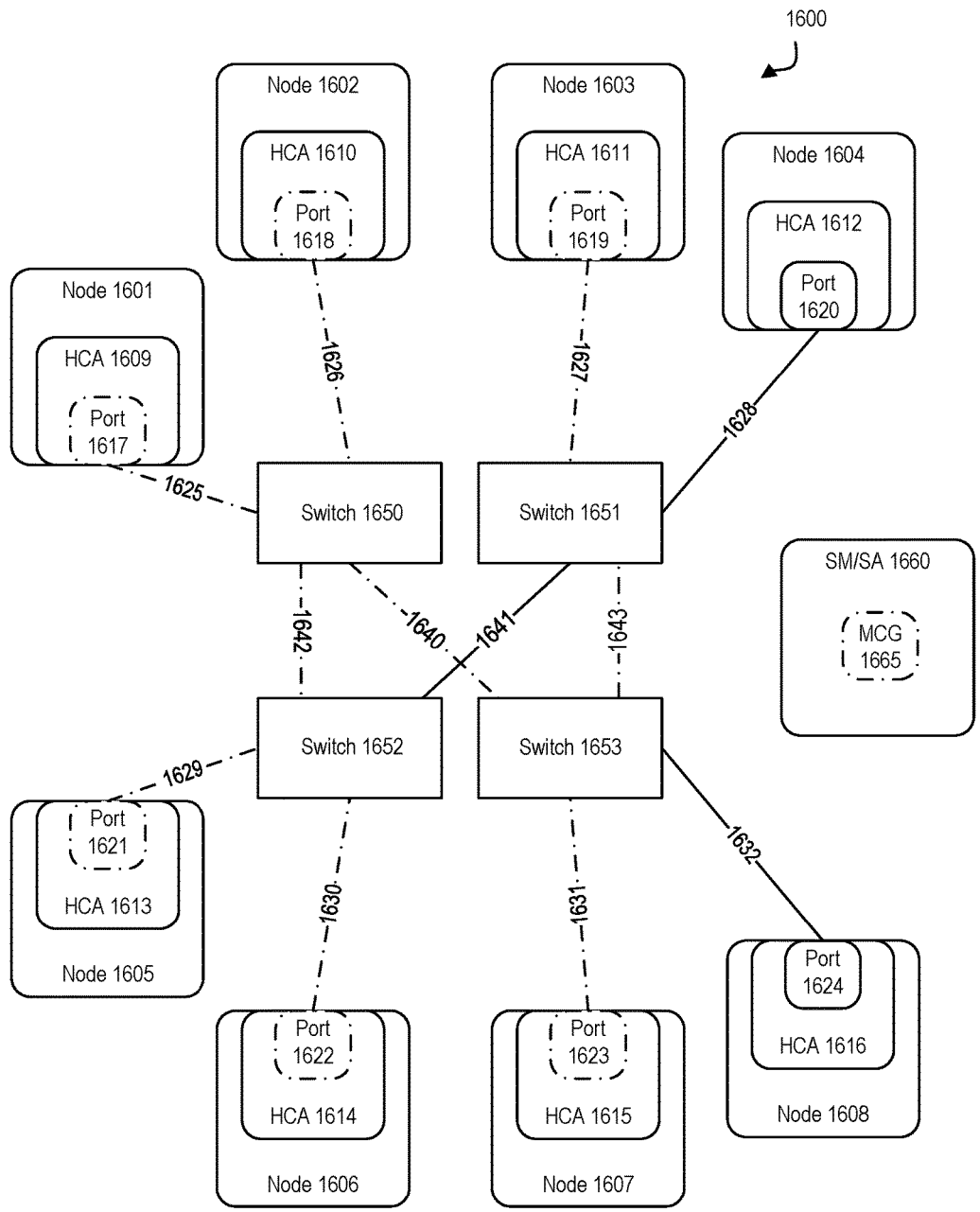
FIG. 16 shows an exemplary route that can be determined via a spanning tree algorithm in a subnet, in accordance with an embodiment.

As noted, above, in order to efficiently forward a single copy of each multicast packet to all multicast group members, the SM can determine a single spanning tree route through the subnet topology. In accordance with an embodiment, FIG. 16 shows an exemplary route that can be determined via a spanning tree algorithm in subnet 1600. As previously noted, Multicast group (MCG) 1665 is defined by SM/SA 1660. MCG 1665 is depicted in block-diagram form with a dash-dot line. Further ports 1617-1619 and ports 1621-1623 are also depicted with a dash-dot line to indicate that they are members of MCG 1665. In FIG. 16, links included in a spanning tree to service delivery of multicast traffic are also depicted in dash-dot line, while links excluded from the spanning tree are depicted in solid line format.

In accordance with an embodiment, SM 1660 can determine which end-ports are members of MCG 1665. Using the determined end-ports, the SM 1660 can determine a spanning tree that ensures that only a single copy of a multicast packet injected into the subnet will be delivered to each end-port that is a member of MCG 1665. For instance, links 1642, 1640 and 1643 can be included in the spanning tree, while link 1641 need not be included. Including links 1642, 1640 and 1643 ensures that, regardless of which end-port injects a multicast packet into the subnet, only one copy of the multicast packet will be delivered to each end-port that is member of MCG 1665.

If, for example, port 1621 injects a multicast packet into the subnet, it will be received by switch 1652. Switch 1652 can then forward a copy of the multicast packet to each of the links designated in the spanning tree (except for the link which the multicast packet was received on). Accordingly, switch 1652 can forward a copy of the received multicast packet to links 1642, and 1630 (and exclude link 1629, since the multicast packet was received on this link). In this scenario, port 1622 will receive its (only) copy of the multicast packet via link 1630, and switch 1650 will receive a copy via link 1642. From here, switch 1650 can also forward a copy of the multicast packet received from link 1642 to links 1625, 1626 and 1640 (and exclude link 1642). Accordingly, ports 1617 and 1618 will receive their (only) respective copies of the multicast packet via links 1625 and 1626, respectively, and switch 1653 will receive a copy via link 1640. This pattern can continue until all end-ports have received one, and only one, copy of the multicast packet, via the spanning tree route determined by the SM.

Figure 17:
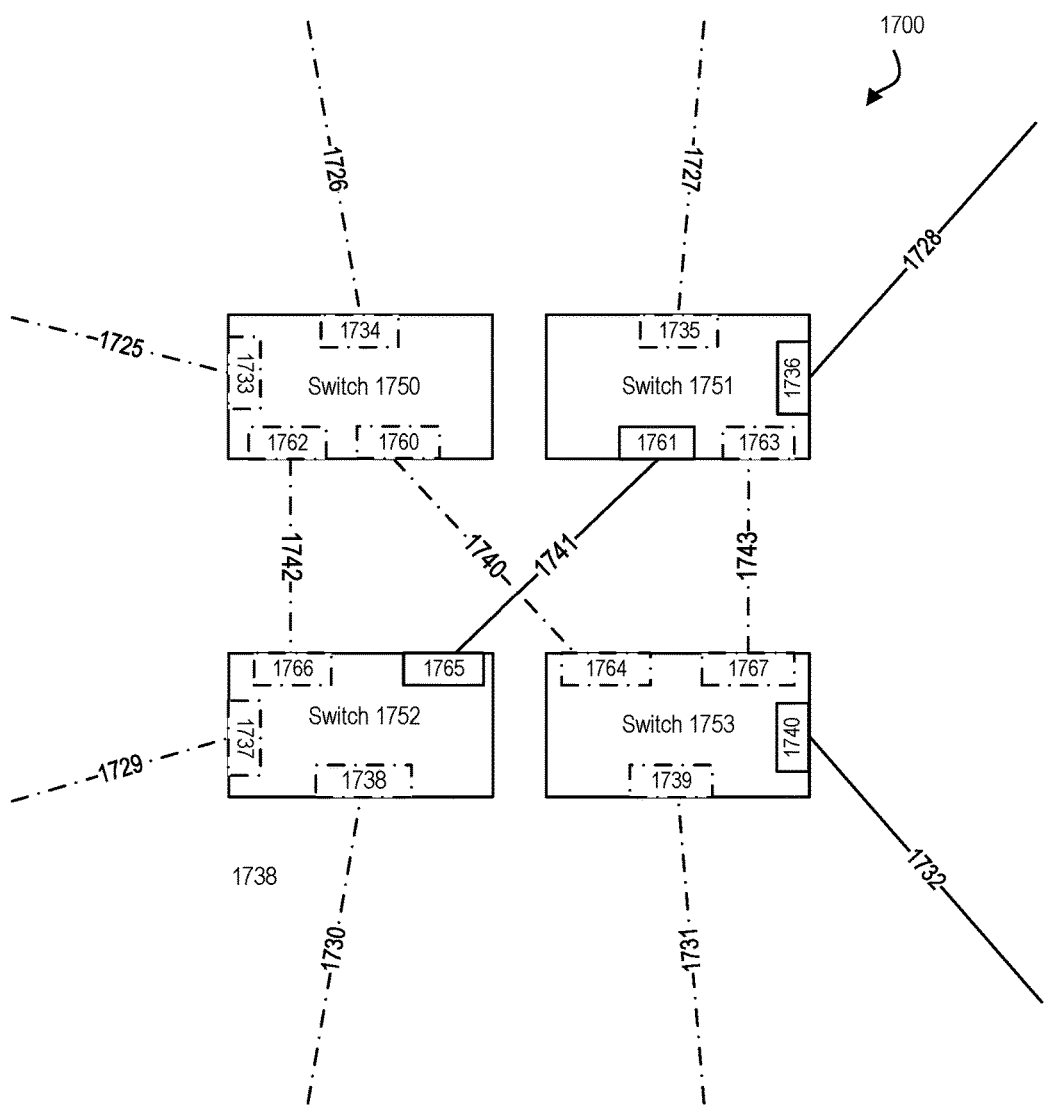
FIG. 17 shows a detailed view of switches, in accordance with an embodiment.

In accordance with an embodiment, once the SM has determined a single spanning tree route for multicast traffic, the SM can determine multicast forwarding table (MFTs) for each switch that is a part of the spanning tree route. FIG. 17 shows a detailed view of switches 1750-1753, including the switch link ports that links 1725-1732 and links 1740-43 are connected to. As shown in FIG. 17, links 1725-1732 are connected, respectively, to switch ports 1733-1740. Likewise, links 1740-1743 are connected, respectively, to ports 1760-1763 on one end and, respectively, to switch ports 1764-1767 on the other end. Consistent with previous figures, switch ports that are connected to links that are included in the spanning tree route of the SM 1765 (not shown) are depicted in dash-dot line, while ports connected to links that are excluded from the spanning tree are depicted in solid format.

In determining an MFT for a switch, the SM can determine each port of a given switch that is connected to a link included in the spanning tree route for delivery of multicast traffic. As an example, referring to FIG. 17, the MFT for switch 1750 can include links 1733, 1734, 1760 and 1762, since a copy of a received multicast packet must be forwarded from each of these ports (except the port that received the link) in order to assure that each end-port that is a member of MCG 1765 receives a copy of the multicast packet. Regarding switch 1751, ports 1735 and 1763 would be included in an MFT entry for switch 1751, while ports 1736 and 1761 would be excluded from the MFT entry. The MFT is indexed by MLID, and a specific MFT entry contains the port vector that corresponds to the spanning tree that the MLID is associated with.

Figure 18:
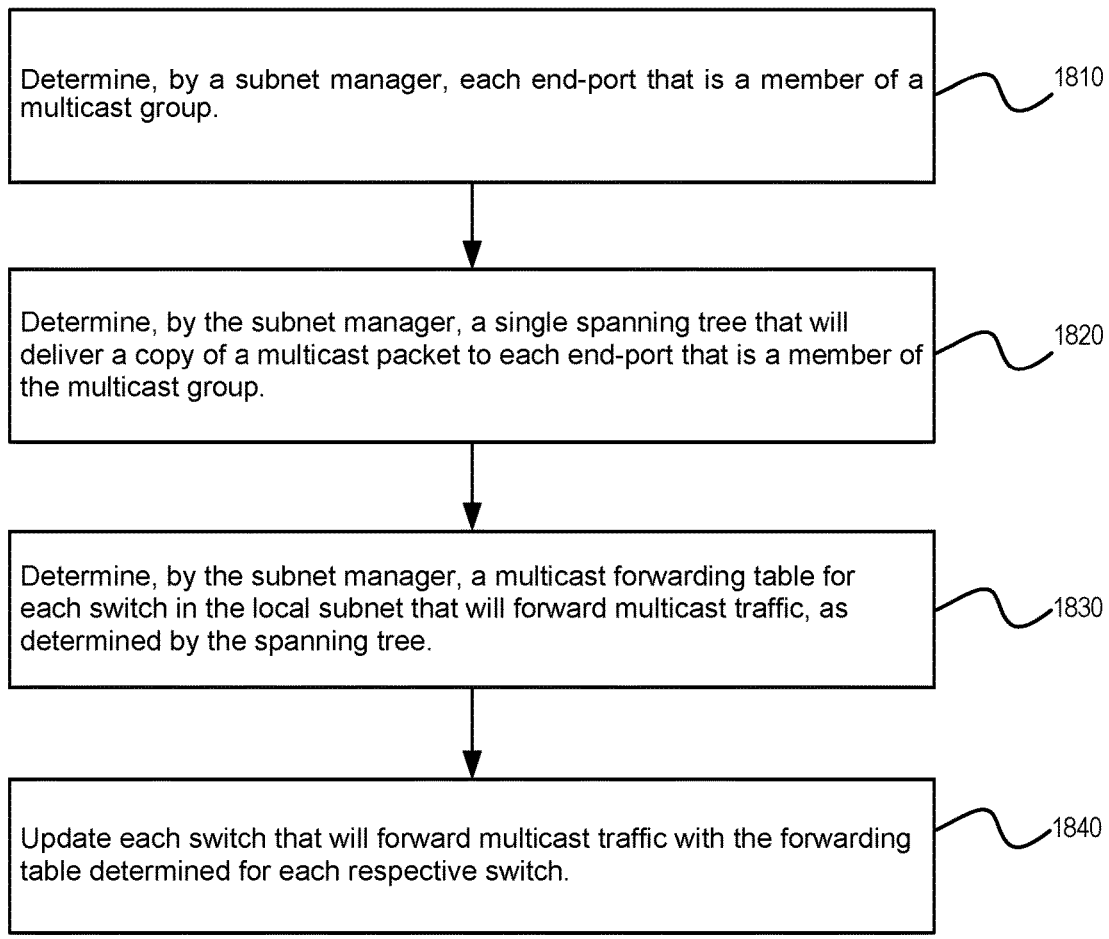
FIG. 18 illustrates a flowchart of a method for providing multicast packet delivery to members of a multicast group, in accordance with an embodiment.

FIG. 18 illustrates a flowchart of a method for providing multicast packet delivery to members of a multicast group, in accordance with an embodiment. At step 1810, a subnet manager can determine each end-port that is a member of a multicast group. At step 1820, the subnet manager can determine a single spanning tree that will deliver a copy of a multicast packet to each end-port that is a member of the multicast group. At step 1830 the subnet manager can determine a multicast forwarding table for each switch in the local subnet that will forward multicast traffic, as determined by the spanning tree. At step 1840, the SM can update each switch that will forward multicast traffic with the forwarding table determined for each respective switch.

Homogenous Fabric Attributes to Reduce the Need for SA Access

The InfiniBand (IB) specification defined Subnet Manager (SM) and Subnet Administrator (SA) provide a centralized way of performing IB subnet discovery and initialization as well as lookup and registration services.

The protocols for communication between IB clients and the SA are designed to allow both the SA and the IB client to represent a minimal feature IB end-port implementation. Hence, per the specification, only 256 byte UD (unreliable datagram) packets are used to implement the protocols.

In accordance with an embodiment, a Subnet Manager (SM) can be responsible for establishing/defining paths through a respective subnet. It does so via subnet management packets (SMPs) that can, for example, set switch forwarding tables (linear forwarding tables), LIDs . . . etc. A Subnet Administrator (SA) can be responsible for responding to path resolution requests sing GMPs (general management packets). For example, upon request for a path record, a SA can response can comprise a local route header (DLID, SLID, SL), a global header (DGID, SGID), and other properties, such as MTU, Rate, Latency, P_Key . . . etc.

In order to ensure that communication parameters are consistent with the relevant IB fabric and peer node capabilities and associated admin policies, an IB client is expected to obtain path records from the SA in order to obtain both relevant L2 address information (LID) as well as communication parameters, such as a max MTU (maximum transmission unit), max Rate and Service Level (SL).

While path records and other information obtained by the clients from the SA can be expected to remain unchanged as long as the relevant peer node is reachable and the same Master SM/SA instance is in charge of the subnet, there is in general a need to refresh any cached information whenever a new Master SM/SA instance becomes active.

In the case of multicast group membership, there is an inherent need to (re-)join any multicast membership whenever a new Master SM/SA is active since a new SM may assign new MGID to MLID mappings.

In certain embodiments, it can be possible for an IB client to cache path records and multicast group membership information upon any changes to a master SM/SA is possible for an IB client to optimistically cache path records and multicast group information also across changes of Master SM/SA. However, in the case of multicast membership, sorting out exception cases where cached information is no longer valid may not be straight forward due to various race conditions.

In the case of SRIOV based VM deployments, the problem of SA request traffic is magnified as long as each such VM performs similar types of SA requests as physical servers (e.g., path record inquires). That is, in a virtualized environment, where each client can comprise a single virtual machine acting as an end node in the system (i.e., acting a physical server in a non-SRIOV environment), this can drastically increase traffic to the SA via SA requests upon an event that would traditionally require such SA requests.

With less capable SM/SA implementations, such as those based on low-performance processor modules connected to a switch management interface, even moderate increases in SA request loads can cause severe overhead and reduced forward progress for both the SM as well as the system as a whole.

For highly available (HA) systems where fast fail-over and recovery is critical, any delay represents a problem. For example, when sub-second fail-over time is the goal, it is important that operational compute nodes can continue normal operation and communication with other operational nodes without any interruption at all as long as there is no loss of physical connectivity between the nodes. Hence, it is desirable that all nodes can continue to use existing address and path information for both unicast and multicast traffic without the need to interact with the SA, and that the only interruption of connectivity occurs if the SM needs to perform re-routing or re-initialization due to failed links within the fabric.

Also, even with SM/SA implementations based on high end servers with full blown HCAs, the use of 256 byte MADs (management datagrams) for SA communication can severely limit performance and scalability. In such cases, even with optimal caching and extremely high performance for SA request processing, the need to re-register multicast membership with a new Master SM can represent an unnecessary interruption of connectivity between operational nodes connected by operational switches and links.

There are two main goals related to optimizing the interaction between the IB clients and the SM/SA infrastructure. For small to medium sized systems with switch embedded (low-end) SM/SA implementations, the goal is that as much as possible, the SM should be able to discover and initialize the subnet as fast as possible without any need to service SA requests or otherwise communicate with the IB clients, such as physical servers or virtual machines (i.e. beyond discovery and initialize operations at SMA level). For larger systems with high-end SM/SA implementations, the goal is that the SM/SA should be able to distribute relevant information to the IB clients in a way that utilizes an optimal IB communication mechanisms, and that also provides the ability to have hierarchical implementations that provides scalability and prevents large scale multicast storms even in very large cluster domains.

In accordance with an embodiment, by default, each IB client can request the SA to get a path record describing how to communicate with remote end-ports in terms of allowed rates, MTUs, SLs, partitions, LIDs etc.

In accordance with an embodiment, in some IB fabric configurations, there are no variations in parameters that are independent of the identity of the remote ports. Alternatively, there can be a well-defined common maximum values that can be used by all nodes, or the fabric can be constructed in a way that allows pairs of nodes to exchange and agree on relevant max values without considering any intermediate fabric connectivity and thereby also avoid the need to request the SA to obtain such parameters.

In accordance with an embodiment, it is possible to specify that client nodes should behave in the above described way. However, this may be error prone, and implies that fabric changes that violate the relevant precondition may not be dynamically detected.

In accordance with an embodiment, an SMA level per port attribute (e.g. a "Homogeneous Fabric" binary flag attribute) can be introduced. Such an attribute can allow a Subnet Manager to dynamically maintain information at the client port level that instructs an associated client about whether a simplified scheme can be used or not, as well as under what constraints—if any—relative to the local port parameters. Using, conventional port level events, it is also possible to asynchronously notify the IB client about dynamic changes.

In accordance with an embodiment, when an Engineered System (ES) private fabric is based on homogeneous HCA and switch capabilities and a regular fat-tree topology is in use, then there are in general no path attributes that have to be defined by the SM/SA in order to ensure that proper path parameters are used in the normal case. For example, a set of supported data rates, MTUs and SLs can be defined by the capabilities of the local HCA port, and the relevant partitions for communication would be defined by the partition setup for the local HCA.

In accordance with an embodiment, this aspect of the ES private fabric can be a configuration parameter for the host stacks used on the relevant ES host nodes. However, a more flexible scheme that could be used independently of any special system configuration is the following.

In accordance with an embodiment, when an SM determines that all host nodes in the fabric and the switches and switch ports that connect the host nodes all support the same capabilities, then a special SMA flag attribute (e.g. "homogenous fabric" attribute flag) specifying this condition can be set for the various HCA ports in the system. (The HCA ports can also include a capability flag indicating support for this attribute in the first place.)

In accordance with an embodiment, this flag can additionally be included as an additional attribute for each partition that the port is currently set up to be a member of.

In accordance with an embodiment, in order to improve the flexibility of the scheme, such an attribute can be extended to include max values for all path attributes (globally or per partition) so that the SM could then handle also non-homogeneous cases in a way that allows host nodes to use values supported by all peers even if the max capabilities may be different for different host nodes. In this way, host nodes would be able to determine all path information that is independent of the identity and address of remote peers based on only local port information and with no need to perform SA queries.

In accordance with an embodiment, an alternative to configuration parameters and/or new SMA attributes would be to introduce a new type of SA query where an end node would be able to obtain "default max path parameters" on a per subnet or partition basis using a single or only a few SA requests per node.—Still, with a large number of nodes, this would still represent a significant load upon startup.

In accordance with an embodiment, a number of additional SMA/PortInfo Attributes can be included.

In accordance with an embodiment, a Port Capability for supporting "Homogenous Fabric Attributes", can be supported. A default value for this attribute is false. It can be set to true by supporting SMA upon link up. When set to true, a supporting master SM may update relevant SMA properties.

In accordance with an embodiment, a "Homogeneous-Subnet" flag can be supported. A default value for this flag can be false. The flag can be set by a supporting master SM if all end ports in the local subnet that are potentially visible from this local port have same path properties and all intermediate links support the same properties. When set to true, a local IB client can safely derive relevant path properties from local port properties.

In accordance with an embodiment, a "SemiHomogeneousSubnet" flag can be supported. A default value for this flag can be false. The flag can be set by a supporting master SM if intermediate links always support the same path properties as the minimum between what values the local port supports and what values any peer port within the local subnet visible from the local port supports. When the value of the flag is set to true, the local port can determine path properties based on negotiation directly with relevant peer port In accordance with an embodiment, a "SubnetGlobalMinimalPathParameters" record of Valid flag (true/false), MTU (legal MTU values), Rate (legal Rate values) can be supported. This can be set by supporting master SM to the minimum values that are supported by any end port in the local subnet that is potentially visible from this local port, as well as by any intermediate links. When set to true, the local IB client may choose to use these path properties for any communication within the local subnet.

In accordance with an embodiment, a "Homogeneous-Fabric" flag can be supported: A default value for this flag can be false. The flag can be set by a supporting master SM if all end ports that are potentially visible from a local port have same path properties and all intermediate links support the same properties. When set true, the local IB client can safely derive all path properties from local port properties.

In accordance with an embodiment, a "SemiHomogeneousFabric" flag can be supported. A default value for this flag can be false. The flag can be set by supporting master SM if intermediate links always support the same path properties as the minimum between what values the local port supports and what values any peer port visible from the local port supports. When set true, the local IB client can determine path properties based on negotiation directly with relevant peer port In accordance with an embodiment, "FabricGlobalMinimalPathParameters"—record of Valid flag (true/false), MTU (legal MTU values), Rate (legal Rate values) can be supported. This can be set by a supporting master SM to the minimum values that are supported by any end ports that are potentially visible from this local port as well as by any intermediate links. When set true, a local IB client may choose to use these path properties for any communication.

Figure 19:
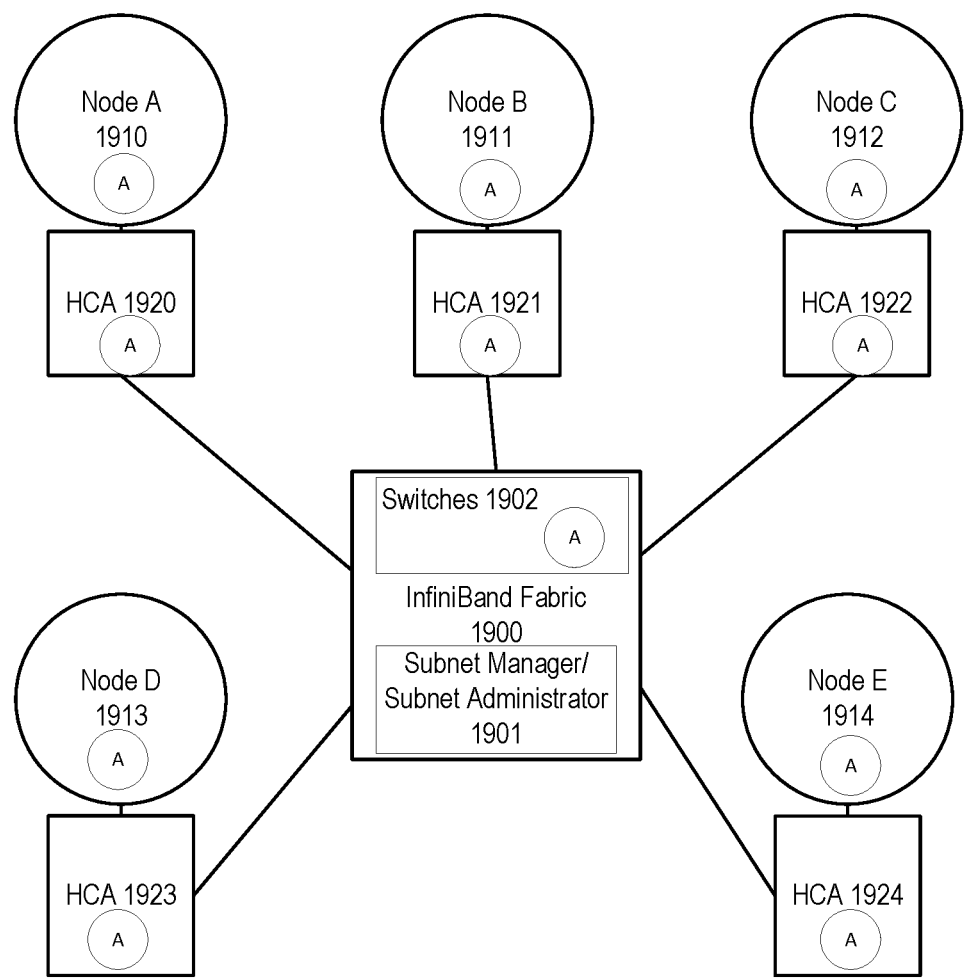
FIG. 19 illustrates a system for supporting homogenous fabric attributes to reduce the need for SA access in a high performance computing environment, in accordance with an embodiment.

FIG. 19 illustrates a system for supporting homogenous fabric attributes to reduce the need for SA access in a high performance computing environment, in accordance with an embodiment.

In accordance with an embodiment, FIG. 19 shows a simplified InfiniBand fabric comprising a plurality of nodes, Node A-Node E, 1910-1914, which are interconnected via host channel adapters 1920-1924 (respectively) through an InfiniBand fabric 1900, which comprises a number of switches 1902, as well as a subnet manager/subnet administrator 1901.

In accordance with an embodiment, the subnet manager/subnet administrator 1901 can determine that the plurality of hosts (e.g., nodes A-E) and the plurality of switches 1902 support a same set of capabilities. Upon determining that the plurality of hosts and the plurality of switches support a same set of capabilities, the subnet manager configures an SMA flag, such as flag A (shown in the figure as a circle containing flag A), the flag indicating that a condition can be set for each of the host channel adapter ports. The flag A can comprise one or more attributes, such as a homogenous fabric attribute as described above. A default value for flag A can be set to false, which can be changed to true by the SA/SM upon such determination that the various ports support a same set of capabilities.

In accordance with an embodiment, the SA/SM can determine a set of capabilities which are the same among different ports within the IB fabric as well as at the HCA ports. The set of capabilities can comprise, but is not limited to, a set of supported data rates, MTUs (maximum transmission units), supported link width, supported link speed, and supported extended link speed. (Note than in an embodiment combinations of different link speeds and widths may represent the same data rate. Hence, from the perspective of path info, only the rate is relevant. However, the SM must correlate all speed and width combinations to determine relevant sets of rates.)

In accordance with an embodiment, flag A can reflect/comprise a Port Capability for supporting "Homogenous Fabric Attributes", can be supported. A default value for flag A in such situation is false. It can be set to true by supporting SMA upon link up. When set to true, a supporting master SM may update relevant SMA properties.

In accordance with an embodiment, flag A can reflect/comprise a "HomogeneousSubnet" flag. A default value for this flag can be false. The flag can be set by a supporting master SM if all end ports in the local subnet that are potentially visible from a local port have same path properties (e.g., MTU, supported data rates), and all intermediate links support the same properties. When set to true, a local IB client can safely derive relevant path properties from local port properties with fewer requests to the SA than traditional IB fabrics.

In accordance with an embodiment, flag A can reflect/comprise a "SemiHomogeneousSubnet" flag. A default value for this flag can be false. The flag can be set by a supporting master SM if intermediate links between end nodes (a local port and a remote port) support the same path properties as the minimum between what values the local port supports and what values any peer port within the local subnet visible from the local port supports. When the value of the flag is set to true, the local port can determine path properties based on negotiation directly with relevant remote port.

In accordance with an embodiment, flag A can reflect/comprise "SubnetGlobalMinimalPathParameters" record of Valid flag (true/false), MTU (legal MTU values), Rate (legal Rate values) can be supported. This can be set by supporting master SM to the minimum values that are supported by any end port in the local subnet that is potentially visible from this local port, as well as by any intermediate links. When set to true, the local IB client may choose to use these path properties for any communication within the local subnet.

In accordance with an embodiment, flag A can reflect/comprise a "HomogeneousFabric" flag: A default value for this flag can be false. The flag can be set by a supporting master SM if all end ports (including those outside of the local port's subnet) that are potentially visible from a local port have same path properties and all intermediate links support the same properties. When set true, the local IB client can safely derive all path properties from local port properties.

In accordance with an embodiment, flag A can reflect/comprise a "SemiHomogeneousFabric" flag. A default value for this flag can be false. The flag can be set by a supporting master SM if intermediate links always support the same path properties as the minimum between what values the local port supports and what values any peer port visible from the local port supports. When set true, the local IB client can determine path properties based on negotiation directly with relevant peer port.

In accordance with an embodiment, flag A can reflect/comprise "FabricGlobalMinimalPathParameters" flag. This flag can comprise a record of Valid flag (true/false), MTU (legal MTU values), Rate (legal Rate values) can be supported. This can be set by a supporting master SM to the minimum values that are supported by any end ports that are potentially visible from this local port as well as by any intermediate links. When set true, a local IB client may choose to use these path properties for any communication.

Figure 20:
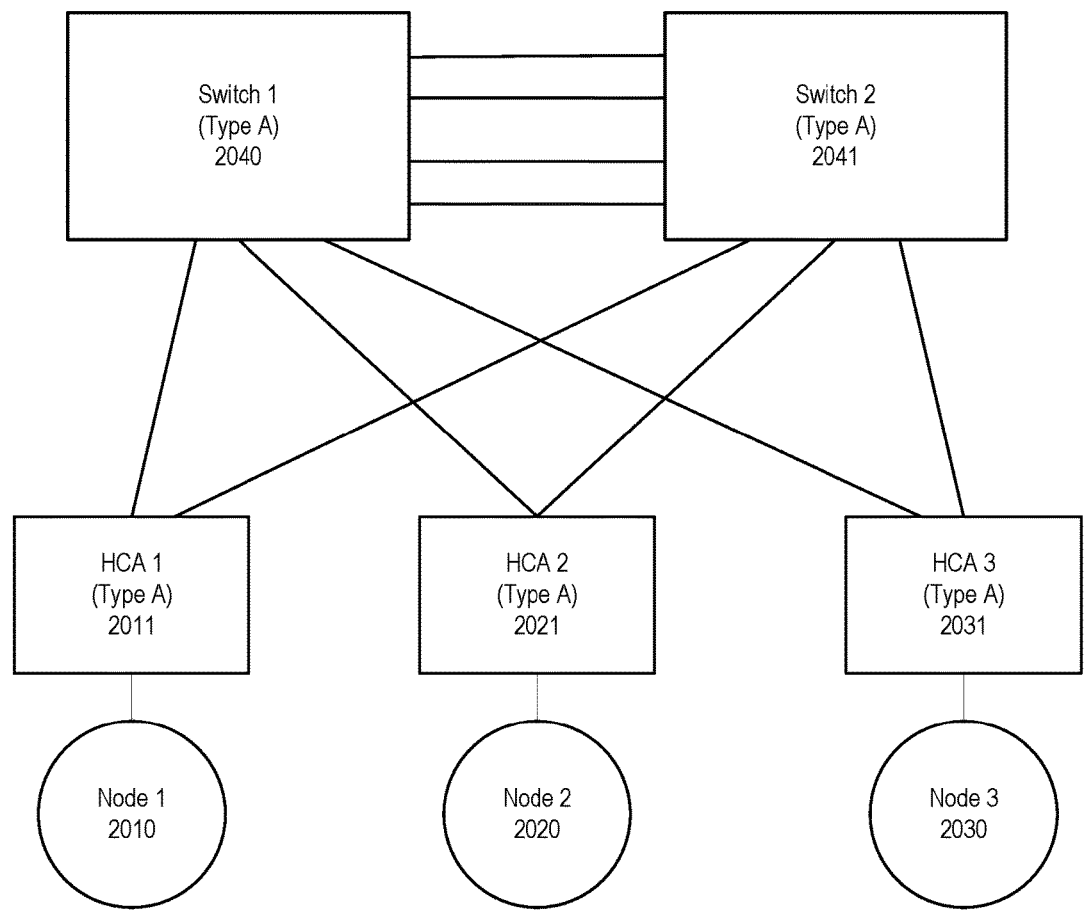
FIG. 20 illustrates a system for supporting homogenous fabric attributes to reduce the need for SA access in a high performance computing environment, in accordance with an embodiment.

FIG. 20 illustrates a system for supporting homogenous fabric attributes to reduce the need for SA access in a high performance computing environment, in accordance with an embodiment.

More particularly, the figure illustrates an exemplary subnet comprising a number of nodes, including node 1 2010, node 2 2020, and node 3 2030, where each node is connected to a switched fabric via a host channel adapter, namely HCA 1 2011, HCA 2 2021, and HCA 3 2031. The nodes, via the respective HCA, are interconnected via a number of switches, such as switch 1 2040, and switch 2 2041.

In accordance with an embodiment, each member of the subnet (the HCAs and the switches) can all comprise the same "type"—meaning that each port on each of these subnet members supports that same capabilities, for example, supported data rates, MTUs (maximum transmission units), supported link width, supported link speed, and supported extended link speed.

Figure 21:
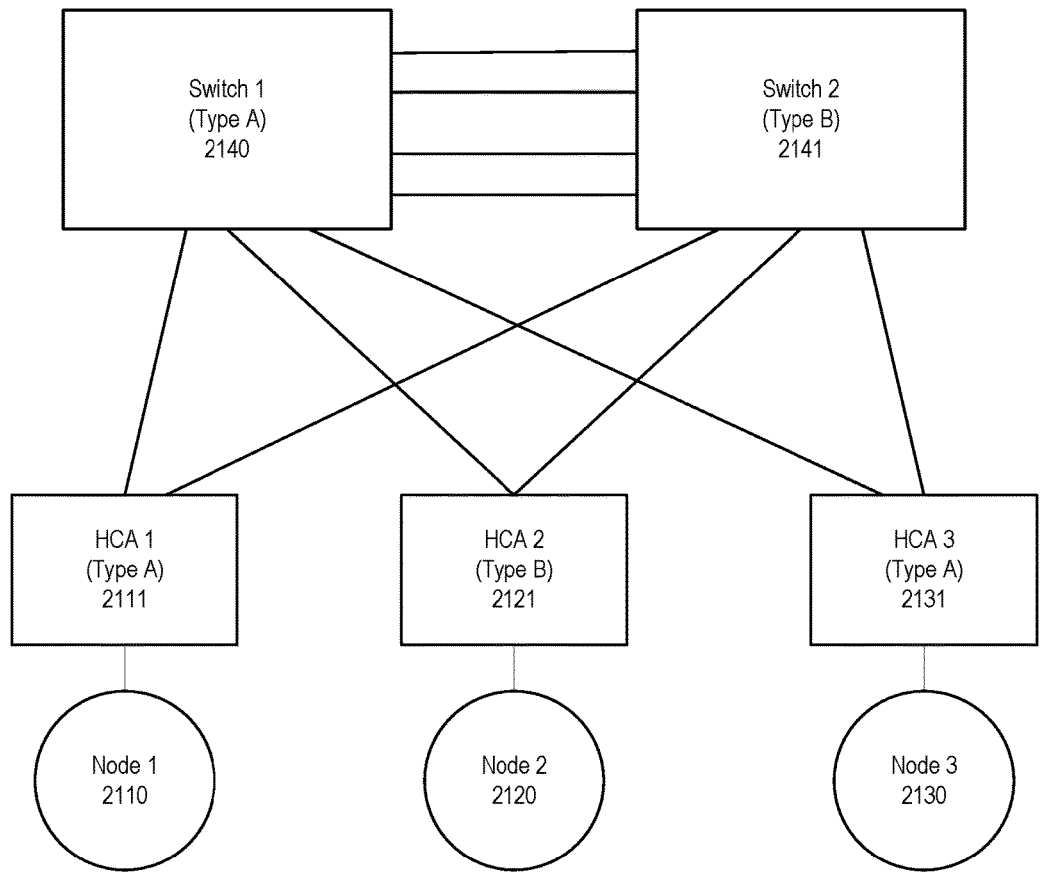
FIG. 21 illustrates a system for supporting homogenous fabric attributes to reduce the need for SA access in a high performance computing environment, in accordance with an embodiment.

FIG. 21 illustrates a system for supporting homogenous fabric attributes to reduce the need for SA access in a high performance computing environment, in accordance with an embodiment.

More particularly, the figure illustrates an exemplary subnet comprising a number of nodes, including node 1 2110, node 2 2120, and node 3 2130, where each node is connected to a switched fabric via a host channel adapter, namely HCA 1 2111, HCA 2 2121, and HCA 3 2131. The nodes, via the respective HCA, are interconnected via a number of switches, such as switch 1 2140, and switch 2 2141.

In accordance with an embodiment, different members of the subnet (the HCAs and the switches) can comprise different "types"—meaning that those members of the subnet of the same type support the same set of capabilities, while member of different types do not support the same set of capabilities.

For example, the host channel adapters of switches of type A in the figure support a first maximum data rate and a first maximum transmission unit, and the host channel adapters and switches of type B support the same first maximum data rate, but a different second maximum transmission unit. In such a situation, a flag, a "SemiHomogeneousSubnet" flag, can be set by the subnet manager if intermediate links between end nodes (a local port and a remote port) support the same path properties as the minimum between what values the local port supports and what values any peer port within the local subnet visible from the local port supports. When the value of the flag is set to true, the local port can determine path properties based on negotiation directly with relevant remote port.

Figure 22:
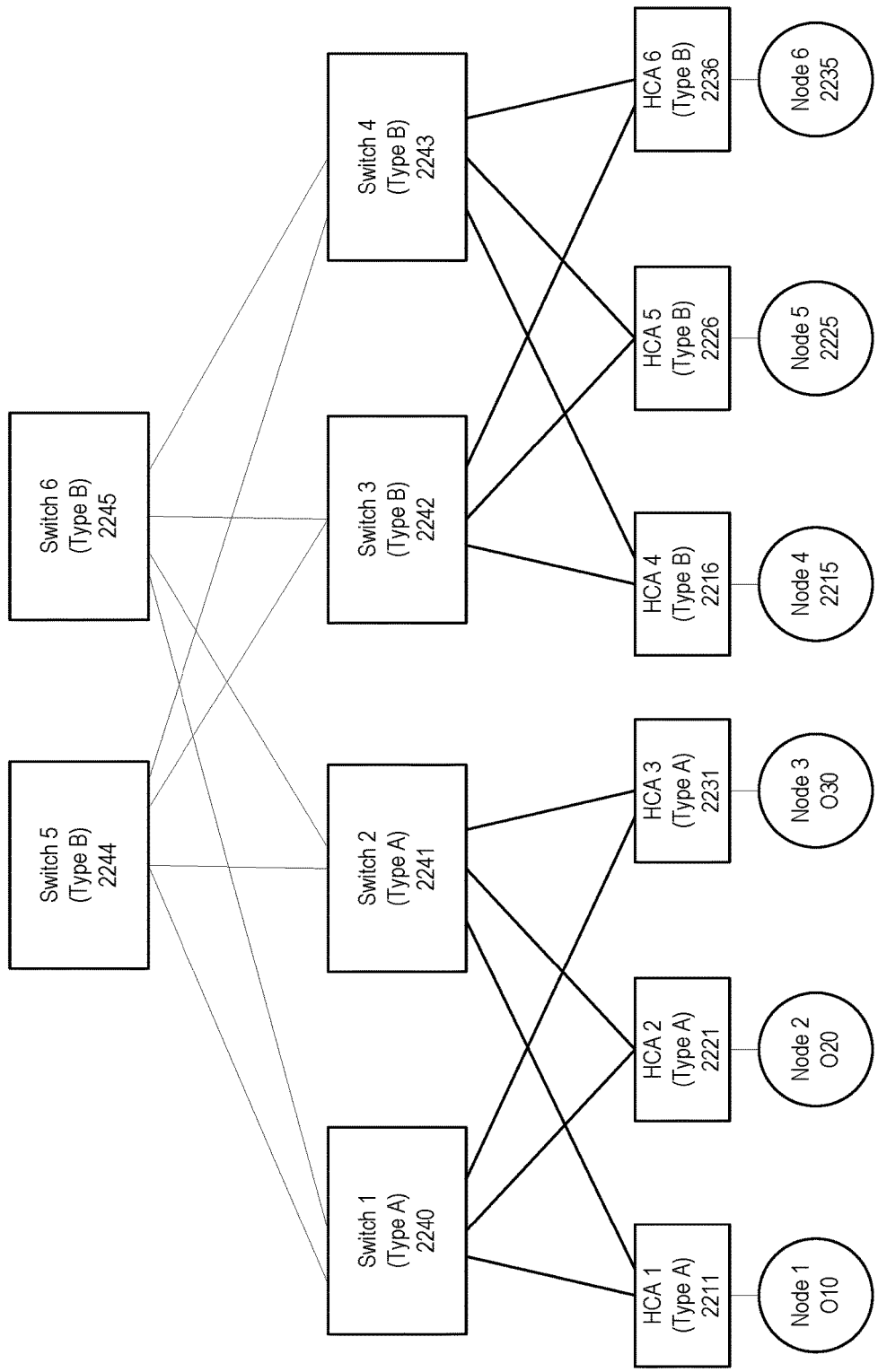
FIG. 22 illustrates a system for supporting homogenous fabric attributes to reduce the need for SA access in a high performance computing environment, in accordance with an embodiment.

FIG. 22 illustrates a system for supporting homogenous fabric attributes to reduce the need for SA access in a high performance computing environment, in accordance with an embodiment.

More particularly, the figure illustrates an exemplary subnet comprising a number of nodes, including node 1 2210, node 2 2220, node 3 2230, node 4 2215, node 5 2225, and node 6 2235, where each node is connected to a switched fabric via a host channel adapter, namely HCA 1 2211, HCA 2 2221, and HCA 3 2231, HCA 4 2216, HCA 5 2226, and HCA 6 2236. The nodes, via the respective HCA, are interconnected via a number of switches, such as switch 1 2240, switch 2 2241, switch 3 2242, switch 4 2243, switch 5 2244, and switch 6 2245.

In accordance with an embodiment, the switches can be arranged in a number of levels. Here, the switches are arranged in two levels, with level 0 comprising switches 1 through 4, and level 1 comprising switches 5-6.

In accordance with an embodiment, different members of the subnet (the HCAs and the switches) can comprise different "types"—meaning that those members of the subnet of the same type support the same set of capabilities, while member of different types do not support the same set of capabilities. For example, Switches and HCAs of "type B" can be more capable (i.e., capable of supporting greater MTUs, maximum data rates, link width . . . etc) that those of "type A".

In accordance with an embodiment, then, a subnet manager could proceed along a number of different paths.

In an embodiment, a subnet manager could decide that all switches and HCAs of "type B" belong to a single subnet, while those belonging to "type A" belong to a different subnet. Then, the SM could flag each port in "subnet B" with a HomogenousSubnet flag, and likewise each port in "subnet A".

In an embodiment, a subnet manager could set a "Semi-HomogeneousSubnet" flag, as the intermediate links between end nodes (a local port and a remote port) support the same path properties as the minimum between what values the local port supports and what values any peer port within the local subnet visible from the local port supports. When the value of the flag is set to true, the local port can determine path properties based on negotiation directly with relevant remote port.

In accordance with an embodiment, a subnet manager could set a "SubnetGlobalMinimalPathParameters" record of Valid flag (true/false), MTU (legal MTU values), Rate (legal Rate values) can be supported. This can be set by supporting master SM to the minimum values that are supported by any end port in the local subnet that is potentially visible from a local port, as well as by any intermediate links. When set to true, the local IB client may choose to use these path properties for any communication within the local subnet.

Figure 23:
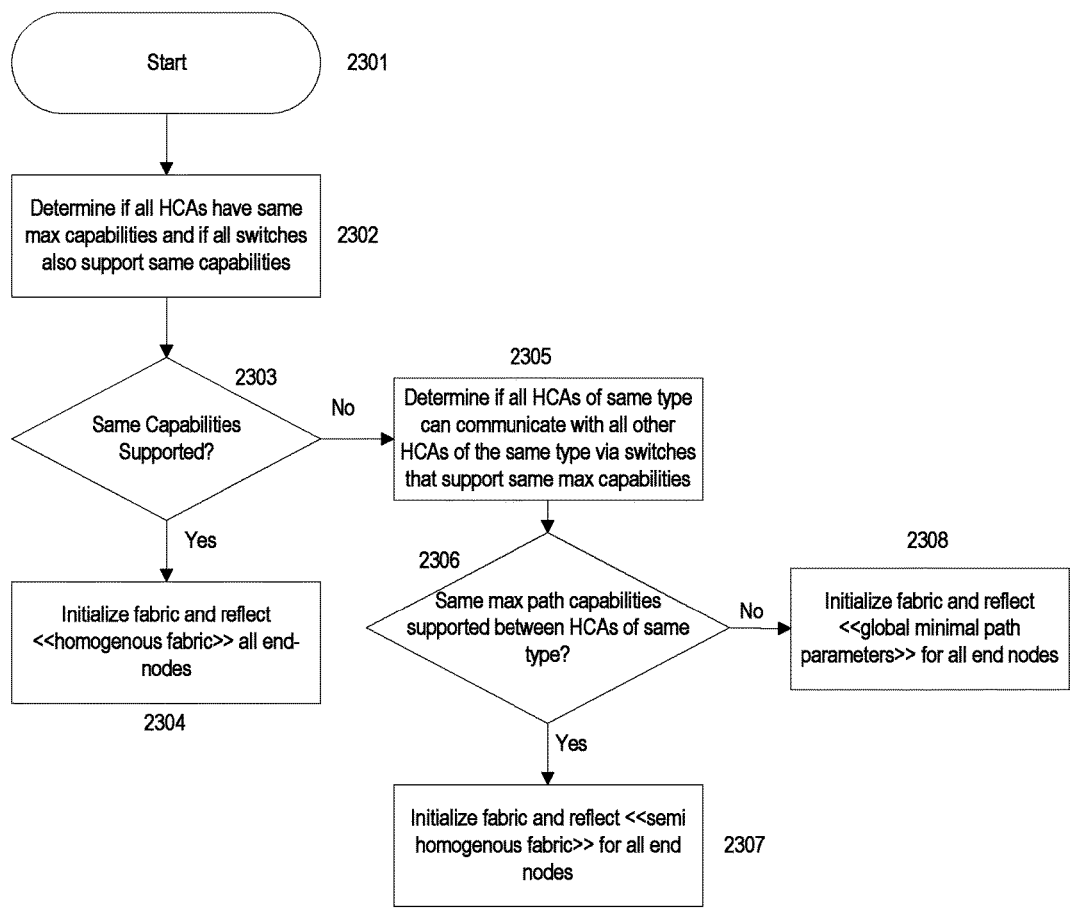
FIG. 23 illustrates a flowchart of a method for supporting homogenous fabric attributes to reduce the need for SA access in a high performance computing environment, in accordance with an embodiment.

FIG. 23 is a flow chart of a method for supporting homogenous fabric attributes to reduce the need for SA access in a high performance computing environment, in accordance with an embodiment.

In accordance with an embodiment, at step 2301, the method can start and perform fabric discovery.

In accordance with an embodiment, at step 2302, the method can determine if all HCAs in the subnet/fabric have the same max capabilities and if all switches also support at least those capabilities.

In accordance with an embodiment, at step 2303, the method can determine if the same max capabilities are supported in both the HCAs and the switches.

In accordance with an embodiment, at step 2304, if the same max capabilities are supported in both the HCAs and the switches, then fabric can be initialized and reflect a «homogenous fabric» (or homogenous subnet attribute if the SM is only looking at a subnet) for all end-nodes (at least all end nodes that support such a new attribute).

In accordance with an embodiment, at step 2305, if the same max capabilities are not supported, the method can determine if all HCAs of the same type can communicate with all other HCAs of the same type via switches that supports the same max capabilities.

In accordance with an embodiment, at step 2306, the method can determine if such same max path capabilities are supported between HCAs of same type.

In accordance with an embodiment, at step 2307, if such same max path capabilities are supported between HCAs of same type, then the fabric can be initialized and reflect «semi homogenous fabric» for all end nodes (at least all end nodes that support such a new attribute).

In accordance with an embodiment, at step 2308, if such same max path capabilities are not supported between HCAs of same type, the fabric can be initialized and reflect «global minimal path parameters» for all end nodes (at least all end nodes that support such a new attribute).

Figure 24:
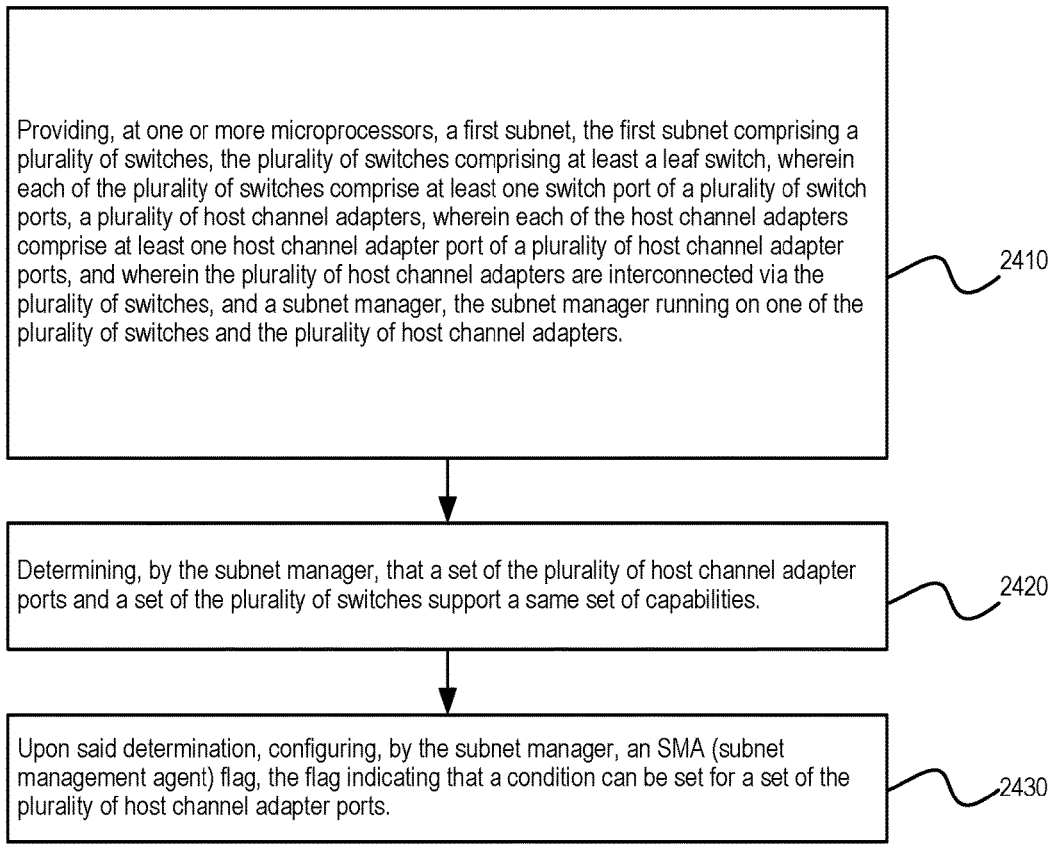
FIG. 24 is a flowchart of a method for supporting homogenous fabric attributes to reduce the need for SA access in a high performance computing environment, in accordance with an embodiment.

FIG. 24 is a flowchart of a method for supporting homogenous fabric attributes to reduce the need for SA access in a high performance computing environment, in accordance with an embodiment.

At step 2410, the method can provide, at one or more microprocessors, a first subnet, the first subnet comprising a plurality of switches, the one or more switches comprising at least a leaf switch, wherein each of the plurality of switches comprise at least one switch port of a plurality of switch ports, a plurality of host channel adapters, wherein each of the host channel adapters comprise at least one host channel adapter port of a plurality of host channel adapter ports, and wherein the plurality of host channel adapters are interconnected via the plurality of switches, and a subnet manager, the subnet manager running on one of the plurality of switches and the plurality of host channel adapters.

At step 2420, the method can determine, by the subnet manager, that a set of the plurality of host channel adapter ports and a set of the plurality of switches support a same set of capabilities.

At step 2430, the method can, upon said determination, configure, by the subnet manager, an SMA (subnet management agent) flag, the flag indicating that a condition can be set for a set of the plurality of host channel adapter ports.

Path Records Derived from ARP Responses and Peer-to-Peer Negotiation Based on Homogenous Fabric Attribute In accordance with an embodiment, as long as determination of IB specific identity information is based on broadcast based query mechanisms like ARP (address resolution protocol), a remote port specific IB address information is well defined whenever any IB multicast message is received containing both a source GID and a source LID.

In accordance with an embodiment, this remote port specific information can then be combined with information defined by a Homogenous Fabric" attribute/flag to form a full path record for the remote port.

In accordance with an embodiment, the "Homogeneous Fabric" flag attribute itself or an additional attribute may be used to specify that all source IB addresses are reversible in the sense that they can be used as destination addresses when establishing communication.

In accordance with an embodiment, in addition, both multicast based address resolution protocols as well as unicast based communication management protocols can be used to represent port specific path parameters that can be used to augment information defined by the "Homogeneous Fabric" attribute.

In accordance with an embodiment, in addition to the path information discussed above, additional information defined by SA path records is the identity of the relevant peer port in terms of GID and the subnet local address in terms of LID.

In accordance with an embodiment, in the case of generic RDMA CM (connection manager) based connections, the address resolution is based on IP addresses within the scope of a partition, and the IP address to GID mapping is defined via broadcast based ARP protocol.

In accordance with an embodiment, within a single subnet, as long as each HCA port has a single LID assigned, then subnet local destination LID address of a peer HCA port will be well defined based on the source LID address in both an initial ARP request multicast packet as well as in the corresponding ARP response unicast packet.

In accordance with an embodiment, based on the combination of path record parameters defined with values from the Homogeneous Fabric/Subnet flag (or configuration parameter) defined above, as well as the GID and SLID information defined by IPoIB ARP requests and responses, there is no additional need for SA requests to obtain path records or path related information in general.

In accordance with an embodiment, in the case of multi-subnet fabrics, the GID information is still well defined by the IPoIB ARP protocol. However, the SLID information in the encapsulating IB packets will no longer define the original sender but rather the LID of the IB-IB router port that the packet was forwarded by in the ingress path to the local subnet.—This applies for both the original multicast request as well as the subsequent unicast response.

In accordance with an embodiment, still, as long as the overall inter-subnet routing allows reversible paths across subnet boundaries, then the use of the router SLID as DLID for unicast traffic would still provide complete path record information in combination with the info from the Homogenous Fabric flag. The Homogenous Fabric flag would then need to be synchronized between the SMs in the various connected subnets.

In accordance with an embodiment, the IPoIB ARP protocol (or RDMA CM protocol) can be extended to include local Homogenous Fabric attributes in order to allow peer nodes to negotiate and agree on mutual parameter values that would exceed the "global" max values. In particular, this would allow different "sub-fabrics" of nodes with different speed interfaces (e.g. combination of a QDR (Quadruple Data Rate) based sub-fabric with an EDR (Enhanced Data Rate) or an HDR (High Data Rate) based sub-fabric where the connectivity of nodes with the same higher speed would always be only through switches/routers supporting this higher speed.

In accordance with an embodiment, various PortInfo attributes can be defined.

In accordance with an embodiment, one such attribute can be a "AllSubnetLocalChannelAdapterLIDsUsable" flag. This flag can be a true/false flag, set to false by default. The flag can be set by supporting master SM if all LIDs associated with any CA (channel adapter) port within the local subnet that are potentially visible from a local port represents a valid DLID. When true, the local IB client can use any Source LID received from a remote CA port in the local subnet as a Destination LID when communicating with the remote CA port.

In accordance with an embodiment, one such attribute can be a "RouterSourceLIDsReversible" flag. This flag can be a true/false flag, set to false by default. The flag can be set by supporting master SM if all Source LIDs generated by a router port in the local subnet when forwarding a packet from an end-port in a remote subnet can be used to reach the relevant end port in the remote subnet. When true, the local IB client can use the Source LID in any packet received from a CA port in a remote subnet as a Destination LID when communicating with the remote CA port.

In accordance with an embodiment, various newly defined communication management protocol additions can be provided.

In accordance with an embodiment, one such method can be "PortAndNodeAttributeRequestMessage", a new communication management (CM) method (message type). The message contains the max path parameters (Rate, MTU etc.) that the sending port represents as well as additional information about the sending port (can include platform specific info as well). This method can be used as a peer-to-peer based replacement of SA path request before initiating other communication to a remote port for which a LID is known. As with path queries to the SA, the received info can be cached and re-used across multiple connections as long as the remote port is still available In accordance with an embodiment, one such method can be "PortAndNodeAttributeResponseMessage", a new CM method (message type). The message contains the max path parameters (Rate, MTU . . . etc.) that the responding port represents as well as additional information about the responding port (can include platform specific info as well). As with path queries to the SA, the received info can be cached and re-used across multiple connections as long as the remote port is still available.

Figure 25:
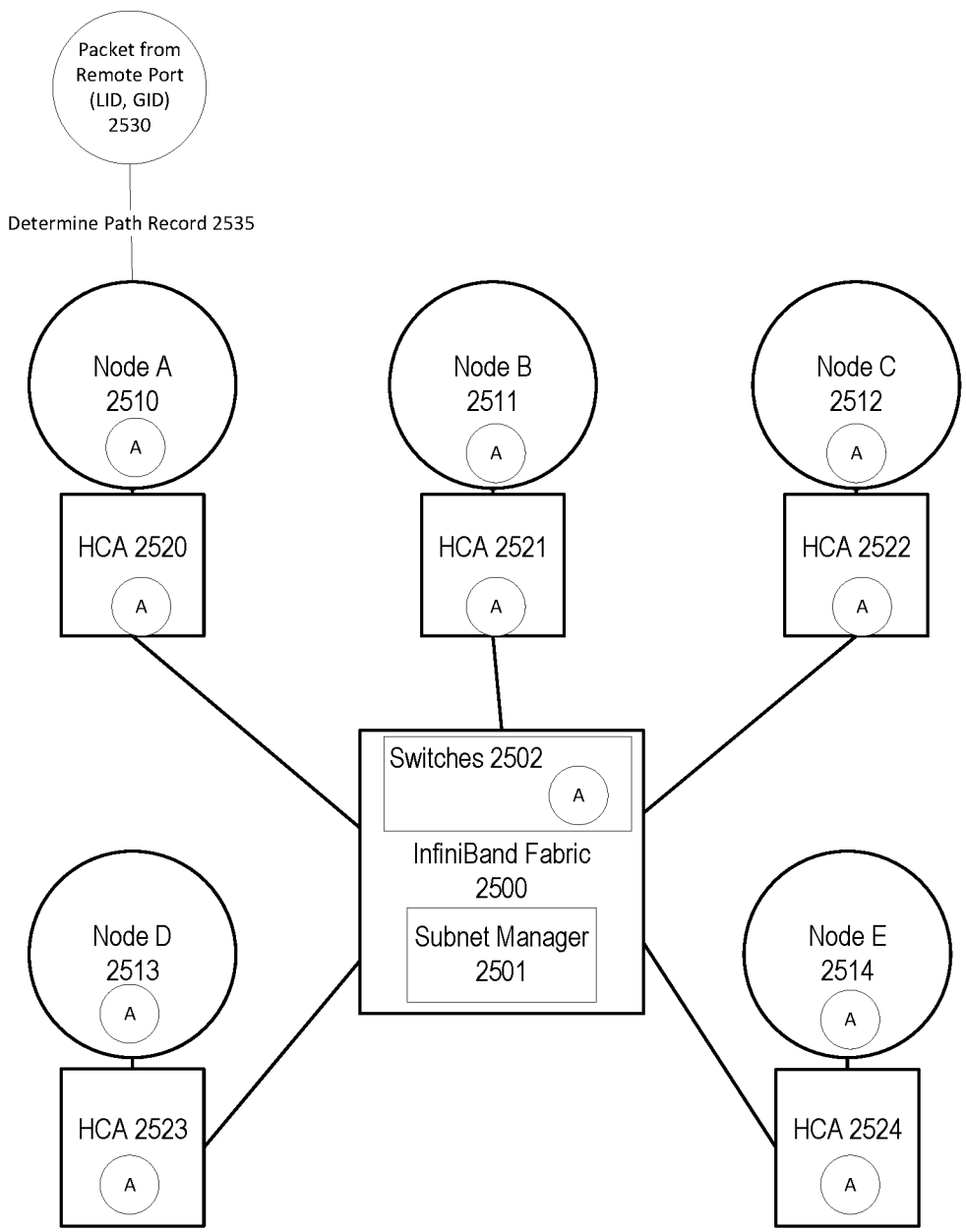
FIG. 25 illustrates a system for providing path records derived from ARP responses and peer-to-peer negotiation on homogenous fabric attribute in a high performance computing environment, in accordance with an embodiment.

FIG. 25 illustrates a system for providing path records derived from address resolution protocol (ARP) responses and peer-to-peer negotiation on homogenous fabric attributes in a high performance computing environment.

In accordance with an embodiment, the figure shows a simplified InfiniBand fabric comprising a plurality of nodes, Node A-Node E, 2510-2514, which are interconnected via host channel adapters 2520-2524 (respectively) through an InfiniBand fabric 2500, which comprises a number of switches 2502, as well as a subnet manager 2501.

In accordance with an embodiment, the subnet manager 2501 can be configured to determine that the plurality of hosts (e.g., nodes A-E) and the plurality of switches 2502 support a same set of capabilities. Upon determining that the plurality of hosts and the plurality of switches support a same set of capabilities, the subnet manager configures an SMA flag, such as flag A (shown in the figure as a circle containing flag A), the flag indicating that a condition can be set for each of the host channel adapter ports. The flag A can comprise one or more attributes, such as a homogenous fabric attribute as described above.

In an embodiment, a packet 2530 can be received from a remote port, the packet comprising a source LID and a source GID. Combining the remote port address information with the homogenous fabric attribute, a complete path record 2535 can be determined.

In accordance with an embodiment, in the case of multi-subnet fabrics (i.e., when the packet arrives from a remote subnet), the GID information is still well defined by the IPoIB ARP protocol. However, the SLID information in the encapsulating IB packets is no longer defined by original sender but rather the LID of the IB-IB router port that the packet was forwarded by in the ingress path to the local subnet. This applies for both the original multicast request as well as the subsequent unicast response.

In accordance with an embodiment, still, as long as the overall inter-subnet routing allows reversible paths across subnet boundaries, then the use of the router SLID as DLID for unicast traffic would still provide complete path record information in combination with the info from the Homogenous Fabric flag. The Homogenous Fabric flag would then need to be synchronized between the SMs in the various connected subnets.

Figure 26:
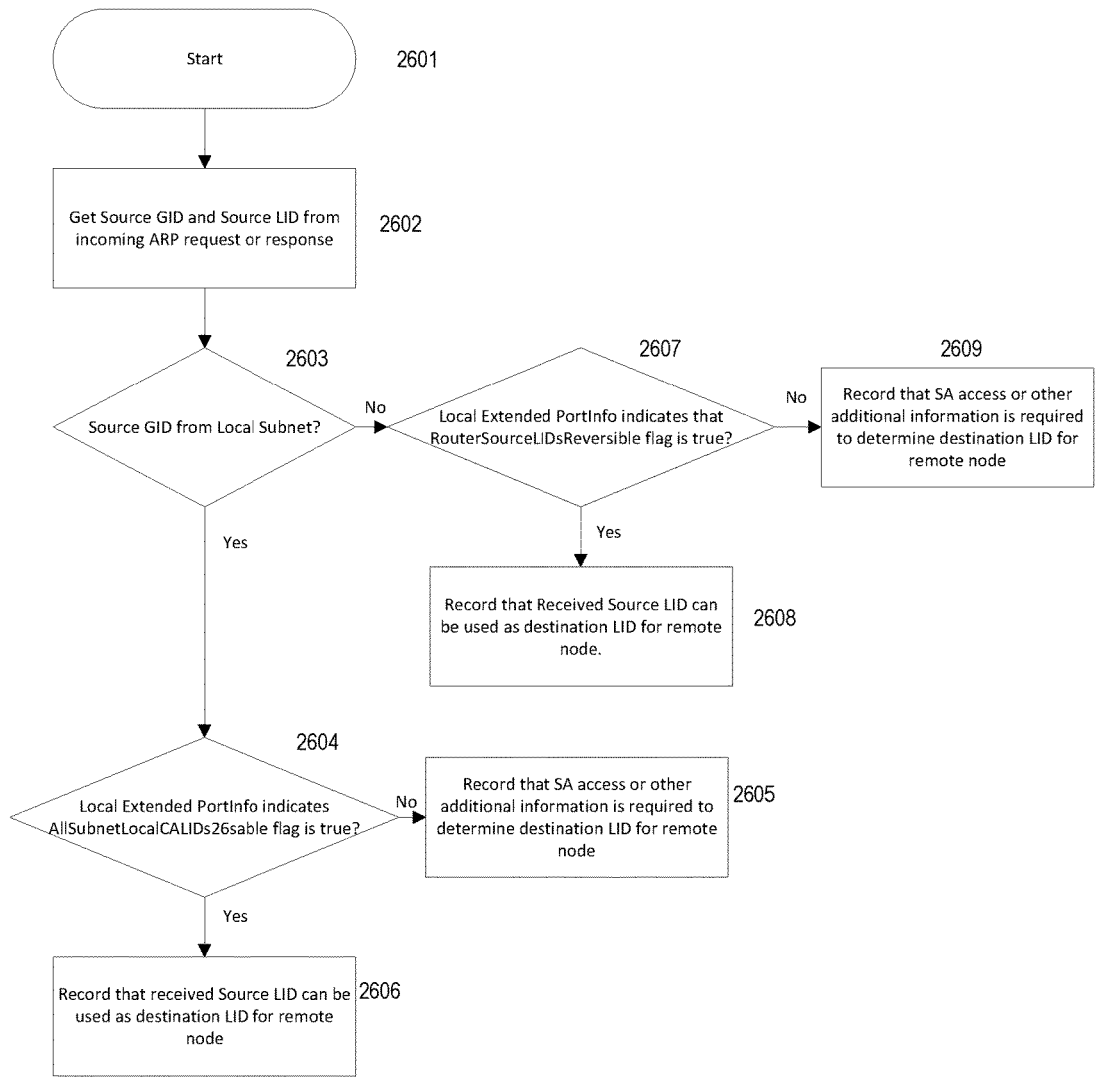
FIG. 26 is a flow chart of a method for determining GID and LIDs from incoming ARP requests and responses, including correlation with fabric minimum/maximum values, in accordance with an embodiment.

FIG. 26 is a flowchart of a method for deriving path records from ARP responses and peer-to-peer negotiation based on a homogenous fabric attribute.

More particularly, the figure shows a flow chart of a method for determining GID and LIDs from incoming ARP requests and responses, from a remote node, including correlation with fabric minimum/maximum values, in accordance with an embodiment.

In accordance with an embodiment, at step 2601 the method can start.

In accordance with an embodiment, at step 2602, the method can get a source GID (global identifier) and source LID (SLID or source local identifier) from an incoming ARP request or response.

In accordance with an embodiment, at step 2603, the method can determine if the source GID is from a local subnet.

If the source GID is from a local subnet, the method can determine, at step 2604, if local extended port information indicates that the flag, set by a local master SM, is indicative that all LIDs associated with any CA (channel adapter) port within the local subnet that are potentially visible from a local port represents a valid DLID (the "AllSubnetLocalChannelAdapterLIDsUsable" flag described above).

If such determination is made, in accordance with an embodiment, then, at step 2606 the method can record such determination can record that the received Source LID can be used as a destination LID for the remote node.

If such determination is not made, then, in accordance with an embodiment, at step U05, the method can record that SA access or other additional information is required to determine destination LID for the remote node.

If it is determined that the source GID is not from a local subnet, then, in accordance with an embodiment, at step 2607, then the method can determine if the Extended PortInfo indicates that RouterSourceLIDsReversible flag is true (or another flag that represents that all Source LIDs generated by a router port in the local subnet when forwarding a packet from an end-port in a remote subnet can be used to reach the relevant end port in the remote subnet).

If such determination is made, then, in accordance with an embodiment, at step 2608, the method can record that the received source LID can be used as a destination LID for the remote node.

If such determination is not made, then, in accordance with an embodiment, at step 2609, the method can record that SA access or other additional information is required to determine destination LID for remote node.

Figure 27:
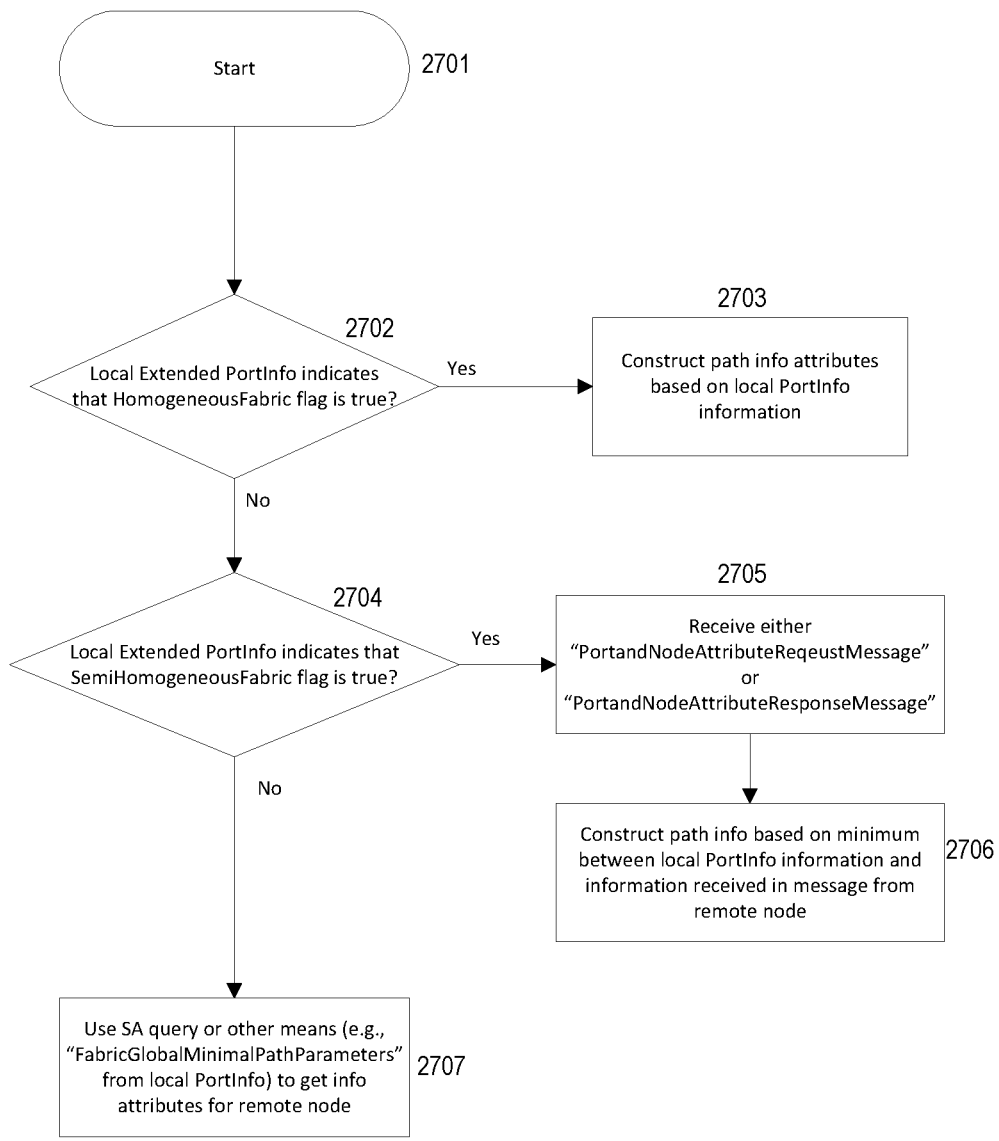
FIG. 27 is a flow chart of a method for constructing path information based on new CM type message exchange, including correlation with fabric minimum/maximum values, in accordance with an embodiment.

FIG. 27 is a flowchart of a method for deriving path records from ARP responses and peer-to-peer negotiation based on a homogenous fabric attribute.

More particularly, the figure shows a flow chart of a method for constructing path information based on new CM type message exchange, including correlation with fabric minimum/maximum values, in accordance with an embodiment.

In accordance with an embodiment, at step 2701, the method can start.

In accordance with an embodiment, at step 2702, the method can determine if Local Extended PortInfo indicates that the Homogenous Fabric flag is set to true.

In accordance with an embodiment, at step 2703, if the Homogenous Fabric flag is set to true, then the method can construct path information attributes based upon the local PortInfo information.

In accordance with an embodiment, at step 2704, if the Homogenous Fabric flag is not set to true, the method can determine if the Local Extended PortInfo indicates that the SemiHomogenous Fabric flag is set to true.

In accordance with an embodiment, at step 2705, if the SemiHomogenous Fabric flag is set to true, then the method receive either "PortandNodeAttributeReqeustMessage" or "PortandNodeAttributeResponseMessage".

In accordance with an embodiment, the PortandNodeAttributeRequestMessage can comprise the max path parameters (Rate, MTU etc.) that the sending port represents as well as additional information about the sending port (can include platform specific info as well). This method can be used as a peer-to-peer based replacement of SA path request before initiating other communication to a remote port for which a LID is known. As with path queries to the SA, the received info can be cached and re-used across multiple connections as long as the remote port is still available In accordance with an embodiment, the "PortAndNodeAttributeResponseMessage" is a CM method (message type). The message contains the max path parameters (Rate, MTU . . . etc.) that the responding port represents as well as additional information about the responding port (can include platform specific info as well). As with path queries to the SA, the received info can be cached and re-used across multiple connections as long as the remote port is still available.

In accordance with an embodiment, after receipt of either or both of the messages at step 2705, the method, at step 2706, can construct path info based on minimum between local PortInfo information and information received in message from remote node.

In accordance with an embodiment, if the Local Extended PortInfo does not indicate that the SemiHomogenous Fabric flag is true, then the method can, at step 2707, use an SA query or other means (e.g., "FabricGlobalMinimalPathParameters" from local PortInfo) to get info attributes for a remote node.

Figure 28:
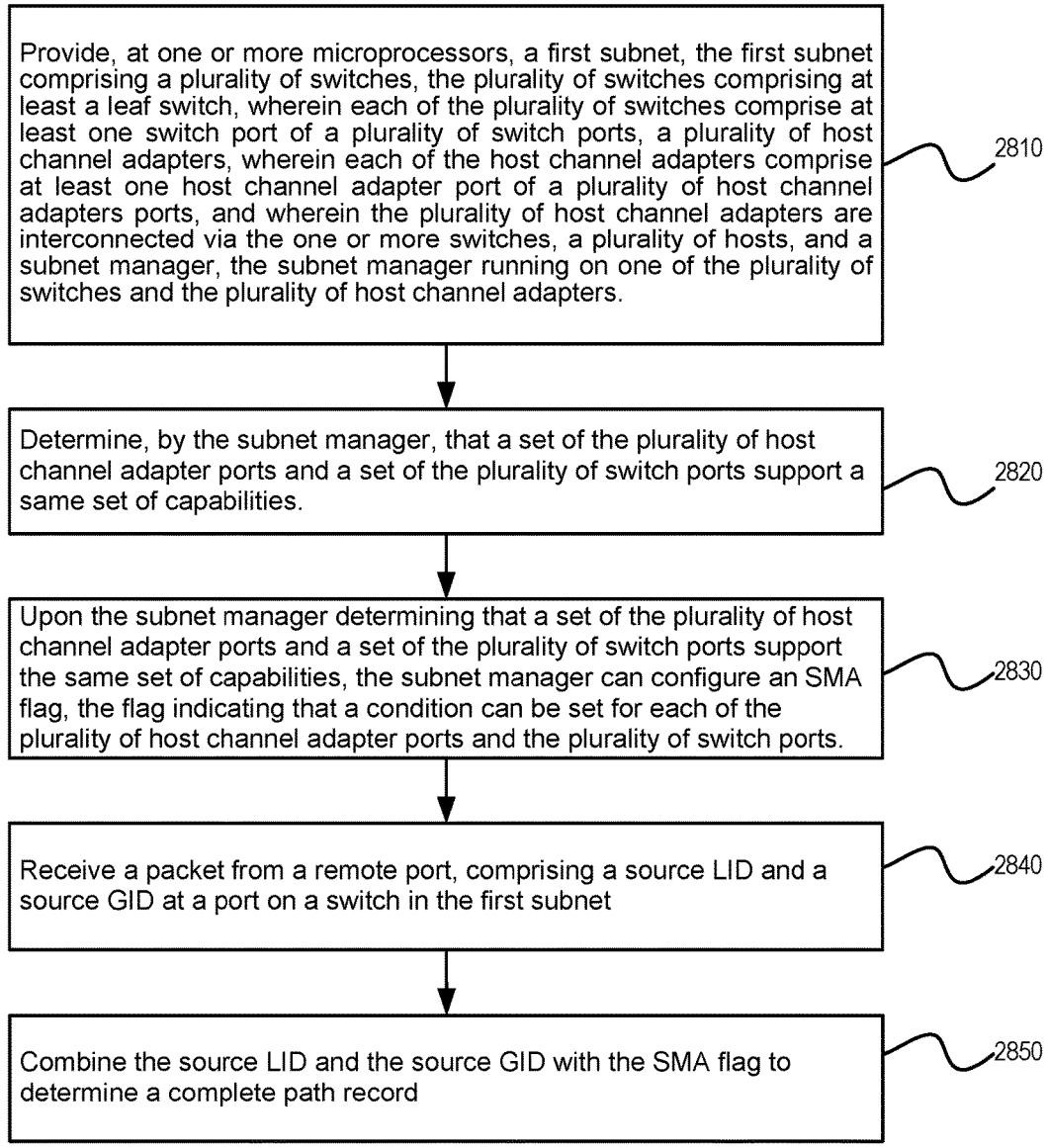
FIG. 28 is a flow chart of a method for constructing path information based on new CM type message exchange, including correlation with fabric minimum/maximum values, in accordance with an embodiment.

FIG. 28 is a flow chart of a method for deriving path records, in accordance with an embodiment.

In accordance with an embodiment, at step 2810, the method can provide, at one or more microprocessors, a first subnet, the first subnet comprising a plurality of switches, the plurality of switches comprising at least a leaf switch, wherein each of the plurality of switches comprise at least one switch port of a plurality of switch ports, a plurality of host channel adapters, wherein each of the host channel adapters comprise at least one host channel adapter port of a plurality of host channel adapters ports, and wherein the plurality of host channel adapters are interconnected via the one or more switches, a plurality of hosts, and a subnet manager, the subnet manager running on one of the plurality of switches and the plurality of host channel adapters.

In accordance with an embodiment, at step 2820, the method can determine, by the subnet manager, that a set of the plurality of host channel adapter ports and a set of the plurality of switch ports support a same set of capabilities.

In accordance with an embodiment, at step 2830, upon the subnet manager determining that a set of the plurality of host channel adapter ports and a set of the plurality of switch ports support the same set of capabilities, the subnet manager can configure an SMA flag, the flag indicating that a condition can be set for each of the plurality of host channel adapter ports and the plurality of switch ports.

In accordance with an embodiment, at step 2840, a packet can be received, from a remote port, comprising a source LID and a source GID at a port on a switch in the first subnet.

In accordance with an embodiment, at step 2850, the source LID and the source GID can be combined with the SMA flag to determine a complete path record.

Multicast Group Creations and Joins

Multicast groups can be created by a fabric administrator based on administrative policy/action. A fabric administrator may use an administrative interface to prompt the creation of a multicast group. Such interfaces can accept the parameters required to define a multicast group. Often times, multicast groups are created for use by upper-level protocols (ULPs). Some of these ULPs use multicast groups created in the context of an IB partition, where the IB partition represents link boundaries for the ULP. Some administrative interfaces allow a multicast group to be created in conjunction with an IB partition, thereby easing administrative overhead when a multicast group is to be associated with a particular IB partition. For example, when an IB partition is created, a flag can be set that facilitates the automatic creation of a multicast group in the context of the created IB partition (e.g., an Internet Protocol over InfiniBand (IPoIB) flag).

In accordance with an embodiment, Listing 1 shows an administrative interface command for creating a IPoIB multicast group in the context of (and within the same command for creating) a corresponding IB partition. As shown in Listing 1, the "ipoib" flag will cause a multicast group to be created in the context of the "partition_name" partition that is being created.

---
Listing 1
---
smpartition create -n partition_name -pkey p_key[-flag [ipoib, mtu mtu, rate rate, sl sl, scope scope]][-m defmember]

---

As noted above, one example of a ULP that employs multicast groups that are associated with IB partitions is Internet Protocol over InfiniBand (IPoIB). IPoIB uses a broadcast group, which is an IB multicast group that has been created in the context of a particular IB partition. The broadcast group is used to simulate broadcast traffic in a legacy Internet Protocol (IP) subnet, since the IB architecture does not support broadcast traffic.

IPoIB simulates an IP subnet using an IB partition (i.e., the IB partition defines and simulates link boundaries for broadcast traffic from the IPoIB protocol). Each member end-port of the IB partition associated with the broadcast group is a simulated member of the IP subnet. Traffic is "broadcast" to each member of the simulated IP subnet (i.e., the IB partition members) via the broadcast (multicast) group. Each of the end-ports that is a member of the partition is also a member of the broadcast group defined in the context of that partition. This allows legacy applications using the IP protocol to receive broadcast packets (e.g., address resolution protocol (ARP) packets) via the IB subnet.

When a multicast group is defined in the context of an IB partition, the MGID of the multicast group can be algorithmically created according to a known convention. The P_Key of the partition in whose context the multicast group is created can be embedded into the MGID of the multicast group. Additional conventions can also be followed when the MGID is created. For example, in the case of a broadcast IPoIB multicast group, a special signature is also embedded into the MGID. By following such conventions, IB clients need only to know the P_Key of the partition in whose context the multicast group is defined in order to derive the MGID that defines the multicast group.

A multicast group may also be created dynamically when an end-port sends a MAD to the SM requesting that a new multicast group be created. The MAD can specify certain parameters for use in defining/creating the new multicast group. For instance, the MAD can specify a valid MGID. Alternatively, the MAD can leave an MGID unspecified, in which case the SM can generate a valid MGID and assign the generated MGID to the newly created multicast group. Other parameters that can be specified in a request to create a new multicast group include P_Key, Q_Key, Service Level (SL), FlowLabel, TClass, JoinState and PortGID.

A MAD requesting that a new multicast group be created can specify the SubnAdmSet( )method, which is provided by the Subnet Administration class defined in the IB Specification. The MAD can further specify the MCMemberRecord attribute, wherein the parameters noted above (i.e., MGID, P_Key, Q_KEY, etc.) can be specified.

Generally, a request to create a new multicast group is treated as an implicit request by the requesting end-port (i.e., the end-port that sends the MAD requesting a new multicast group be created) to join the newly created multicast group, and the SM includes the requesting port in the newly created multicast group. That is, the SM uses the LID of the requesting port as a way to make an association between the requesting port and the MGID of the newly created multicast group (i.e., the LID of the port has no significance for the multicast handling).

Conventionally, in order to join an existing multicast group, an end-port sends a join request to the SM. The join request specifies the MGID of the existing multicast group along with other parameters that allow the SM to determine if the configuration of the existing multicast group is compatible with the configuration of the port that is requesting to join the existing multicast group. If the SM determines that the configuration of the requesting port is compatible with that of the existing multicast group, then the SM adds the LID of the requesting port to the existing multicast group. That is, the SM associates the LID of the requesting port with the MGID of the existing multicast group (e.g., in an SA data store such as that depicted in FIG. 15). Additionally, the SM responds to the requesting end-port with the MLID that has been allocated to the MCG for use by the end-port when sending out multicast packets.

After an end-port joins an existing MCG, the SM regenerates the associated spanning tree, including the requesting port that has been associated with the multicast group. Further, updated MFTs (updated by the newly generated spanning tree) can be sent to any switch whose existing MFT was made obsolete by the addition of the requesting port to the multicast group. Accordingly, when a multicast packet is sent out having the MLID of the existing multicast group in the DLID field of the packet, the requesting port is recognized as a member of the relevant multicast group, and a copy of the multicast packet is delivered to the requesting port.

Figure 29:
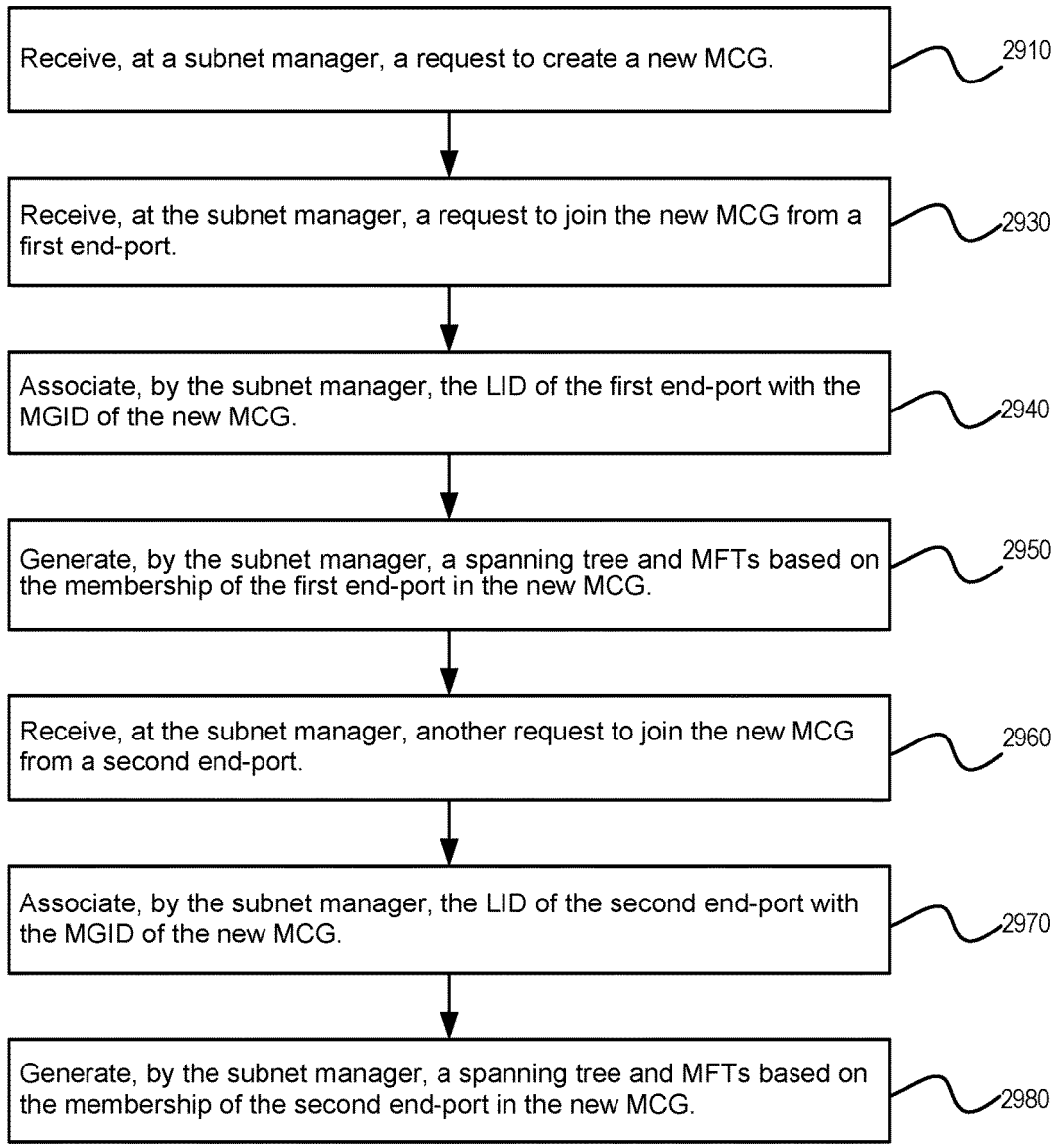
FIG. 29 illustrates a flowchart for creation and joining of a multicast group (MCG), in accordance with an embodiment.

FIG. 29 illustrates a flowchart for creation and joining of a multicast group (MCG), in accordance with an embodiment. At step 2910, an SM can receive a request to create a new MCG. At step 2930, the SM can receive a request to join the new MCG from a first end-port. At step 2940, the SM can associate the LID of the first end-port with the MGID of the new MCG. At step 2950, the SM can generate a spanning tree and M29 Ts based on the membership of the first end-port in the new MCG. At step 2960, the SM can receive another request to join the new MCG from a second end-port. At step 2970, the SM can associate the LID of the second end-port with the MGID of the new MCG. At step 2980, the SM can generate a spanning tree and MFTs based on the membership of the second end-port in the new MCG.

As can be seen from FIG. 29, every time an end-port joins an MCG the SM receives and processes a MAD, updates associations, determines a spanning tree, and determines new MFTs. On large subnets where many end-ports will be sending join requests, this can create tremendous overhead for the SM/SA, especially at subnet initialization.

As can be seen from the above-described processes for multicast group creation and joins, every end-port that is to be included in a multicast group must interact with the SM/SA in order to join the multicast group. Additionally, whenever a new master SM is elected in the subnet there is an inherent need for end-ports to rejoin any multicast groups for which the end-ports are members, because a new SM may assign new MGID to MLID mappings. In the case of SR-IOV based virtual machine deployments on a subnet, the amount of request traffic that the SM/SA must process is magnified since multiple vPorts each will perform the same type of SM/SA requests (e.g., multicast group join requests) as a physical end-port.

Consequently, a problem can arise in subnets densely populated (with both physical and virtual end-ports) when the management requirements of the subnet scale beyond the SM's ability to process these requirements. In particular, in the case of less capable SM/SA implementations (e.g., implementations based on low-performance processor modules connected to a switch management interface), even moderate SA request loads can cause severe overhead and reduced efficiency and higher latency for both the SM as well as the system as a whole.

For highly available (HA) systems where fast-fail over and recovery is critical, any delay represents a problem. In particular, when sub-second fail-over time is required, it is important that fabric nodes can continue normal operation and communication with other operational nodes without interruption (so long as there is no loss of physical connectivity between the nodes). Accordingly, it is desirable that all nodes can continue to use existing address and path information for both unicast and multicast traffic without need to interact with the SM/SA, and that the only interruption of connectivity occurs if the SM needs to perform re-routing or re-initialization due to failed links (or switches) within the fabric.

Moreover, even with SM/SA implementations based on high end servers having fully functional HCAs, the use of 256 byte MADs for SA communication severely limits performance and scalability. Consequently, even with optimal caching and high performance hardware for SA request processing, the need to re-register (i.e., process new join requests for) multicast membership when a new master SM is elected can result in an interruption of connectivity between operational nodes connected by operational switches and links.

Accordingly, there is a need to optimize the interaction between IB clients and the SM/SA infrastructure. For small to medium sized systems with lower-end, switch embedded SM/SA implementations, fast discovery and initialization of the subnet, while avoiding the need to service SA requests or otherwise communicate with the IB clients (i.e. beyond discovery and initialize operations at the SMA level) is needed. For systems having higher-end SM/SA implementations, processes for distributing relevant information, by the SM/SA implementations and to the IB clients, in a way that utilizes optimal IB communication mechanisms, and that also provides the ability to have hierarchical implementations that provide scalability and prevent large scale multicast storms—even in very large cluster domains—are needed.

Improvements in the existing technological processes for the management of multicast group creations, joins, deletes, and unjoins can help in overcoming SM/SA overhead and in bolstering the efficiency of SM/SA implementations.

Dual MLID Allocation for MCGs

As noted above multicast groups can be created in the context of an IB partition. Further, each partition member can be one of two types: limited or full members. When defining multicast group membership, however, the IB Specification does not discriminate between full and limited partition members. Thus, because only a single route (e.g., only a single spanning tree) is determined for each MLID, the determined route must deliver a multicast packet to each member port of the multicast group, regardless of what type of partition member a given port may be.

The limit of one route per MLID can raise issues, since limited partition members may not accept packets from other limited partition members, according to the IB Specification. Accordingly, when a limited partition member sends a multicast packet, the multicast packet represents a P_Key access violation for each receiving port in the partition that is also a limited member of the partition. Such P_Key access violations can lead to the generation of a P_Key violation trap sent to the SM.

While the IB Specification now reflects that P_Key access violations that are the results of multicast packets being forwarded from one limited partition member to another do not have to be reported as P_Key access violations (via traps to the SM), there is still a significant set of legacy implementations that do not provide this contemporary feature. Moreover, link capacity is wasted on the multicast packet itself, which will only be dropped at the destination port after it has used subnet resources to be forwarded there.

In order to avoid the need for the above special handling of P_Key access violations, as well as to ensure complete isolation between limited partition members in terms of multicast traffic, two MLIDs can be allocated to a single MCG, in accordance with an embodiment. A first MLID can be allocated and used by end-ports for sending from full partition members to both full and limited partition members (referred to herein as a "full partition member MLID"). Additionally, a second MLID can be allocated and used by end-ports for sending from limited partition members to full partition members (referred to herein as a "limited partition member MLID"). Using this scheme, a limited partition member can avoid sending multicast packets to other limited partition members in the MCG.

In accordance with an embodiment, the SM is responsible for providing the MLID of a multicast group to an end-port that has requested membership in the multicast group. The end-port will use the MLID provided by the SM when sending multicast packets for the multicast group. Moreover, the requesting end-port can provide the P_Key that is associated with the multicast group that the end-port is requesting to join to the SM. The P_Key is part of the MCMemberRecord that is sent to the SM in an MCG join request. Accordingly, the SM can determine the P_Key that is associated with the MCG that the end-port is requesting to join from the join request of the end-port. The SM can also maintain its own policy information for which end port is a member of what partition(s) and also if the port is a limited or full member of the relevant partition(s).

Once the SM has determined the P_key that is associated with the MCG that an end-port is requesting to join, the SM can determine (from the high order bit of the determined P_Key) whether the requesting end-port is a full member or a limited member of the partition that is associated with the MCG that the end-port is requesting to join. If it is determined that the requesting end-port is a full member of the partition, the SM can provide the full partition member MLID to the end-port. If the requesting end-port is a limited member of the partition, the SM can provide the limited partition member MLID to the end-port.

The pseudo code in Listing 1 shows an algorithm for responding to a request for an MLID (e.g., a request to join an MCG) by an end port, in accordance with an embodiment.

Listing 1

```
- receive join request from end-port;
- determine partition member type of end-port;
If join request is from a full partition member Then
    response MLID = full partition member MLID;
Else
    response MLID = limited partition member MLID;
Endif
- generate and send join response message including response MLID;
```

Figure 30:
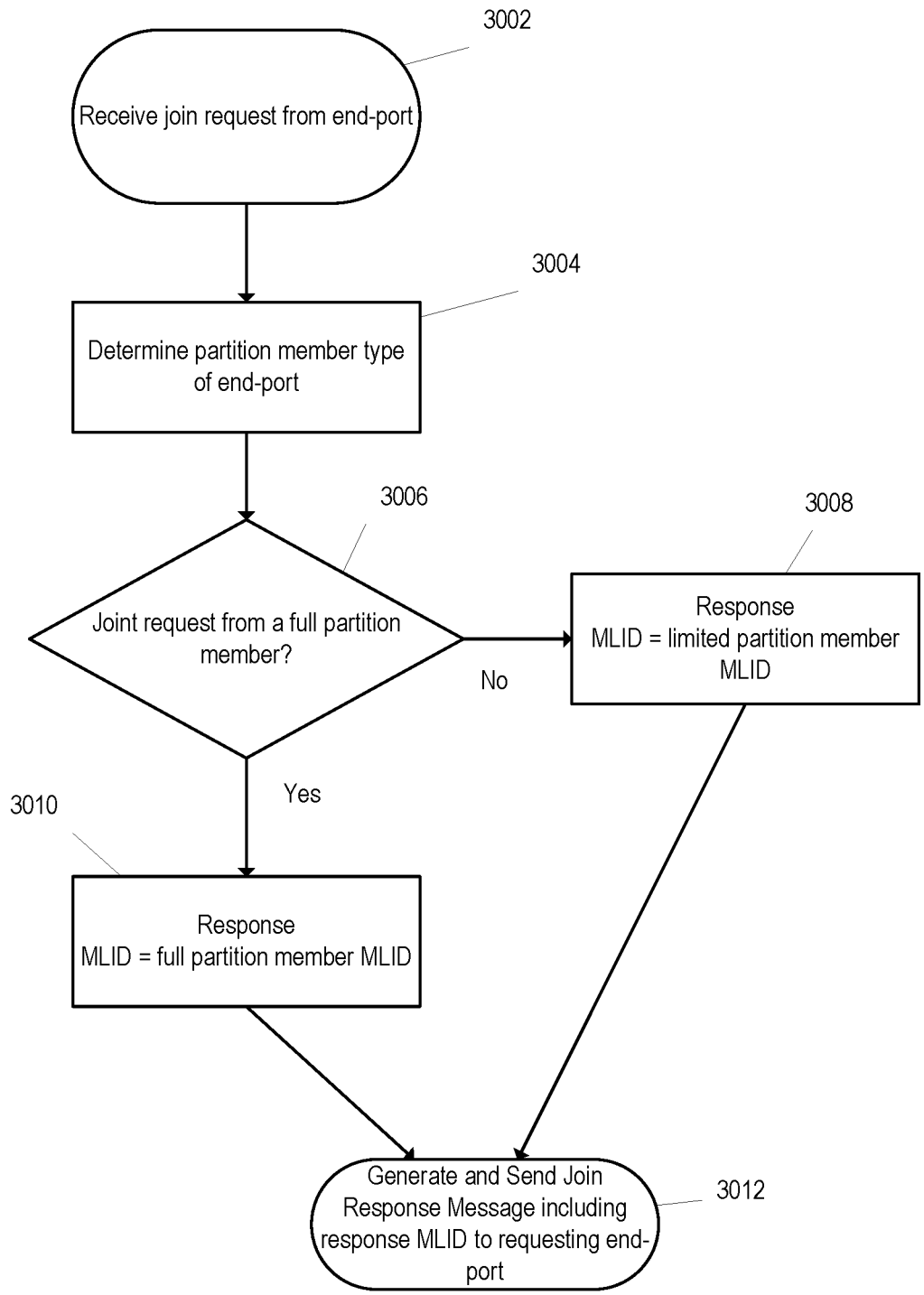
FIG. 30 shows a flow chart for responding to a request for an MLID (e.g., a request to join an MCG) by an end port, in accordance with an embodiment.

FIG. 30 shows a flow chart for responding to a request for an MLID (e.g., a request to join an MCG) by an end port, in accordance with an embodiment. At start 3002, a join request is received from an end-port. At step 3004, the partition member type of the requesting end-port is determined. At decision 3006, it is determined if the join request is from a full partition member. If it is determined that the join request is from a full partition member, control passes to step 3010, where the response MLID is set to the value of the full partition member MLID allocated for the MCG group that the requesting end-port has requested to join. If it is determined that the join request is not from a full partition member, control passes to step 3008, where the response MLID is set to the value of the limited partition member MLID allocated for the MCG that the requesting end-port has requested to join. From either step 3010 or 3008, control passes to step 3012, where the response MLID is sent in a response message to the requesting end-port.

As shown in FIG. 30 and Listing 1, in accordance with an embodiment, the SM can provide an end-port that has requested membership in an MCG with either the full partition member MLID or the limited partition member MLID for the MCG based on the partition membership of the requesting end-node for the partition associated with the MCG. This process can be fully transparent to the end-node, and not require any change of legacy code or attributes in the SMA of the requesting end-node. Moreover, if a limited partition member tries to use the full MLID to forward packets to other limited members, then this would constitute a valid P_Key access violation and should be reported accordingly. Such violations are in general a consequence of an end node generating and sending packets to any destination LID—including any unicast DLID or multicast DLID (i.e., an MLID). However, sent packets can only represent P_Key values that are valid for the sending port and if the send P_Key is not valid for the destination port, then the packet is discarded following a P_Key check.

In accordance with an embodiment, the SM can allocate two MLIDs to an MCG—a full partition member MLID, and a limited partition member MLID. Further, the MCG record, as stored by the SM/SA, can include metadata such as the full partition member MLID, the limited partition member MLID, a spanning tree route for the a full partition member MLID, a spanning tree route for the limited partition member MLID, a list of member nodes for both MLIDs, the MGID, the related P_Key, etc.

In order to correctly route both the full partition member MLID and the limited partition member MLID of an MCG, the SM can calculate two spanning trees—one for the full partition member MLID and one for the limited partition member MLID. Moreover, the SM can determine MFT entry contents for the relevant MLIDs for all impacted switches for each of the determined spanning trees, and forward updated MFTs to any impacted subnet switches.

Figure 31:
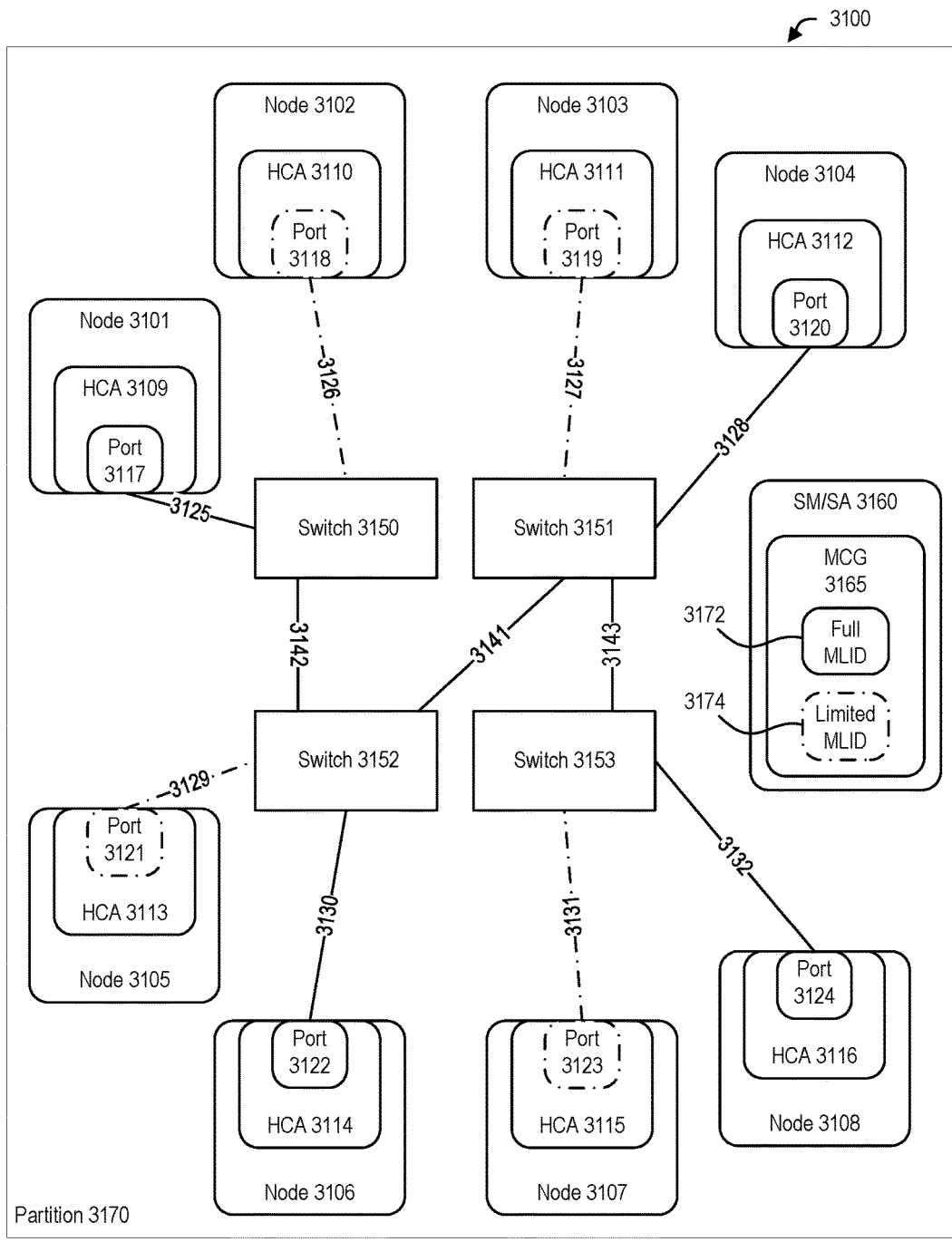
FIG. 31 shows an exemplary multicast packet route that can be determined via a spanning tree algorithm for a limited partition member MLID in subnet, in accordance with an embodiment.

FIG. 31 shows an exemplary multicast packet route that can be determined via a spanning tree algorithm for a limited partition member MLID in subnet 3100, in accordance with an embodiment. Subnet 3100 includes nodes 3101-3108. Nodes 3101-3108 include HCAs 3109-3116, respectively. Further, HCAs 3109-3116 each include a port—ports 3117-3124, respectively. Every port in subnet 3100 is a member of partition 3170. Likewise, every port in subnet 3100 is a member of MCG 3165.

In subnet 3100, multicast group (MCG) 3165 is defined by SM/SA 3160. Dual MLIDs have been assigned to MCG 3165. Full partition member MLID 3172 is depicted in block-diagram form with a solid line. Limited partition member MLID 3174 is depicted in block-diagram form with a dash-dot line. Ports 3118-3119 and ports 3121 and 3123 are also depicted with a dash-dot line to indicate that they have received limited partition member MLID 3174 from SM/SA 3160 (and, accordingly, that they are limited members of partition 3170). Further, ports 3117, 3120, 3122, and 3124 are depicted with a solid line to indicate that they have received full partition member MLID 3172 from SM/SA 3160 (and, accordingly, that they are full members of partition 3170).

In FIG. 31, links included in a spanning tree to service delivery of multicast traffic for limited partition member MLID 3174 are depicted in solid line. This is because a spanning tree generated for delivery of a multicast packet having a limited partition member MLID as the packet's DLID will only deliver the multicast packet to full members of the partition. In accordance with an embodiment, SM/SA 3160 can, when generating the spanning tree for limited partition member MLID 3174, determine each member of partition 3170 (that is also a member of MCG 3165), and determine a spanning tree that will deliver packets having limited partition member MLID 3174 as a DLID only to the determined full members of partition 3170. In this way, no multicast packets having a limited member P_Key will be delivered to any other port that is a limited member of the partition 3170. Accordingly, no P_Key access violations will be triggered and sent to the SM/SA, and link resources will not be wasted on a packet that will ultimately be dropped at the delivery port.

With further reference to FIG. 31, links 3142, 3141 and 3143 can be included in the spanning tree determined for limited partition member MLID 3174. Additionally, links 3125, 3128, 3130, and 3132, which service end-ports 3117, 3120, 3122, and 3124, respectively, can also be included in the spanning tree for limited partition member MLID 3174. Thus, the spanning tree for limited partition member MLID 3174 can ensure that a multicast packet having limited partition member MLID 3174 as the DLID will only be delivered to each end-port that is both a member of MCG 3165 and a full member of partition 3170.

If, for example, port 3121 injects a multicast packet into the subnet, it will be received by switch 3152. Switch 3152 can then forward a copy of the multicast packet to each of the links designated in the spanning tree. Thus, switch 3152 can forward a copy of the received multicast packet to links 3142, 3141, and 3130. In this scenario, port 3122 will receive a copy of the multicast packet via link 3130, switch 3150 will receive a copy via link 3142, and switch 3151 will receive a copy via link 3141. From here, switch 3150 can also forward a copy of the multicast packet received from link 3142 to link 3125 (but not to link 3126, since it is not part of the spanning tree). This pattern can continue, following the spanning tree throughout the subnet, until all full partition member ports have received a copy of the multicast packet.

The spanning tree route for full member MLID 3172 is not shown in FIG. 31. This is because, since every node in subnet 3100 is a member of MCG 3165 and a member of partition 3170 (as noted above), the route would include every port 3117-3124, in accordance with an embodiment. Nonetheless, SM/SA 3160 can generate the spanning tree for the full member MLID 3172 in the same manner as discussed above, except for that each port 3117-3124 would be included in the spanning tree for full member MLID 3172.

In accordance with an embodiment, SM/SA 3160 can generate MFTs for each impacted switch 3150-3153 based on the spanning trees shown in FIG. 31. Once generated, the SM/SA 3160 can send the MFTs to the switches 3150-3153 for implementation by the respective switches. Moreover, MFTs for the spanning tree generated for full member MLID 3172 can be generated and sent to switches 3150-3153 for implementation by the respective switches. These respective sets of MFTs can be generated according to the process described above with respect to FIG. 17.

In accordance with an embodiment, end-ports can be aware that the SM has allocated dual MLIDs to an MCG. When an end-port is aware that the SM has allocated dual MLIDs to an MCG, the end-port can distinguish between the dual MLIDs. Such awareness can allow the end-port to use the limited partition member MLID in order to only forward multicast packets to other full partition members within the relevant MCG—even if the end-port is a full member of the corresponding partition.

Additional properties can be added to, e.g., the PortInfo attribute, to allow an end-port to be aware of, and take advantage of, dual MLIDs allocated to an MCG. In accordance with an embodiment, one such property can indicate if an end-port supports distinguishing between full member and limited member MLIDs. For instance, a "DualMLIDAllocation" indicator can be added to the PortInfo attribute. The DualMLIDAllocation indicator can be, for example, a bit where, when the bit is set high, the indication is that the end-port supports distinguishing between full member and limited member MLIDs. The DualMLIDAllocation indicator can be set to false by default (e.g., the bit can be set low). The SMA of a supporting HCA can set the DualMLIDAllocation indicator to true during link up/initialization. If set to true (e.g., set high), a supporting SM can update associated SMA properties.

Another such property can indicate whether dual MLIDs have been allocated to MCGs in a subnet, in accordance with an embodiment. An exemplary property can be a "DualMLIDAllocationInUse" indicator. The DualMLIDAllocationInUse indicator can be, for example, a bit where, when the bit is set high, the indication is that a supporting SM has allocated dual MLIDs (i.e., one for full partition members and one for limited partition members) to multicast groups defined in the subnet. The DualMLIDAllocationInUse indicator can be set to false by default (e.g., the bit can be set low). A supporting SM can set the DualMLIDAllocationInUse indicator to true if the SM has allocated dual MLIDs to MCGs in the subnet.

In accordance with an embodiment, the allocation of a second MLID for use by limited partition members can follow a convention in order to lower subnet overhead and traffic. For instance, the second MLID for use by limited partition members can be defined as the next MLID value (numerically) after the MLID value allocated for use by full partition members. In this way, supporting end-ports can determine the value of the second MLID without actually receiving it from the SM.

In accordance with an embodiment, a property of. e.g., the PortInfo attribute, can indicate that a convention is followed by the SM with respect to allocation of a second MLID for use by limited partition members. An exemplary indicator can be a "ConsecutiveDualMLIDs" indicator. The indicator (e.g., ConsecutiveDualMLIDs) can be, for example, a bit where, when the bit is set high, the indication is that the second MLID for use by limited partition members is defined as the next MLID value (numerically) after the MLID value allocated for use by full partition members. The ConsecutiveDualMLIDs indicator can be set to false by default (e.g., the bit can be set low). A supporting SM can set the ConsecutiveDualMLIDs indicator to true if the SM allocates the second MLID for use by limited partition members as the next MLID value (numerically) after the MLID value allocated for use by full partition members.

In accordance with an embodiment, an end-port that is both aware of dual MLID allocation to MCGs in a subnet, and is a full member of a partition associated with an MCG that has been allocated dual MLIDs, can request, in a join request to the SM, that the limited partition member MLID be returned by the SM. The SM can check that the end-port is a full member of the partition associated with the MCG that the end-port is requesting to join, and if it is determined by the SM that the end-port is a full member of that partition, then the SM can return the limited partition member MLID to the requesting end-port. This method can be used by a full-partition-member end-port in order to forward multicast packets only to other full-partition-member end-ports that are also members of the relevant MCG.

In accordance with an embodiment, a message type can be defined that both requests that the sending end-port be joined to the MCG specified in the message (i.e., associated with the MGID specified in the message), and that requests that the limited partition member MLID be returned to the requesting end-port. This message type can contain the same parameters as an ordinary join operation, with the exception that the limited partition member MLID is returned to the requesting end-port, instead of the (default) full partition member MLID. This message type can be implemented as, for example, a property of the MCMemberRecord attribute (e.g., a GetLimitedMLID property), or as a new SA method.

In accordance with an embodiment, IB implementations that support the use, configuration, and/or management of dual MLID allocation to MCGs can include state-change events for the properties employed in the use, configuration, and/or management of dual MLID allocation to MCGs (e.g., DualMLIDAllocation, and DualMLIDAllocationInUse, as described above). Further, IB implementations that support the use, configuration, and/or management of dual MLID allocation to MCGs can include verb interfaces for querying the value of the properties used in the use, configuration, and/or management of dual MLID allocation to MCGs (e.g., DualMLIDAllocation, and DualMLIDAllocationInUse, as described above).

Figure 32:
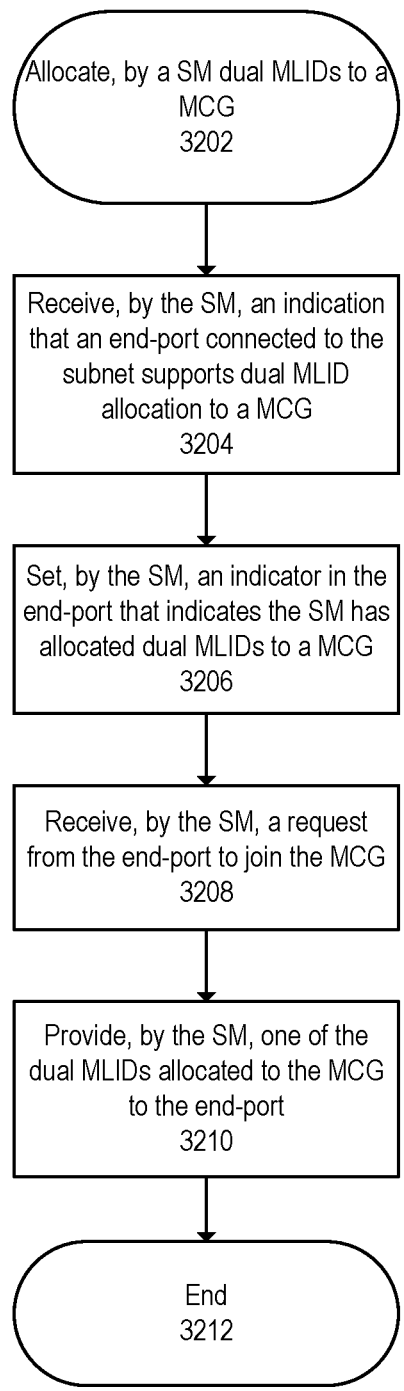
FIG. 32 shows a flow chart for configuring an end-port for use with dual MLIDs allocated for an MCG, in accordance with an embodiment.

FIG. 32 shows a flow chart for configuring an end-port for use with dual MLIDs allocated for an MCG, in accordance with an embodiment. At step 3202, an SM allocates dual MLIDs to an MCG. At step 3204, the SM receives an indication that an end-port connected to the subnet supports dual MLID allocation to an MCG. At step 3206, the SM sets an indicator in the end-port that indicates the SM has allocated dual MLIDs to an MCG. At step 3208, the SM receives a request from the end-port to join the MCG. At step 3210, the SM provides the end-port with one of the dual MLIDs allocated to the MCG. At step 3212, the method can end.

Figure 33:
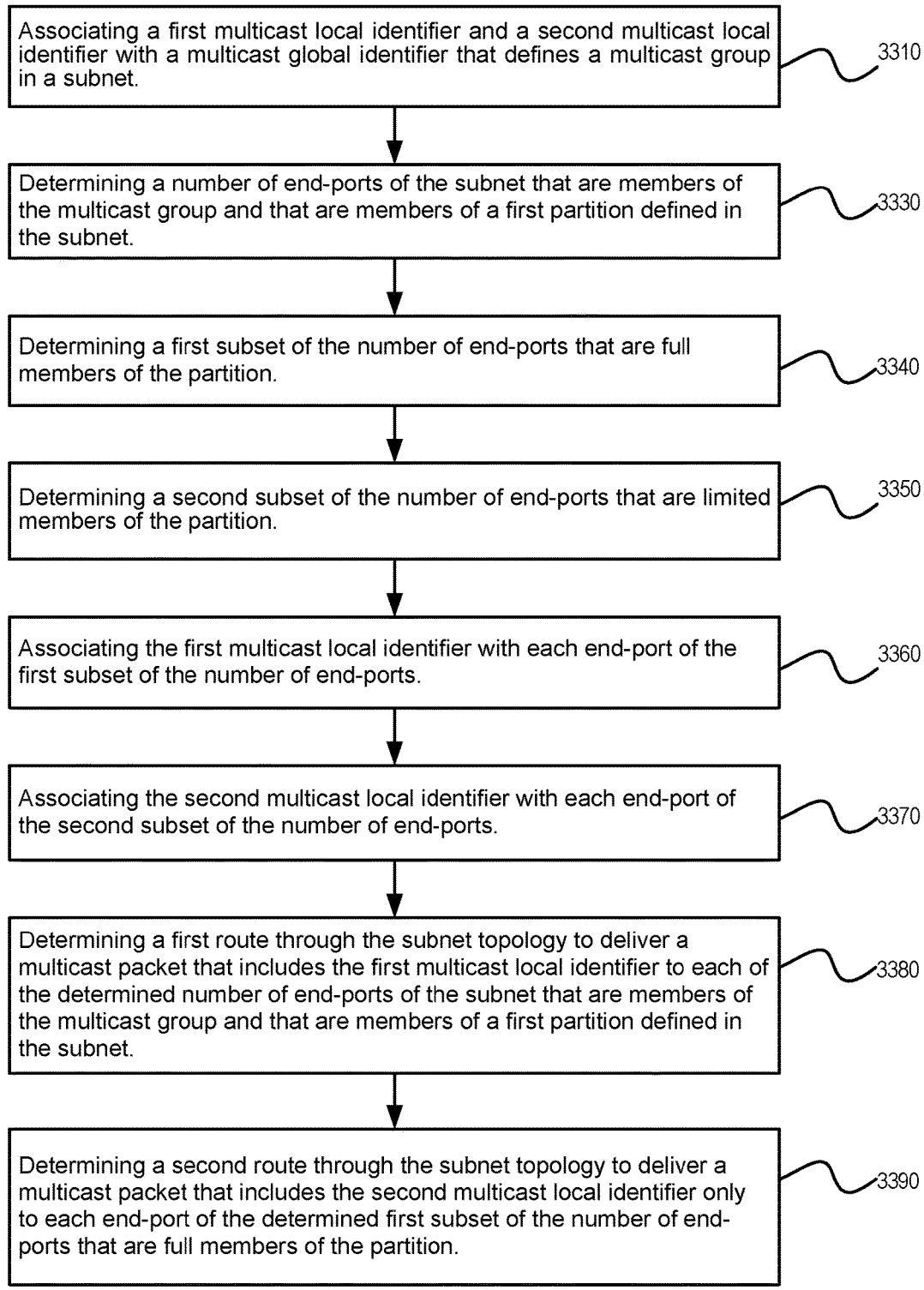
FIG. 33 illustrates a flow chart for providing dual multicast local identifiers (MLIDs) per multicast group to facilitate both full and limited partition members in a high performance computing environment, in accordance with an embodiment.

FIG. 33 illustrates a flow chart for providing dual multicast local identifiers (MLIDs) per multicast group to facilitate both full and limited partition members in a high performance computing environment, in accordance with an embodiment. At step 3310, a first multicast local identifier and a second multicast local identifier are associated with a multicast global identifier that defines a multicast group in a subnet. At step 3330, a number of end-ports of the subnet that are members of the multicast group and that are members of a first partition defined in the subnet are determined. At step 3340, a first subset of the number of end-ports that are full members of the partition is determined. At step 3350, a second subset of the number of end-ports that are limited members of the partition is determined. At step 3360, the first multicast local identifier is associated with each end-port of the first subset of the number of end-ports. At step 3370, the second multicast local identifier is associated with each end-port of the second subset of the number of end-ports. At step 3380, a first route through the subnet topology to deliver a multicast packet that includes the first multicast local identifier to each of the determined number of end-ports of the subnet that are members of the multicast group and that are members of a first partition defined in the subnet is determined. At step 3390, a second route through the subnet topology to deliver a multicast packet that includes the second multicast local identifier only to each end-port of the determined first subset of the number of end-ports that are full members of the partition is determined.

Multicast Group (MCG) Membership Defined Relative to Partition Membership

In accordance with an embodiment, it is not uncommon that all end-ports that are members of a particular IB partition are also all members of a particular IB multicast group. For example, and as noted above, the IPoIB broadcast group is a multicast group defined in the context of an IB partition. Each of the end-ports that is a member of the partition is also a member of the broadcast group defined in the context of that partition. This allows legacy applications using the IP protocol to receive broadcast packets via the IB subnet.

As further discussed above, however, each end-port member of the IB partition to which the broadcast group corresponds must send a join request to the SM/SA in order to become a member of the broadcast (multicast) group. In response to an MCG join request, in addition to associating the LID of the requesting end-port with the MGID of the broadcast group, the SM must recreate the single spanning tree (as discussed above), and recreate and send the MFT of any impacted switch. In order to avoid the overhead and inefficiency of this scenario, multicast groups that are defined in the context of a certain partition can be indicated as such, in accordance with an embodiment. Further the SM can determine when a partition is associated with a multicast group in this manner, and can then automatically add the partition members to the multicast group, without the need to receive an MCG join request from each member of the partition.

In accordance with an embodiment, when the SM receives a request to create a new multicast group (MCG), the subnet manager can examine the request to determine the traditional parameters (e.g., the parameters specified in the IB specification) needed in order to define a multicast group. As noted above, a P_Key is one of the parameters required in a request to define a multicast group. Additionally, a parameter, or indicator, can be included in the request (e.g., a "JoinAllPartitionMembers" parameter) that indicates whether each member of the partition that corresponds to the P_Key included in the request is to also be added as a member of the new multicast group. Upon a determination, by the SM, that the parameter indicates that each end-port member of the specified partition is also to be added to the new multicast group, the SM can associate the LID of each member of the specified partition with the MGID of the new multicast group.

This method eliminates the need for each end-port member (other than a creating end-port member, if the MCG is dynamically created) of the partition specified in the MCG create request to communicate a join request to the SM for the newly created MCG, since these partition members can be added as a result of the indication of the additional parameter included in the MCG create request. Thus, this method greatly reduces communication between clients/end-ports and the SM/SA implementation, especially during the critical time of fabric initialization, when the majority of such communications are ordinarily taking place.

Additionally, this method eliminates the need for the SM/SA to generate a spanning tree after each join request and update and send MFTs to switches affected by each individual join request. Rather, the SM can associate all the LIDs of the partition members with the MGID of the newly created MCG. Then, the SM can create a single spanning tree that takes into account each of the LIDs added to the MCG. From this spanning tree, the SM can generate a set of MFTs that accounts for all of the LIDs added to the MCG, and send this set of MFTs to the subnet switches. Consequently, SM workload can be greatly reduced during initialization and at other times.

Figure 34:
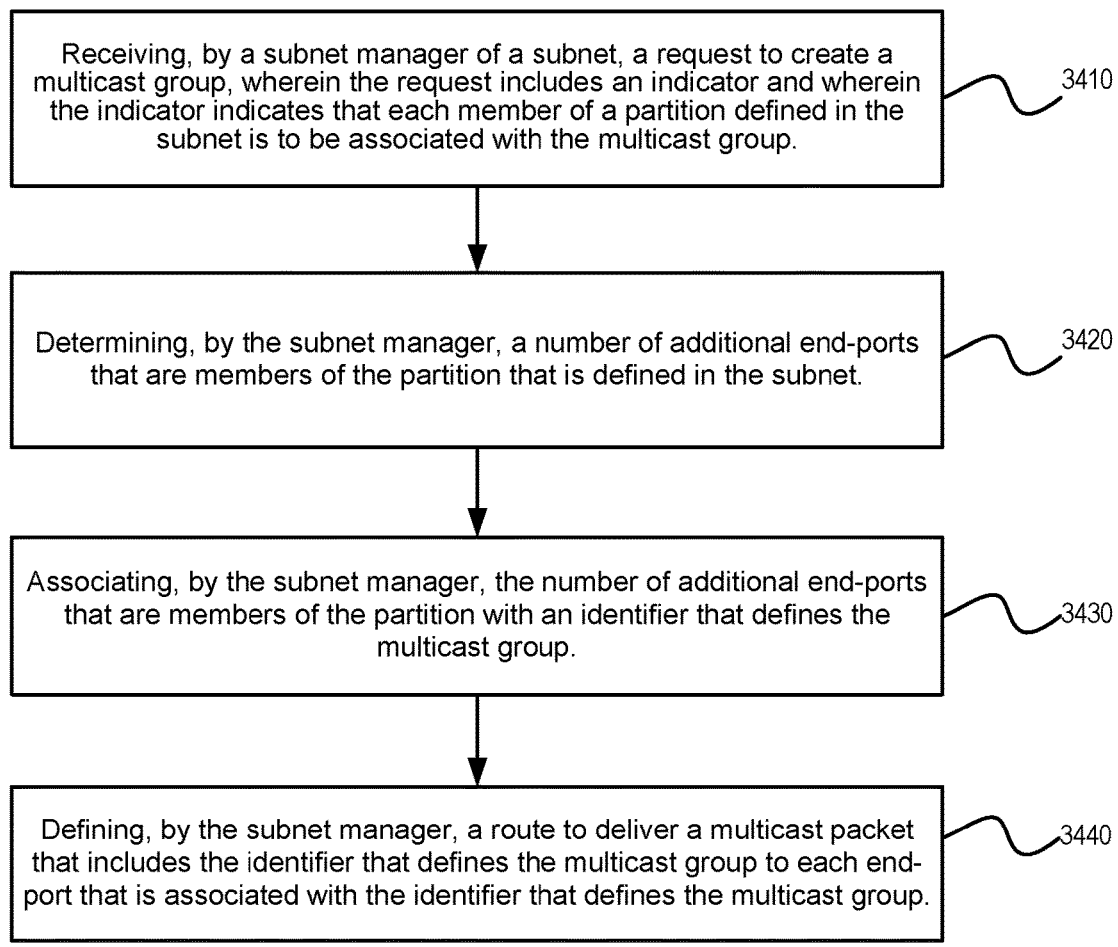
FIG. 34 shows a flow chart for providing multicast group membership defined relative to partition membership in a high performance computing environment, in accordance with an embodiment.

FIG. 34 shows a flow chart for providing multicast group membership defined relative to partition membership in a high performance computing environment, in accordance with an embodiment. At step 3410, a subnet manager of a subnet receives a request to create a multicast group, where the request includes an indicator and where the indicator indicates that each member of a partition defined in the subnet is to be associated with the multicast group. At step 3420 the subnet manager determines a number of additional end-ports that are members of the partition that is defined in the subnet. At step 3430, the subnet manager associates the number of additional end-ports that are members of the partition with an identifier that defines the multicast group. At step 3440 the subnet manager defines a route to deliver a multicast packet that includes the identifier that defines the multicast group to each end-port that is associated with the identifier that defines the multicast group.

Figure 35:
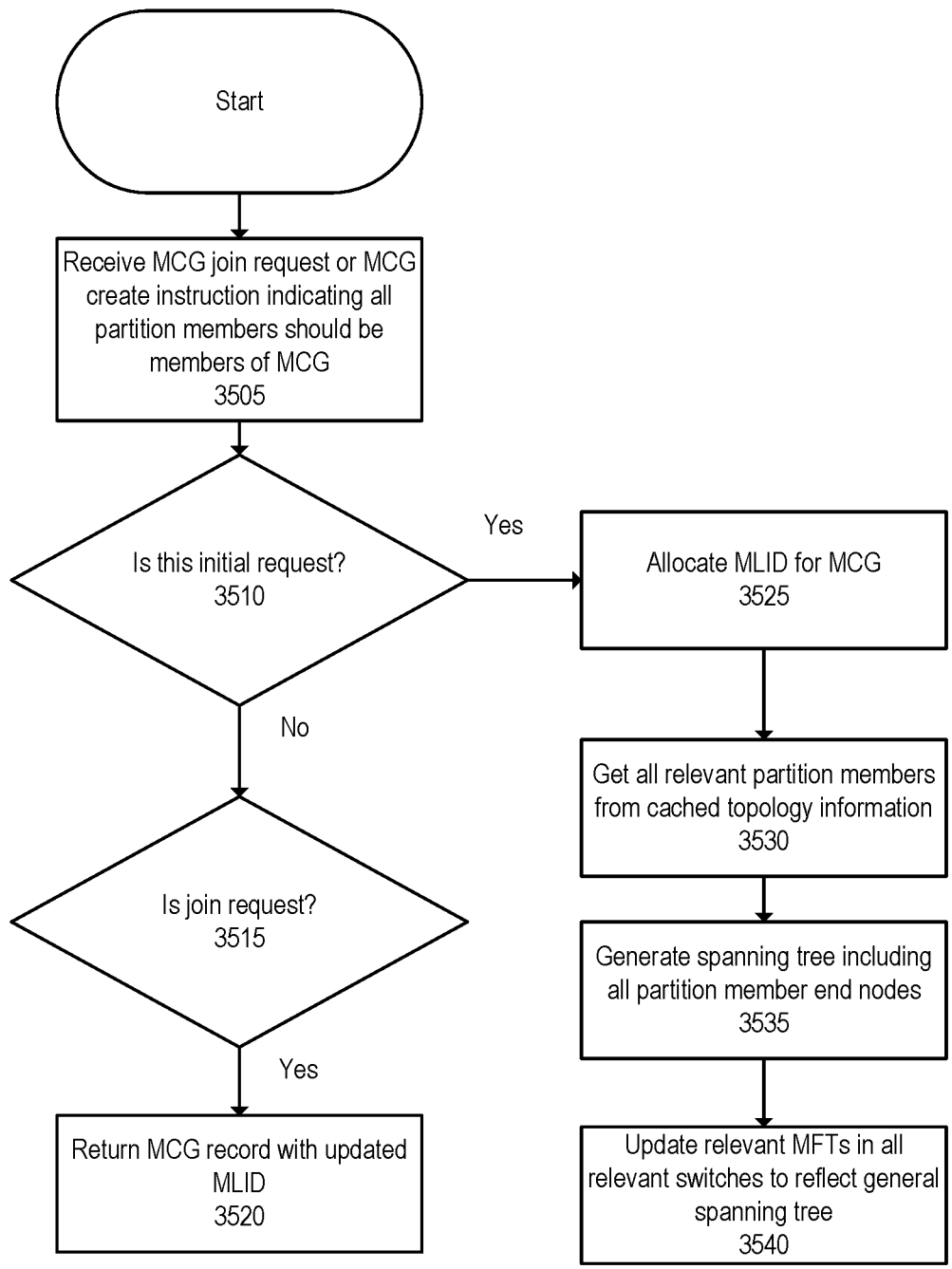
FIG. 35 illustrates a flowchart of a method for providing multicast group membership defined relative to partition membership in a high performance computing environment, in accordance with an embodiment.

FIG. 35 illustrates a flowchart of a method for providing multicast group membership defined relative to partition membership in a high performance computing environment, in accordance with an embodiment. More specifically, FIG. 35 shows a flowchart for setting up multicast routing, and updating multicast forwarding tables based upon a multicast group create request indicating that each member of a corresponding partition should be added to the created multicast group.

With reference to FIG. 35, at step 3505 an MCG join request or MCG create instruction indicating all partition members should be members of the relevant MCG can be received. At decision step 3510, it can be determined if the request is an initial request with regard to the MCG. If it is determined not to be an initial request with regard to the MCG, it can further be determined if the request is a join request to join the relevant MCG at step 3515. If it is determined that the request is a join request, an MCG record can be returned with an updated MLID at step 3520. If, however, it is determined at step 3510 that the request is an initial request with regard to the MCG, then control can pass to step 3525. At step 3525, an MLID can be allocated for the MCG. Then, at step 3530, all relevant partition members can be retrieved from cached topology information. A spanning tree including all partition member end-nodes can be generated are step 3535. At step 3540, the MFTs of impacted switches can be updated and to reflect the spanning tree, and the updated MFTs can be send to their respective switches.

Table 1 shows an exemplary subnet administration attribute (e.g., a MCMemberRecord attribute) for creating a multicast group including a parameter that is used by the SM/SA to indicate whether each member of a corresponding partition should also be added as a member of a newly created multicast group. The attribute in Table 1 includes traditional parameters specified in the IB Specification for creating a new MCG. The attribute specified in Table 1 further includes a JoinAllPartitionMembers parameter, or indicator, that indicates whether each member of a corresponding partition should also be added as a member of the created multicast group. The corresponding partition can be the partition specified in the attribute.

TABLE 1

| Component | Length (bits) | Offset (bits) | Description |
| --- | --- | --- | --- |
| MGID | 128 | 0 | Multicast GID address for this multicast group. |
| PortGID | 128 | 128 | Valid GID of the endport joining this multicast group. |
| Q_Key | 32 | 256 | Q_Key to be used by this multicast group. |
| MLID | 16 | 288 | Multicast LID for this multicast group, assigned by SA at creation time. |
| MTUSelector | 2 | 304 | In a query request: 3-largest MTU available. |
| MTU | 6 | 306 | MTU required. |
| TClass | 8 | 312 | Traffic class. |
| P_Key | 16 | 320 | P_Key 16 320 Partition key for this multicast group. This partition key may indicate full or limited membership. |
| RateSelector | 2 | 336 | RateSelector. |
| Rate | 6 | 338 | Rate. |
| PacketLifeTimeSelector | 2 | 344 | PacketLifeTimeSelector. |
| PacketLifeTime | 6 | 346 | Maximum estimated time for a packet to traverse a path within the multicast group. |
| SL | 4 | 352 | Service Level. |
| FlowLabel | 20 | 356 | FlowLabel. |
| HopLimit | 8 | 376 | HopLimit. |

TABLE 1-continued

| Component | Length (bits) | Offset (bits) | Description |
| --- | --- | --- | --- |
| Scope | 4 | 384 | Multicast Address Scope |
| JoinState | 4 | 388 | Join/Leave Status. |
| ProxyJoin | 1 | 392 | Proxy join |
| JoinAllPartitionMembers | 1 | 393 | Indicates whether all members of a corresponding partition should be added to the newly created multicast group. |
| Reserved | 22 | 394 | Reserved. |

In accordance with an embodiment, upon receipt of an attribute such as that in Table 1 (where the attribute is included in either an administrative or dynamic request to create a new MCG), logic in the SM/SA can determine the value of the JoinAllPartitionMembers parameter. Based on the determined value of the JoinAllPartitionMembers parameter, the SM can determine that each member of a corresponding partition should be added to the new MCG group. That is, the LID(s) of each end-port member of the partition should be associated with the MGID that defines the new MCG. These associations can then be stored in, e.g., the SA data store.

For example, an SM can receive a MAD requesting that a new multicast group be created. The MAD can specify the SubnAdmSet( )method, which is provided by the Subnet Administration class defined in the IB Specification. The MAD can further specify the MCMemberRecord attribute, wherein the parameters noted above (i.e., MGID, P_Key, Q_KEY, etc.) can be specified. In addition the MCMemberRecord attribute can include the JoinAllPartitionMembers parameter. In accordance with an embodiment, the JoinAllPartitionMembers parameter can be a single bit.

Upon receiving the MAD, including the MCMemberRecord attribute with the JoinAllPartitionMembers parameter, the SM/SA can determine the value of the JoinAllPartitionMembers parameter. For example, the JoinAllPartitionMembers parameter bit may be set to 1, indicating that each member of the partition specified by the P_Key parameter of the MCMemberRecord should be joined to the new MCG group. Upon determining that the JoinAllPartitionMembers parameter bit is set to 1 (or 0, depending on design), logic in the subnet manager can add all members of the partition represented by the P_Key specified in the MCMemberRecord attribute to the newly created MCG.

Figure 36:
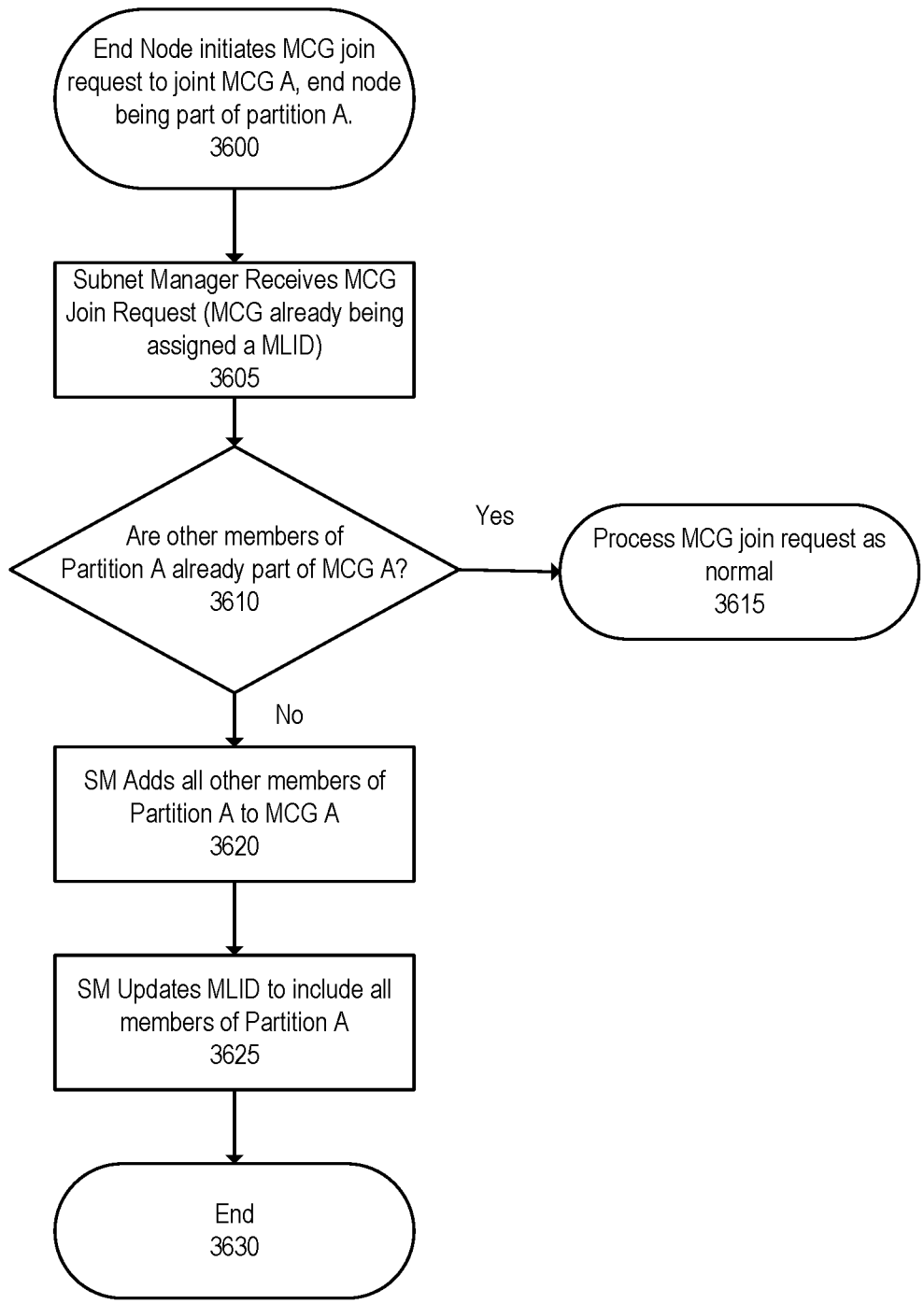
FIG. 36 illustrates a flowchart of a method for providing multicast group membership defined relative to partition membership in a high performance computing environment, in accordance with an embodiment.

FIG. 36 illustrates a flowchart of a method for providing multicast group membership defined relative to partition membership in a high performance computing environment, in accordance with an embodiment. At step 3600, an end node, which is a member of a partition, such as partition A, can initiate a multicast group (MCG) join request to join an MCG, such as MCG A. At step 3605, a subnet manager can receive the MCG join request. In the depicted method, the MCG to which the join request was directed has already been assigned a multicast local identifier (MLID) within the subnet. at step 3610, the SM manager can determine whether the other members of partition A are also already members of MCG A (e.g., if the end node is a new addition to the subnet and is requesting to be added to the MCG A). In such a case, the MCG join request is processed normally, 3615, and the method ends. If, however, the other members of partition A (some or all other members) are not members of MCG A, then the SM can automatically add, at step 3620, all other members of partition A to MCG A, based solely upon the MCG join request the SM received from the first end node. Once the other members of partition A are added to the MCG A, the SM can update, at 3625, the MLID for MCG A to include the other members of partition A as destinations for MC packets addressed to MCG A. The method can end at 3630.

Default MLID Values Per Partition as SMA Attributes

In accordance with an embodiment, and as noted above, it is possible for multiple MCGs to share the same MLID. That is, it is possible for multiple MGIDs (which define multicast groups) to be associated with one and the same MLID. Moreover, MCGs that share the same MLID will share the same routing of their respective multicast packets through the subnet, since multicast packet routing is based on the MLID specified as the DLID of the multicast packet. Accordingly, a subnet manager can allocate a dedicated MLID per partition where the partition has one or more MCGs defined in the context of the partition. All MCGs associated with, or defined in the context of, the partition can then share a same MLID. This allows for a greater number of LIDs within a subnet, since less of the finite number of LIDs will be used for multicast groups. This also enables the SM of the subnet to create a single spanning tree and to create a single set of MFTs for multiple MCGs that are associated with the same partition, thereby reducing SM/SA overhead.

In accordance with an embodiment SM policy can specify that a default MLID be defined for a partition. The policy can specify that each partition in the subnet be allocated a default MLID, or that only partitions defined for multicast communication (i.e., those partitions having MCGs defined in their context) be allocated a default MLID. Further, default MLIDs can be made known to the end-port members of the relevant partition by virtue of the end-ports' membership in the relevant partition.

In accordance with an embodiment, default MLID values can be provided as metadata relative to the P_Key table contents that the SM delivers to each port during initialization of the subnet. In this manner, the end-port members of a particular partition can be made aware of the MLID of any MCG that is set up in the context of the particular partition, so long as the end-ports are a member of the particular partition. Accordingly, end-ports can learn MLIDs for MCG groups of which the end-ports are a member in an a priori manner, and thereby avoid sending an MCG join request to be processed by the SM.

In the case where a default (i.e., a "partition specific") MLID is allocated for one or more MCGs associated with a partition, the partition specific MLID can be provided to an end-port as an SMA attribute, along with each P_Key that will be placed in the end-port's P_Key table, in accordance with an embodiment. The P_Key table information can be logically extended by including an association, or relationship, between the P_Key table entries and entries in a default MLID table.

The size of the P_Key table can be specified by the PartitionCap component of the NodeInfo attribute that, according to the IB Specification, is implemented by each node (e.g., each HCA) of the subnet. The size of the P_Key table is generally vendor specific, but the PartitionCap component is set to at least a value of one (1) for each node, to indicate that the P_Key table can store at least one 16-bit P_Key, since each end-port is a member of at least the default partition. Larger P_Key tables are common, however. In accordance with an embodiment, a conventional P_Key table can comprise an array where the number of elements of the array equals the number specified in the PartitionCap component of the node.

In accordance with an embodiment, an HCA can be configured to store a default MLID table that includes the partition specific MLID (if one has been allocated) of any partitions that the end-port is a member of. The default MLID table of an end-port can be associated with the P_Key table of the end-port such that each entry in the P_Key table is mapped to an entry in the default MLID table.

For example, in an embodiment where the P_Key table is an array, the default MLID table can also be an array. The default MLID table array can have the same number of elements as the P_Key table array. Additionally, the index value of a given element in the P_Key table array can be equal to the index value of the element in the default MLID table array that holds the default MLID allocated for the partition represented by the P_Key held in the given element of the P_Key table array. That is, the P_Key table and the default MLID table can be parallel arrays. In this way, each element of the P_Key table can be mapped directly to an element of the default MLID table, and the end-port node can determine the default MLID allocated to a partition (if any) through use of the P_Key table to default MLID table mappings.

Listing 2 represents the P_Key table and the default MLID table as exemplary parallel arrays, in accordance with an embodiment. As can be seen in Listing 2, the P_Key table is an array that is parallel to the default MLID table array, such that, for a P_Key at P_Key array element N, the default MLID associated with the P_Key will be found at the Default MLID array element N.

| Listing 2 | |
|---|---|
| P_KEY Array | DefaultMLID Array |
| P_Key [0] = 10 | DefaultMLID [0] = 50000 |
| P_Key [1] = 11 | DefaultMLID [1] = 50002 |
| P_Key [2] = 12 | DefaultMLID [2] = 50004 |
| P_Key [3] = 13 | DefaultMLID [3] = 50006 |

Other exemplary embodiments of P_Key table to default MLID table mappings include a relational database structure utilizing, for example, primary and foreign keys and/or mapping tables, to create relationships between a P_Key in the P_key table and its allocated default MLID(s) in the default MLID table. In yet another embodiment, a 2-dimensional array (or a multidimensional array, in the case of dual default MLIDs being allocated to a partition) can be used to create the described mapping relationship between a partition key and a default MLID. Still other embodiments can include file architectures, such as comma separated value, etc. Any suitable mapping technique can be used to create the described relation between the P_Key of a partition and a default MLID allocated to the partition.

In the case where dual default partition specific MLIDs have been allocated to an MCG (as described in detail, above), two independent values may be represented in the default MLID table—one value for the MLID assigned to MCG members with full partition membership, and one value for the MLID assigned to MCG members with limited partition membership. Alternatively, a single value could be represented in the default MLID table with a convention defined that would allow the corresponding value (either the full or limited member MLID value) to be easily derived. For example, in the case where the MLID assigned to MCG members with full partition membership is represented in the default MLID table, the convention could specify that the MLID assigned to MCG members with full partition membership is that of the full membership MLID plus one (i.e., full partition member MLID+1=limited partition member MLID). Thus, one of the dual MLIDs would not have to be explicitly known, or communicated to, the end-port.

In accordance with an embodiment, if no default MLID is assigned to a partition, the element in the P_Key table that holds the P_Key representing that partition can be mapped to a value known (by the node housing the P_Key table) to indicate that there is no default MLID allocated for that partition. For example, if there is no default MLID allocated to a certain partition, then the element in the default MLID table that is mapped to the element in the partition table that holds the P_Key for the particular partition can store the value of zero (0), where a value of zero indicates that no default MLID has been allocated for the corresponding partition.

In accordance with an embodiment, IB components can support a default MLID table of an end-port of a node. For example, an HCA can not only include a default MLID table, but can also support its configuration and use through attributes. Further, a subnet manager can also work in conjunction with a node to support configuration and management of a default MLID table through the use of such attributes.

One such attribute can be a flag, or indicator, that a node (e.g., an HCA) supports a default MLID table. Such an indicator can have a default value of "false". For instance, an SM that supports the use/configuration/management of default MLID tables can set a default MLID table support attribute (e.g., a "HasDefaultMLIDsTable" attribute) to "false". Accordingly, if the SM discovers any HCAs that do not support a default MLID table, the SM will not send unsupported attribute modifiers to the non-supporting HCA in an attempt to configure a default MLID table that is not supported, or included in, the non-supporting HCA.

During initialization, the SM can discover HCAs connected to the subnet, and send configuration information to the discovered HCAs. The HCAs can also communicate with, or respond to requests from, the SM about supported capabilities of the HCAs. In accordance with an embodiment, when a discovered HCA does not explicitly communicate that it supports a default MLID table, the SM can simply leave the default setting for, e.g., a HasDefaultMLIDsTable attribute, as false. Conversely, if an HCA supports a default MLID table, the supporting HCA can set the attribute to "true" in a communication to an initializing SM. Such a communication can be a direct communication to the SM, or can be a response to a request for information (such as a SubnGet( ) SMP, where the response is in the form of a SubnGetResp( ) SMP back to the SM).

Once a node has communicated to the (supporting) SM that the node's end-port supports a default MLID table, the SM can configure the default MLID table of the end-port.

The SM can maintain a record of default MLIDs. Each of the default MLIDs can be associated with a respective partition. These MLIDs can be associated with their respective partitions (i.e., assigned as the default MLID of their respective partitions) by subnet policy. The subnet manager can determine what partitions a supporting end-port is a member of, update the end-port's P_Key table, and, based on the updated P_Key table, can update the default MLID table.

In accordance with an embodiment, HCAs that support a default MLID table for use with an end-port can include an attribute that indicates whether the default MLID table is in use. For example, an HCA that includes, and supports the use of, a default MLID table can also include a DefaultMLIDTableInUse attribute. This attribute can be set to "true" by the SM once the SM updates the MLID table of the supporting end-port. An IB client can then use the attribute to determine if MLID values relevant to the client can be learned/retrieved from a supporting end-port's default MLID table.

In accordance with an embodiment, the pseudo code shown in Listing 3, below, shows a method for updating a default MLID table of an end-port according to a partition table of the end-port.

Listing 3

```
If end-port's HasDefaultMLIDsTable attribute is true Then
    If end-port's DefaultMLIDTableInUse attribute is false Then
        - Clear the default MLID table of the end-port;
        - Set the end-port's DefaultMLIDTableInUse attribute to true;
        If end-port's partition table requires updating Then
            - Update the partition table of the end-port;
        Endif
        - Update the default MLID table of the end-port according to the
          updated partition table;
    Else
        If Partition table requires updating Then
            - Clear the default MLID table of the end-port;
            - Update the partition table of the end-port;
            - Update the default MLID table of the end-port according to
              the updated partition table;
        Endif
    Endif
Else
    If Partition table requires update Then
        - Update the partition table of the port;
    Endif
Endif
```

Figure 37:
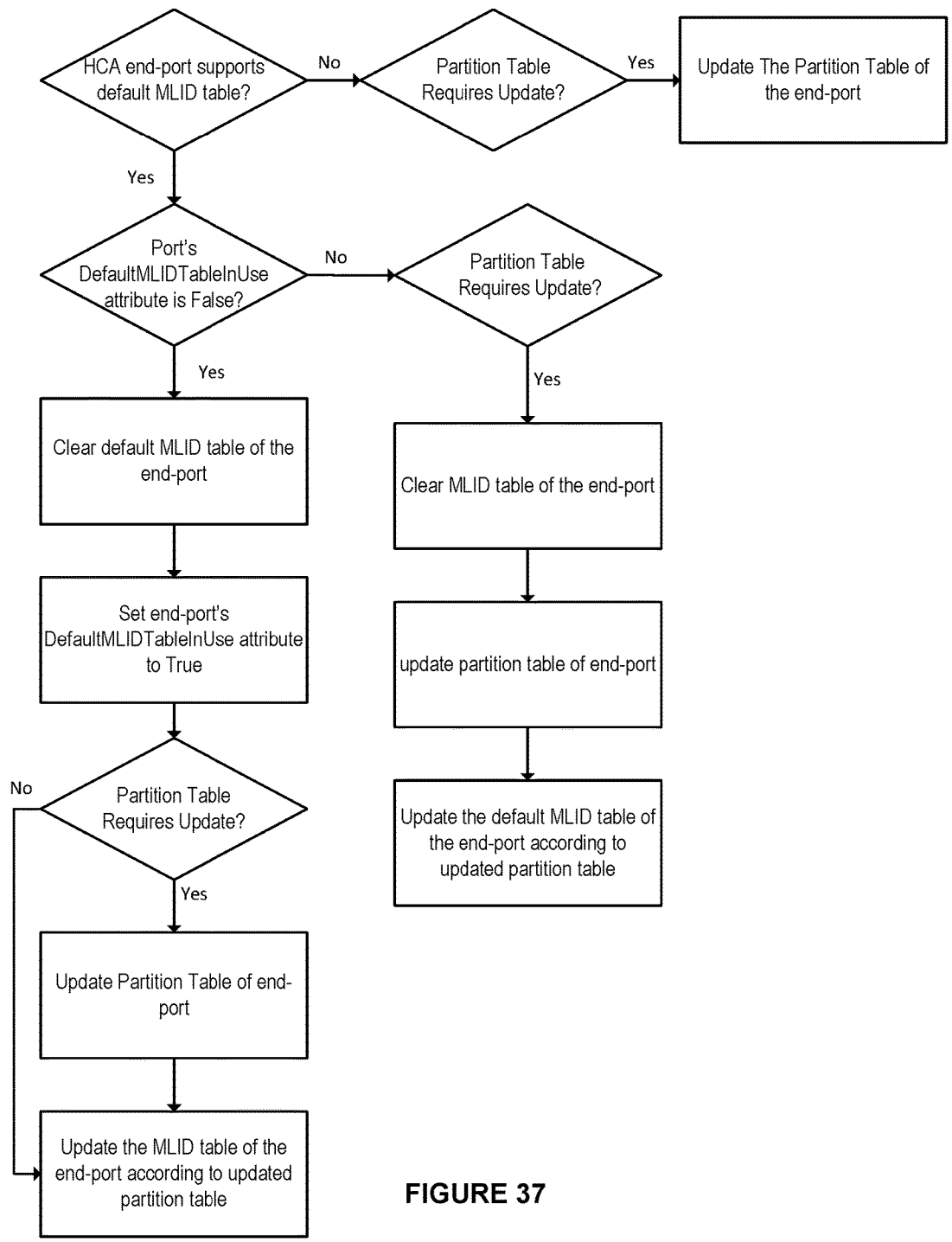
FIG. 37 is a flow chart of a method for updating a default MLID table of an end-port according to a partition table of the end-port, in accordance with an embodiment.

FIG. 37 is a flow chart of a method for updating a default MLID table of an end-port according to a partition table of the end-port, in accordance with an embodiment. With reference to FIG. 37 (and as reflected in the pseudo code in Listing 3), when updating the P_Key table of an end-port, an SM can first determine if the end-port supports a default MLID table by checking the attribute that indicates such (e.g., a HasDefaultMLIDsTable attribute). If the end-port does not support default MLID tables (e.g., if the end-port's HasDefaultMLIDsTable attribute if false), the SM can continue to update the partition table of the end-port if the partition table needs to be updated. However, if the end-port supports (and, accordingly, includes) a default MLID table (e.g., if the end-port's HasDefaultMLIDsTable attribute is true), then the SM can check the value of the attribute of the end-port that indicates whether the default MLID table of the end-port is in use.

With continued reference to FIG. 37, if the attribute of the end-port that indicates whether the default MLID table of the end-port is in use (e.g., the end-port's DefaultMLIDTableInUse attribute) is set to true, and if the partition table of the end-port needs to be updated, then the SM can leave this attribute set to true, clear the default MLID table of the end-port, update the partition table of the end-port, and then update the default MLID table of the end-port based on the updated partition table of the end-port.

Conversely, if the attribute of the end-port that indicates whether the default MLID table of the end-port is in use (e.g., the end-port's DefaultMLIDTableInUse attribute) is set to false, the SM can clear the default MLID table of the end-port, and set this attribute to true. Then, if the end-port's partition table requires updating, the SM can update the partition table. Finally, the SM can update the default MLID table of the end-port based on the updated partition table of the end-port.

Figure 38:
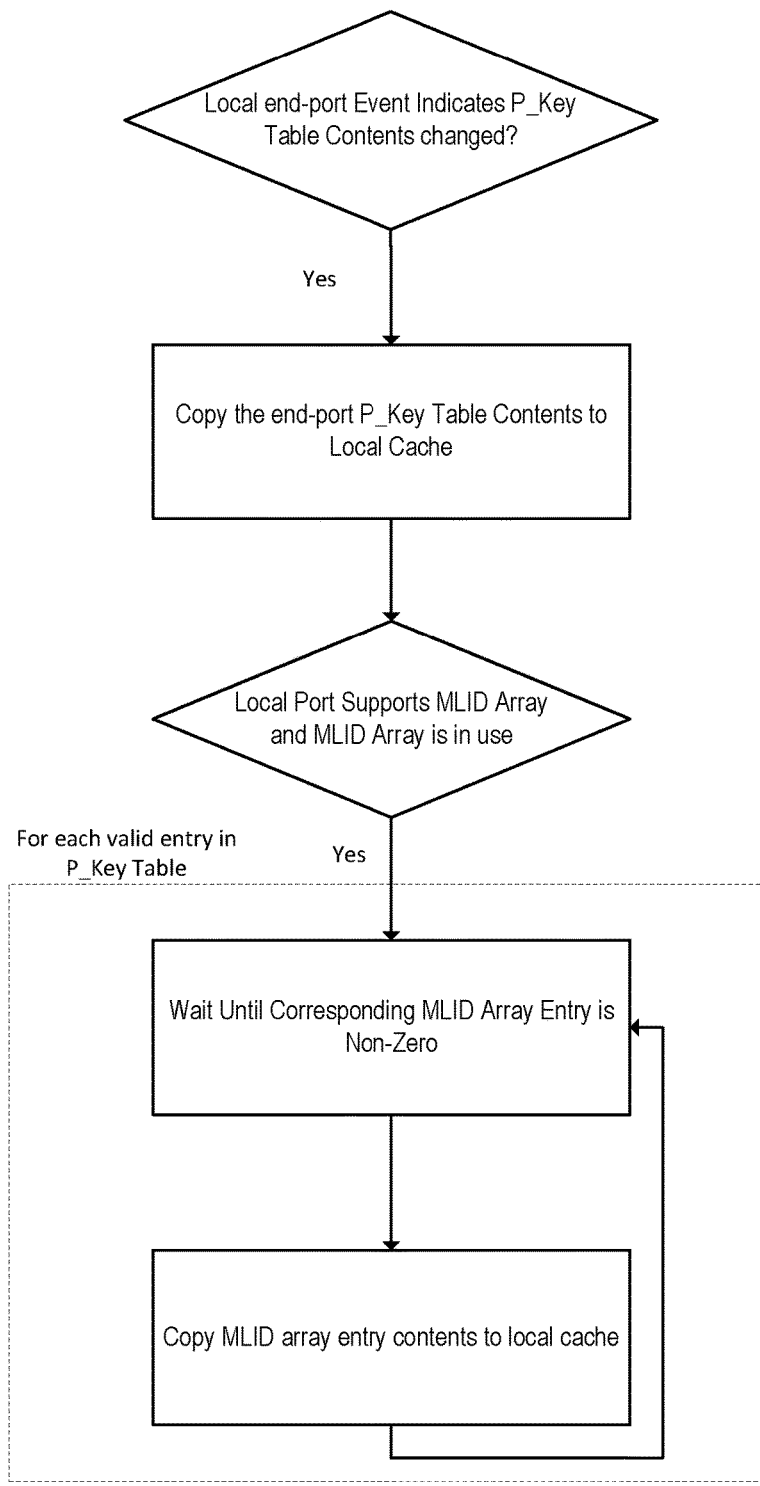
FIG. 38 is flow chart of a method for determining, by an IB client, default MLID values from the default MLID table of a supporting end-port, in accordance with an embodiment.

FIG. 38 is flow chart of a method for determining, by an IB client, default MLID values from the default MLID table of a supporting end-port, in accordance with an embodiment. With reference to FIG. 38, in retrieving/learning default MLIDs from the default MLID table of a supporting end-port, an IB client can first determine if the contents of the relevant local end-port's P_Key table has been changed or updated. This can be determined, e.g., by a local port event that the IB client is aware of. Once it is determined that the contents of the P_Key table of the local end-port has changes, the contents of the P_Key table can be copied to a local cache. The IB client can check that the local end-port both supports a default MLID table (e.g., that the end-port's HasDefaultMLIDsTable attribute is true) and that the MLID table is in use (e.g., the end-port's DefaultMLIDTableInUse attribute is set to true). If both attributes are set to true, then, for each valid entry in the end-port's P_Key table, the IB client can wait until the corresponding entry in the end-port's default MLID table indicates a default MLID (e.g., until the entry is non-zero), and then copy the MLID table contents to the local cache.

The pseudo code shown in Listing 4, below, shows a method for determining, by an IB client, default MLID values from the default MLID table of a supporting end-port, in accordance with an embodiment.

Listing 4

```
If local end-port event indicates P_Key table contents may have changed
Then
    - copy the end-port P_Key table contents to local cache
    If HasDefaultMLIDsTable attribute is True AND
    DefaultMLIDTableInUse attribute is True Then
        - clear the default MLID table of the end-port
        For each valid entry in P_Key table Do
            - wait until corresponding MLID array entry is non-zero
            - copy MLID array entry contents to local cache
        Endfor
    Endif
Endif
```

In accordance with an embodiment, IB implementations that support the use, configuration, and/or management of default MLID tables can include state-change events for the attributes used in the use, configuration, and/or management of default MLID tables (e.g., the attributes described above). Further, IB implementations that support the use, configuration, and/or management of default MLID tables can include verb interfaces for querying the value of the attributes used in the use, configuration, and/or management of default MLID tables (e.g., the attributes described above).

Figure 39:
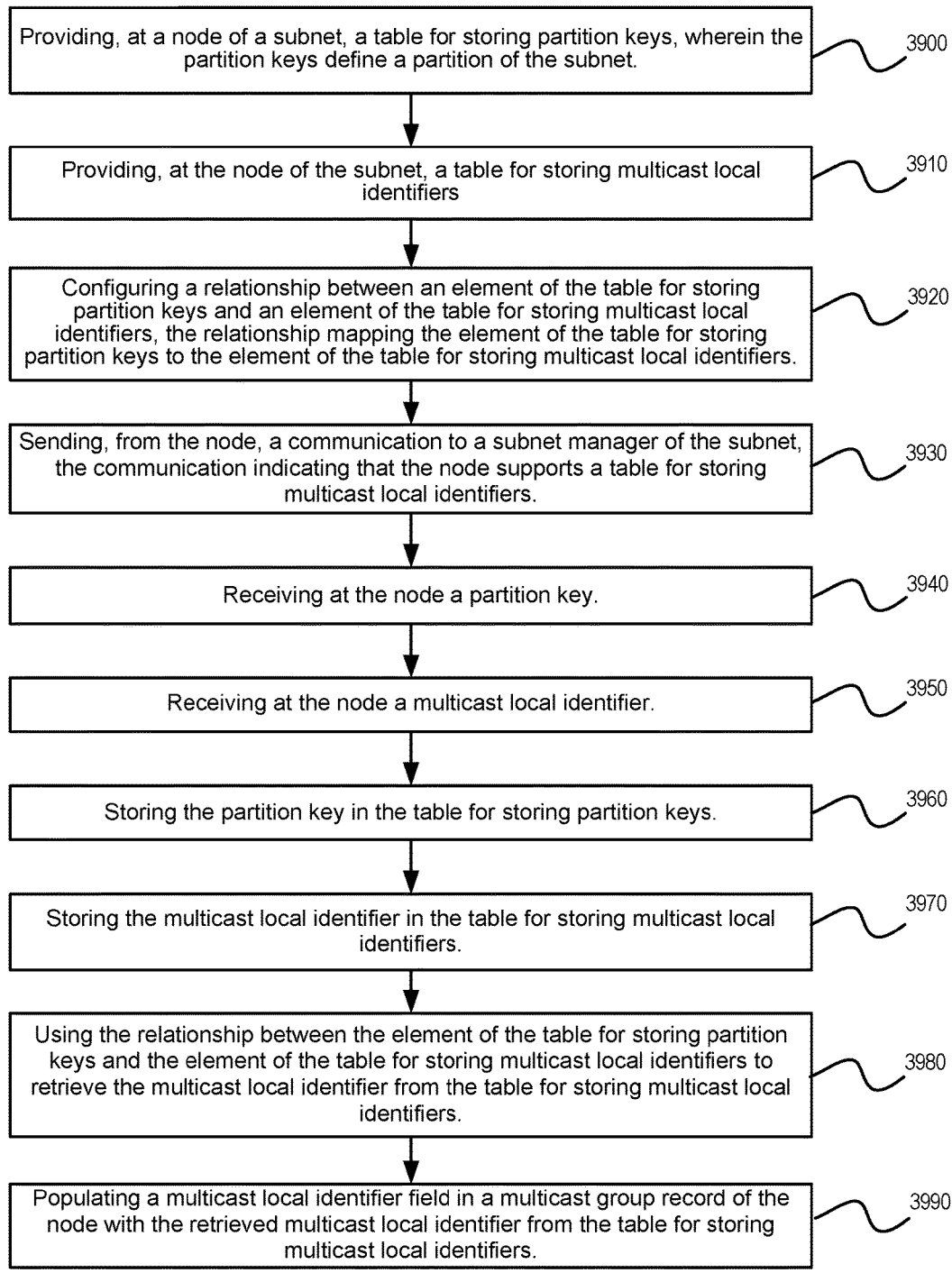
FIG. 39 illustrates a flow chart of a method for providing default multicast local identifier (MLID) values per partition as additional subnet management agent (SMA) attributes in a high performance computing environment, in accordance with an embodiment.

FIG. 39 illustrates a flow chart of a method for providing default multicast local identifier (MLID) values per partition as additional subnet management agent (SMA) attributes in a high performance computing environment, in accordance with an embodiment. At step 3900 a table for storing partition keys is provided at a node of a subnet, where the partition keys define a partition of the subnet. At step 3910, a table for storing multicast local identifiers is provided at the node of the subnet. At step 3920 a relationship between an element of the table for storing partition keys and an element of the table for storing multicast local identifiers is configured, where the relationship maps the element of the table for storing partition keys to the element of the table for storing multicast local identifiers. At step 3930, a communication to a subnet manager of the subnet is sent from the node, the communication indicating that the node supports a table for storing multicast local identifiers. At step 3940 a partition key is received at the node. At step 3950, a multicast local identifier is received at the node. At step 3960, the partition key is stored in the table for storing partition keys. At step 3970, the multicast local identifier is stored in the table for storing multicast local identifiers. At step 3980, the relationship between the element of the table for storing partition keys and the element of the table for storing multicast local identifiers is used to retrieve the multicast local identifier from the table for storing multicast local identifiers. At step 3990 a multicast local identifier field in a multicast group record of the node is populated with the retrieved multicast local identifier from the table for storing multicast local identifiers.

Dynamic Discovery of MLIDs by End-Ports

According to the IB Specification, a QP must be attached to a multicast group (i.e., associated with an MGID that represents the multicast group) in order to receive IB multicast messages. A QP is attached to or detached from a multicast group through the use of IB verbs. IB verbs are a service interface, including a set of semantics, that expose required behavior of an HCA to a consumer of the I/O services provided by the HCA (i.e., an IB client). Verbs describe operations that take place between an HCA and the IB client based on a particular queuing model for submitting work requests to the HCA and returning completion status. Verbs describe the parameters necessary for configuring and managing the channel adapter, allocating (creating and destroying) queue pairs, configuring QP operation, posting work requests to the QP, getting completion status from the completion queue.

It is a requirement of the IB Specification that an IB client know the MGID of an MCG that it wishes to join. In a conventional join request, the end-port associated with the IB client passes the known MGID to the SM so that the SM is aware of what MCG to join the end-port to. Moreover, as noted above, a QP must be attached to a multicast group (i.e., associated with an MGID that represents the multicast group) in order to receive IB multicast messages. Consequently, and in accordance with an embodiment, HCAs can support IB clients associating local QPs with the MGID of relevant multicast groups (MCGs) without sending a join request to the SM. Therefore, end-ports of such supporting HCAs can begin to receive multicast packets of an MCG without sending a join request, to the SM, requesting membership in the MCG from which the packets are received.

Figure 40:
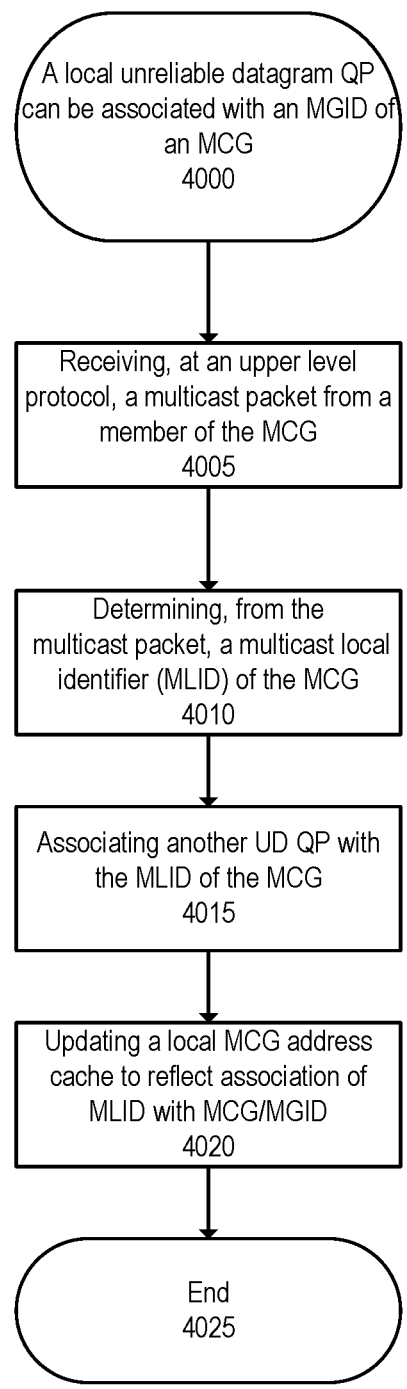
FIG. 40 illustrates a flowchart of a method for providing multicast group multicast local identifier (MLID) dynamic discovery on received multicast messages for relevant MGID (multicast global identifier) in a high performance computing environment, in accordance with an embodiment.

FIG. 40 illustrates a flowchart of a method for providing multicast group multicast local identifier (MLID) dynamic discovery on received multicast messages for relevant MGID (multicast global identifier) in a high performance computing environment, in accordance with an embodiment. At step 4000, a local unreliable datagram (UD) QP can be associated with an MGID of an MCG. At step 4005, a multicast packet from the MCG can be received at an ULP. At step 4010, the ULP can determine, from the multicast packet, an MLID of the MCG. At step 4015, the ULP can associate the MLID of the MCG with another UD QP. At step 4020, a local MCG address cache can be updated to reflect the association of the MLID with the MCG/MGID.

In accordance with an embodiment, HCAs can support a query parameter that can be evaluated to determine whether the HCA supports QP association with an MGID (i.e., an MCG) without the MLID being known. For example a "NoMLIDRequiredForQPMCGAttach" parameter may be included as a queryable parameter in supporting HCAs. The default value for such a parameter can be "false." The HCA interface provider can set the parameter to "true" when the HCA implementation supports an unknown MLID (e.g., a value of zero in the MLID parameter) during QP to MCG association operations. Such a parameter may be queried by an IB client to determine whether the HCA supports an unknown MLID (e.g., a value of zero in the MLID parameter) during QP to MCG association operations. Appropriate verbs can also be supplied by the interface provider for querying the parameter and for QP to MCG association with an unknown MLID.

In accordance with an embodiment, Listing 5 shows exemplary pseudo code for associating a QP with an MCG depending on whether the queried HCA supports an unknown MLID during QP to MCG association operations.

---

Listing 5

If NoMLIDRequiredForQPMCGAttach is True Then
   - perform QP attach to MCG operation setting MLID to 0;
Else
   - perform SM/SA request to join relevant MCG;
   - get response from SM/SA including SM allocated MLID for relevant MCG;
   - perform QP attach to MCG operation setting MLID to SM allocated MLID;
Endif

---

Figure 41:
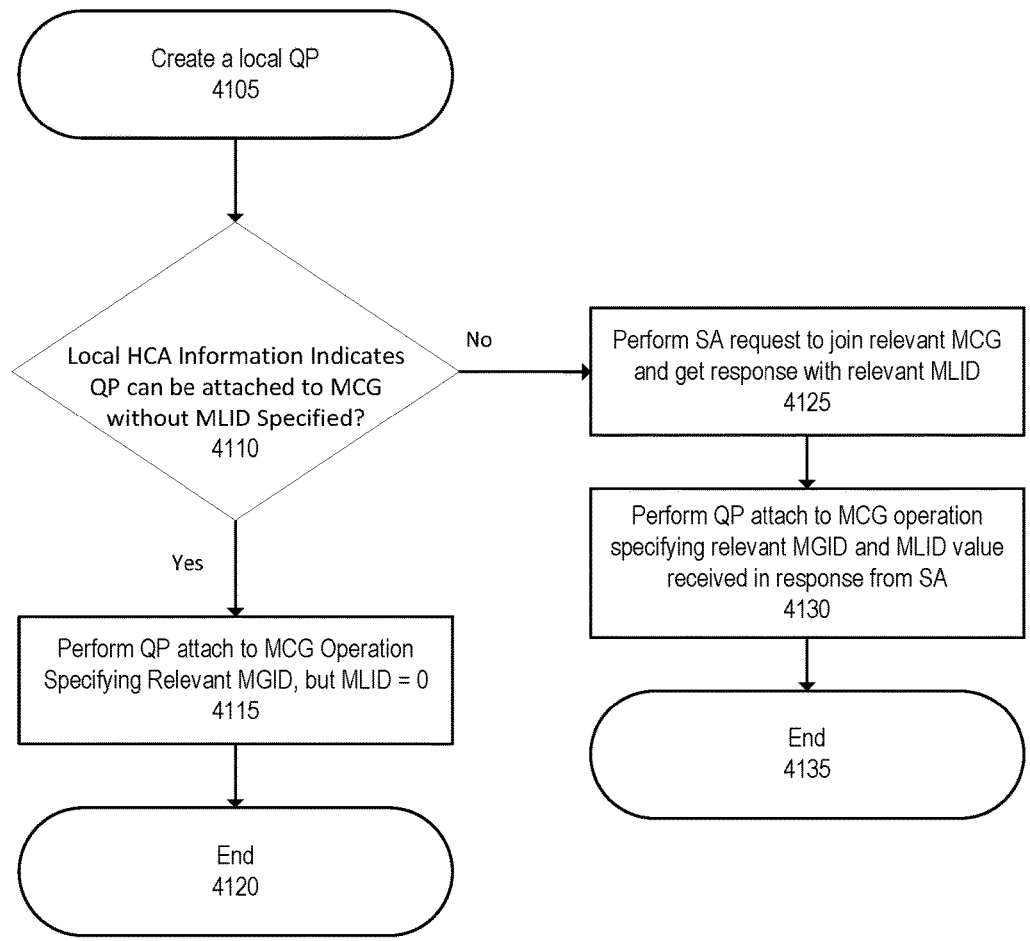
FIG. 41 is a flowchart of a method for providing multicast group multicast local identifier (MLID) dynamic discovery on received multicast messages for a relevant MGID (multicast global identifier) in a high performance computing environment, in accordance with an embodiment.

FIG. 41 is a flowchart of a method for providing multicast group multicast local identifier (MLID) dynamic discovery on received multicast messages for a relevant MGID (multicast global identifier) in a high performance computing environment, in accordance with an embodiment. More particularly, the figure shows a flowchart for deciding local QP association with MCG with or without MLID.

The method can start with creating a local QP at step 4105. If local HCA information indicates that QP can be attached to MCG without MLID specified (at step 4110), then the QP can be attached to MCG via an operation specifying relevant MGID, but MLID=0, at step 4115. If not, then a conventional SA request to join relevant MCG and get response with relevant MLID can be performed at step 4125. Then, a QP attach to MCG operation specifying relevant MGID and MLID value received in response from SA can be performed at step 4130.

A request from an end-port to join an MCG generally ensures that two necessary aspects of multicast packet delivery are performed. First, a successful join request includes the SM incorporating the requesting end-port into the multicast route of the MCG that the end-port has requested to join. Second, one or more QPs are associated with the MGID of the MCG that the end-port has requested to join. As noted above, the second aspect can be performed without the end-port sending a join request to the SM, since the information to perform the second aspect is known by, e.g., the IB client or a ULP. Moreover, as also described above, the SM can incorporate the appropriate end-ports into the multicast route of an MCG implicitly, as a matter of administrative/subnet policy, or as a side-effect of a "create join" operation for the MCG—for instance, the relevant end-port may be included in the spanning tree route for an MCG as a product of MCG membership defined relative to partition membership, as described above. Thus, in accordance with an embodiment, multicast packets can be received by an end-node without the end-node sending a conventional join request to the SM.

In order to send a multicast packet, however, and end-port must know the MLID associated with the MCG. The IB Specification does not require that an end-node be aware of the MLID of an MCG in order to join the MCG, since, conventionally, the MLID will be supplied by the SM to the end-port in the MCMemberRecord attribute returned to the end-port by the SM in response to a join request. If it can be assumed, however, that an end-port has been incorporated into the multicast route for an MCG, and that a QP has been associated with the MGID of the same MCG, there are other options for an end-port to learn the MLID of the MCG beyond sending, and receiving a response to, a conventional join request.

In accordance with an embodiment, an IB client/ULP can learn the MLID of an MCG from inspecting the MLID field of a multicast packet received at the end-port associated with the IB client/ULP. Each multicast packet also includes the MGID of the MCG that the packet is associated with. Accordingly, the IB client/ULP can determine the MGID included in the received multicast packet, then inspect the MLID (i.e., the DLID of the received multicast packet) and store the discovered MLID as the MLID of the MCG represented by the MGID determined from the received packet. Thus, the IB client/ULP can dynamically learn the MLID of the MCG without sending, and receiving a response to, a conventional MCG join request.

One challenge in learning the MLID of an MCG by determining the MGID and inspecting the MLID field of a multicast packet is that there must be an initial multicast packet sent including the relevant MLID. Regarding an MCG dynamically created by an end-port performing a create/join operation, in accordance with an embodiment, the IB client/ULP associated with the creating end-port can be configured to send an initial multicast packet (e.g., a gratuitous ARP). MCG member end-ports can then perform inspection on this delivered packet.

In the case of SM-created MCGs, however, there would be no creating MCG member end-port responsible for sending an initial multicast packet after creation of the multicast group. In accordance with an embodiment, in such a case, the SM/SA (or a related special service—e.g., a daemon executing in concert with the SM) could be responsible for generating an initial multicast packet. When generating an initial multicast packet for an MCG, however, the SM (or daemon) may not be aware of the multicast packet protocol for which the packet should be generated. In accordance with an embodiment, a convention defining a generic multicast packet type that can be delivered to any MCG member end-ports, and treated uniformly by ULPs/IB clients, can be used by the SM when sending out initial multicast packets. In accordance with such a convention, relevant IB Clients/ULPs can ignore multicast packets adhering to this convention except for inspecting/learning of the MLID contained in the packet and any other MLID-related information included in the packet.

In accordance with an embodiment, in addition to the relevant MLID and MGID (which is included in every multicast packet by default) an initial multicast packet may include information that indicates whether the included MLID is a partition specific MLID (i.e., a default MLID for all MCGs created in the context of the relevant partition, as described above). For example, an initial multicast packet convention, or protocol, may include information (e.g., within a special initial multicast packet payload and/or the initial multicast packet header) that indicates whether the initial multicast packet identifies a partition specific MLID, or a dedicated MLID. If the initial multicast packet identifies a partition specific MLID, the initial multicast packet can also include the P_Key of the partition for which the MLID of the packet is the default MLID of.

In accordance with an embodiment, when partition specific default MLIDs (as described in detail, above) are employed in the subnet, it is possible for any end-port to learn the MLID of any MCG that is defined in the context of a particular partition by inspecting the MLID of any multicast packet associated with the particular partition. This is true even if another dedicated (i.e., non-partition specific) MLID (or pair of dedicated MLIDs) is associated with the MCG, since there is no requirement in IB for end-nodes to enforce a specific MLID to be used with any MGID, and since the IB Specification explicitly allows multiple MGIDs to be associated with a single MLID.

In accordance with an embodiment, Listing 6 shows exemplary pseudo code for associating an MLID, learned from an incoming multicast packet, with a known MGID, and the updating of a default MLID table (if necessary).

Listing 6

```
- receive incoming initial multicast packet;
If initial multicast packet and indicates dedicated (non-partition specific)
MLID Then
    - update local MGID to MLID mappings with received MLID;
Elseif initial multicast packet indicates partition specific MLID Then
    - update local default partition table with received MLID;
Else
    - get local MCG information associated with received MGID;
    If (no MLID value mapped to received MGID) Or (received MLID
    already in default partition table) Then
        - update local MGID to MLID mappings with received MLID;
    Endif
Endif
```

Figure 42:
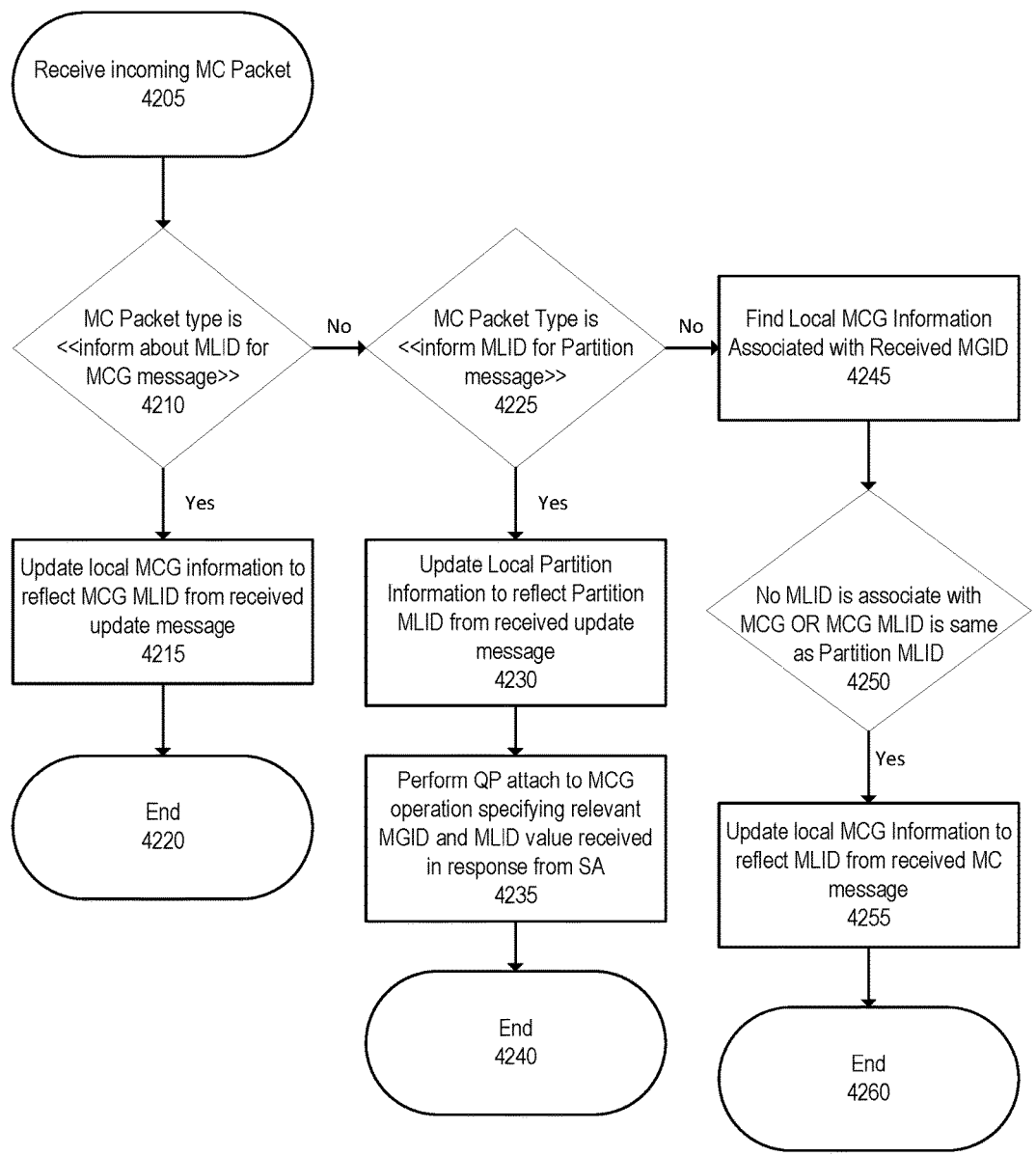
FIG. 42 is a flowchart of a method for providing multicast group multicast local identifier (MLID) dynamic discovery on received multicast messages for relevant MGID (multicast global identifier) in a high performance computing environment, in accordance with an embodiment.

FIG. 42 is a flowchart of a method for providing multicast group multicast local identifier (MLID) dynamic discovery on received multicast messages for relevant MGID (multicast global identifier) in a high performance computing environment, in accordance with an embodiment. More particularly, the figure shows a flowchart for registering MLID as a result of incoming MC packets—including packets that confirm to an initial multicast packet convention and that include information (e.g., within a special initial multicast packet payload and/or the initial multicast packet header) that indicates whether the initial multicast packet identifies a partition specific MLID, or a dedicated MLID.

The method can start at step 4205 with receiving an incoming multicast packet. If the multicast packet is an initial multicast packet (e.g., a packet that conforms to an initial multicast convention or protocol) and the initial multicast packet indicates a dedicated (non-partition specific) MLID (at step 4210), then local MCG information to reflect MCG MLID from the received packet can be updated at step 4215. Else, at step 4225, if the multicast packet is an initial multicast packet and the initial multicast packet indicates a partition specific MLID, then the local Partition information can be updated to reflect the partition specific MLID from the received multicast packet at step 4230. Else, at step 4245, the method can find local MCG info associated with received MGID. If No MLID is associated with MCG or MCG MLID is the same as Partition MLID, then the method can update local MCG information to reflect MLID from the received multicast packet at step 4255.

In accordance with an embodiment, Listing 7 shows exemplary pseudo code for keeping track of both partition specific MLIDs, as well as dedicated MLIDs for outgoing packets.

Listing 7

```
- get MGID from outgoing multicast packet;
- look up MCG record for outgoing MGID;
If MCG record reflects dedicated MCG MLID Then
    - packet DLID = MCG MLID from MCG Record;
    - send multicast packet;
Elseif default partition table indicates partition specific MLID Then
    - packet DLID = partition specific MLID;
    - send multicast packet;
Else
    - record that MLID must be determined before MC packet can be sent;
    - start timeout period;
Endif
While Timeout period not expired Do
    - wait until MLID determined (go to first If statement);
Endwhile
    - timeout
```

Figure 43:
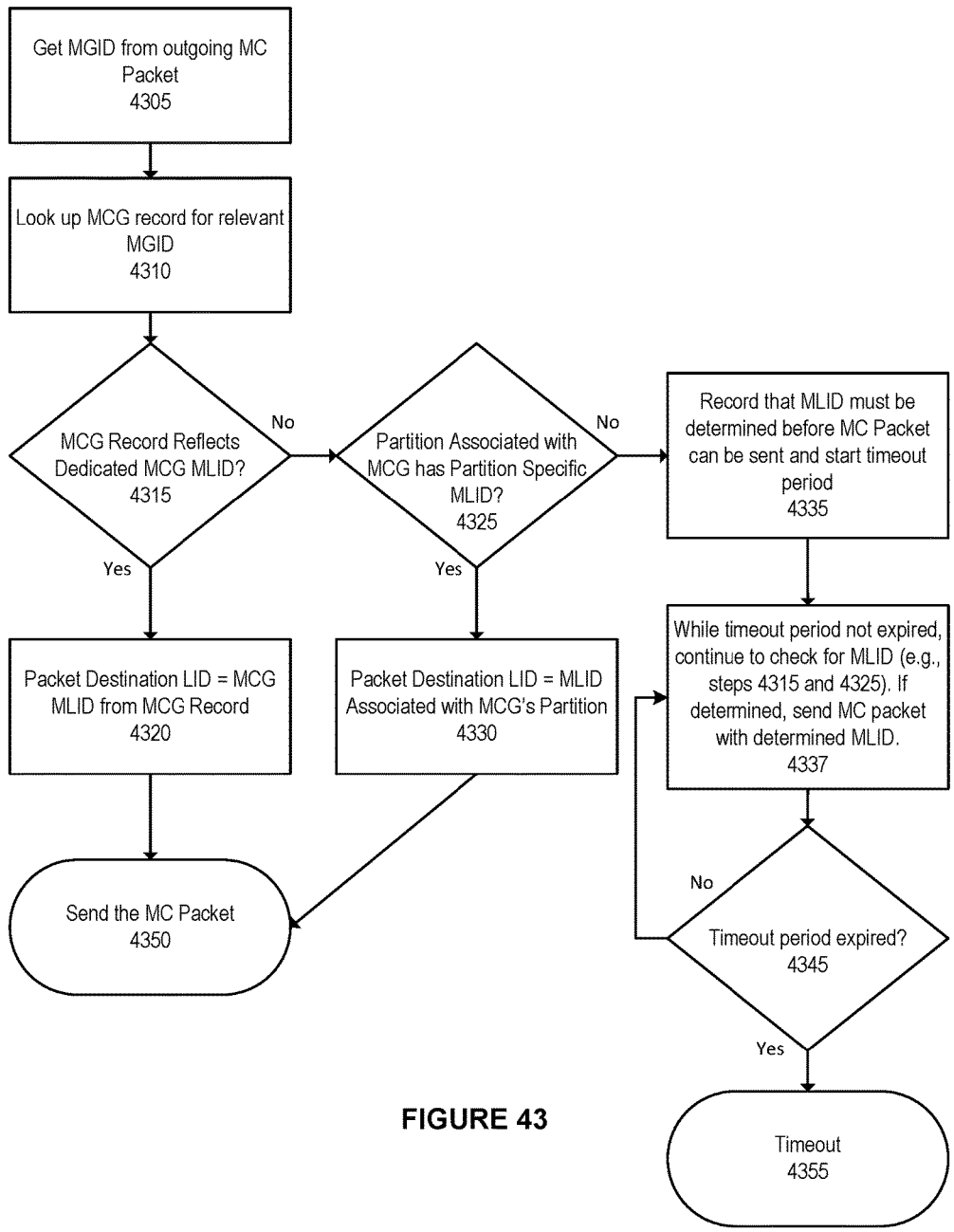
FIG. 43 illustrates a flow chart for maintaining records of both partition specific MLIDs as well as dedicated MCG MLIDs for outgoing multicast packets, in accordance with an embodiment.

FIG. 43 illustrates a flow chart for maintaining records of both partition specific MLIDs as well as dedicated MCG MLIDs for outgoing multicast packets, in accordance with an embodiment. At step 4305, the MGID from outgoing MC packet is retrieved. At step 4310 the MCG record for the retrieved MGID is looked up. At decision 4315, if the MCG record reflects a dedicated MCG MLID, then the Packet Destination LID is set to the dedicated MCG MLID from the MCG Record at step 4320 and the MC packet is sent at step 4350. Else, if a partition associated with the MCG has an associated default (partition specific) MLID (step 4325), then the Packet Destination LID is set to the default MLID associated with the MCG's partition, and the MC packet is sent at step 4350. Else (at step 4335), the method can record that the MLID must be determined before a multicast packet can be sent, and a timeout period can be started at step 4335. Whether the MLID for the relevant MGID has been determined can continue to be checked until the time period expires. If the MLID has not been determined by the expiration of the timeout period, then the method can time-out and end (step 4355). If, however the MLID is determined within the timeout period (e.g., at either step 4315 or 4325), then the packet can be sent with the correct MLID.

Still another challenge associated with the delivery of initial multicast packets for inspection/learning of the included MLID is that host nodes and associated end-nodes may start/initialize at any time, not just at subnet start/initialization. Hence, in order to ensure that such late-arriving nodes/ULPs/end-ports are able to effectively learn relevant MLIDs, a regular, timed, sending of "initial" MC packets (e.g., initial multicast packets that conform to an MLID learning packet convention, as described above) must be performed such that MLID learning by late starting/initializing nodes/end-ports can learn M LIDs within reasonable delays.

In accordance with an embodiment, Listing 8 shows exemplary pseudo code for sending initial multicast packets using both a special initial multicast packet protocol, as well as leveraging protocols such as Reverse Address Resolution Protocol (RARP) in partitions with IPoIB enabled. This code can be executed from, for example, an SM co-located daemon associated with a component responsible for the creating of the relevant MCG. There can be one daemon context per relevant partition:

Listing 8

```
While (any MCG created by local component requires update service) Do
    - wait for an amount of time;
    If end-port is member of relevant partition Then
        If IPoIB is enabled in relevant Partition Then
            - Send IPoIP RARP multicast packet;
        Endif
        If Information MCG exists in relevant Partition Then
            - send initial multicast packet indicating partition specific
              MLID for relevant partition;
            For all partition MCGs with dedicated MLIDs Do
                - send initial multicast packet for relevant MCG
                  indicating dedicated MLID;
            Endfor
        Endif
    Else
        If Information MCG exists in default or special Partition Then
            - send initial multicast packet indicating partition specific
              MLID for default or special partition;
            For all owned MCGs with dedicated MLIDs Do
                - send initial multicast packet for relevant MCG indicating
                  dedicated MLID;
            Endfor
        Endif
    Endif
Enddo
```

Figure 44:
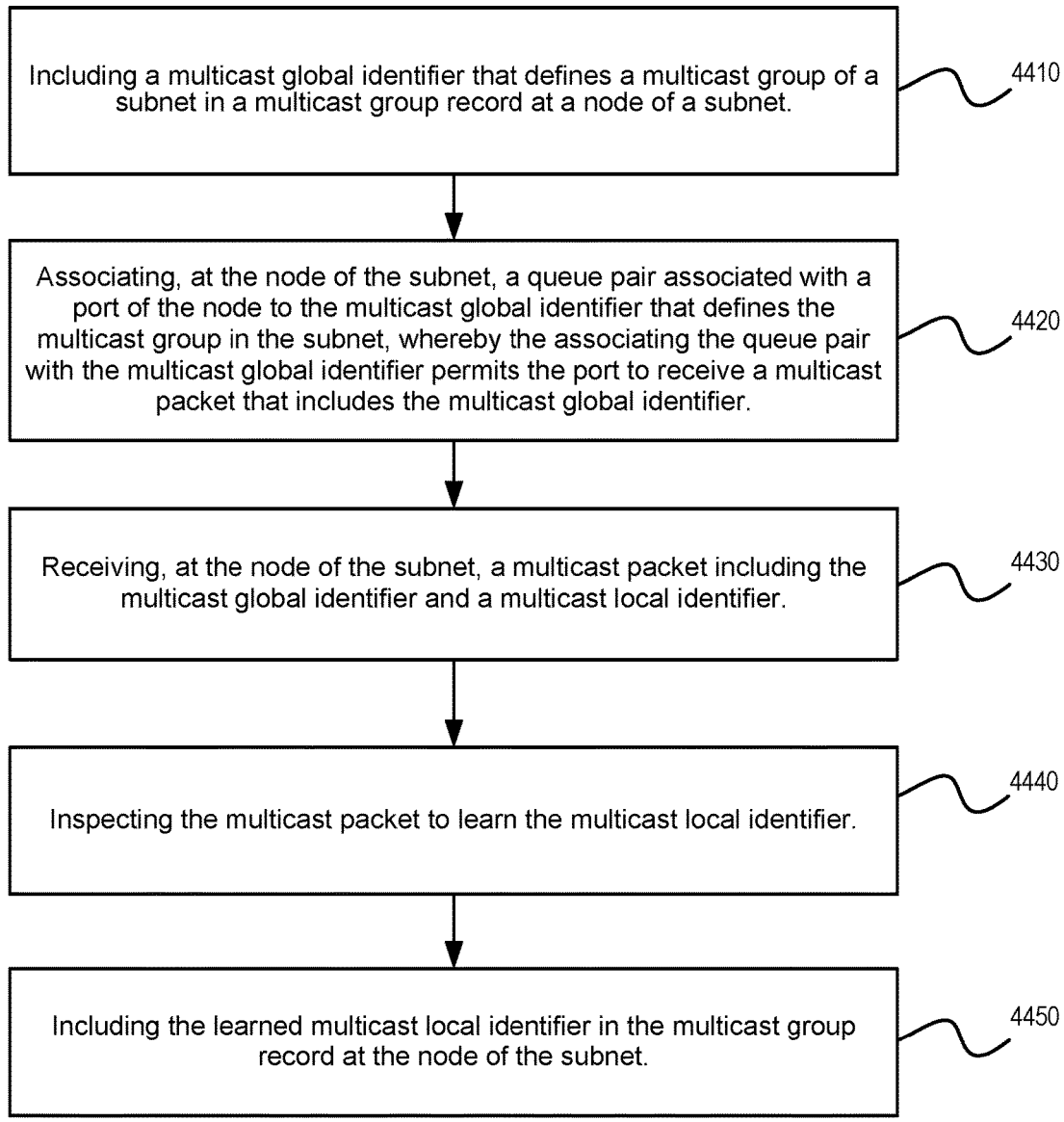
FIG. 44 illustrates a flow chart for a method of providing end-node dynamic discovery of a multicast local identifier in a high performance computing environment, in accordance with an embodiment.

FIG. 44 illustrates a flow chart for a method of providing end-node dynamic discovery of a multicast local identifier in a high performance computing environment, in accordance with an embodiment. At step 4410, a multicast global identifier that defines a multicast group of a subnet is included in a multicast group record at a node of a subnet. At step 4420, a queue pair associated with a port of the node is associated with the multicast global identifier that defines the multicast group in the subnet, whereby associating the queue pair with the multicast global identifier permits the port to receive a multicast packet that includes the multicast global identifier. At step 4430, a multicast packet including the multicast global identifier and a multicast local identifier are received at the node. At step 4440, the multicast packet is inspected to learn the multicast local identifier. At step 4450, the learned multicast local identifier is included in the multicast group record at the node of the subnet.

Explicit MLID Assignment for Default and Dedicated MLIDs

In conventional implementations, different master SM instances allocate MLID values based on local state information and as consequence of IB clients requesting new multicast groups to be defined. In such a scenario any master SM restart or failover, or any subnet-merge operation can lead to different MLIDs being used for different MGIDs (i.e., different MGID to MLID mappings), and thereby can cause non-trivial delays before multicast communication is again fully operational between relevant end-ports.

In accordance with an embodiment, an explicit MLID assignment policy can be provided (as, e.g., administrative input) that explicitly defines which MLIDs will be used for which partitions in an implementation where partition specific default MLID values (as described above) are in use. Further, an MLID assignment policy can also define which dedicated MLIDs will be associated with given MGIDs (for example, partition independent MLIDs). By employing such an MLID assignment policy, a new or restarted master SM can observe (and verify) the MLIDs used for existing IB partitions, instead of generating new MGID to MLID mappings. In this way, changes in MLID associations for any corresponding MGID can be avoided as a result of master SM restarts or failovers, or any subnet-merge operations.

Figure 45:
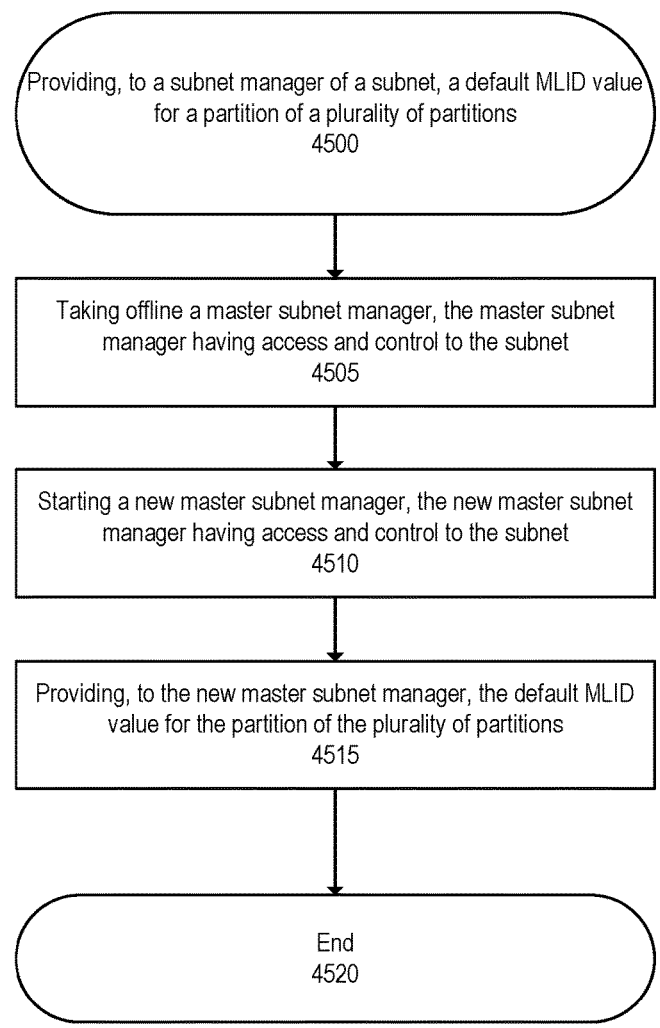
FIG. 45 illustrates a flowchart of a method to provide explicit multicast local identifier (MLID) assignment for partition specific default MLIDs defined as SM policy input, in accordance with an embodiment.

FIG. 45 illustrates a flowchart of a method to provide explicit multicast local identifier (MLID) assignment for partition specific default MLIDs defined as SM policy input, in accordance with an embodiment. At step 4500, the method can provide, to a subnet manager of a subnet, a default MLID value for a partition of a plurality of partitions. At step 4505, the method can take offline a master subnet manager, the master subnet manager having access and control to the subnet. At step 4510, the method can start a new master subnet manager, the new master subnet manager having access and control to the subnet. At step 4515, the method can provide, to the new master subnet manager, the default MLID value for the partition of the plurality of partitions. At step 4520, the method can end.

Figure 46:
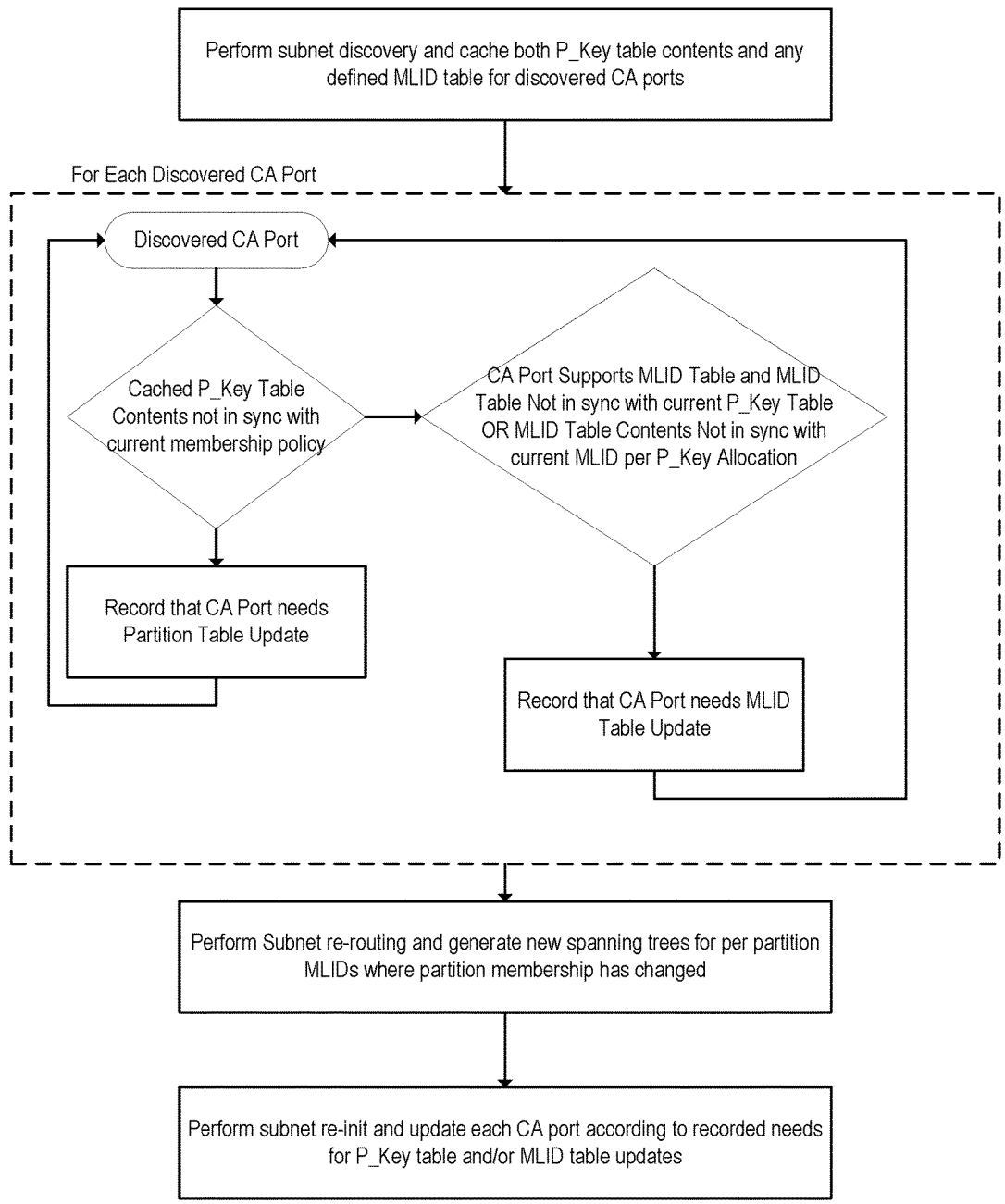
FIG. 46 illustrates a flowchart of a method to provide explicit multicast local identifier (MLID) assignment for per partition default MLIDs defined as SM policy input, in accordance with an embodiment.

FIG. 46 illustrates a flowchart of a method to provide explicit multicast local identifier (MLID) assignment for per partition default MLIDs defined as SM policy input, in accordance with an embodiment. Particularly, FIG. 46 is a flow chart of a method for verifying existing MLID/P_Key index (e.g., P_Key table to default MLID table mappings, as described, above) associations during subnet re-discovery. The method can perform subnet discovery and cache both P_Key table contents and any defined MLID table for discovered HCA ports. For each discovered HCA port, the method can, if the cached P_Key table contents are not in sync with current membership policy, then record that CA port needs partition table update. Else, if the HCA port supports MLID table and MLID table is not in sync with current P_Key table or MLID table contents is not in sync with current MLID per P_Key allocation, then the method can record that HCA port needs MLID table update. The method can then perform subnet re-routing and generate new spanning trees for per partition MLIDs where partition membership has changed. The method can then perform subnet re-init and update each CA port according to recorded needs for P_Key table and/or MLID table updates.

In accordance with an embodiment, MLID assignment policy can specify the value of four policy variables. MLID assignment policy can specify the starting and ending values of a range of MLIDs allocated for MCGs explicitly defined in the subnet (e.g., via administrative input). Additionally, the MLID assignment policy can specify the starting and ending values of a range of MLIDs allocated for MCGs dynamically created by end-ports. As MLIDs are assigned to each type of MCG, the assignments can be stored, e.g., in a non-volatile format, where the present master SM and any future SMs will be able to determine the MLID to MGID (i.e., MCG) mappings, and reuse these mappings, instead of creating new MLID to MGID mappings.

In a conventional implementation, all partition definitions in a subnet are based on explicit policy input to the SM. In accordance with an embodiment, conventional partition policy input conventions can be extended to include explicit MLID assignment policy. For example, an SM can receive subnet partition policy input for the creation of a partition. The policy input can include a partition number (i.e., a P_Key), a partition name, an IPoIB flag (that indicates that IPoIB is enabled for the partition members) and membership specifications for ports in the subnet. Additionally, the policy input can include an MLID value that is the value of the MLID assigned to an MCG that is created in the context of the partition as a result of the policy input. In accordance with an embodiment, the MLID value included in the policy input can be a base value that indicates the value of a full partition member MLID where the base value conforms to a convention (as discussed above) from which a limited partition MLID value can be derived (or vice versa).

In accordance with an embodiment, when an MCG is created in the context of a partition, e.g., using explicit policy input as described above, the MLID value can be an MLID value from the range of MLIDs allocated for MCGs explicitly defined in the subnet. In accordance with an embodiment, the MLID value may not be explicitly defined in the policy input, but rather, it can be assigned by the SM from the range of MLIDs allocated for MCGs explicitly defined in the subnet.

In accordance with an embodiment, in subnets employing MLID assignment policy, subnet merge and split can take place without a change of MLID-to-MGID mappings. Inter-switch cross links between independent subnets can be used for selective forwarding of MC packets without any need for MLID-to-MGID re-mapping. Moreover, IB-to-IB router based connectivity between different IB subnets can be implemented without any need to allocate header mapping resources to perform global route header to local route header mappings.

Figure 47:
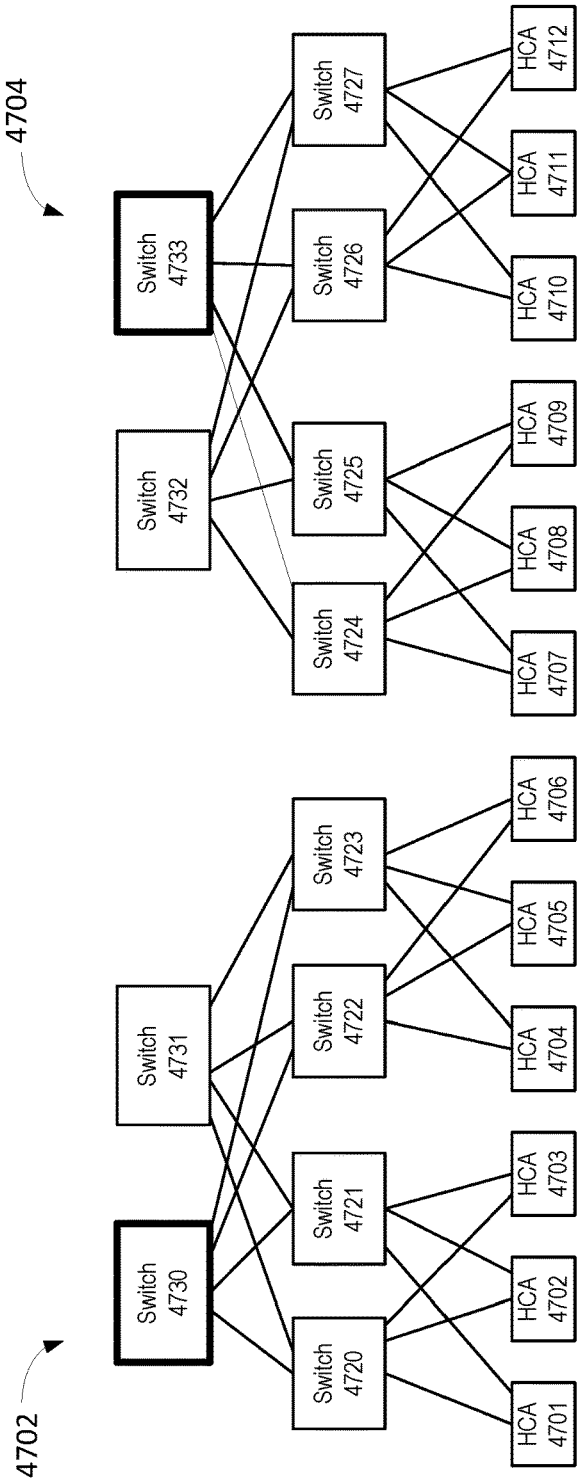
FIG. 47 illustrates two independent fat-tree based subnets, each having explicit multicast local identifier (MLID) assignment for partition specific default MLIDs defined as SM policy input, before a subnet merge operation, in accordance with an embodiment.

FIG. 47 illustrates two independent fat-tree based subnets, each having explicit multicast local identifier (MLID) assignment for partition specific default MLIDs defined as SM policy input, before a subnet merge operation, in accordance with an embodiment. As shown in FIG. 47 each subnet, subnet 4702 and 4704, includes a spanning tree for relevant MCGs/MLIDs with a single spine switch as root for the spanning tree in each subnet. In subnet 4702, spine switch 4730 is the root of the spanning tree for subnet 4702 (as indicated by the bold line defining switch 4730). Likewise, switch 4733 is the root of the spanning tree for subnet 4704. A spanning tree has been generated and corresponding MFTs have been distributed to the switches, in accordance with an embodiment (e.g., as described above).

With continued reference to FIG. 47, the spanning tree for subnet 4702 can indicate switch 4730 as the root for the spanning tree in subnet 4702, in accordance with an embodiment. In this case, the spanning tree will not include any links to/from switch 4731. Likewise, the spanning tree for subnet 4704 can indicate switch 4733 as the root for the spanning tree in subnet 4704, and will not include any links to/from switch 4732.

Figure 48:
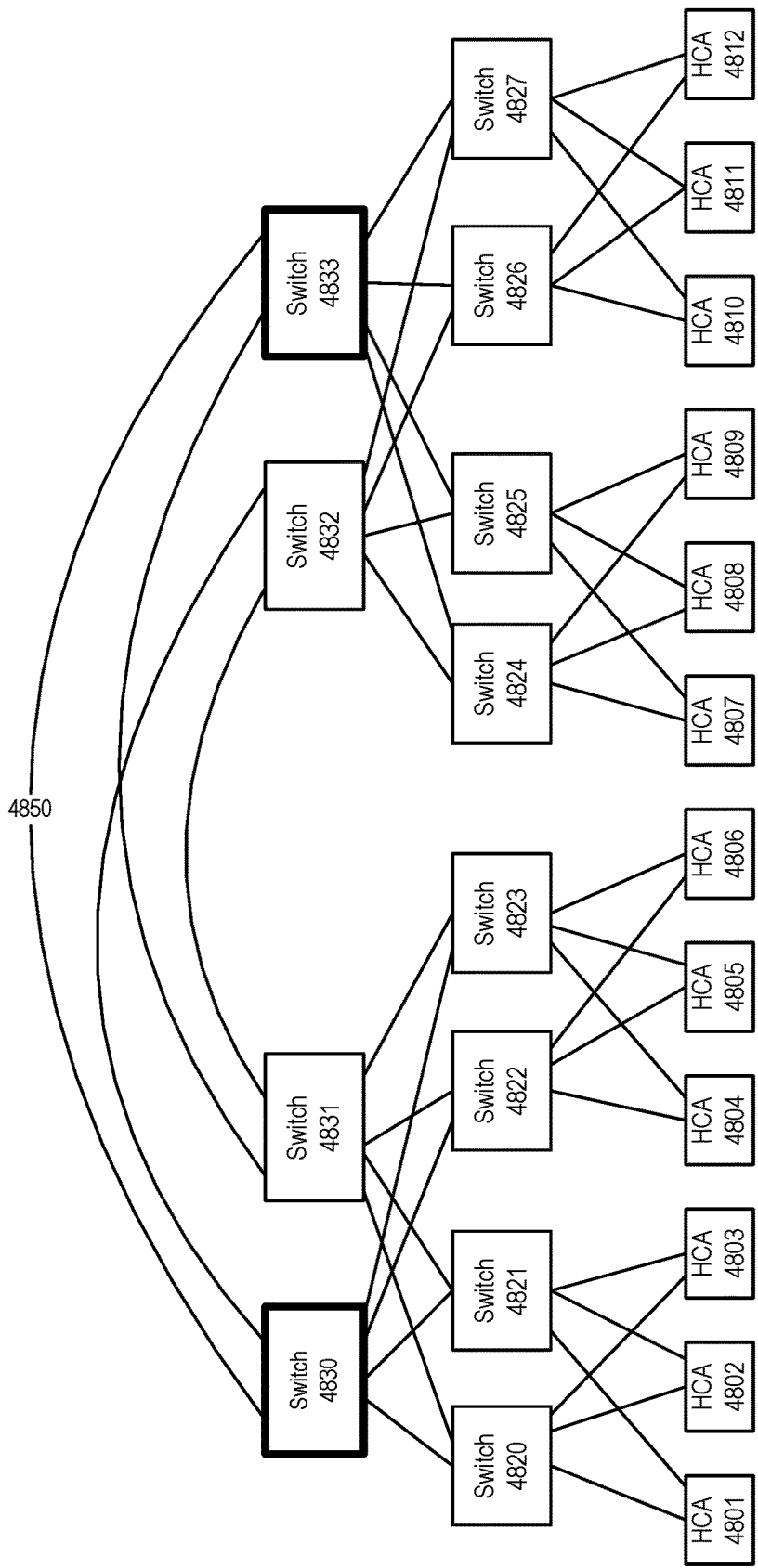
FIG. 48 shows a single fat-tree based subnet having explicit multicast local identifier (MLID) assignment for partition specific default MLIDs defined as SM policy input after a subnet merge operation.

FIG. 48 shows a single fat-tree based subnet having explicit multicast local identifier (MLID) assignment for partition specific default MLIDs defined as SM policy input after a subnet merge operation. As shown in FIG. 48, the subnet merge operation is implemented by interconnecting the spines from each original subnet (i.e., subnets 4702 and 4704 of FIG. 47). In accordance with an embodiment, while employing the same policy based MLIDs in each original subnet, the only re-configuration required after the merge is to logically connect the two original spanning trees by updating the MFTs in the spine switches 4830 and 4833 to perform mutual forwarding. Thus, an entry in the MFT of switch 4830 can be made that forwards all multicast traffic that arrives at switch 4830 and that is bound for an end-port that is connected downstream of switch 4833 to switch 4833. Once such a packet arrives at switch 4833 (forwarded from switch 4830) the original MFTs generated as a result of the MLID assignment policy will forward the packet to MCG member end-ports. Accordingly, only the MFT of the spine switch 4830 would need to be updated as a result of the subnet merge. Likewise, only the MFT of spine switch 4833 would need be updated to forward packets received at switch 4833 and bound for end-ports downstream of spine switch 4830 to switch 4830. End-ports "downstream" of the spine switches would be, e.g., HCAs 4801-4812.

Default Multicast Group (MCG) for Announcements and Discovery

In accordance with an embodiment, the IB specification solves a problem of bootstrapping IB communication from a node by defining PortInfo Elements that specify the LID and SL (service level) values to be used for SA requests, and also by specifying that each port is at least limited member of a default partition.

In accordance with an embodiment, similarly, the IP-over-IB specification (which is not part of the InfiniBand specification) defines a default multicast group (MCG) that can be used for IP to IB address resolution. However, since IP-over-IB is not part of the IB specification it is therefore not a feature that can be relied on for a generic IB discovery, announcement and address resolution scheme.

In accordance with an embodiment, hence, in order to enable IB multicast operations in a well-defined way without depending on SA access, at least one IB multicast group (MCG) can be defined by the Subnet Manager and communicated to the IB clients via extended SMA attributes.

In accordance with an embodiment, by including the MCG definition as additional SMA level information, there is no dependency on that different IB client versions are in synch about the associated MGID. Also, the Subnet Manager may reserve one or more MGID values that are not currently reserved, and may then also prevent any creation of MCGs with MGID values that the SM intends to reserve for its own usage.

In accordance with an embodiment, an additional aspect of a dedicated MCG defined at SMA level is that it can be specified to be allowed to be used with any partition that is defined for the relevant port, and in that case the IB client can use the partition specific MLID(s) defined for that partition when sending MC messages.

In accordance with an embodiment, in order to implement basic announcement protocols, the same message format as used for peer-to-peer exchange of port and node attributes can be used. However, in this case, only the sender address info is specified and there is no target specified and no response expected.

In accordance with an embodiment, in order to also implement address resolution and discovery, one request message format specifying a target GID or GUID with expected response(s) from one specific node can be used. Also, in order to allow a generic discovery of available peer nodes, a fully or partially wild-carded target can be specified, and then all relevant receivers can send unicast responses with their local information.—This scheme would imply that fewer multicast messages are sent and thereby reducing the total overhead in terms of the number of "irrelevant" multicast messages forwarded through the IB fabric and received by different nodes.

In accordance with an embodiment, various InfiniBand specification enhancements/additions are contemplated by the above disclosure. One such additional SMA attribute is a port capability for supporting "DefaultMCG", with a default value of false. This attribute can be set to true by a supporting SMA upon link up. When set to true, an SM or master SM can update relevant SMA properties.

In accordance with an embodiment, a "DefaultMCG-MGID", a 128 bit integer, can be set (default 0—i.e., when DefaultMCG port capability is false).

In accordance with an embodiment, a "DefaultMCG-MQ_Key" a 32 bit integer, can be set (default 0—i.e., when DefaultMCG port capability is false).

In accordance with an embodiment, the IB spec defines conventional MCG metadata as comprising an MGID, a P_Key, an MLID, and other attributes. What is contemplated above defines a new MCG to multiple MLID (or MLID pair) value associations. Special MCG meta data can comprise an MGID (from Extended PortInfo), a partition Global Flag, and other attributes—(e.g., based on "FabricGlobalMinimalPathParameters" from extended PortInfo). The PartitionGlobalFlag implies that the MCG can be used with any locally defined P_Key value and the corresponding P_Key specific MLID as destination MLID when sending.

In accordance with an embodiment, an announcement multicast message can be provided. The announcement MC message can comprise a sender GUID and sender LID as part of the GRH and LRH of the MC message. The receiver of the announcement message can update cached information about the sender.

In accordance with an embodiment, a target specific discovery request MC message can be provided. This message can comprise the sender GUID and sender LID as part of GRH and LRH of MC message. The message type may be a targetdiscovery message. A receiver of this announcement message can check if the specified target information represents either an exact match or a wildcarded match of local information, and if so send a unicast response with relevant local information.

In accordance with an embodiment, various InfiniBand specification enhancements/additions are contemplated by the above disclosure. One such enhancement is a new class of announcement and discovery protocol messages. These can include an Announcement multicast message, a target specific discovery request multicast message, and a discovery response unicast message.

Figure 49:
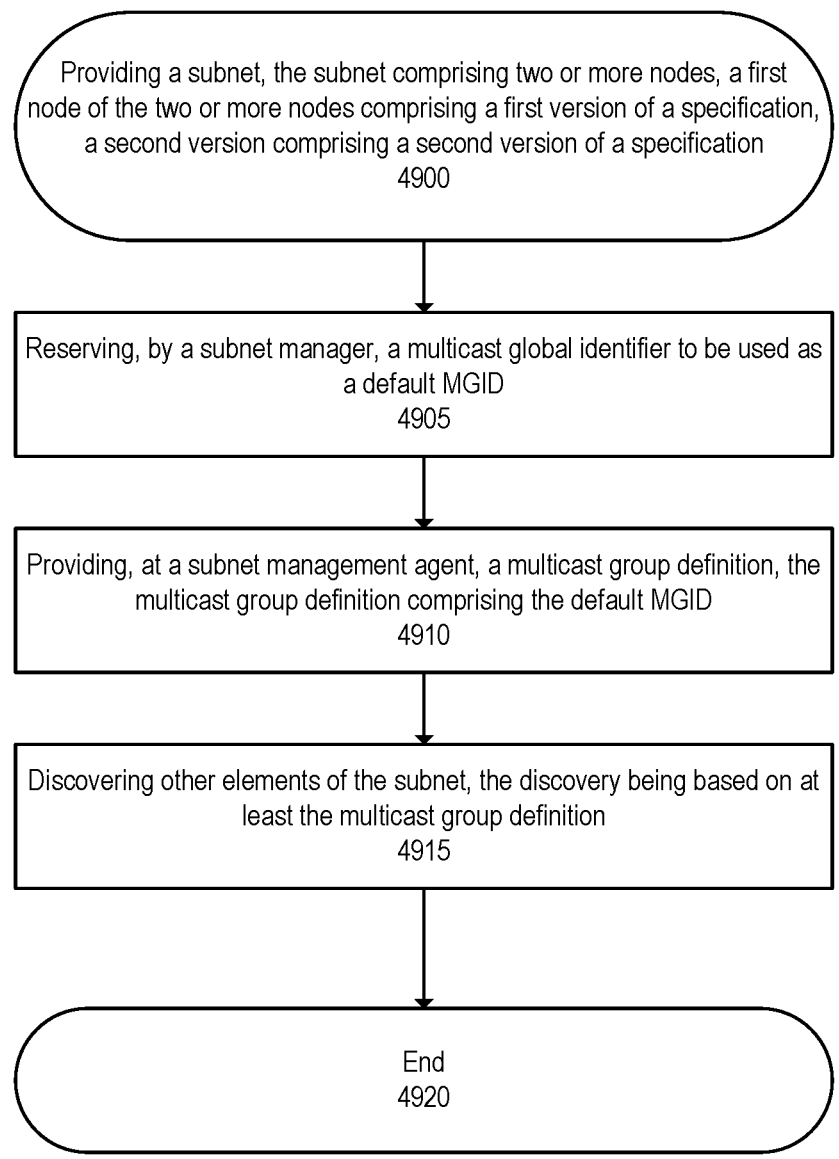
FIG. 49 illustrates a flowchart of a method to provide default multicast group (MCG) for announcements and discovery as extended port information in a high performance computing environment, in accordance with an embodiment.

FIG. 49 illustrates a flowchart of a method to provide default multicast group (MCG) for announcements and discovery as extended port information in a high performance computing environment, in accordance with an embodiment.

In accordance with an embodiment, at step 4900, the method can provide a subnet, the subnet comprising two or more nodes, a first node of the two or more nodes comprising a first version of a specification, a second version comprising a second version of a specification.

In accordance with an embodiment, at step 4905, the method reserve, by a subnet manager, a multicast global identifier to be used as a default MGID.

In accordance with an embodiment, at step 4910, the method provide, at a subnet management agent, a multicast group definition, the multicast group definition comprising the default MGID.

In accordance with an embodiment, at step 4915, the method can discover other elements of the subnet, the discovery being based on at least the multicast group definition.

Figure 50:
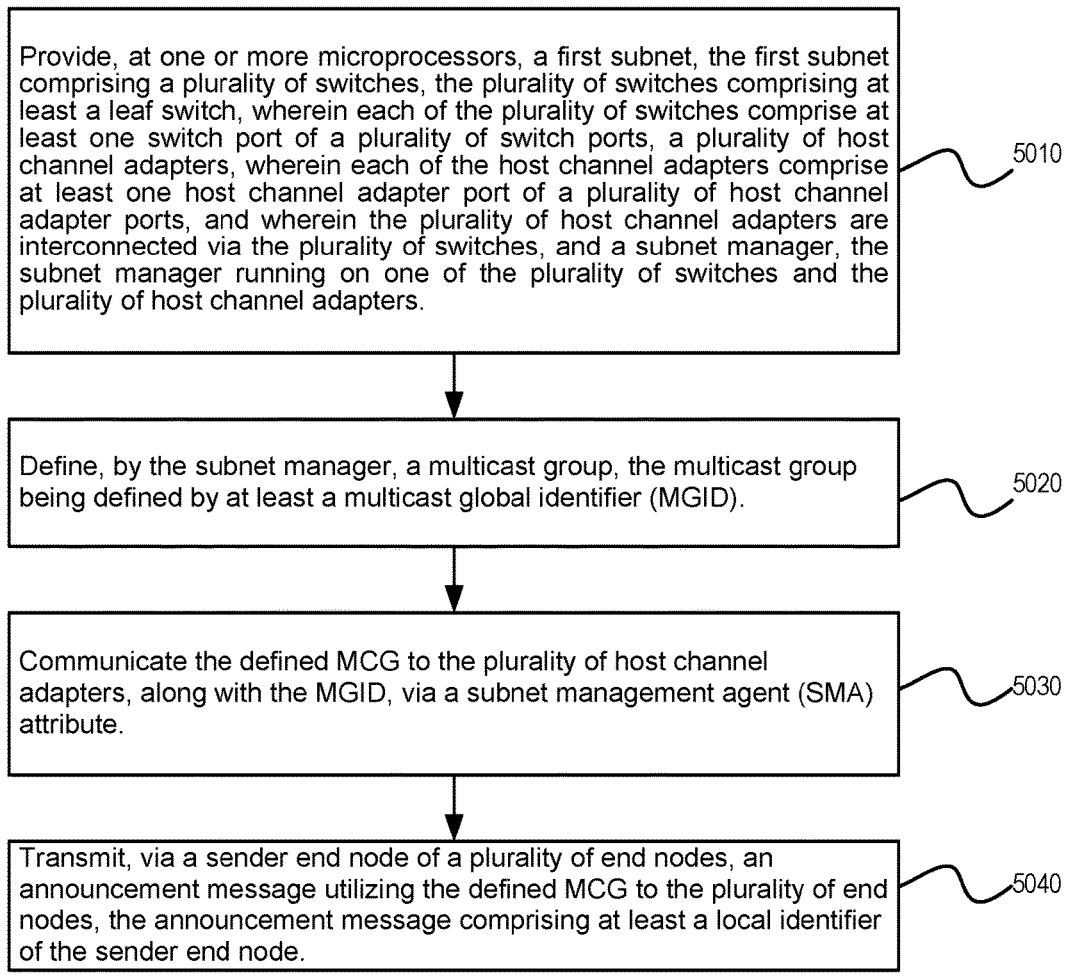
FIG. 50 illustrates a flowchart of a method to provide a default multicast group (MCG) for announcements and discovery as extended port information in a high performance computing environment, in accordance with an embodiment.

FIG. 50 illustrates a flowchart of a method to provide a default multicast group (MCG) for announcements and discovery as extended port information in a high performance computing environment, in accordance with an embodiment.

In accordance with an embodiment, at step S010, the method can provide, at one or more microprocessors, a first subnet, the first subnet comprising a plurality of switches, the plurality of switches comprising at least a leaf switch, wherein each of the plurality of switches comprise at least one switch port of a plurality of switch ports, a plurality of host channel adapters, wherein each of the host channel adapters comprise at least one host channel adapter port of a plurality of host channel adapter ports, and wherein the plurality of host channel adapters are interconnected via the plurality of switches, and a subnet manager, the subnet manager running on one of the plurality of switches and the plurality of host channel adapters.

In accordance with an embodiment, at step S020, the method can define, by the subnet manager, a multicast group, the multicast group being defined by at least a multicast global identifier (MGID).

In accordance with an embodiment, at step S030, the method can communicate the defined MCG to the plurality of host channel adapters, along with the MGID, via a subnet management agent (SMA) attribute.

In accordance with an embodiment, at step S040, the method can transmit, via a sender end node of a plurality of end nodes, an announcement message utilizing the defined MCG to the plurality of end nodes, the announcement message comprising at least a local identifier of the sender end node.

Default Multicast Group Proxy for Scalable Forwarding (5836)

In accordance with an embodiment, as the number of nodes that need to exchange information increases, the scalability of broadcast based announcement and discovery/address resolution protocols is reduced as the basic complexity is N squared when all N nodes send a multicast message to perform address resolution for all other nodes.

In accordance with an embodiment, by aggregating the request for address resolution for multiple target nodes in a single request multicast message, the scalability can be increased, but for large node sets this will still have limited scalability.

In accordance with an embodiment, in order to scale the protocols to cover arbitrary number of nodes, a hierarchical scheme can be introduced where the total system is divided into multiple domains where each such domain is represented by an MCG Proxy instance for the relevant protocols.

In accordance with an embodiment, each such proxy instance can receive MC based announcements and requests from nodes within its domain, but such MC requests would not be directly sent out beyond the boundaries of the local domain. Instead, the various proxies can exchange information via combination of MC based protocols among the proxies as well as bulk transfer of data as peer-to-peer traffic between pairs of proxies.

In accordance with an embodiment, the proxies can also be co-operating with the SM(s) in the subnet/fabric and can send MC based announcements for available nodes on behalf of the SM (i.e., similar to the unicast based SA event notifications.)

In accordance with an embodiment, privileged proxies may also be allowed to operate in a mode where they can send messages on behalf of other nodes in a way that makes the presence of the proxy transparent to the involved client nodes. In this case, the proxy would be able to use the source address information of the relevant node when forwarding requests or responses.

In accordance with an embodiment, in this way, a proxy that operates as a full member in a default partition (ref admin partition) would be able to respond to discovery requests from limited member client nodes and would thereby be able to enforce visibility rules based on the actual partition membership of the involved client nodes.

In accordance with an embodiment, proxy forwarded or generated requests, responses and announcements may also be explicitly identified as involving a proxy instance. In this case, the client node(s) receiving such messages would know that the IB source address of the message is associated with a proxy and not with the relevant peer node that the message relates to.

In order to provide the required isolation between domains within a single subnet, the SM must be able to identify domain boundaries as well as the various proxy instances so that even for a single logical MCG, the multicast routing is set up so that MC packets sent by non-proxies are not forwarded out of the domain.

In accordance with an embodiment, as long as domain boundaries exists between different IB switches, the same MLID can be used in different domains without any "accidental forwarding" between domains. However, if a single IB switch is to be shared by two different domains, then two MLIDs would have to be allocated for the same logical MCG. Hence, in practice, it would not make sense to have domain boundaries within a single switch.

In accordance with an embodiment, in fat-tree based topologies, it would make sense to have individual leaf switches as a single domain, or a sub-tree with a unique set of switches but with fully redundant physical connectivity between all involved leaf switches could represent a domain.

In accordance with an embodiment, various IB specification enhancements are envisioned. On such enhancement can be an extension to Announcement and Discovery Protocol Messages. Such an extension would allow the explicit representation of proxies generation and forwarding.

In accordance with an embodiment, another such enhancement can allow for specified protocols for inter-proxy communication, but may also be left as an area for vendor, consortium or distro specific innovation and value-add.

In accordance with an embodiment, in order to provide domain and proxy aware multicast routing, the SM must be aware of both the domain boundaries as well as the individual proxy ports. This can be implemented via SM implementation specific configuration policy, or it could be implemented via in-band discovery when both proxy presence and domain boundaries represent node local configuration information.

Figure 51:
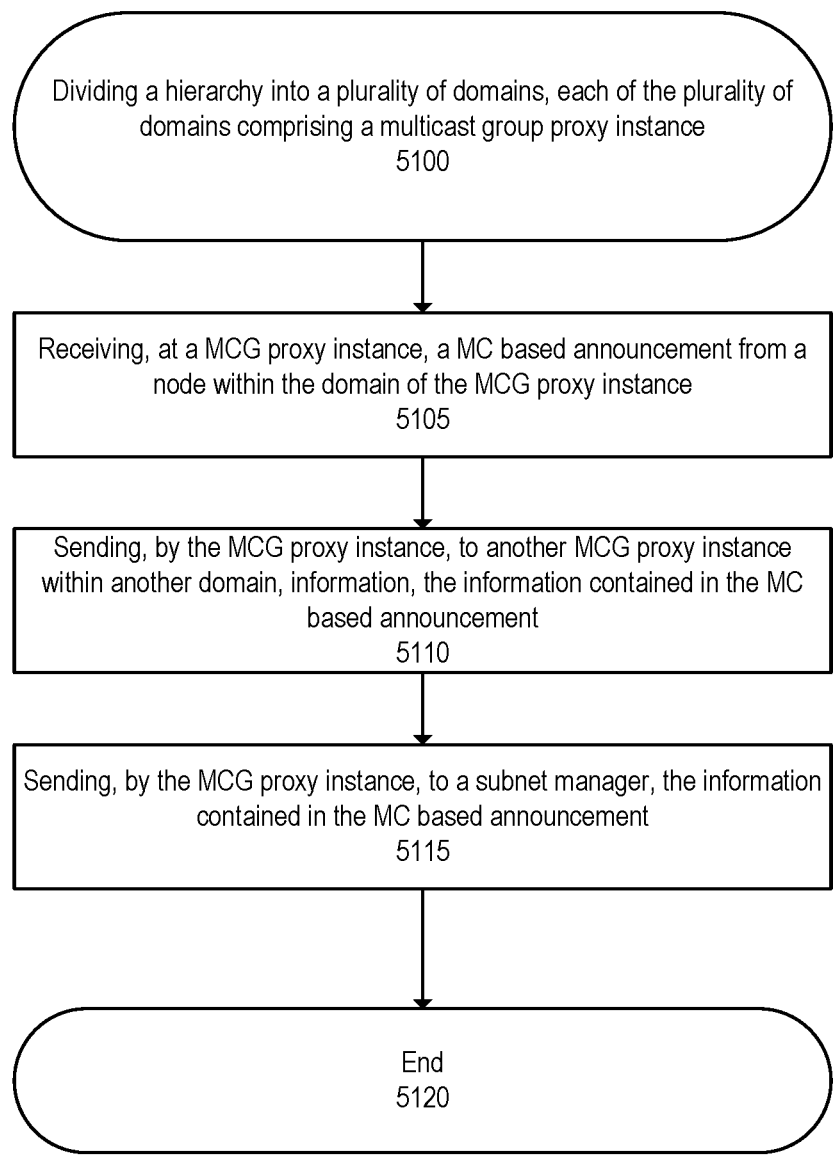
FIG. 51 illustrates a flowchart of a method to provide default multicast group (MCG) proxy for scalable forwarding of announcements and information request intercepting in a high performance computing environment, in accordance with an embodiment.

FIG. 51 illustrates a flowchart of a method to provide default multicast group (MCG) proxy for scalable forwarding of announcements and information request intercepting in a high performance computing environment, in accordance with an embodiment.

In accordance with an embodiment, at step S100, the method can divide a hierarchy into a plurality of domains, each of the plurality of domains comprising a multicast group proxy instance.

In accordance with an embodiment, at step S105, the method can receive, at an MCG proxy instance, an MC based announcement from a node within the domain of the MCG proxy instance.

In accordance with an embodiment, at step S110, the method can send, by the MCG proxy instance, to another MCG proxy instance within another domain, information, the information contained in the MC based announcement.

In accordance with an embodiment, at step S115, the method can send, by the MCG proxy instance, to a subnet manager, the information contained in the MC based announcement In accordance with an embodiment, at step S120, the method can end.

Figure 52:
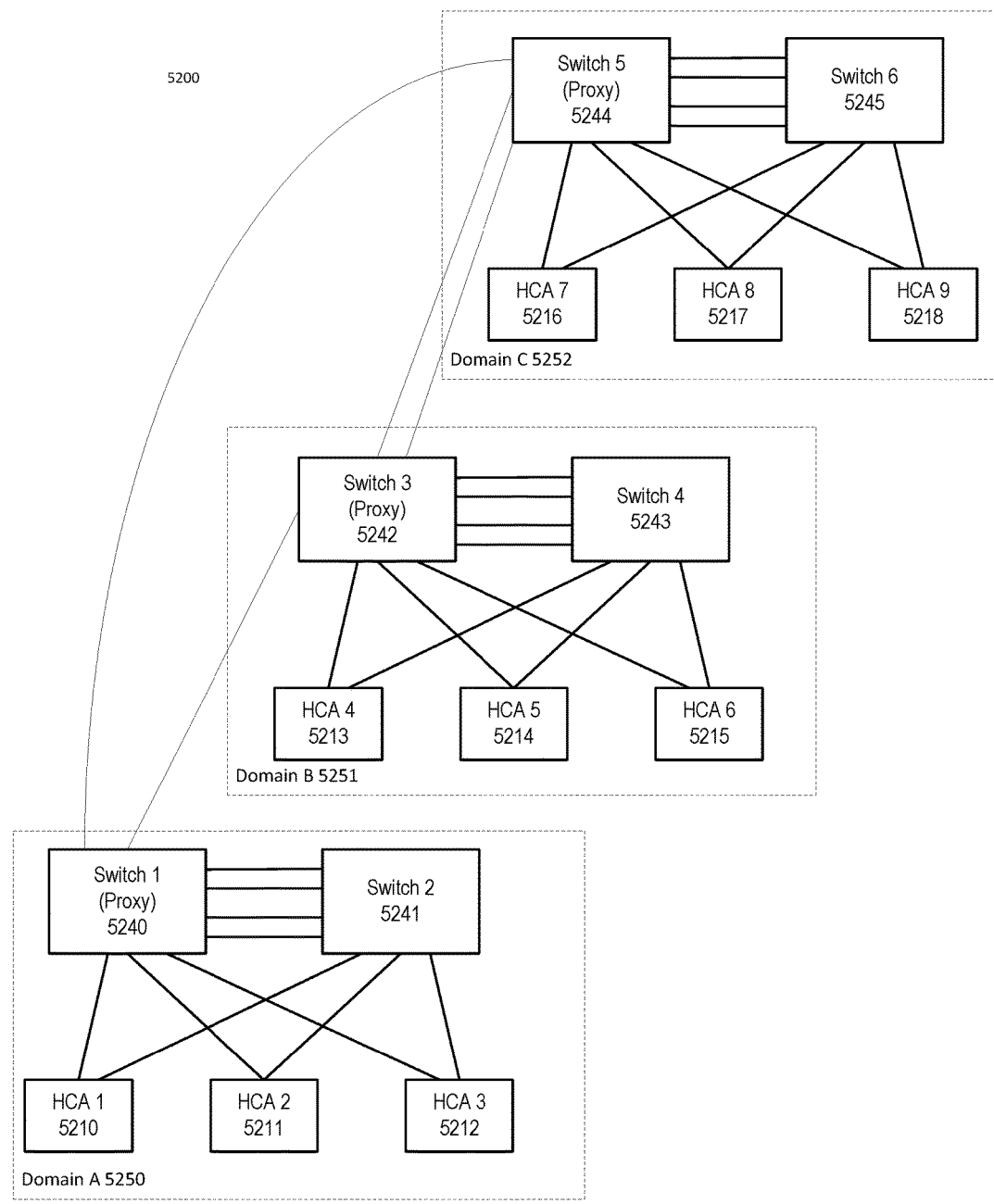
FIG. 52 illustrates a system to provide default multicast group (MCG) proxy for scalable forwarding of announcements and information request intercepting in a high performance computing environment, in accordance with an embodiment.

FIG. 52 illustrates a system to provide default multicast group (MCG) proxy for scalable forwarding of announcements and information request intercepting in a high performance computing environment, in accordance with an embodiment.

More particularly, the figure illustrates a system of an arbitrary fabric with proxy instances associated with each leaf switch. The system 5200 can be divided into a number of arbitrary domains, such as domain A 5250, domain B 5251, and domain C 5252. The system can comprise a number of host channel adapters, such as HCA1-HCA9 5210-5218, as well as a number of switches that interconnect the HCAs, such as switch 1-switch 6 5240-5245. The HCAs attached one more hosts/end nodes (not shown) to the system 5200.

In accordance with an embodiment, certain switches (e.g., one switch within each defined domain) can be defined as proxies. In the depicted embodiment, switch 1 5240, switch 3 5242, and switch 5 5244 are defined as proxies. In certain embodiments, these switches can be defined as a multicast group proxy instance for certain protocols.

In accordance with an embodiment, each such proxy instance can receive MC based announcements and requests from nodes within its domain, but such MC requests would not be directly sent out beyond the boundaries of the local domain. Instead, the various proxies can exchange information via combination of MC based protocols among other proxies as well as bulk transfer of data as peer-to-peer traffic between pairs of proxies.

In accordance with an embodiment, the proxies can also be co-operating with the SM(s) in the subnet/fabric and can send MC based announcements for available nodes on behalf of the SM (i.e., similar to the unicast based SA event notifications.)

Figure 53:
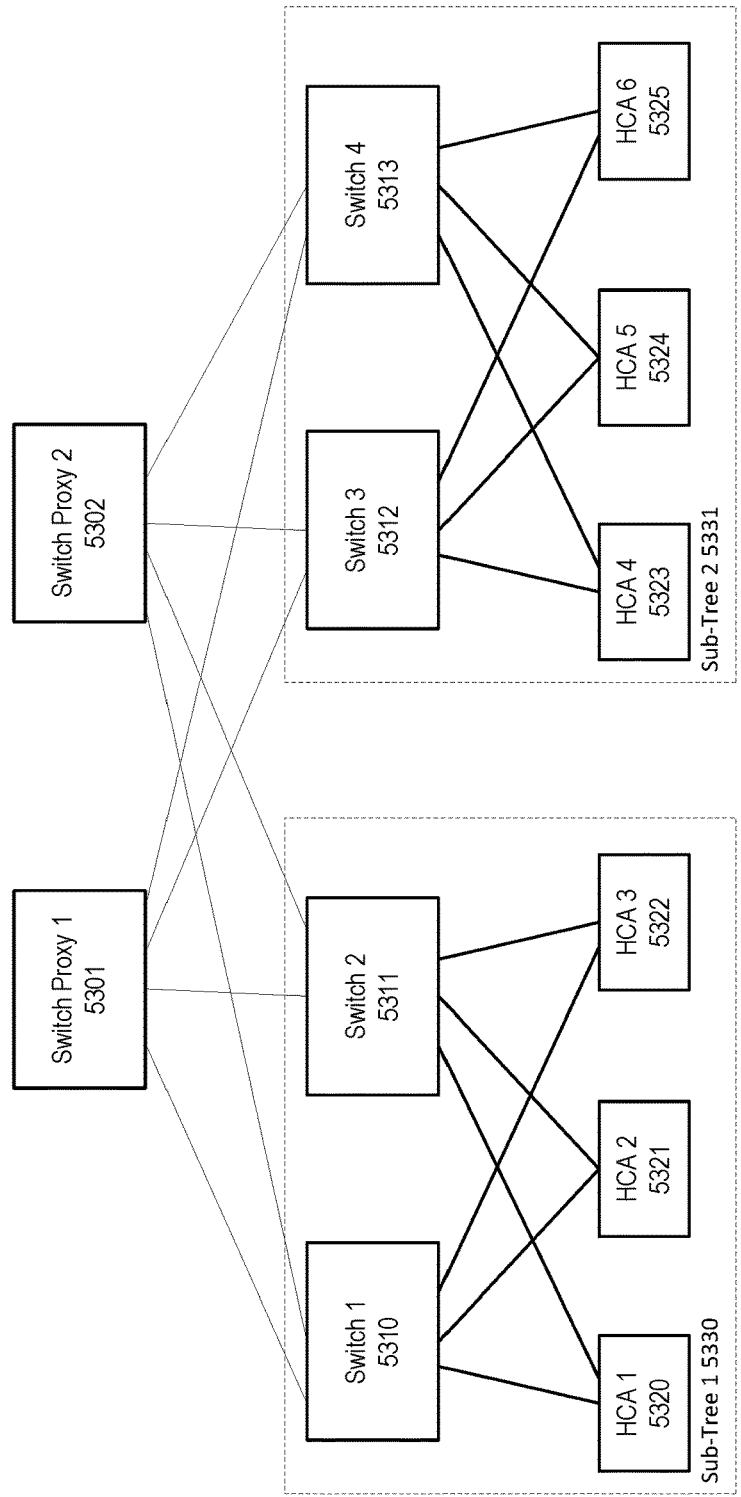
FIG. 53 illustrates a system to provide default multicast group (MCG) proxy for scalable forwarding of announcements and information request intercepting in a high performance computing environment, in accordance with an embodiment.

FIG. 53 illustrates a system to provide default multicast group (MCG) proxy for scalable forwarding of announcements and information request intercepting in a high performance computing environment, in accordance with an embodiment.

More particularly, the figure illustrates a medium sized fat tree based fabric with proxies associated with each sub-tree of certain size—single level. Switch proxy 1 5301 handles the left sub-tree, or sub-tree 1 5330, which comprises switch 1 5310 and switch 2 5311, as well as HCA 1-HCA 3 5320-5322. Likewise, switch proxy 2 5302 handles the right sub-tree, or sub-tree 2 5331, which comprises switch 3 5312 and switch 4 5313, as well as HCA 4-HCA 6 5323-5325.

Figure 54:
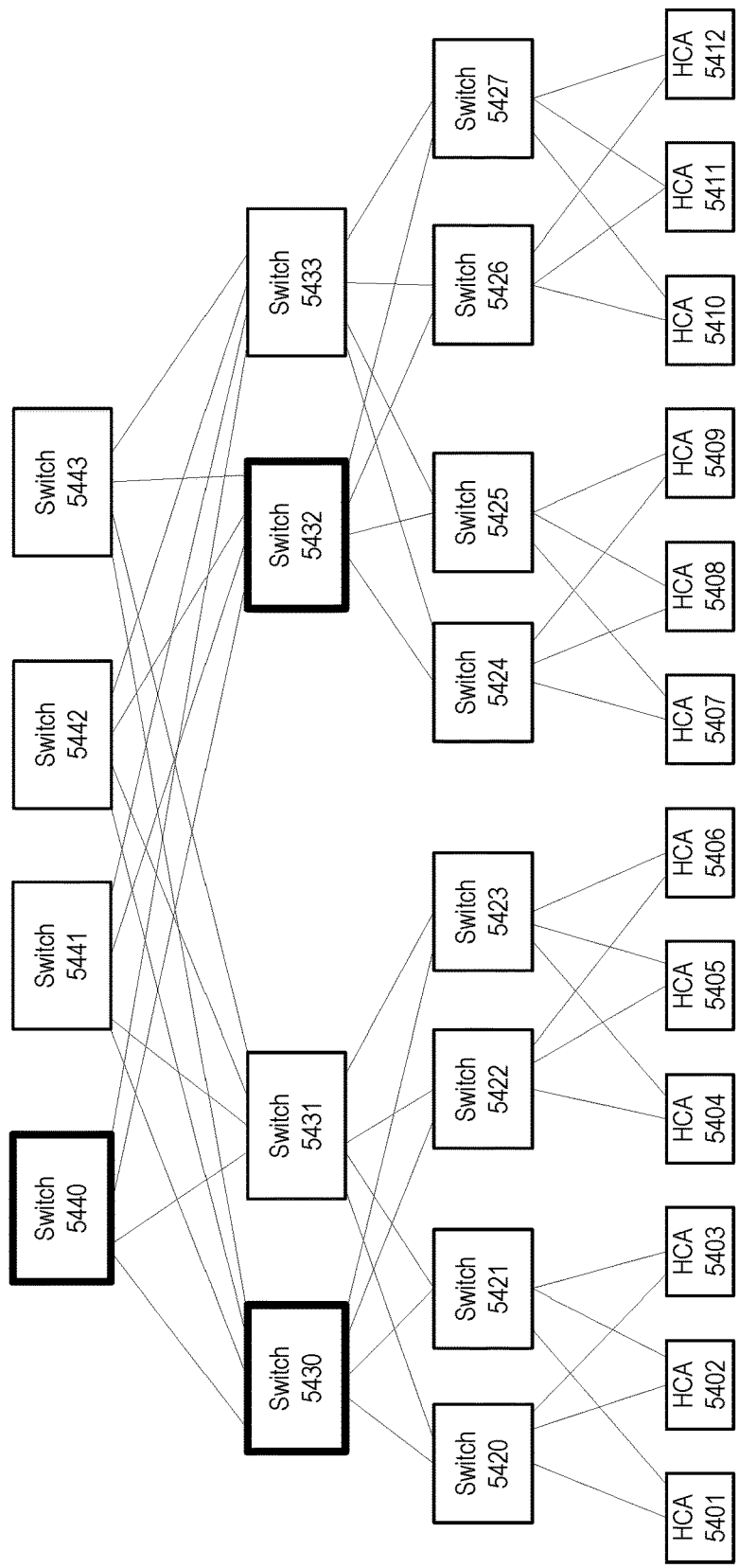
FIG. 54 illustrates a system to provide default multicast group (MCG) proxy for scalable forwarding of announcements and information request intercepting in a high performance computing environment, in accordance with an embodiment.

FIG. 54 illustrates a system to provide default multicast group (MCG) proxy for scalable forwarding of announcements and information request intercepting in a high performance computing environment, in accordance with an embodiment.

More particularly, the figure illustrates a large fat tree based fabric with proxies associated with hierarchical sub-trees, multiple levels. Switches with bolded borders represent proxy instances, one in each spine based sub-tree and one at root switch level providing aggregation between spine level proxies.

In accordance with an embodiment, a fabric can comprise a number of HCAs, such as HCA 5401-HCA 5412, and a number of switches at various levels of a tree topology. In the depicted embodiment, switches 5420 through 5427 are leaf level switches, while switches 5440 through 5443 are root level switches. Switches 5430 through 5433 are mid-level switches.

In accordance with an embodiment, those switches with bolded borders, namely switch 5430, switch 5432, and switch 5440 represent proxy instances. Switch 5430 is a proxy instance for the left-most subtree, while switch 5432 is a proxy instance for the right-most subtree. Switch 5440 is a proxy instance for the root level that provides aggregation between the subtree proxy instances.

Figure 55:
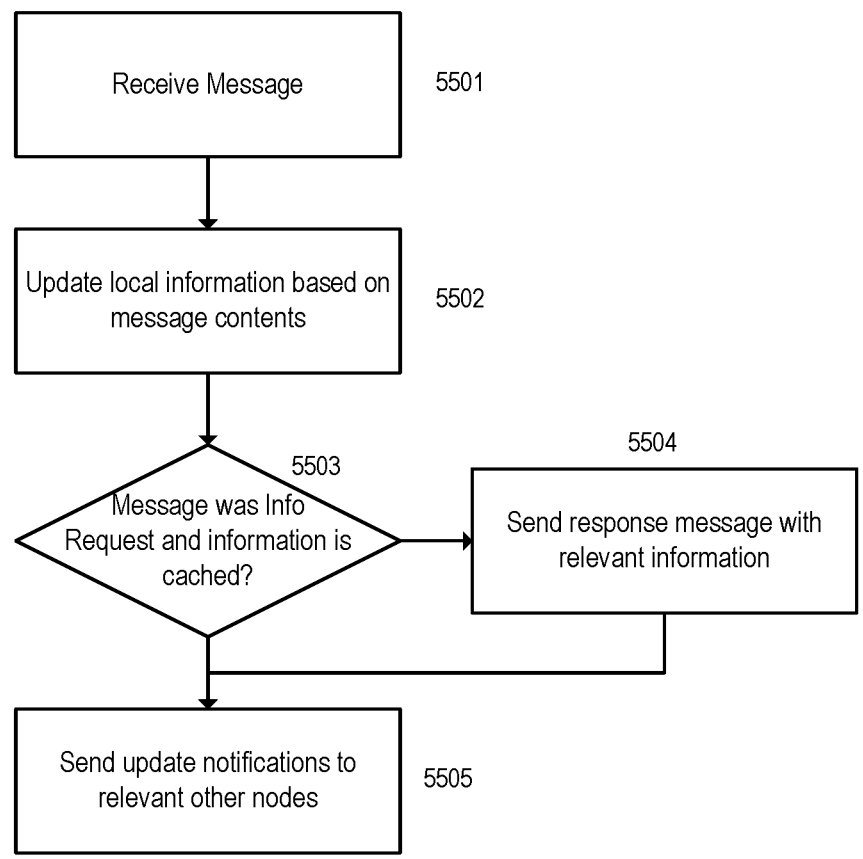
FIG. 55 illustrates a flowchart of a method to provide default multicast group (MCG) proxy for scalable forwarding of announcements and information request intercepting in a high performance computing environment, in accordance with an embodiment.

FIG. 55 illustrates a flowchart of a method to provide default multicast group (MCG) proxy for scalable forwarding of announcements and information request intercepting in a high performance computing environment, in accordance with an embodiment.

In accordance with an embodiment, in a method, a proxy may have to forward to, or consult with, other proxies.

In accordance with an embodiment, a method can receive a message at step S501. The method can update local information based on message contents at step S502. If received message was an information request from node in local domain, and if the relevant information is cached locally, then the method can send a response message with relevant info at step S504. If the relevant information is not cached locally, the method can send an information request to relevant set of peer proxies at step S505.

In accordance with an embodiment, if the received message was an information request from a proxy in a different domain, then the method can send a response based on currently cached local info.

In accordance with an embodiment, if the received message was a response or update from a proxy in another domain, then the method can complete any pending requests that were waiting for received info. The method can then send update notifications to relevant nodes in local domain, and send update notifications to relevant proxies in other domains.

Figure 56:
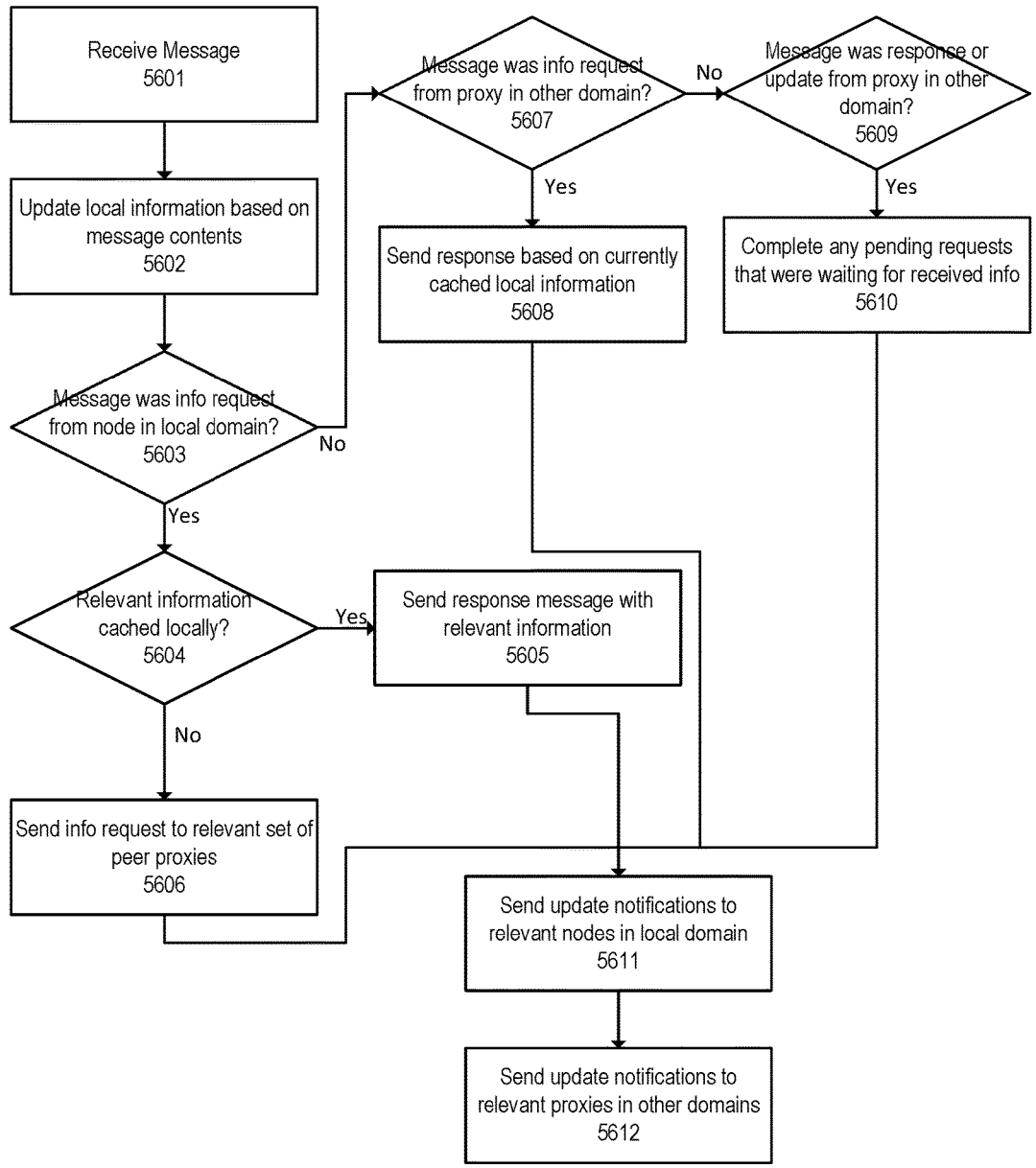
FIG. 56 illustrates a flowchart of a method to provide default multicast group (MCG) proxy for scalable forwarding of announcements and information request intercepting in a high performance computing environment, in accordance with an embodiment.

FIG. 56 illustrates a flowchart of a method to provide default multicast group (MCG) proxy for scalable forwarding of announcements and information request intercepting in a high performance computing environment, in accordance with an embodiment.

At step S601, the method can receive a message at a proxy.

At step S602, the method can update local information based on message contents.

At step S603, the method can determine if the received message was an information request message from node in local domain.

At step S604, if the message was an information request message from a node in the local domain, then the method can determine if the relevant information is cached locally.

At step S605, if the relevant information is cached locally, then the proxy can send a response message with the relevant information.

At step S606, if the relevant information is not cached locally, then the proxy can send an information request to a relevant set of peer proxies.

At step S607, if the received message was from a proxy in another domain, then the method can determine if the message received was an information request from a proxy in another domain.

At step S608, if the message received was an information request from a proxy in another domain, then the proxy can send a response based on currently cached local information.

At step S609, if the message was not an information request from a proxy in another domain, the proxy can determine if the message was a response or update from a proxy in another domain.

At step S610, on such determination that the message was a response or update from a proxy in another domain, the proxy can complete any pending requests that were waiting on the information received.

At step S611, the proxy can send update notifications to relevant nodes in local domain.

At step S612, the proxy can send update notifications to relevant proxies in other domains.

Figure 57:
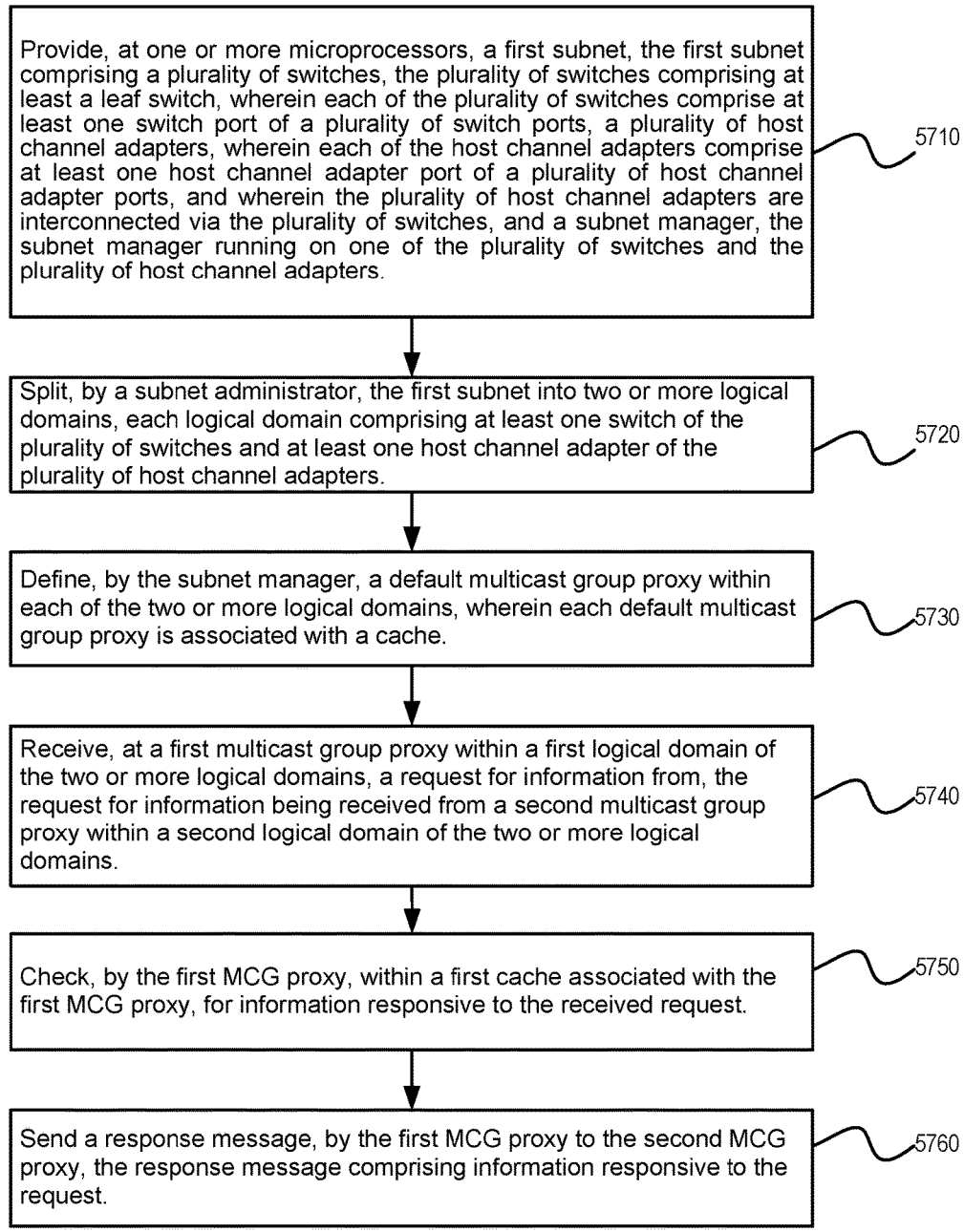
FIG. 57 illustrates a flowchart of a method to provide a default multicast group (MCG) proxy for scalable forwarding of announcements and information request intercepting in a high performance computing environment, in accordance with an embodiment.

FIG. 57 illustrates a flowchart of a method to provide a default multicast group (MCG) proxy for scalable forwarding of announcements and information request intercepting in a high performance computing environment, in accordance with an embodiment.

In accordance with an embodiment, at step S710, the method can provide, at one or more microprocessors, a first subnet, the first subnet comprising a plurality of switches, the plurality of switches comprising at least a leaf switch, wherein each of the plurality of switches comprise at least one switch port of a plurality of switch ports, a plurality of host channel adapters, wherein each of the host channel adapters comprise at least one host channel adapter port of a plurality of host channel adapter ports, and wherein the plurality of host channel adapters are interconnected via the plurality of switches, and a subnet manager, the subnet manager running on one of the plurality of switches and the plurality of host channel adapters.

In accordance with an embodiment, at step S720, the method can split, by a subnet administrator, the first subnet into two or more logical domains, each logical domain comprising at least one switch of the plurality of switches and at least one host channel adapter of the plurality of host channel adapters.

In accordance with an embodiment, at step S730, the method can define, by the subnet manager, a default multicast group proxy within each of the two or more logical domains, wherein each default multicast group proxy is associated with a cache.

In accordance with an embodiment, at step S740, the method can receive, at a first multicast group proxy within a first logical domain of the two or more logical domains, a request for information from, the request for information being received from a second multicast group proxy within a second logical domain of the two or more logical domains.

In accordance with an embodiment, at step S750, the method can check, by the first MCG proxy, within a first cache associated with the first MCG proxy, for information responsive to the received request.

In accordance with an embodiment, at step S760, the method send a response message, by the first MCG proxy to the second MCG proxy, the response message comprising information responsive to the request.

Using QP1 for Receiving MC Based Announcements in Multiple Partitions

In accordance with an embodiment, a unique feature with queue pair 1 (QP1) that is used as a well-defined destination for General Management Packets (GMPs) is that it, unlike normal QPs, is not only associated with a single partition, but instead can operate for both sends and receives on behalf of all partitions currently associated with the relevant port.

In accordance with an embodiment, by extending the scope of QP1 to also include receiving and sending multicast packets in any partition defined for the port, it is possible to implement generic MC based announcement and discovery without requiring the complexity of unique QPs for individual partitions, nor any update of QP configuration as a consequence of change of partition membership.

In accordance with an embodiment, since the default MGID for the port is defined at SMA level, it is inherently well-defined for a port that supports this feature. Hence, there is no need for any special initialization procedures except for potentially support for enabling and disabling the use of QP1 for such MC traffic.

In accordance with an embodiment, the IB client would in any case be allowed to handle the relevant MC traffic via other QPs specifically allocated for the relevant partitions. As with any QP MCG associations, there can be multiple local QPs associated with the same MCG, hence the use of dedicated QPs for default MCG traffic in different partitions can be used instead of or in addition to use of QP1 for the same partition.

In accordance with an embodiment, relative to remote nodes including proxies, the use of QP1 or dedicated QPs for default MCG traffic in different partitions can in general be totally transparent except for that as with any GMP traffic, it should be possible to use the source QP in an incoming request as the destination QP in a corresponding (unicast) response. However, this scheme applies in the same way independently of whether the source QP is QP1 or any other QP number.

In accordance with an embodiment, by leveraging dedicated MLIDs per partition, the IB client would be able to send announcement and discovery messages in any local partition and have it received by all relevant peer nodes without any additional initialization.

In accordance with an embodiment, in the case of proxy based operations, it would also be possible for the relevant domain proxy to send notifications in the per domain default partition, but use the MLIDs of different partitions so that only relevant nodes would receive the corresponding message. The partition specific MLIDs would have routing for the relevant actual members, but the port used by the proxy could still be included as a send-only member.

In accordance with an embodiment, in the case where a proxy has port membership in all relevant partitions it may choose to send such MC messages in the specific partition instead of using a default partition.

In accordance with an embodiment, the IB spec can be enhanced to include verbs interfaces for querying HCA support for the MC traffic via QP1 as well as port specific operations for enabling and disabling this feature if supported.

Figure 58:
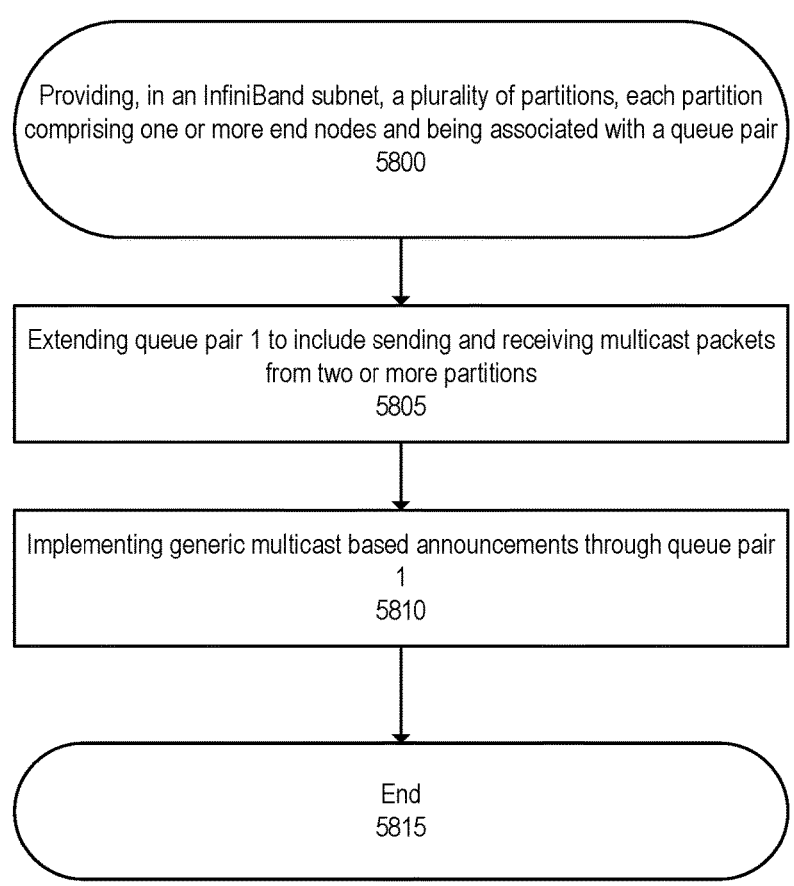
FIG. 58 illustrates a flowchart of a method to use queue pair 1 (QP1) for receiving multicast based announcements in multiple partitions in a high performance computing environment, in accordance with an embodiment.

FIG. 58 illustrates a flowchart of a method to use queue pair 1 (QP1) for receiving multicast based announcements in multiple partitions in a high performance computing environment, in accordance with an embodiment.

In accordance with an embodiment, at step S800, the method can provide, in an InfiniBand subnet, a plurality of partitions, each partition comprising one or more end nodes.

In accordance with an embodiment, at step S805, the method extended queue pair 1 to include sending and receiving multicast packets from two or more partitions.

In accordance with an embodiment, at step S810, the method can implement generic multicast based announcements through queue pair 1.

In accordance with an embodiment, at step S815, the method can end.

Figure 59:
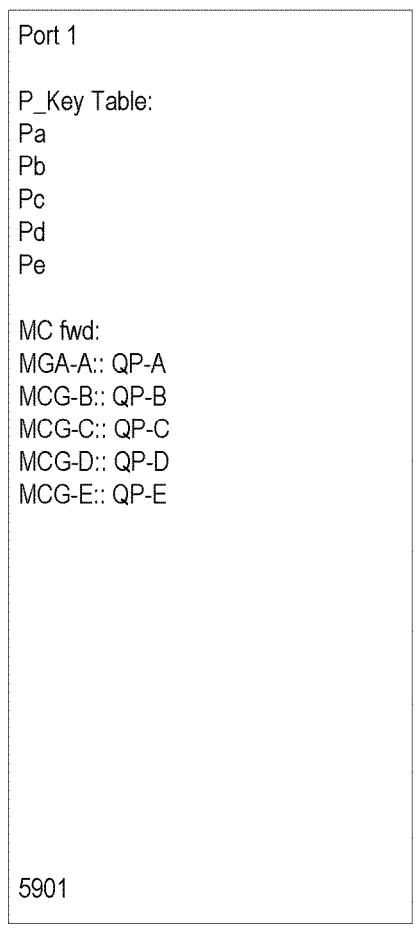
FIG. 59 illustrates a system to use queue pair 1 (QP1) for receiving multicast based announcements in multiple partitions in a high performance computing environment, in accordance with an embodiment.

FIG. 59 illustrates a system to use queue pair 1 (QP1) for receiving multicast based announcements in multiple partitions in a high performance computing environment, in accordance with an embodiment.

More particularly, the figure shows a default scheme with dedicated announcement QP for each partition.

In accordance with an embodiment, a port, such as port 1 5901 of an HCA in a fabric, such as an InfiniBand Fabric, can bet set up comprising a partition table as well as dedicated queue pairs for multicast announcements, such as Queue Pair A 5902, Queue Pair B 5903, Queue Pair C 5904, Queue Pair D 5905, and Queue Pair E 5906. Each of the queue pairs can be associated with a different partition key, according to an associated multicast group.

FIG. 60 illustrates a system to use queue pair 1 (QP1) for receiving multicast based announcements in multiple partitions in a high performance computing environment, in accordance with an embodiment.

More particularly, the figure shows a reconfiguration of announcement QP population as a result of partition membership handling.

In accordance with an embodiment, a port, such as port 1 6001 of an HCA in a fabric, such as an InfiniBand Fabric, can bet set up comprising a partition table as well as dedicated queue pairs for multicast announcements, such as Queue Pair A 6002, Queue Pair B 6003, Queue Pair C 6004, Queue Pair E 6005, and Queue Pair F 6006. Each of the queue pairs can be associated with a different partition key, according to an associated multicast group.

In accordance with an embodiment, FIG. 60 shows a reconfiguration of the system depicted in FIG. 59 after a change in partition membership.

Figure 61:
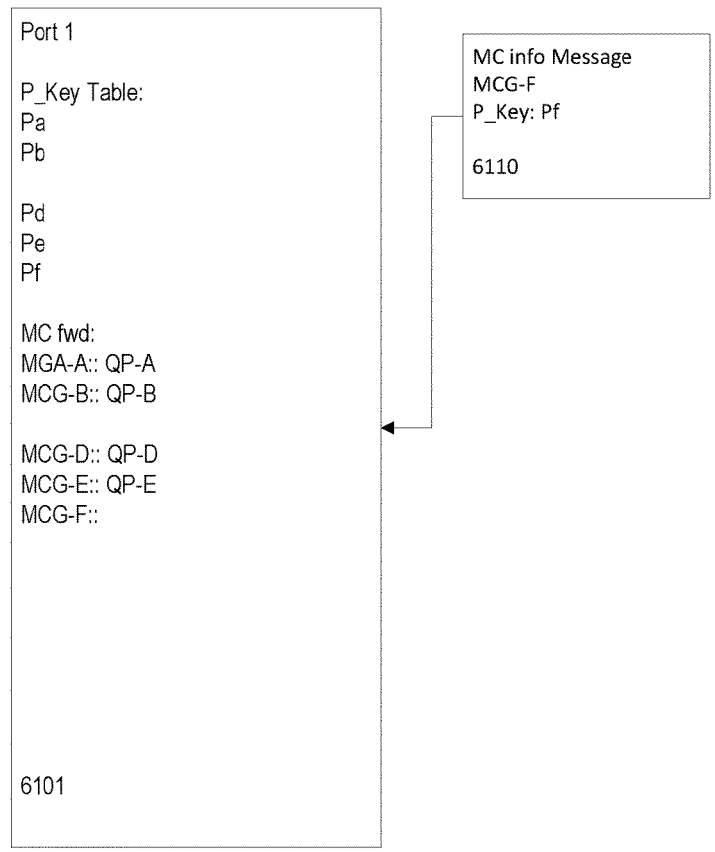
FIG. 61 illustrates a system to use queue pair 1 (QP1) for receiving multicast based announcements in multiple partitions in a high performance computing environment, in accordance with an embodiment.

FIG. 61 illustrates a system to use queue pair 1 (QP1) for receiving multicast based announcements in multiple partitions in a high performance computing environment, in accordance with an embodiment.

More particularly, the figure shows of a special race condition where announcements are lost due to new QP not being in place when announcement is made.

In accordance with an embodiment, a port, such as port 1 6101 of an HCA in a fabric, such as an InfiniBand Fabric, can bet set up comprising a partition table as well as dedicated queue pairs for multicast announcements, such as Queue Pair A 6102, Queue Pair B 6103, Queue Pair C 6104, Queue Pair E 6105, and Queue Pair F 6106. Each of the queue pairs can be associated with a different partition key, according to an associated multicast group.

In accordance with an embodiment, FIG. 61 illustrates the system of FIG. 60 before a new queue-pair (QP F) can be set up to handle multicast announcements from multicast group F. In such a situation when an MC information message 6110 is received at port 1, port 1 is not able to handle the MC information message as queue pair F has not been established for P_Key F and/or multicast group F.

Figure 62:
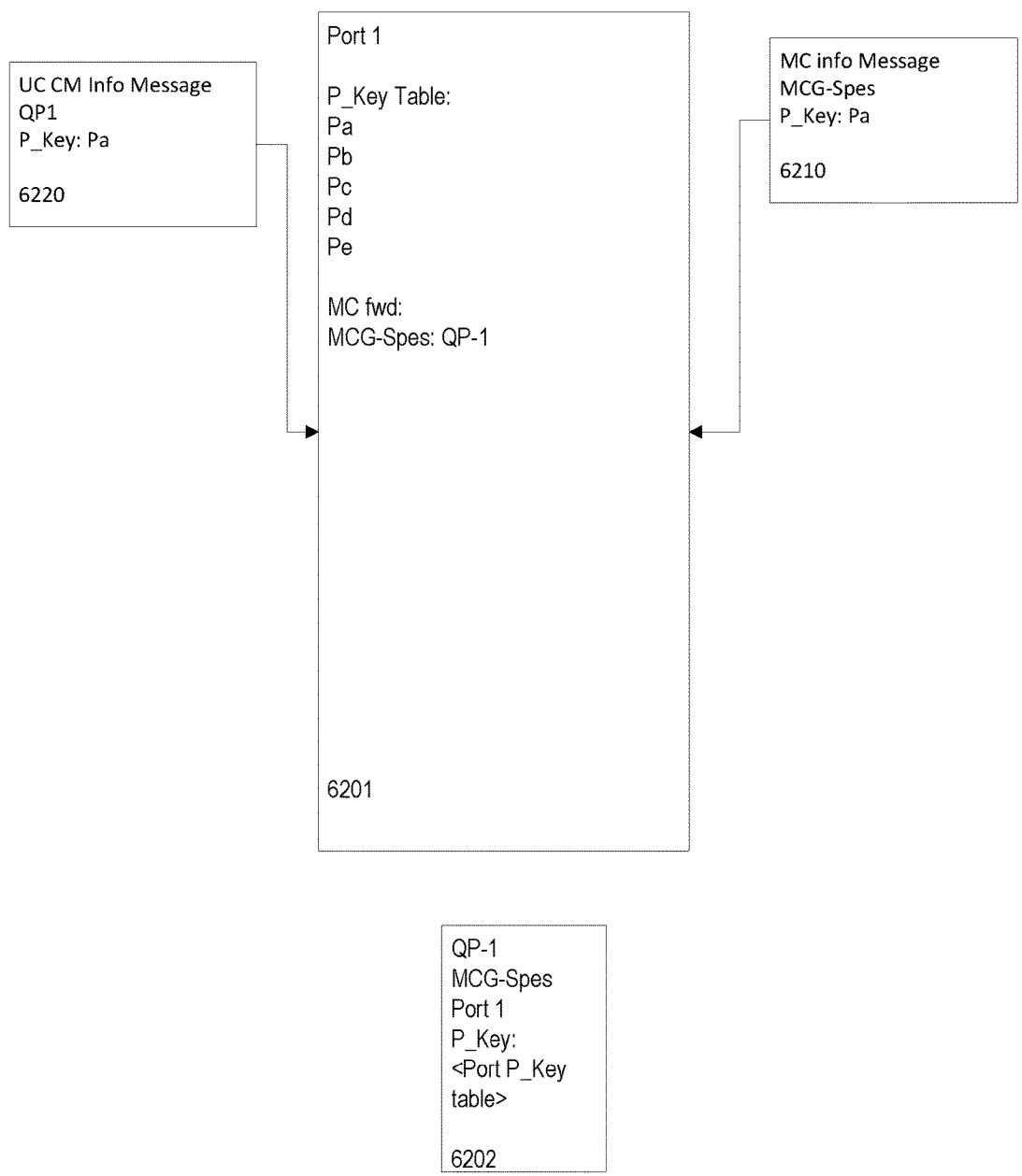
FIG. 62 illustrates a system to use queue pair 1 (QP1) for receiving multicast based announcements in multiple partitions in a high performance computing environment, in accordance with an embodiment.

FIG. 62 illustrates a system to use queue pair 1 (QP1) for receiving multicast based announcements in multiple partitions in a high performance computing environment, in accordance with an embodiment.

More particularly, the figure shows a simplified scheme where QP1 receives both extended connection management unicast messages as well as multicast based announcement messages.

In accordance with an embodiment, a port, such as port 1 6201 of an HCA in a fabric, such as an InfiniBand Fabric, can bet set up comprising a partition table. As well, the port can utilize a simplified scheme where Queue Pair 1 6202 is used for both extended connection management unicast messages, such as 6220, as well as multicast information messages, such as 6210.

In accordance with an embodiment, by employing Queue Pair 1 for both the unicast management as well as multicast information messages, a system can avoid the race conditions shown in FIG. 61.

In accordance with an embodiment, by extending the scope of QP1 to also include receiving and sending multicast packets in any partition defined for the port, it is possible to implement generic MC based announcement and discovery without requiring the complexity of unique QPs for individual partitions, nor any update of QP configuration as a consequence of change of partition membership.

In accordance with an embodiment, since the default MGID for the port is defined at SMA level, it is inherently well-defined for a port that supports this feature. Hence, there is no need for any special initialization procedures except for potentially support for enabling and disabling the use of QP1 for such MC traffic.

In accordance with an embodiment, the IB client would in any case be allowed to handle the relevant MC traffic via other QPs specifically allocated for the relevant partitions. As with any QP MCG associations, there can be multiple local QPs associated with the same MCG, hence the use of dedicated QPs for default MCG traffic in different partitions can be used instead of or in addition to use of QP1 for the same partition.

Figure 63:
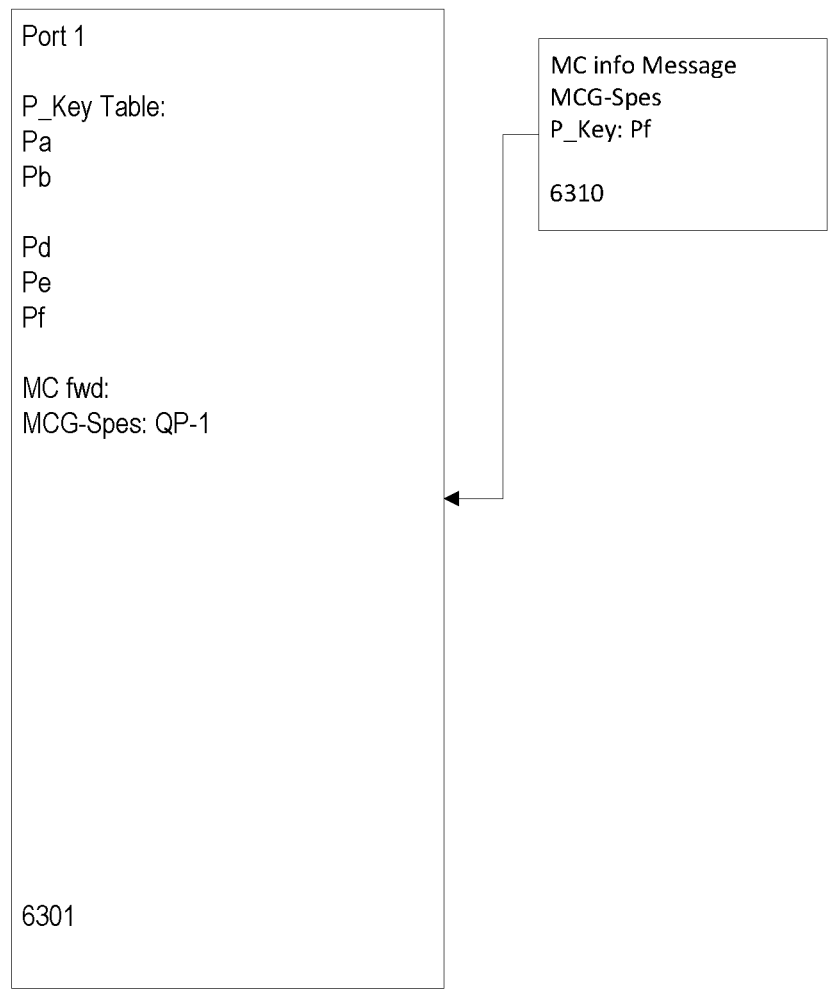
FIG. 63 illustrates a system to use queue pair 1 (QP1) for receiving multicast based announcements in multiple partitions in a high performance computing environment, in accordance with an embodiment.
Figure 63:
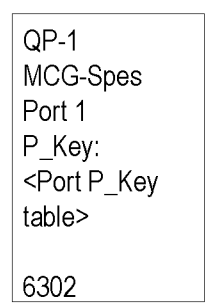

FIG. 63 illustrates a system to use queue pair 1 (QP1) for receiving multicast based announcements in multiple partitions in a high performance computing environment, in accordance with an embodiment.

More particularly, the figure shows the existence of QP as associated with default MCG/MGID removes any race-condition between QP establishment and reception of announcement MC Packets 6310.

In accordance with an embodiment, QP1 6302, as used by port 1 6301, can be permanently associated with MCG-Spes, and is always associated with whatever set of P_Key values that the SM has set up for the associated port.

Figure 64:
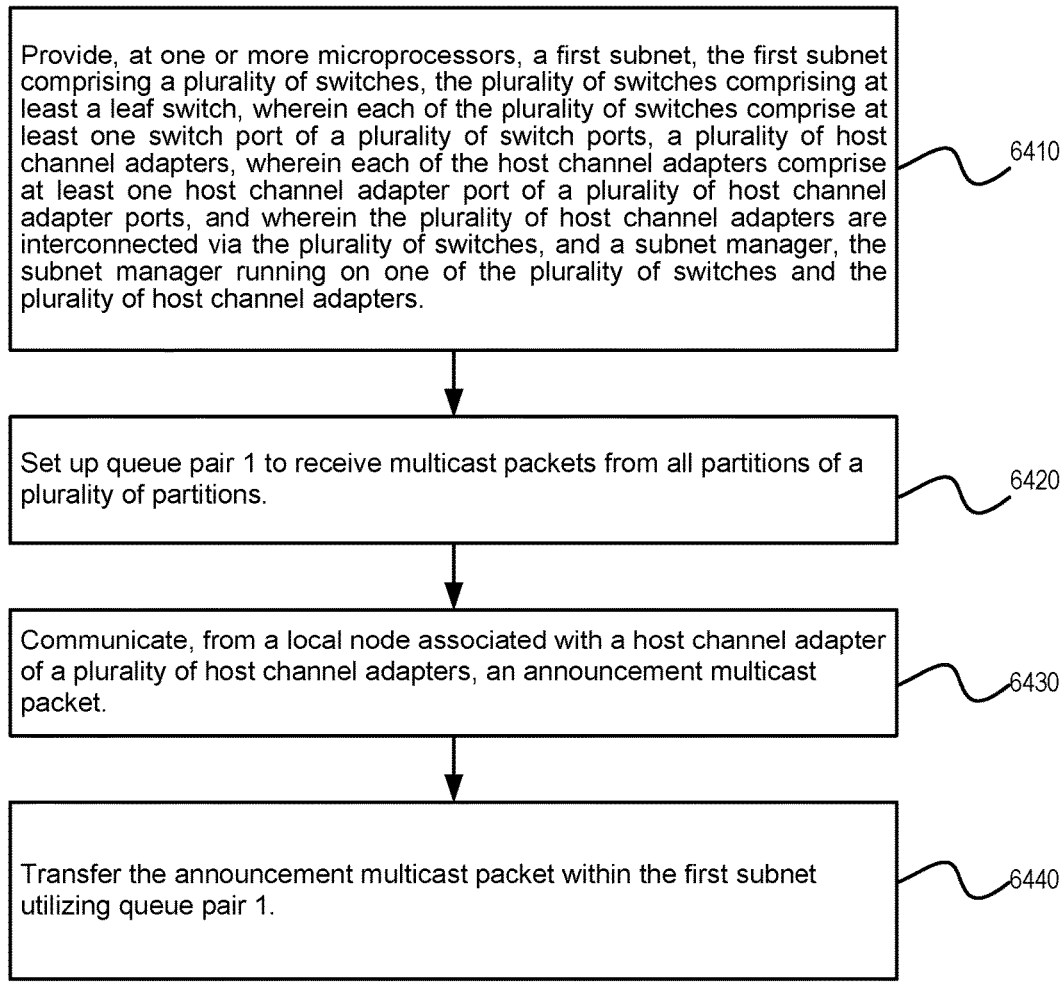
FIG. 64 illustrates a flowchart of a method to use queue pair 1 (QP1) for receiving multicast based announcements in multiple partitions in a high performance computing environment, in accordance with an embodiment.

FIG. 64 illustrates a flowchart of a method to use queue pair 1 (QP1) for receiving multicast based announcements in multiple partitions in a high performance computing environment, in accordance with an embodiment.

In accordance with an embodiment, at step 6410, the method can provide, at one or more microprocessors, a first subnet, the first subnet comprising a plurality of switches, the plurality of switches comprising at least a leaf switch, wherein each of the plurality of switches comprise at least one switch port of a plurality of switch ports, a plurality of host channel adapters, wherein each of the host channel adapters comprise at least one host channel adapter port of a plurality of host channel adapter ports, and wherein the plurality of host channel adapters are interconnected via the plurality of switches, and a subnet manager, the subnet manager running on one of the plurality of switches and the plurality of host channel adapters.

In accordance with an embodiment, at step 6420, the method can set up queue pair 1 to receive multicast packets from all partitions of a plurality of partitions.

In accordance with an embodiment, at step 6430, then method can communicate, from a local node associated with a host channel adapter of a plurality of host channel adapters, an announcement multicast packet.

In accordance with an embodiment, at step 6440, the method can transfer the announcement multicast packet within the first subnet utilizing queue pair 1.

Using Incoming MC Packets as Basis for GUID/GID to LID Cache Contents (5838)

In accordance with an embodiment, since all multicast packets have a Global Route Header (GRH), there is always both a source GID and a source LID defined for an incoming multicast packet. This implies that it is, in general, possible for an HCA implementation to gather information about GID and GUID to LID mappings for any sender node based on all incoming MC packets.

In accordance with an embodiment, by correlating with local SMA level properties for whether "AllSubnetLocal-ChannelAdapterLIDsUsable" flag and "RouterSourceLIDsReversible" flag values are True or False, as well as based on being able to identify incoming explicitly proxied MC messages for the local default MCG, the local port logic can build and maintain a dynamic cache containing mappings between GIDs and/or GUIDs and the corresponding LID(s).

In accordance with an embodiment, as long as HCA specific functions exist for handling incoming work request processing, it is possible to maintain this kind of caching logic below the CI (channel interface) interface of the HCA.

In accordance with an embodiment, performing such cache maintenance will not represent significant overhead, but it will not be zero, hence for this reason the enabling of this feature should be explicitly controllable at both port and individual QP level.

In accordance with an embodiment, various IB specification enhancements are contemplated by the disclosure. A first enhancement can comprise new verb interfaces for querying HCA support for the MC based address map caching as well as control operations for enabling and disabling this on both a per port and per QP (including QP1) level. When caching is supported and enabled, verbs interfaces must exist for observing and controlling cache contents.

Figure 65:
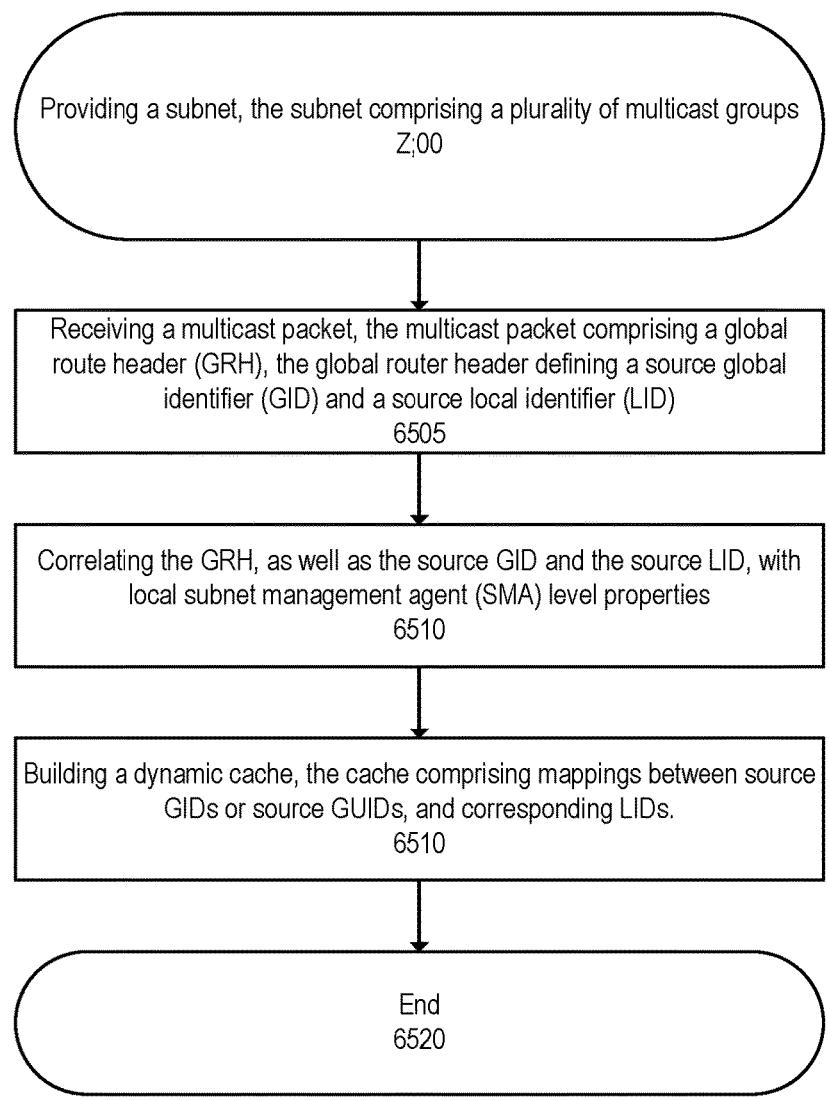
FIG. 65 illustrates a flowchart of a method to use all incoming multicast (MC) packets as a basis for global unique identifier (GUID) to local identifier (LID) cache contents in a high performance computing environment, in accordance with an embodiment.

FIG. 65 illustrates a flowchart of a method to use all incoming multicast (MC) packets as a basis for global unique identifier (GUID) to local identifier (LID) cache contents in a high performance computing environment, in accordance with an embodiment.

In accordance with an embodiment, at step 6500, the method can provide a subnet, the subnet comprising a plurality of multicast groups.

In accordance with an embodiment, at step 6505, the method can receive a multicast packet, the multicast packet comprising a global route header (GRH), the global router header defining a source global identifier (GID) and a source local identifier (LID).

In accordance with an embodiment, at step 6510, the method can correlate the GRH, as well as the source GID and the source LID, with local subnet management agent (SMA) level properties.

In accordance with an embodiment, at step 6515, the method can build a dynamic cache, the cache comprising mappings between source GIDs or source GUIDs, and corresponding LIDs.

In accordance with an embodiment, at step 6520, the method can end.

Figure 66:
FIG. 66 illustrates a system to use all incoming multicast (MC) packets as a basis for global unique identifier (GUID) to local identifier (LID) cache contents in a high performance computing environment, in accordance with an embodiment.

FIG. 66 illustrates a system to use all incoming multicast (MC) packets as a basis for global unique identifier (GUID) to local identifier (LID) cache contents in a high performance computing environment, in accordance with an embodiment.

In accordance with an embodiment, the figure shows an illustration of CI interface and GUID to LID cache existence below CI interface.

In accordance with an embodiment, at a host channel adapter comprising a generic verb interface 6601 as well as a channel provider interface 6602 (CI), a platform specific implementation of verb interfaces 6603 as well as a GID or GUID to LID Mapping cache 6604 can be provided below the CI level.

Figure 67:
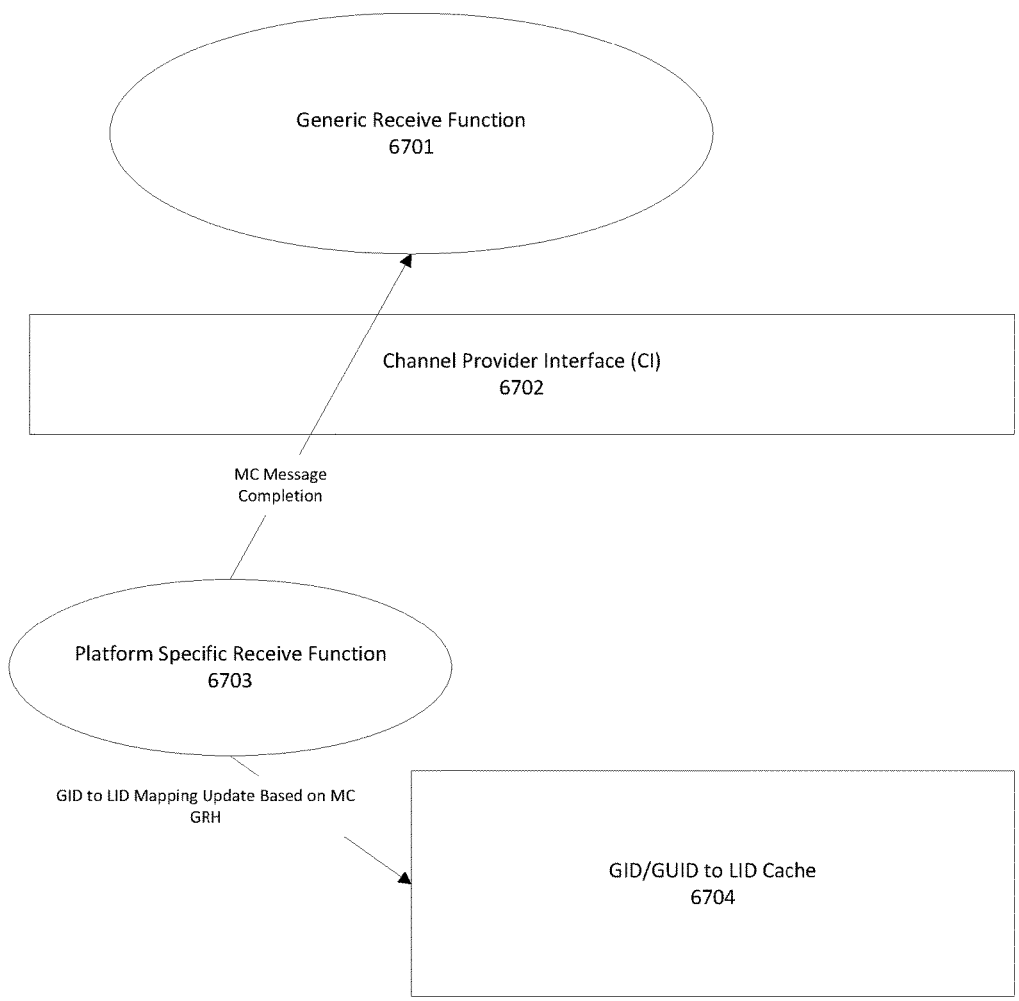
FIG. 67 illustrates a system to use all incoming multicast (MC) packets as a basis for global unique identifier (GUID) to local identifier (LID) cache contents in a high performance computing environment, in accordance with an embodiment

FIG. 67 illustrates a system to use all incoming multicast (MC) packets as a basis for global unique identifier (GUID) to local identifier (LID) cache contents in a high performance computing environment, in accordance with an embodiment In accordance with an embodiment, the figure shows an illustration of standard receive functions and IB client above CI interface not being aware of cache updates as a result of incoming MC packets.

In accordance with an embodiment, then, upon receiving an MC packet, an HCA can perform a platform specific receive function 6703, and cache a GID/GUID to LID mapping based upon the GRH of the MC packet in a GID/GUID to LID Cache 6704 without anything above the CI 6702, such as the generic receive function 6701 being aware of such caching. Then, for example, an MC message completion message can be transmitted to the generic receive function.

In accordance with an embodiment, use of local cache "consulting" before performing any connection management operation in order to reduce the number of message exchanges.

In accordance with an embodiment, the local GID/GUID to LID cache mapping can be used when a new connection to a destination node is to be set up. In the event that the destination node does not have a known/stored (in cache) GUID/GID, then the local node can use a typical ARP type operation to obtain the destination node's GUID/GID. If, on the other hand, the GID/GUID of the destination node is stored in a cache (from a prior MC message), then the destination node's GID/GUID to LID mapping can be used to construct an address for a message.

Figure 68:
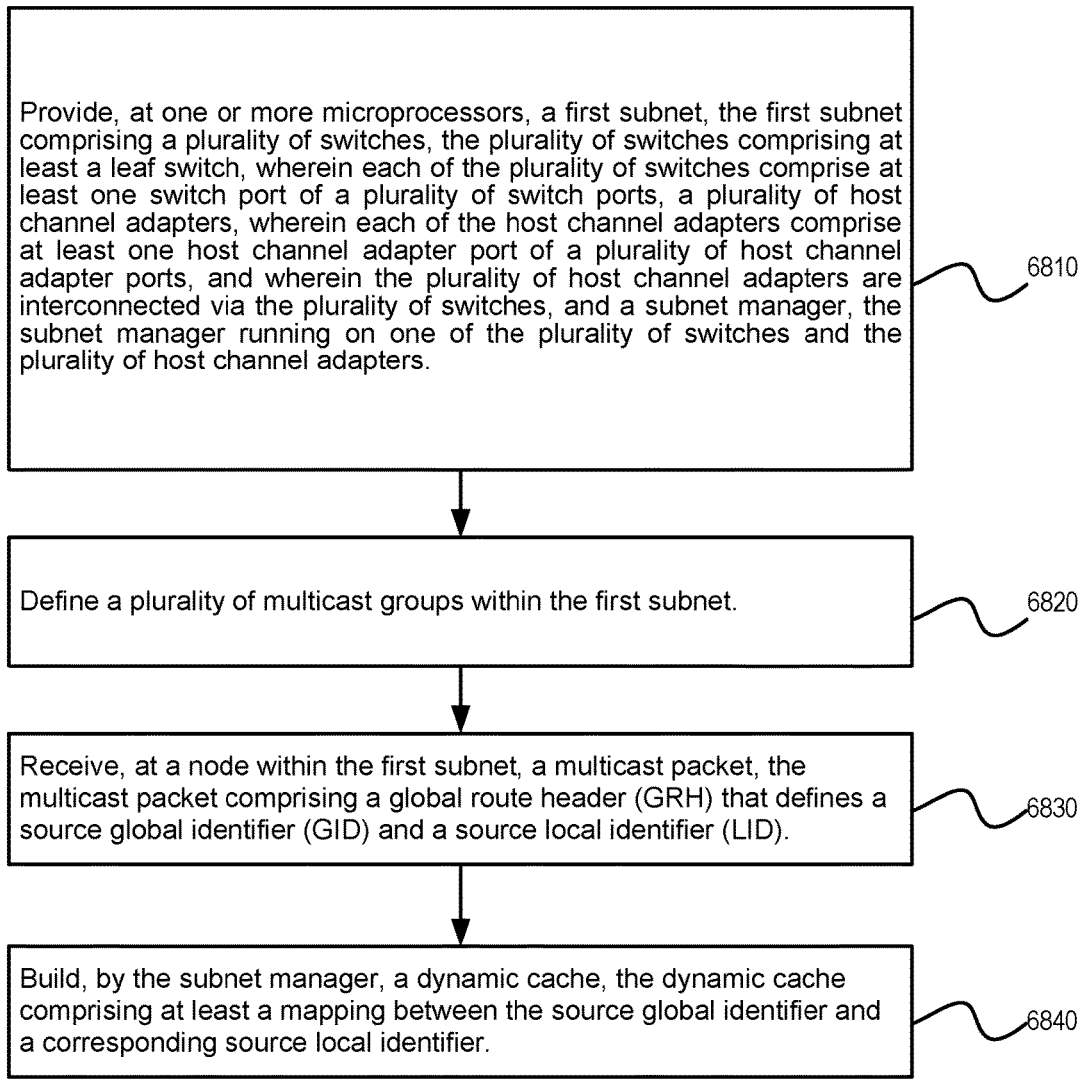
FIG. 68 illustrates a flowchart of a method to use all incoming multicast (MC) packets as a basis for global unique identifier (GUID) to local identifier (LID) cache contents in a high performance computing environment, in accordance with an embodiment.

FIG. 68 illustrates a flowchart of a method to use all incoming multicast (MC) packets as a basis for global unique identifier (GUID) to local identifier (LID) cache contents in a high performance computing environment, in accordance with an embodiment.

In accordance with an embodiment, at step 6810, the method can provide, at one or more microprocessors, a first subnet, the first subnet comprising a plurality of switches, the plurality of switches comprising at least a leaf switch, wherein each of the plurality of switches comprise at least one switch port of a plurality of switch ports, a plurality of host channel adapters, wherein each of the host channel adapters comprise at least one host channel adapter port of a plurality of host channel adapter ports, and wherein the plurality of host channel adapters are interconnected via the plurality of switches, and a subnet manager, the subnet manager running on one of the plurality of switches and the plurality of host channel adapters.

In accordance with an embodiment, at step 6820, the method can define a plurality of multicast groups within the first subnet.

In accordance with an embodiment, a step 6830, the method can receive, at a node within the first subnet, a multicast packet, the multicast packet comprising a global route header (GRH) that defines a source global identifier (GID) and a source local identifier (LID).

In accordance with an embodiment, at step 6840, the method can build, by the subnet manager, a dynamic cache, the dynamic cache comprising at least a mapping between the source global identifier and a corresponding source local identifier.

Combine IB and IP Address and Name Resolution Via Default IB MCGs (5839)

In accordance with an embodiment, since most addressing and node identification schemes for nodes/ports in IB fabrics are based on RDMA-CM and use of IP addresses as the application level identification of communicating end-nodes, there is a need for mapping of IP addresses to IB addresses as well as for resolving symbolic name associations with nodes and interfaces.

In accordance with an embodiment, based on an efficient and scalable scheme for resolving IB addresses based on announcement and discovery protocols leveraging default IB MCGs, the protocols can be extended to also include the ability to include IP address and symbolic name information.

In accordance with an embodiment, more specifically, the protocol can include options for providing application specific values using TLV (type-length-value) style generic representation. In this way, it is possible to issue requests that have an application specific argument (e.g. IP address) for which an IB address mapping is requested, and it would also be possible to have responses and announcement messages containing an arbitrary set of such TLVs.

In accordance with an embodiment, based on a core IB address cache, the various TLVs can be associated with IB addresses in the cache and also be used as lookup criteria. In this way, both various IP addresses, symbolic names, MAC addresses, etc. could all be associated with the relevant IB address info and be maintained by a single cache on each node and also be conveyed in a single message on the IB fabric.

Figure 69:
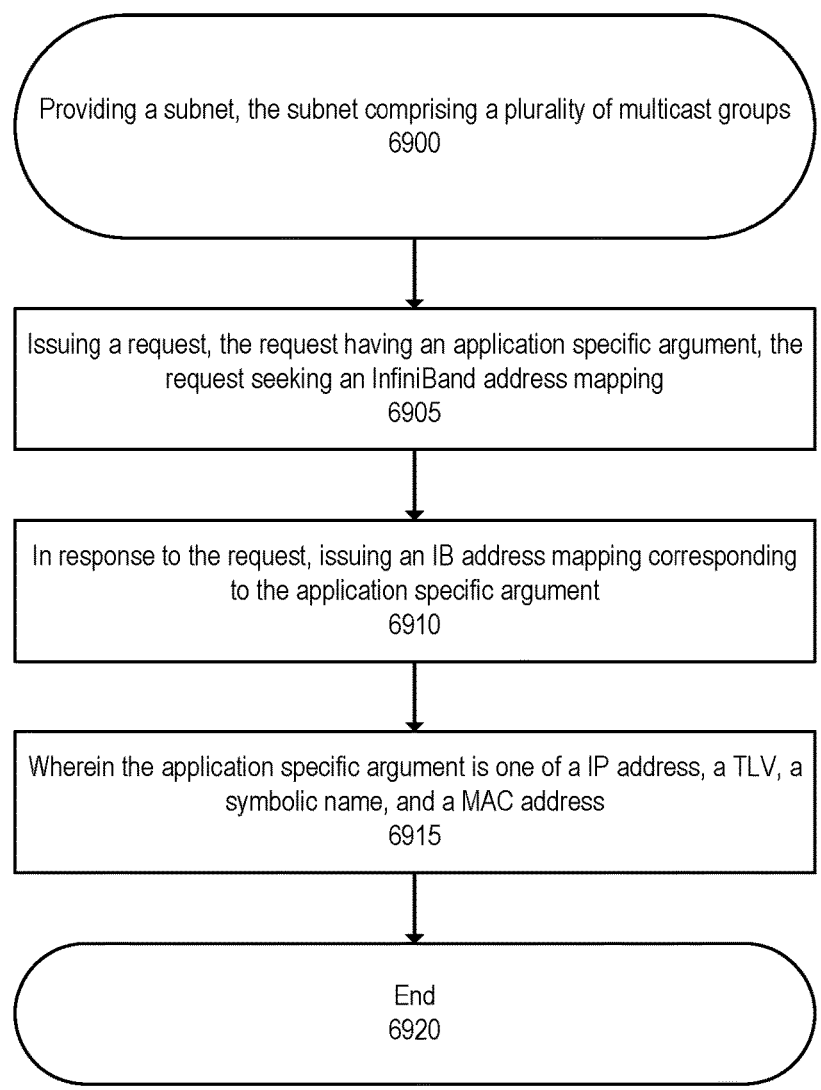
FIG. 69 illustrates a flowchart of a method to provide combined IB and IP address and name resolution schemes via default IB multicast groups in a high performance computing environment, in accordance with an embodiment.

FIG. 69 illustrates a flowchart of a method to provide combined IB and IP address and name resolution schemes via default IB multicast groups in a high performance computing environment, in accordance with an embodiment.

In accordance with an embodiment, at step 6900, the method can provide a subnet, the subnet comprising a plurality of multicast groups.

In accordance with an embodiment, at step 6905, the method can issue a request, the request having an application specific argument, the request seeking an InfiniBand address mapping.

In accordance with an embodiment, at step 6910, the method can, in response to the request, issue an IB address mapping corresponding to the application specific argument.

In accordance with an embodiment, at 6915, the application specific argument is one of an IP address, a TLV, a symbolic name, and a MAC address.

In accordance with an embodiment, at step 6920, the method can end.

Figure 70:
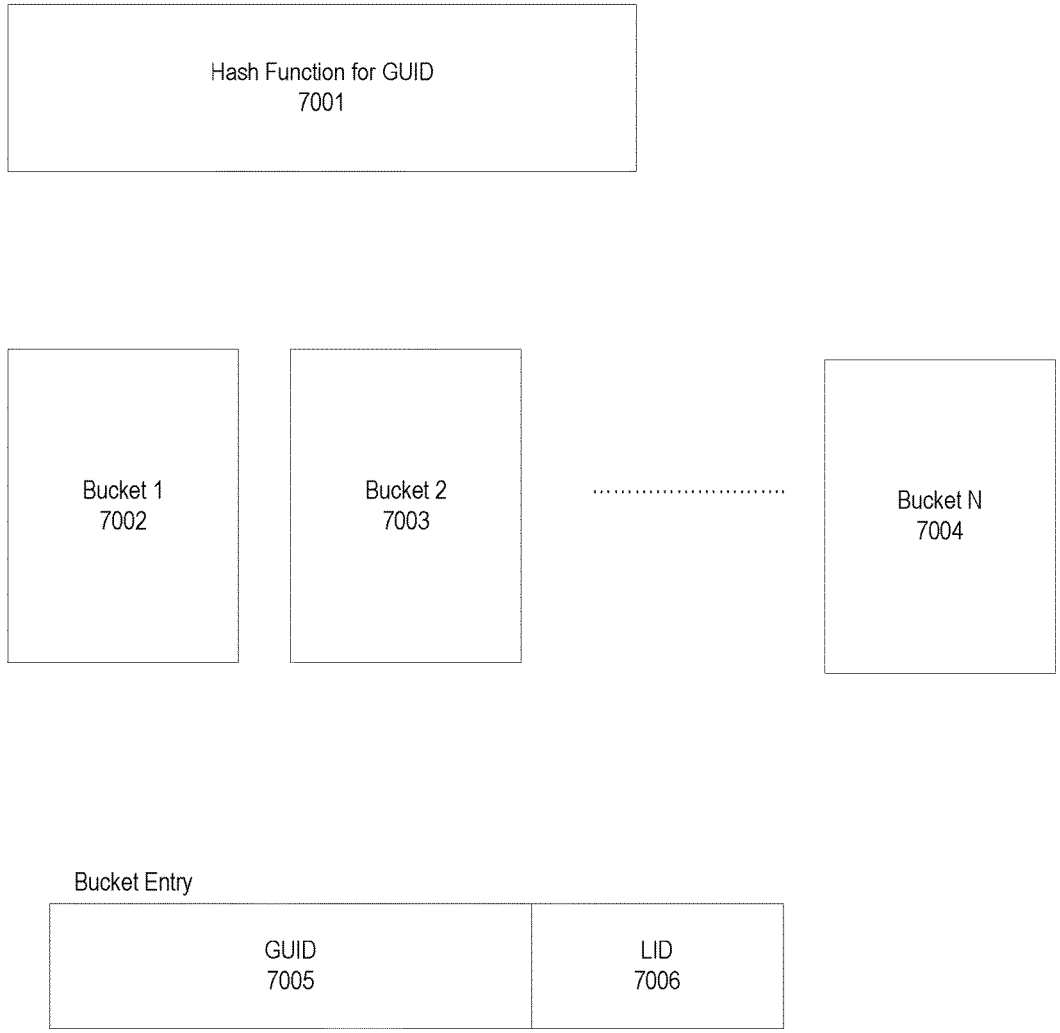
FIG. 70 illustrates a system to provide combined IB and IP address and name resolution schemes via default IB multicast groups in a high performance computing environment, in accordance with an embodiment. More particularly, the figure shows a conventional GUID to LID cache.

FIG. 70 illustrates a system to provide combined IB and IP address and name resolution schemes via default IB multicast groups in a high performance computing environment, in accordance with an embodiment. More particularly, the figure shows a conventional GUID to LID cache.

In accordance with an embodiment, the conventional GUID to LID cache can comprise a hash function for the GUID 7001, N number of buckets, such as bucket 1 7002 through bucket N 7004, as well as a number of bucket entries that relate a GUID 7005 to a LID 7006.

In accordance with an embodiment, the GUID to LID cache can be utilized as a fixed feature. Using TLV based node info records, a dynamic list of such records can be maintained with an associated indexing scheme.

In accordance with an embodiment, for each supported info type (e.g., IP, MAC address . . . etc.), a dedicated lookup infrastructure can be provided that is similar to the hash based GUID to LID cache. However, in this case, the looked up value is an index value to access the main index for the node info record list.

In accordance with an embodiment, lookup functions will take any supported TLV as input and will return the relevant record if it is matched. Additional parameters can restrict the scope of the lookup (e.g., name lookup can be restricted to a specific partition.)

In accordance with an embodiment, an extended notification multicast packet protocol with generic TLVs for arbitrary information can be used. A sender GUID and sender LID is part of GRH and LRH of multicast and unicast packets—GRH is required for both].

In accordance with an embodiment, more than one message can be used to represent more TLV based info than what a single message can contain.

Figure 71:
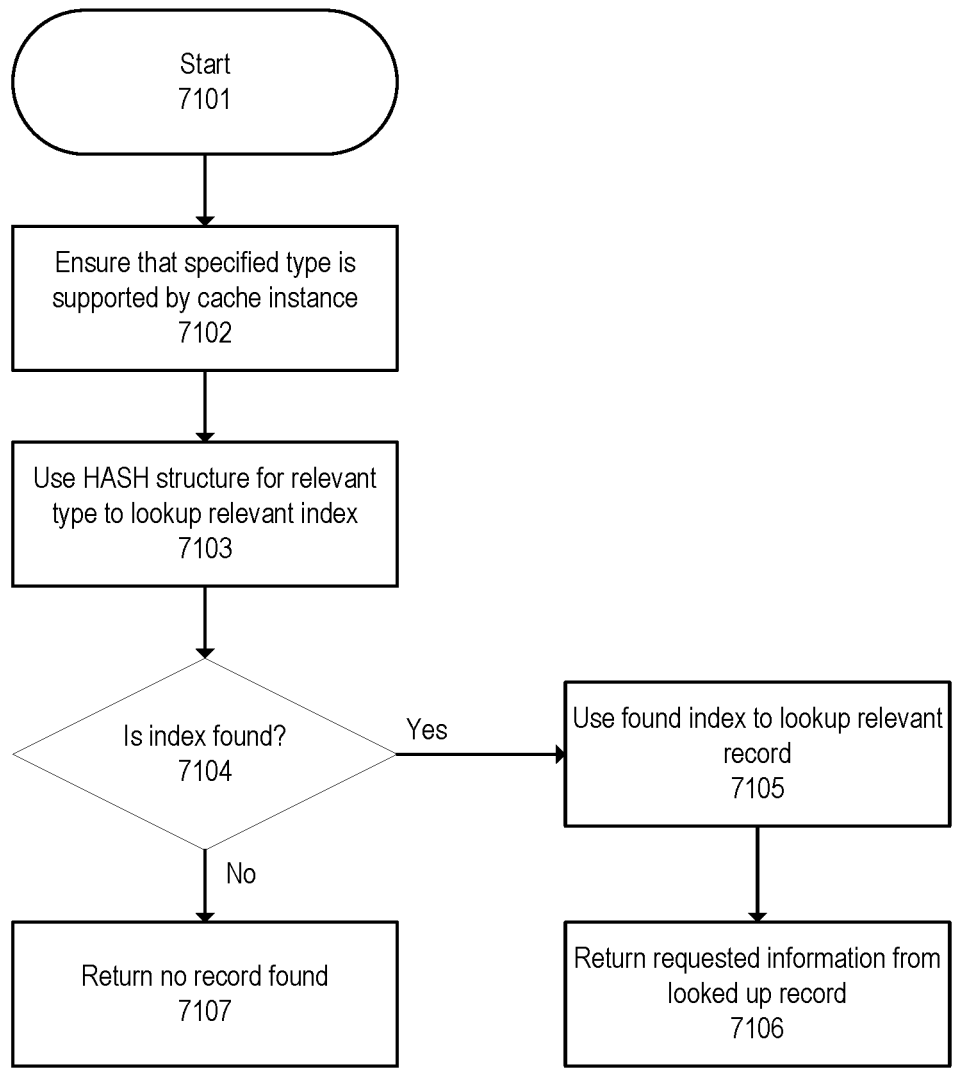
FIG. 71 illustrates a flowchart of a method to provide combined IB and IP address and name resolution schemes via default IB multicast groups in a high performance computing environment, in accordance with an embodiment.

FIG. 71 illustrates a flowchart of a method to provide combined IB and IP address and name resolution schemes via default IB multicast groups in a high performance computing environment, in accordance with an embodiment.

More particularly, the flowchart shows a generic cache lookup scheme where TLV (type—length value) type and value can be input in order to map IB address (GID and LID) or to complete cache record with extra TLVs.

In accordance with an embodiment, at step 7101, the method can start.

In accordance with an embodiment, at step 7102, the method can ensure that the specified type is supported by the cache instance. That is, the method can ensure that the specified type of a received message is supported by the cache instance running within the node at which the message is received.

In accordance with an embodiment, at step 7103, the method can use the hash structure for relevant type to lookup the relevant index (that is, the index that supports the specified type of the received message).

In accordance with an embodiment, at step 7104, if the index is found, then the method can use the found index (i.e., the correct found index meaning the found index that supports the relevant type) to look up the relevant record (i.e., GRH or GUID/LID and LID mapping).

In accordance with an embodiment, at step 7105, the method can return the requested information from the looked up record.

In accordance with an embodiment, at step 7106, if the index is not found/located, then the method can return a message that the index is not found and/or that the specified type is not supported.

Figure 72:
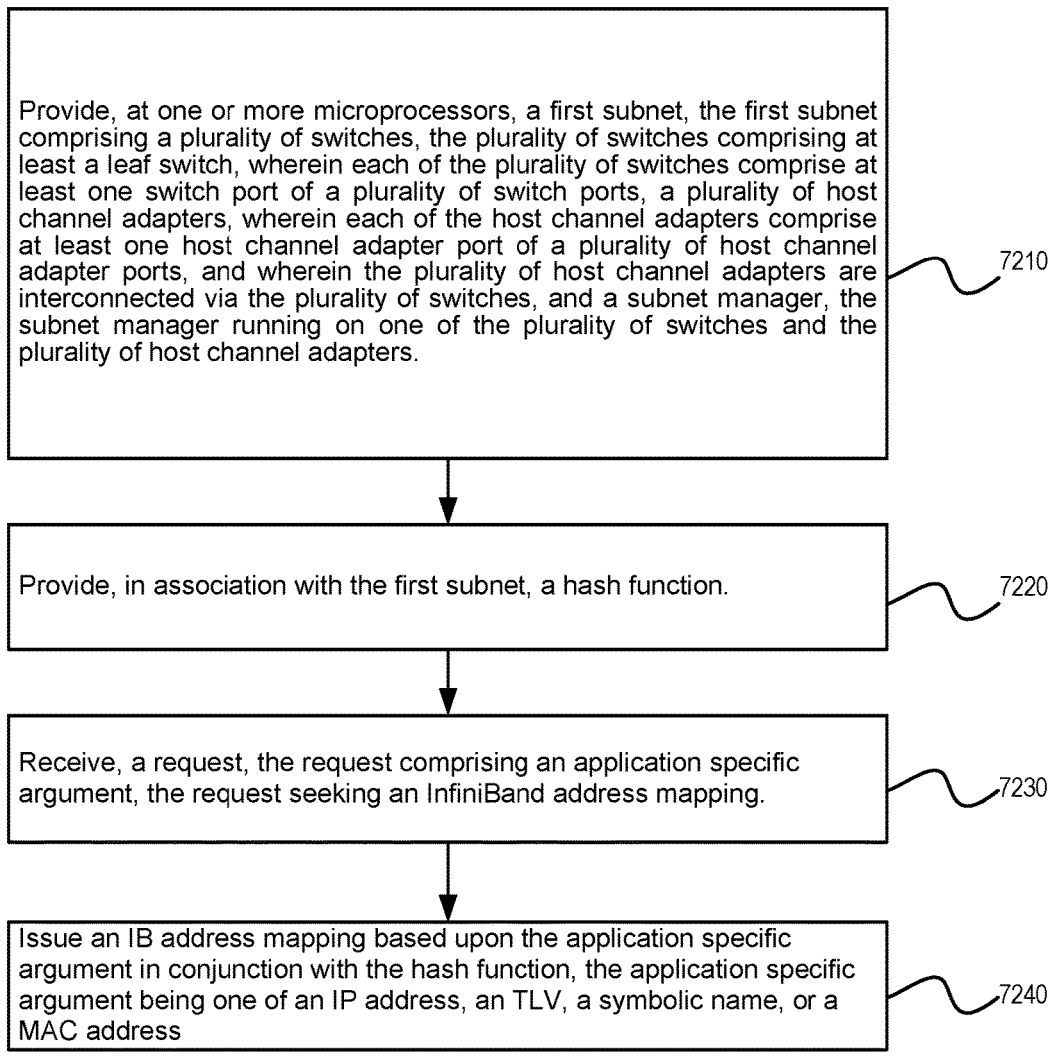
FIG. 72 illustrates a flowchart of a method to provide combined IB and IP address and name resolution schemes via default IB multicast groups in a high performance computing environment, in accordance with an embodiment.

FIG. 72 illustrates a flowchart of a method to provide combined IB and IP address and name resolution schemes via default IB multicast groups in a high performance computing environment, in accordance with an embodiment.

In accordance with an embodiment, at step 7210, the method can provide, at one or more microprocessors, a first subnet, the first subnet comprising a plurality of switches, the plurality of switches comprising at least a leaf switch, wherein each of the plurality of switches comprise at least one switch port of a plurality of switch ports, a plurality of host channel adapters, wherein each of the host channel adapters comprise at least one host channel adapter port of a plurality of host channel adapter ports, and wherein the plurality of host channel adapters are interconnected via the plurality of switches, and a subnet manager, the subnet manager running on one of the plurality of switches and the plurality of host channel adapters.

In accordance with an embodiment, at step 7220, the method can provide, in association with the first subnet, a hash function.

In accordance with an embodiment, a step 7230, the method can receive, a request, the request comprising an application specific argument, the request seeking an InfiniBand address mapping.

In accordance with an embodiment, at step 7240, the method can issue an IB address mapping based upon the application specific argument in conjunction with the hash function, the application specific argument being one of an IP address, a TLV, a symbolic name, or a MAC address.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in the cloud as part of, or as a service of, a cloud computing system based on shared, elastic resources delivered to users in a self-service, metered manner using Web technologies. There are five characteristics of the cloud (as defined by the National Institute of Standards and Technology: on-demand self-service; broad network access; resource pooling; rapid elasticity; and measured service. See, e.g. "The NIST Definition of Cloud Computing", Special Publication 800-145 (2011) which is incorporated herein by reference. Cloud deployment models include: Public, Private, and Hybrid. Cloud service models include Software as a Service (SaaS), Platform as a Service (PaaS), Database as a Service (DBaaS), and Infrastructure as a Service (IaaS). As used herein, the cloud is the combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description is not intended to be exhaustive or to limit the invention to the precise forms disclosed. Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A method for providing multicast group membership defined relative to partition membership in a high performance computing environment, comprising:

receiving, by a subnet manager of a subnet, a request to create a multicast group, wherein the request includes an indicator and wherein the indicator indicates that each member of a partition defined in the subnet is to be associated with the multicast group;

determining, by the subnet manager, a number of additional end-ports that are members of the partition that is defined in the subnet;

associating, by the subnet manager, the number of additional end-ports that are members of the partition with an identifier that defines the multicast group;

defining, by the subnet manager, a route to deliver a multicast packet that includes the identifier that defines the multicast group to each end-port that is associated with the identifier that defines the multicast group.

2. The method of claim 1, wherein the request to create the multicast group is received from an administrative interface.

3. The method of claim 1, wherein the request to create the multicast group is received from an end-node of the subnet.

4. The method of claim 3, wherein the request to create the multicast group comprises a management datagram packet, wherein the management datagram packet specifies a method and a method attribute, and wherein the indicator is a bit that is set in the method attribute.

5. The method of claim 4, wherein the method is SubnAdmSetQ, and wherein the attribute is MCMemberRecord.

6. The method of claim 2, wherein the request to create the multicast group is generated by an administrative service as a result of a flag included in a request to create the partition.

7. The method of claim 6, wherein the flag is an Internet Protocol over InfiniBand (IPoIB) flag.

8. A system for providing multicast group membership defined relative to partition membership in a high performance computing environment, the system comprising a subnet manager, the subnet manager comprising a processor, wherein the processor is configured to:

receive a request to create a multicast group, wherein the request includes an indicator and wherein the indicator indicates that each member of a partition defined in the subnet is to be associated with the multicast group;

determine a number of additional end-ports that are members of the partition that is defined in the subnet;

associate the number of additional end-ports that are members of the partition with an identifier that defines the multicast group;

define a route to deliver a multicast packet that includes the identifier that defines the multicast group to each end-port that is associated with the identifier that defines the multicast group.

9. The system of claim 8, wherein the request to create the multicast group is received from an administrative interface.

10. The system of claim 8, wherein the request to create the multicast group is received from an end-node of the subnet.

11. The system of claim 10, wherein the request to create the multicast group comprises a management datagram packet, wherein the management datagram packet specifies a method and a method attribute, and wherein the indicator is a bit that is set in the method attribute.

12. The system of claim 11, wherein the method is SubnAdmSetQ, and wherein the attribute is MCMemberRecord.

13. The system of claim 9, wherein the request to create the multicast group is generated by an administrative service as a result of a flag included in a request to create the partition.

14. The system of claim 13, wherein the flag is an Internet Protocol over InfiniBand (IPoIB) flag.

15. A non-transitory machine readable storage medium having instructions stored thereon for supporting multicast group membership defined relative to partition membership in a high performance computing environment that, when executed, cause a subnet manager of a subnet to perform steps comprising:

receiving, by the subnet manager, a request to create a multicast group, wherein the request includes an indicator and wherein the indicator indicates that each member of a partition defined in the subnet is to be associated with the multicast group;

determining, by the subnet manager, a number of additional end-ports that are members of the partition that is defined in the subnet;

associating, by the subnet manager, the number of additional end-ports that are members of the partition with an identifier that defines the multicast group;

defining, by the subnet manager, a route to deliver a multicast packet that includes the identifier that defines the multicast group to each end-port that is associated with the identifier that defines the multicast group.

16. The non-transitory machine readable storage medium of claim 15, wherein the request to create the multicast group is received from an administrative interface.

17. The non-transitory machine readable storage medium of claim 15, wherein the request to create the multicast group is received from an end-node of the subnet.

18. The non-transitory machine readable storage medium of claim 17, wherein the request to create the multicast group comprises a management datagram packet, wherein the management datagram packet specifies a method and a method attribute, and wherein the indicator is a bit that is set in the method attribute.

19. The non-transitory machine readable storage medium of claim 18, wherein the method is SubnAdmSetQ, and wherein the attribute is MCMemberRecord.

20. The non-transitory machine readable storage medium of claim 16, wherein the request to create the multicast group is generated by an administrative service as a result of a flag included in a request to create the partition.

* * * * *

UNITED STATES PATENT AND TRADEMARK OFFICE
CERTIFICATE OF CORRECTION

PATENT NO. : 10,432,414 B2
APPLICATION NO. : 15/927448
DATED : October 1, 2019
INVENTOR(S) : Johnsen et al.

Page 1 of 4

It is certified that error appears in the above-identified patent and that said Letters Patent is hereby corrected as shown below:

On the Title Page

In Column 1, under Applicant, Line 2, after "CORPORATION" insert -- Redwood Shores, CA (US) --.

In the Specification

In Column 2, Line 1, delete "ANNOUNCMENTS" and insert -- ANNOUNCEMENTS --, therefor.

In Column 3, Line 25, after "embodiment" insert -- . --.

In Column 7, Line 12, after "embodiment" insert -- . --.

In Column 8, Line 2, delete "www.inifinibandta.org," and insert -- www.infinibandta.org, --, therefor.

In Column 9, Line 7, delete "and or" and insert -- and/or --, therefor.

In Column 12, Line 18, delete "SR-IIV" and insert -- SR-IOV --, therefor.

In Column 14, Lines 56-57, delete "PCI e" and insert -- PCIe --, therefor.

In Column 17, Line 59, after "PF" insert -- . --.

In Column 30, Line 60, after "port" insert -- . --.

In Column 31, Line 18, after "port" insert -- . --.

In Column 36, Line 34, delete "LlDs" and insert -- LIDs --, therefor.

Signed and Sealed this
Twentieth Day of October, 2020

Andrei Iancu
*Director of the United States Patent and Trademark Office*

CERTIFICATE OF CORRECTION (continued)
U.S. Pat. No. 10,432,414 B2

In Column 36, Line 67, after "available" insert -- . --.

In Column 38, Line 10, delete "LlDs" and insert -- LIDs --, therefor.

In Column 39, Line 2, after "available" insert -- . --.

In Column 40, Line 4, delete "(IPolB)" and insert -- (IPoIB) --, therefor.

In Column 40, Line 30, delete "IPolB" and insert -- IPoIB --, therefor.

In Column 40, Line 65, delete "SubnAdmSet( )" and insert -- SubnAdmSet() --, therefor.

In Column 51, Line 28, delete "SubnAdmSet( )" and insert -- SubnAdmSet() --, therefor.

In Column 54, Line 63, delete "SubnGet( )" and insert -- SubnGet() --, therefor.

In Column 54, Line 64, delete "SubnGetResp( )" and insert -- SubnGetResp() --, therefor.

In Column 59, Line 40, delete "MLID." and insert -- MGID. --, therefor.

In Column 61, Line 64, delete "M LIDs" and insert -- MLIDs --, therefor.

In Column 66, Line 66, delete "S010," and insert -- 5010, --, therefor.

In Column 67, Line 12, delete "S020," and insert -- 5020, --, therefor.

In Column 67, Line 16, delete "S030," and insert -- 5030, --, therefor.

In Column 67, Line 20, delete "S040," and insert -- 5040, --, therefor.

In Column 68, Line 52, delete "S100," and insert -- 5100, --, therefor.

In Column 68, Line 56, delete "S105," and insert -- 5105, --, therefor.

In Column 68, Line 60, delete "S110," and insert -- 5110, --, therefor.

In Column 68, Line 64, delete "S115," and insert -- 5115, --, therefor.

In Column 68, Line 67, after "announcement" insert -- . --.

In Column 69, Line 1, delete "S120," and insert -- 5120, --, therefor.

In Column 70, Line 17, delete "S501." and insert -- 5501. --, therefor.

In Column 70, Line 18, delete "S502." and insert -- 5502. --, therefor.

CERTIFICATE OF CORRECTION (continued)
U.S. Pat. No. 10,432,414 B2

In Column 70, Line 22, delete "S504." and insert -- 5504. --, therefor.

In Column 70, Line 24, delete "S505." and insert -- 5505. --, therefor.

In Column 70, Line 41, delete "S601," and insert -- 5601, --, therefor.

In Column 70, Line 43, delete "S602," and insert -- 5602, --, therefor.

In Column 70, Line 45, delete "S603," and insert -- 5603, --, therefor.

In Column 70, Line 48, delete "S604," and insert -- 5604, --, therefor.

In Column 70, Line 51, delete "S605," and insert -- 5605, --, therefor.

In Column 70, Line 54, delete "S606," and insert -- 5606, --, therefor.

In Column 70, Line 57, delete "S607," and insert -- 5607 --, therefor.

In Column 70, Line 61, delete "S608," and insert -- 5608, --, therefor.

In Column 70, Line 64, delete "S609," and insert -- 5609, --, therefor.

In Column 71, Line 1, delete "S610," and insert -- 5610, --, therefor.

In Column 71, Line 5, delete "S611," and insert -- 5611, --, therefor.

In Column 71, Line 7, delete "S612," and insert -- 5612, --, therefor.

In Column 71, Line 14, delete "S710," and insert -- 5710, --, therefor.

In Column 71, Line 28, delete "S720," and insert -- 5720, --, therefor.

In Column 71, Line 34, delete "S730," and insert -- 5730, --, therefor.

In Column 71, Line 39, delete "S740," and insert -- 5740, --, therefor.

In Column 71, Line 45, delete "S750," and insert -- 5750, --, therefor.

In Column 71, Line 49, delete "S760," and insert -- 5760, --, therefor.

In Column 72, Line 51, delete "S800," and insert -- 5800, --, therefor.

In Column 72, Line 54, delete "S805," and insert -- 5805, --, therefor.

In Column 72, Line 55, delete "S810," and insert -- 5810, --, therefor.

CERTIFICATE OF CORRECTION (continued)
U.S. Pat. No. 10,432,414 B2

In Column 72, Line 60, delete "S815," and insert -- 5815, --, therefor.

In Column 76, Line 5, after "embodiment" insert -- . --.

In the Claims

In Column 81, Lines 23-24, in Claim 5, delete "SubnAdmSetQ," and insert -- SubnAdmSet(), --, therefor.

In Column 81, Line 29, in Claim 7, delete "(IPolB)" and insert -- (IPoIB) --, therefor.

In Column 82, Line 4, in Claim 12, delete "SubnAdmSetQ," and insert -- SubnAdmSet(), --, therefor.

In Column 82, Line 48, in Claim 19, delete "SubnAdmSetQ," and insert -- SubnAdmSet(), --, therefor.